US012780715B2

(12) United States Patent
Sasaki et al.

(10) Patent No.: US 12,780,715 B2
(45) Date of Patent: Nov. 3, 2026

(54) OPTICAL GLASS AND OPTICAL ELEMENT

(71) Applicant: HOYA CORPORATION, Tokyo (JP)

(72) Inventors: Hayato Sasaki, Tokyo (JP); Tomoaki Negishi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 1008 days.

(21) Appl. No.: 17/909,662

(22) PCT Filed: Mar. 10, 2021

(86) PCT No.: PCT/JP2021/009501
§ 371 (c)(1),
(2) Date: Sep. 6, 2022

(87) PCT Pub. No.: WO2021/182505
PCT Pub. Date: Sep. 16, 2021

(65) Prior Publication Data

US 2023/0121192 A1 Apr. 20, 2023

(30) Foreign Application Priority Data

Mar. 12, 2020 (JP) ................................ 2020-042968
Mar. 23, 2020 (JP) ................................ 2020-050615
(Continued)

(51) Int. Cl.
*C03C 3/068* (2006.01)
*C03C 3/064* (2006.01)
(Continued)

(52) U.S. Cl.
CPC .............. *C03C 3/068* (2013.01); *C03C 3/064* (2013.01); *C03C 3/097* (2013.01); *G02B 1/00* (2013.01);
(Continued)

(58) Field of Classification Search
None
See application file for complete search history.

(56) References Cited

U.S. PATENT DOCUMENTS 8,852,745 B2 * 10/2014 Yamaguchi ............. C03C 3/062 501/901
2010/0222199 A1 * 9/2010 Wolff ...................... C03C 3/068 501/78
(Continued)

FOREIGN PATENT DOCUMENTS

CN 101932532 A 12/2010
CN 103145331 A 6/2013
(Continued)

OTHER PUBLICATIONS

Machine Translation of CN-109399916-A ("Sun") (Year: 2019).*
Machine Translation of CN-108558202-A ("Ouyang") (Year: 2018).*
Hashimoto et al., "Ti3+-Free Titanoborophosphate Glasses as Molding Glasses with High Refractive Indices," J. American Ceramic Society 92 (2009), pp. 1250-1255 (Year: 2009).*
(Continued)

*Primary Examiner* — Amber R Orlando
*Assistant Examiner* — Paul Alan Forsyth
(74) *Attorney, Agent, or Firm* — Greenblum & Bernstein, P.L.C.

(57) ABSTRACT

To provide an optical glass having a high refractive index and a relatively low specific gravity, and an optical element. An optical glass which is a $SiO_2$—$TiO_2$—$Nb_2O_5$-based glass, and in which the content of $SiO_2$ is 10% by mass or greater, the total content of $Na_2O$, $K_2O$, and $Cs_2O$ ($Na_2O$+$K_2O$+$Cs_2O$) is 11.0% by mass or less, and the specific gravity and the refractive index nd thereof satisfy formula (1).

$$nd \geq 0.2 \times \text{specific gravity} + 1.18 \quad (1):$$

5 Claims, 10 Drawing Sheets

(30) Foreign Application Priority Data

| | | |
|---|---|---|
| Mar. 23, 2020 | (JP) | 2020-050618 |
| Mar. 23, 2020 | (JP) | 2020-050620 |

(51) Int. Cl.

*C03C 3/097* (2006.01)
*F21V 8/00* (2006.01)
*G02B 1/00* (2006.01)

(52) U.S. Cl.

CPC ........ *G02B 6/0065* (2013.01); *C03C 2201/31* (2013.01); *C03C 2201/3417* (2013.01); *C03C 2201/40* (2013.01)

(56) References Cited

U.S. PATENT DOCUMENTS

| | | | | |
|---|---|---|---|---|
| 2011/0034315 | A1* | 2/2011 | Takazawa | C03C 3/066 501/79 |
| 2014/0106174 | A1* | 4/2014 | Yamaguchi | C03C 3/064 501/73 |
| 2020/0325063 | A1* | 10/2020 | Amma | C03C 3/097 |

FOREIGN PATENT DOCUMENTS

| | | | | | |
|---|---|---|---|---|---|
| CN | 105347668 | A | | 2/2016 | |
| CN | 108558202 | A | * | 9/2018 | C03C 1/00 |
| CN | 109399916 | A | * | 3/2019 | C03C 3/068 |
| JP | 2009-179522 | A | | 8/2009 | |
| JP | 2009-209018 | A | | 9/2009 | |
| JP | 2012-229135 | A | | 11/2012 | |
| JP | 5734587 | B2 | | 6/2015 | |
| JP | 5766002 | B2 | | 8/2015 | |
| JP | 2016-88759 | A | | 5/2016 | |
| JP | 2019-34874 | A | | 3/2019 | |
| WO | 2018/221678 | A1 | | 12/2018 | |
| WO | 2019/151316 | A1 | | 8/2019 | |

OTHER PUBLICATIONS

Hashimoto, T. et al., "Ti3+-Free Titanoborophosphate Glasses as Molding Glasses with High Refractive Indices", Journal of the American Ceramic Society, 2009, 92[6], pp. 1250-1255.

Hashimoto, T. et al., "Ti3+-Free Multicomponent Titanophosphate Glasses as Ecologically Sustainable Optical Glasses", Journal of the American Ceramic Society, 2006, 89[8], pp. 2521-2527.

International Search Report issued in International Patent Application No. PCT/JP2021/009501, dated May 11, 2021, along with an English translation thereof.

International Preliminary Report on Patentability issued in International Patent Application No. PCT/JP2021/009501, dated Sep. 6, 2022, along with an English translation thereof.

Office Action that issued in Chinese Patent Application No. 202180019111.5, mailed Oct. 19, 2024, along with English translation thereof.

Office Action that issued in Japanese Patent Application No. 2022-507241, mailed Dec. 10, 2024, along with English translation thereof.

Office Action that issued in Taiwanese Patent Application No. 110108613, dated Aug. 22, 2024, along with English translation thereof.

Office Action that issued in the corresponding Chinese Patent Application No. 202180019111.5 dated Dec. 16, 2023, along with English translation.

Office Action that issued in Chinese Patent Application No. 202180019111.5, dated Jun. 8, 2024, along with English translation thereof.

Office Action that issued in corresponding Japanese Patent Appl. No. 2022-507241, dated Apr. 16, 2025, along with English translation thereof.

Office Action that issued in Chinese Patent Application No. 202180019111.5, mailed May 27, 2025, along with English translation thereof.

* cited by examiner

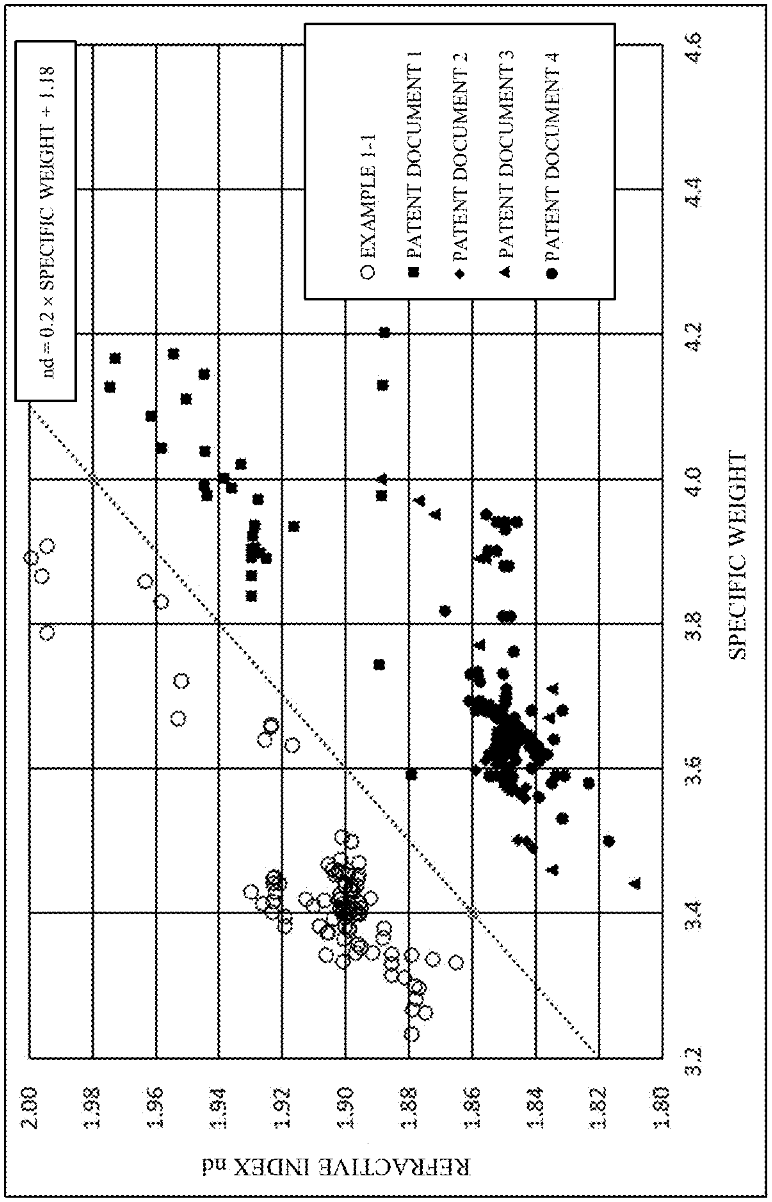
[FIG. 1]

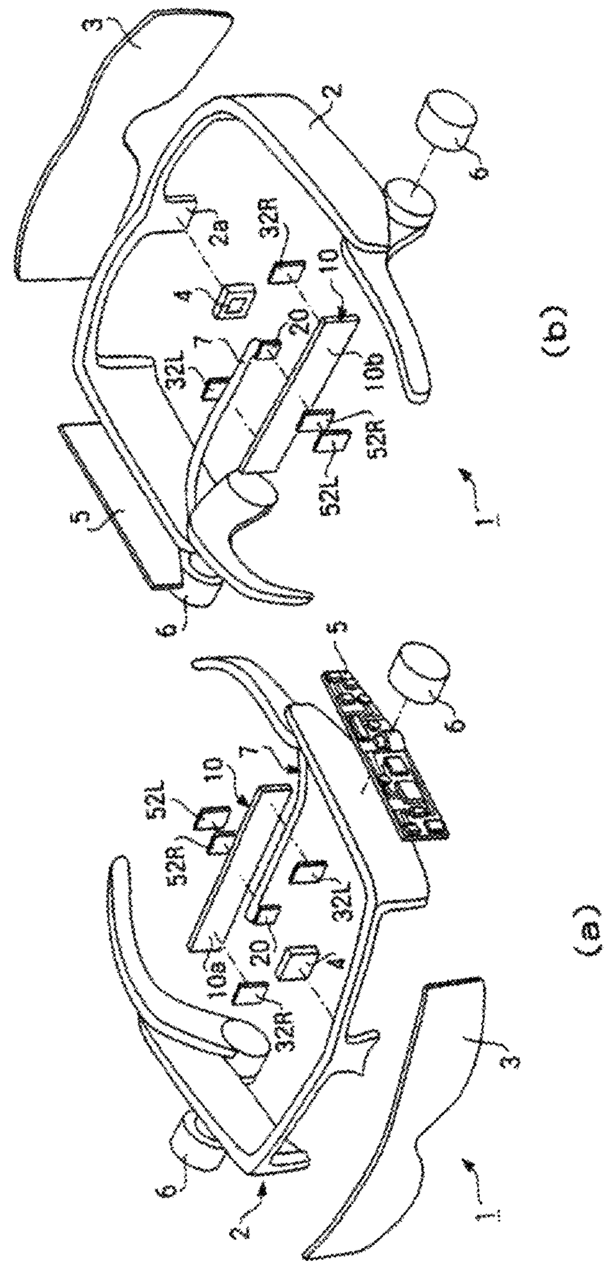
[FIG. 2]

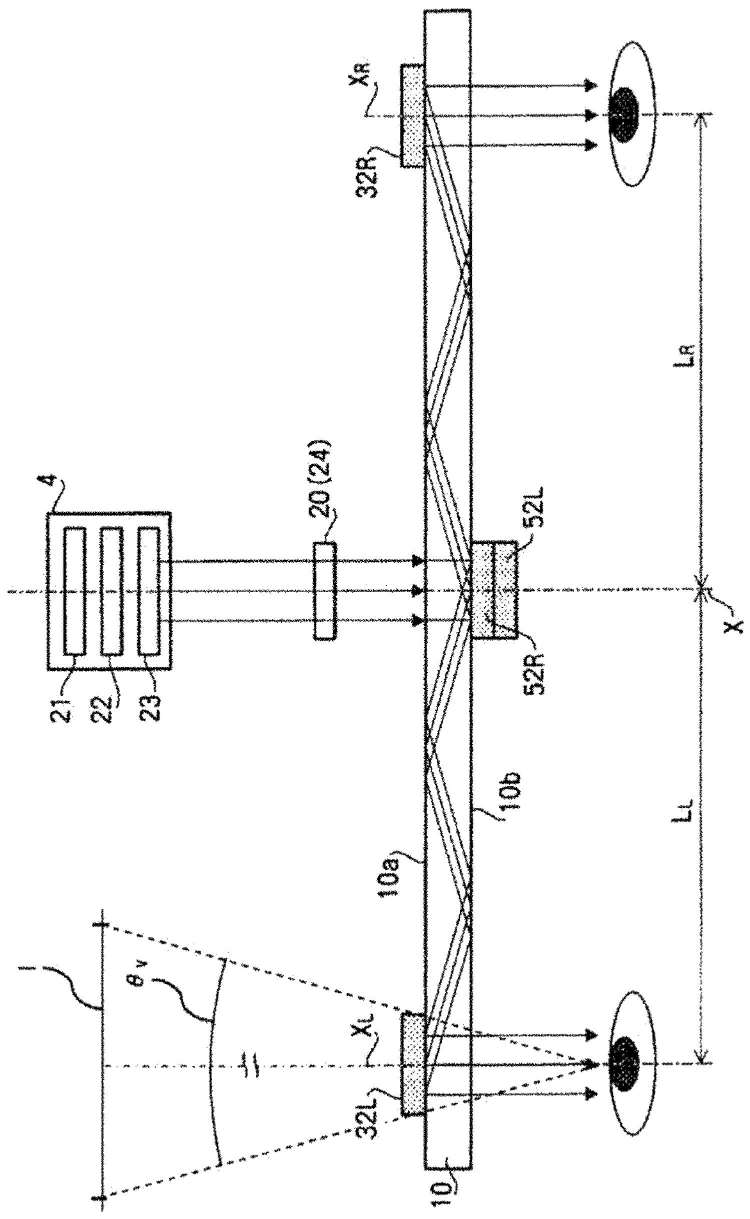
[FIG. 3]

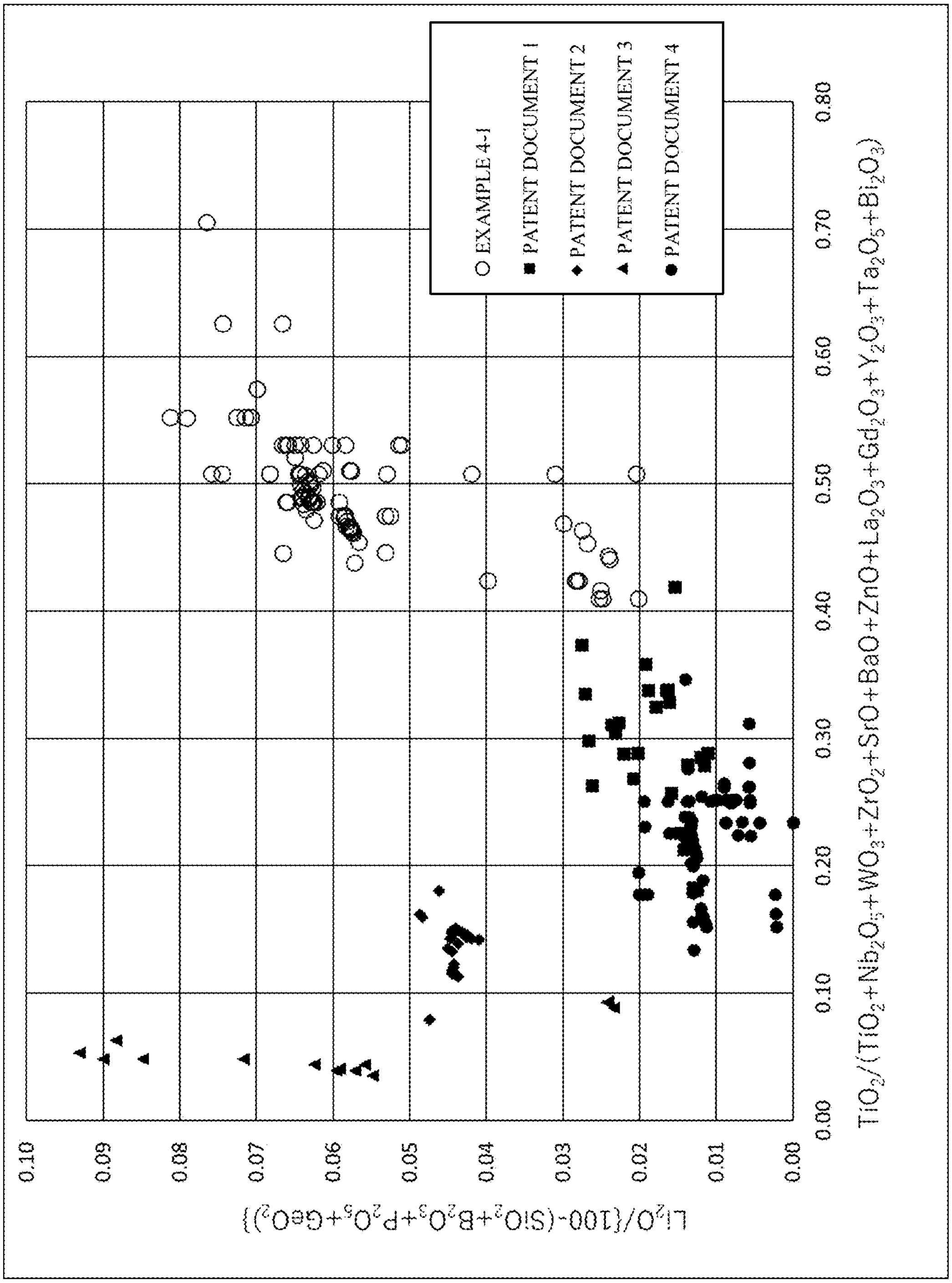
[FIG. 4]

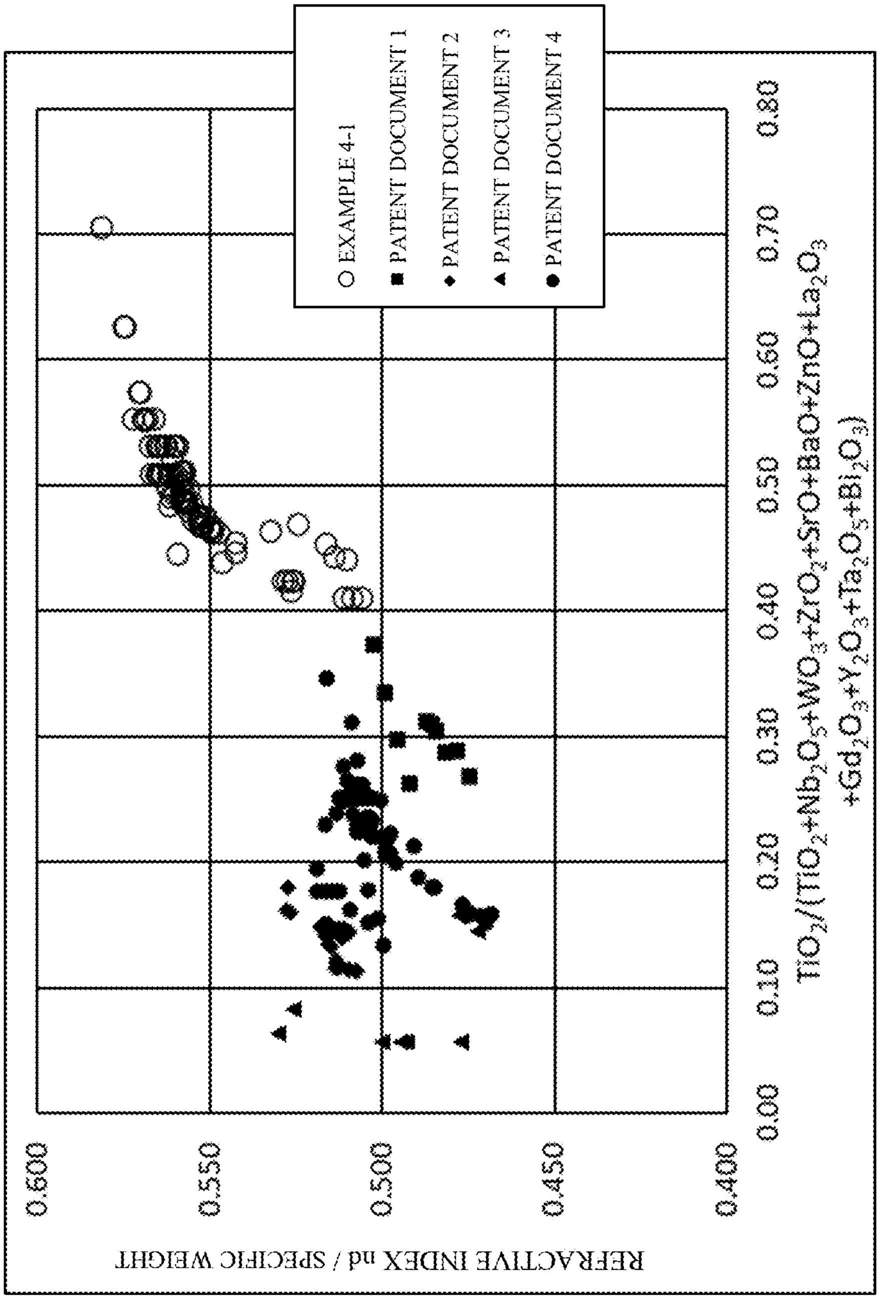
[FIG. 5]

[FIG. 6]
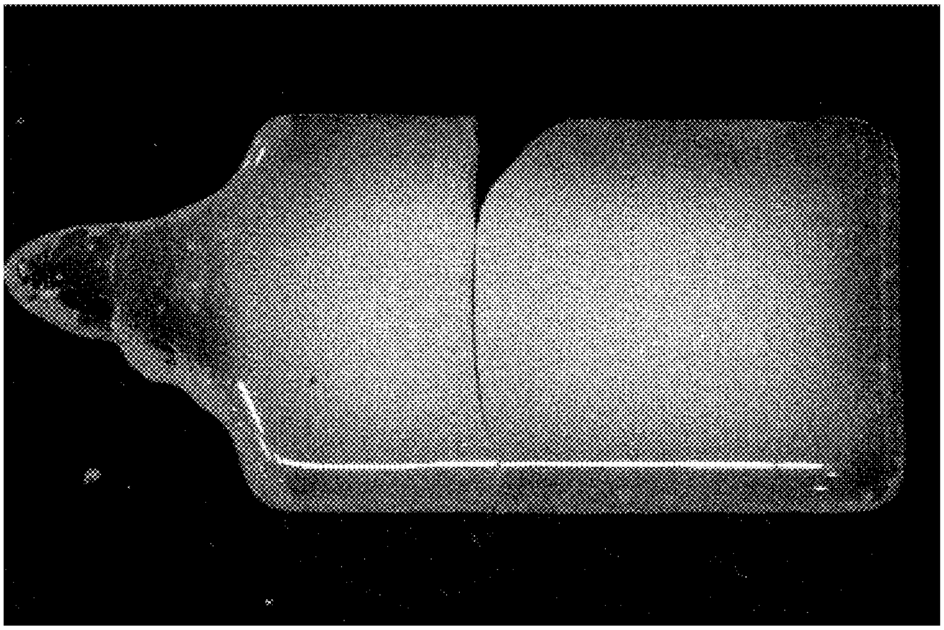

[FIG. 7]

[FIG. 8]
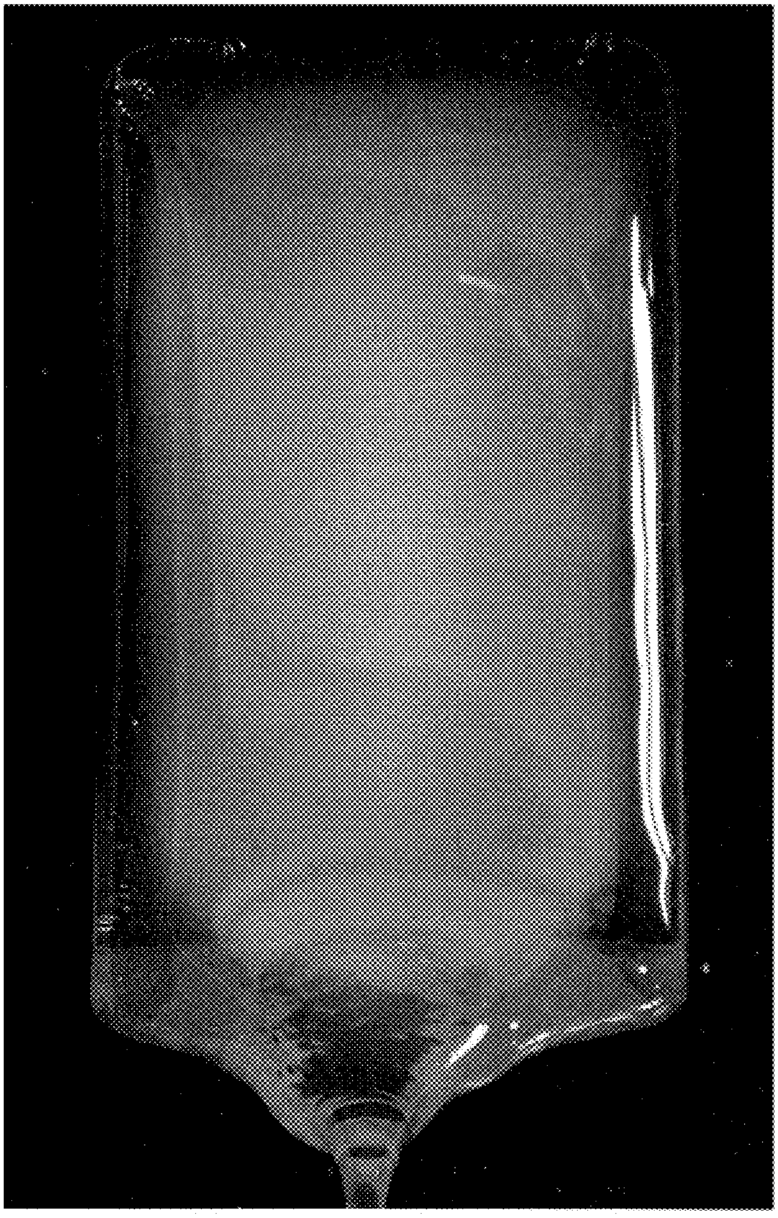

[FIG. 9]
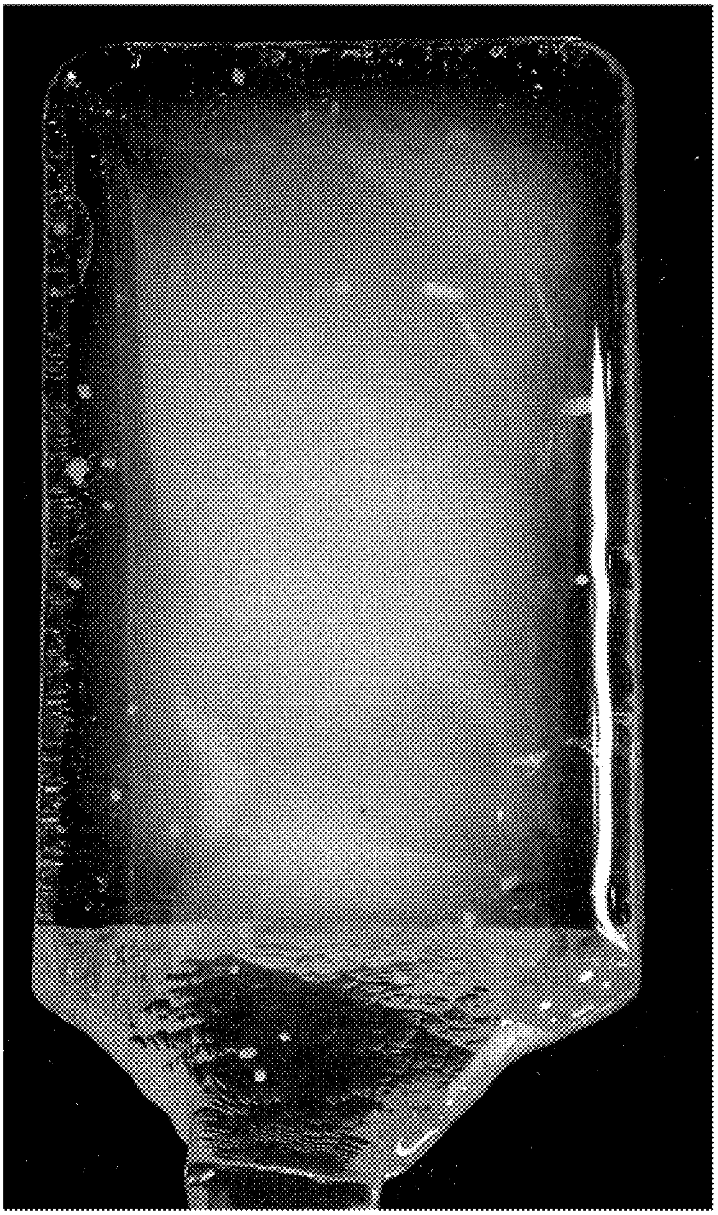

[FIG. 10]
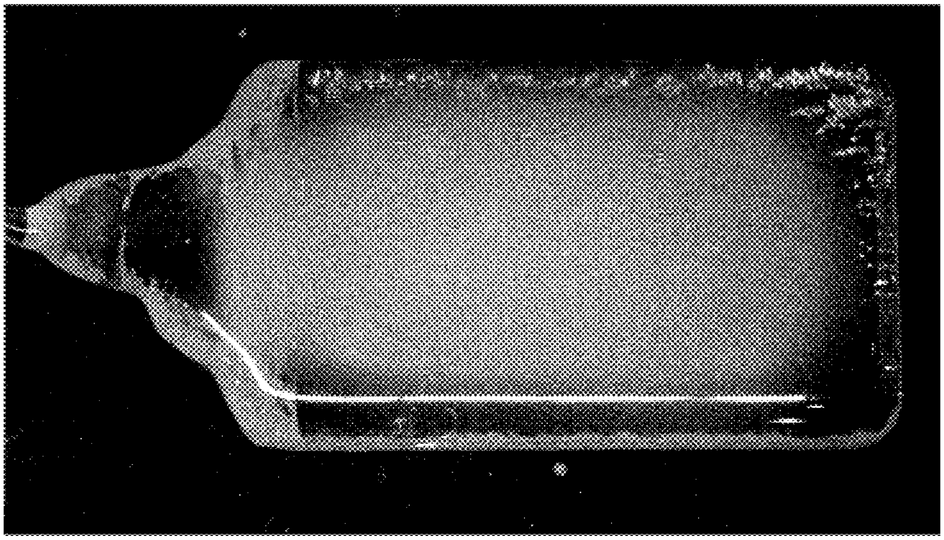
[FIG. 11]
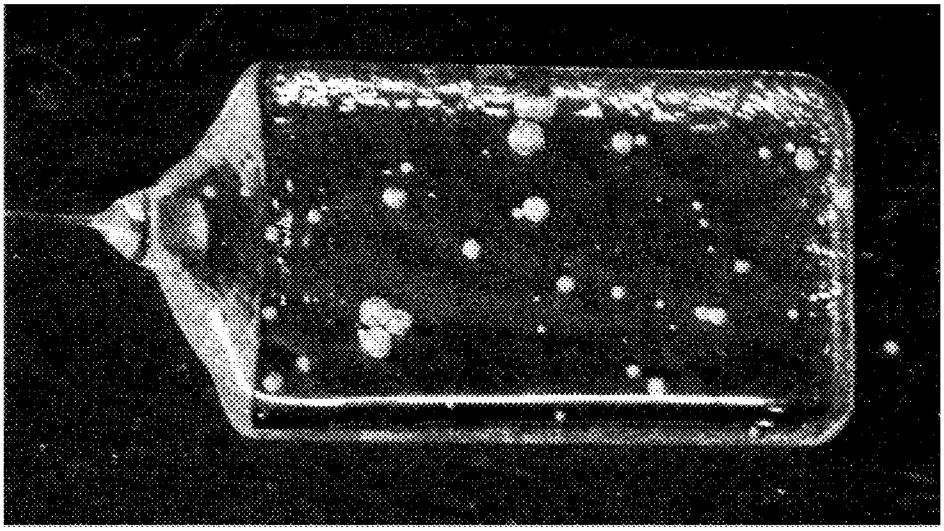

OPTICAL GLASS AND OPTICAL ELEMENT

TECHNICAL FIELD

The present invention relates to optical glass and an optical element.

BACKGROUND ART

Recently, as an augmented reality (AR) device, for example, a goggle type or spectacle type display device has been developed with the progress of an augmented reality (AR) technology. For example, in the goggle type display device, a lens having a high refractive index and a low specific weight is required, and there is a high demand for glass that can be applied to such a lens.

In Patent Documents 1 to 4, optical glass having a high refractive index is disclosed. However, the optical glass has a problem that a specific weight is excessively large with respect to a refractive index to be adopted as a lens for an AR device.

Therefore, optical glass of which a specific weight is reduced while maintaining a high refractive index is required.

Patent Document 1: JP Patent No. 5766002

Patent Document 2: JP Patent No. 5734587

Patent Document 3: JP Patent Application Laid Open No. 2016-88759

Patent Document 4: JP Patent Application Laid Open No. 2019-34874

SUMMARY

The present invention has been made in consideration of such circumstances, and an object thereof is to provide optical glass having a high refractive index and a comparatively low specific weight, and an optical element.

The gist of the present invention is as follows.

(1) Optical glass that is $SiO_2$—$TiO_2$—$Nb_2O_5$-based glass, in which a content of $SiO_2$ is 10% by mass or more, a total content [$Na_2O$+$K_2O$+$Cs_2O$] of $Na_2O$, $K_2O$, and $Cs_2O$ is 11.0% by mass or less, and a specific weight and a refractive index nd satisfy Expression (1) described below.

$$nd \geq 0.2 \times \text{Specific Weight} + 1.18 \quad (1)$$

(2) Optical glass, in which a content of $SiO_2$ is 1 to 50% by mass, a content of $TiO_2$ is 1 to 50% by mass, a content of BaO is 0 to 16.38% by mass, a content of $Nb_2O_5$ is 1 to 50% by mass, a total content [$Li_2O$+$Na_2O$+$K_2O$+$Cs_2O$] of $Li_2O$, $Na_2O$, $K_2O$, and $Cs_2O$ is 0.1 to 20% by mass, a total content [$La_2O_3$+$Gd_2O_3$+$Y_2O_3$] of $La_2O_3$, $Gd_2O_3$, and $Y_2O_3$ is 0 to 10% by mass, a total content [$TiO_2$+$Nb_2O_5$] of $TiO_2$ and $Nb_2O_5$ is 45 to 65% by mass, a mass ratio [$TiO_2$/($TiO_2$+$Nb_2O_5$)] of the content of $TiO_2$ to the total content of $TiO_2$ and $Nb_2O_5$ is 0.3 or more, a mass ratio [$Li_2O$/($Li_2O$+$Na_2O$+$K_2O$+$Cs_2O$)] of the content of $Li_2O$ to the total content of $Li_2O$, $Na_2O$, $K_2O$, and $Cs_2O$ is 0.1 to 1, an Abbe's number vd is 25 or less, and a refractive index nd is 1.86 or more.

(3) Optical glass, in which a content of $SiO_2$ is 1 to 50% by mass, a content of $TiO_2$ is 1 to 50% by mass, a content of $Nb_2O_5$ is 1 to 50% by mass, a content of $Na_2O$ is 0 to 8% by mass, a total content [$TiO_2$+$Nb_2O_5$] of $TiO_2$ and $Nb_2O_5$ is 40 to 80% by mass, a mass ratio [$TiO_2$/($TiO_2$+$Nb_2O_5$)] of the content of $TiO_2$ to the total content of $TiO_2$ and $Nb_2O_5$ is 0.3 or more, a refractive index nd is 1.88 or more, and a ratio [Refractive Index nd/Specific Weight] of the refractive index nd to a specific weight is 0.50 or more.

(4) The optical glass according to (3), in which a content of BaO is less than 16.0% by mass.

(5) Optical glass, in which a mass ratio [$Li_2O$/{100−($SiO_2$+$B_2O_3$+$P_2O_5$+$GeO_2$)}] of a content of $Li_2O$ to a total content of glass components other than $SiO_2$, $B_2O_3$, $P_2O_5$, and $GeO_2$ is 0.02 or more, a mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] of a content of $TiO_2$ to a total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is 0.40 or more, and a refractive index nd is 1.86 or more.

(6) An optical element, including:

the optical glass according to any one of (1) to (5).

(7) Alight guide plate, including:

the optical glass according to any one of (1) to (5).

(8) The light guide plate according to (7), in which a diffraction grating is provided on a surface.

(9) An image display device, including:

an image display element; and a light guide plate guiding light exiting from the image display element, in which the light guide plate includes the optical glass according to any one of (1) to (5).

According to the present invention, optical glass having a high refractive index and a comparatively low specific weight, and an optical element can be provided.

BRIEF DESCRIPTION OF DRAWINGS

FIG. 1 is a graph in which an example of optical glass according to a first embodiment of the present invention and optical glasses disclosed in Examples of Patent Documents 1 to 4 are plotted with a refractive index nd as a vertical axis and a specific weight as a horizontal axis;

FIG. 2 is a diagram illustrating a configuration of a head mounted display using a light guide plate that is one aspect of the present invention;

FIG. 3 is a side view schematically illustrating the configuration of the head mounted display using the light guide plate that is one aspect of the present invention;

FIG. 4 is a graph in which an example of optical glass according to a fourth embodiment of the present invention and the optical glasses disclosed in Examples of Patent Documents 1 to 4 are plotted with a mass ratio [$Li_2O$/{100-($SiO_2$+$B_2O_3$+$P_2O_5$+$GeO_2$)}] as a vertical axis and a mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] as a horizontal axis;

FIG. 5 is a graph in which an example of the optical glass according to the fourth embodiment of the present invention and the optical glasses disclosed in Examples of Patent Documents 1 to 4 are plotted with a ratio [Refractive Index nd/Specific Weight] of a refractive index nd to a specific weight as a vertical axis and a mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] as a horizontal axis;

FIG. 6 is a picture of a glass sample obtained in Comparative Example 1;

FIG. 7 is a picture of a glass sample obtained in Comparative Example 2;

FIG. 8 is a picture of a glass sample obtained in Comparative Example 4;

FIG. 9 is a picture of a glass sample obtained in Comparative Example 5;

FIG. 10 is a picture of a glass sample obtained in Comparative Example 6; and FIG. 11 is a picture of a glass sample obtained in Comparative Example 7.

In the present invention and the present specification, a glass composition is represented in terms of an oxide, unless otherwise specified. Here, the "glass composition in terms of an oxide" indicates a glass composition to be obtained by converting all glass raw materials as an oxide in glass that is obtained by decomposing all the glass raw materials in melting. The total content of all the glass components (excluding Sb($Sb_2O_3$) and Ce($CeO_2$) to be added as a clarificant) represented in terms of an oxide is 100% by mass. Each of the glass components is noted as $SiO_2$, $TiO_2$, and the like, in accord with the custom. Unless otherwise specified, the content and the total content of the glass components are on a mass basis, and "%" indicates "% by mass".

The content of the glass component can be quantified by a known method, for example, a method such as an inductively coupled plasma atomic emission spectrometry (ICP-AES) and an inductively coupled plasma mass spectrometry (ICP-MS). In addition, in the present specification and the present invention, the content of a structural component of 0% indicates that the structural component is not substantially contained, and the component is allowed to be contained at an inevitable impurity level.

Hereinafter, the present invention will be described by being divided into a first embodiment, a second embodiment, a third embodiment, and a fourth embodiment.

First Embodiment

Optical glass according to a first embodiment is $SiO_2$—$TiO_2$—$Nb_2O_5$-based glass, in which a content of $SiO_2$ is 10% by mass or more, a total content [$Na_2O+K_2O+Cs_2O$] of $Na_2O$, $K_2O$, and $Cs_2O$ is 11.0% by mass or less, and a specific weight and a refractive index nd satisfy Expression (1) described below.

$$nd \geq 0.2 \times \text{Specific Weight} + 1.18 \quad (1)$$

The optical glass according to the first embodiment is the $SiO_2$—$TiO_2$—$Nb_2O_5$-based glass. That is, $SiO_2$, $TiO_2$, and $Nb_2O_5$ are contained as a glass component. According to the $SiO_2$—$TiO_2$—$Nb_2O_5$-based glass, a decrease in a strength and chemical durability can be suppressed.

In the optical glass according to the first embodiment, the content of $SiO_2$ is 10% or more. A lower limit of the content of $SiO_2$ is preferably 12%, and more preferably 15%, 18%, and 20% in this order. In addition, an upper limit of the content of $SiO_2$ is preferably 40%, and more preferably 38%, 35%, 33%, and 30% in this order.

$SiO_2$ is a network-forming component of the glass. By setting the content of $SiO_2$ to be in the range described above, thermal stability, chemical durability, and weather resistance of the glass can be improved, and the viscosity of molten glass can be increased. On the other hand, in a case where the content of $SiO_2$ is excessively high, the refractive index of the glass may decrease, and desired optical properties may not be obtained.

In the optical glass according to the first embodiment, the total content [$Na_2O+K_2O+Cs_2O$] of $Na_2O$, $K_2O$, and $Cs_2O$ is 11.0% or less. An upper limit of the total content is preferably 10.0%, and more preferably 9.0%, 8.0%, 7.0%, and 6.0% in this order. In addition, a lower limit of the total content is preferably 0%.

By setting the total content [$Na_2O+K_2O+Cs_2O$] to be in the range described above, a high refractive index can be maintained while maintaining the thermal stability of the glass.

In the optical glass according to the first embodiment, the refractive index nd and the specific weight satisfy Expression (1) described below. The refractive index nd and the specific weight preferably satisfy Expression (2) described below, and more preferably satisfy Expression (3) described below. By the refractive index nd and the specific weight satisfying the following expressions, optical glass having a high refractive index and a comparatively reduced specific weight can be obtained.

$$nd \geq 0.2 \times \text{Specific Weight} + 1.18 \quad (1)$$

$$nd \geq 0.2 \times \text{Specific Weight} + 1.19 \quad (2)$$

$$nd \geq 0.2 \times \text{Specific Weight} + 1.20 \quad (3)$$

Non-restrictive examples of the content, the ratio, and the properties of glass components other than the above in the optical glass according to the first embodiment will be described.

In the optical glass according to the first embodiment, an upper limit of the content of $P_2O_5$ is preferably 10%, and more preferably 8%, 5%, and 3% in this order. The content of $P_2O_5$ may be 0%.

In order to obtain optical glass having a high refractive index and a reduced specific weight, it is preferable that the content of $P_2O_5$ is in the range described above.

In the optical glass according to the first embodiment, an upper limit of the content of $B_2O_3$ is preferably 10%, and more preferably 8%, 5%, and 3% in this order. In addition, a lower limit of the content of $B_2O_3$ is preferably 0%, and more preferably 0.5%, 0.8%, and 1.0% in this order.

$B_2O_3$ is a network-forming component of the glass. $B_2O_3$ has a function of improving the thermal stability of the glass, but in a case where the content of $B_2O_3$ is excessively high, the refractive index may decrease. Accordingly, it is preferable that the content of $B_2O_3$ is in the range described above.

In the optical glass according to the first embodiment, an upper limit of the content of $Al_2O_3$ is preferably 10%, and more preferably 8%, 5%, and 3% in this order. The content of $Al_2O_3$ may be 0%.

$Al_2O_3$ has a function of increasing the chemical durability, but in a case where the content of $Al_2O_3$ is excessively high, melting properties of the glass may be degraded. Accordingly, it is preferable that the content of $Al_2O_3$ is in the range described above.

In the optical glass according to the first embodiment, a lower limit of the total content [$SiO_2+Al_2O_3$] of $SiO_2$ and $Al_2O_3$ is preferably 10%, and more preferably 13%, 15%, 18%, and 20% in this order. In addition, an upper limit of the total content is preferably 50%, and more preferably 45%, 40%, 35%, and 30% in this order.

In order to increase the thermal stability of the glass, it is preferable that the total content [$SiO_2+Al_2O_3$] is in the range described above.

In the optical glass according to the first embodiment, a lower limit of a mass ratio [$B_2O_3/(SiO_2+Al_2O_3)$] of the content of $B_2O_3$ to the total content of $SiO_2$ and $Al_2O_3$ is preferably 0.01, and more preferably 0.02, 0.03, and 0.04 in this order. An upper limit of the mass ratio is preferably 0.20, and more preferably 0.18, 0.15, 0.13, and 0.10 in this order.

From the viewpoint of improving the chemical durability and the thermal stability, it is preferable that the mass ratio [$B_2O_3/(SiO_2+Al_2O_3)$] is in the range described above.

In the optical glass according to the first embodiment, a lower limit of the total content [$B_2O_3+P_2O_5$] of $B_2O_3$ and $P_2O_5$ is preferably 0.5%, and more preferably 0.8% and 1.0% in this order. In addition, an upper limit of the total content is preferably 10%, and more preferably 8%, 5%, and 3% in this order.

From the viewpoint of improving the chemical durability and the thermal stability, it is preferable that the total content [$B_2O_3+P_2O_5$] is in the range described above.

In the optical glass according to the first embodiment, a lower limit of the total content [$B_2O_3+SiO_2$] of $B_2O_3$ and $SiO_2$ is preferably 10%, and more preferably 15%, 18%, and 20% in this order. In addition, an upper limit of the total content is preferably 50%, and more preferably 45%, 40%, and 35% in this order.

In order to obtain optical glass having a high refractive index, it is preferable that the total content [$B_2O_3+SiO_2$] is in the range described above.

In the optical glass according to the first embodiment, a lower limit of the content of $ZrO_2$ is preferably 0%, and more preferably 0.1%, 0.5%, and 1.0% in this order. In addition, an upper limit of the content of $ZrO_2$ is preferably 10%, and more preferably 8%, 5%, and 3% in this order. The content of $ZrO_2$ may be 0%.

$ZrO_2$ is a component that contributes to an increase in the refractive index. On the other hand, in a case where the content of $ZrO_2$ is excessively high, the thermal stability may decrease, and the specific weight may increase. Accordingly, it is preferable that the content of $ZrO_2$ is in the range described above.

In the optical glass according to the first embodiment, a lower limit of the content of $TiO_2$ is preferably 10%, and more preferably 13%, 15%, 18%, and 20% in this order. In addition, an upper limit of the content of $TiO_2$ is preferably 50%, and more preferably 45%, 40%, and 35% in this order.

$TiO_2$ is a component that contributes to an increase in the refractive index, and has a function of improving glass stability. In addition, the refractive index can be increased without increasing the specific weight. On the other hand, in a case where the content of $TiO_2$ is excessively high, the thermal stability may decrease. Accordingly, it is preferable that the content of $TiO_2$ is in the range described above.

In the optical glass according to the first embodiment, a lower limit of the content of $Nb_2O_5$ is preferably 10%, and more preferably 13% and 15% in this order. In addition, an upper limit of the content of $Nb_2O_5$ is preferably 50%, and more preferably 45%, 40%, and 35% in this order.

$Nb_2O_5$ is a component that contributes to an increase in the refractive index, and has a function of improving the glass stability. On the other hand, in a case where the content of $Nb_2O_5$ is excessively high, the specific weight may increase, and the thermal stability may decrease. Accordingly, it is preferable that the content of $Nb_2O_5$ is in the range described above.

In the optical glass according to the first embodiment, a lower limit of the total content [$TiO_2+Nb_2O_5$] of $TiO_2$ and $Nb_2O_5$ is preferably 20%, and more preferably 25%, 30%, and 35% in this order. In addition, an upper limit of the total content is preferably 70%, and more preferably 65%, 60%, and 55% in this order.

$TiO_2$ and $Nb_2O_5$ are a component that contributes to an increase in the refractive index. Therefore, in order to obtain glass having desired optical properties, it is preferable that the total content of $TiO_2$ and $Nb_2O_5$ is in the range described above.

In the optical glass according to the first embodiment, a lower limit of a mass ratio [$TiO_2/(TiO_2+Nb_2O_5)$] of the content of $TiO_2$ to the total content of $TiO_2$ and $Nb_2O_5$ is preferably 0.20, and more preferably 0.25, 0.30, and 0.35 in this order. An upper limit of the mass ratio is preferably 0.80, and more preferably 0.75, 0.70, and 0.65 in this order.

In order to obtain optical glass having a high refractive index and a reduced specific weight, it is preferable that the mass ratio [$TiO_2/(TiO_2+Nb_2O_5)$] is in the range described above.

In the optical glass according to the first embodiment, an upper limit of the content of $WO_3$ is preferably 10%, and more preferably 8%, 5%, and 3% in this order. The content of $WO_3$ may be 0%.

$WO_3$ is a component that contributes to an increase in the refractive index. On the other hand, in a case where the content of $WO_3$ is excessively high, the thermal stability may decrease, the specific weight may increase, the coloration of the glass may increase, and a transmittance may decrease. Accordingly, it is preferable that the content of $WO_3$ is in the range described above.

In the optical glass according to the first embodiment, an upper limit of the content of $Bi_2O_3$ is preferably 10%, and more preferably 8%, 5%, and 3% in this order. In addition, a lower limit of the content of $Bi_2O_3$ is preferably 0%. The content of $Bi_2O_3$ may be 0%.

$Bi_2O_3$ has a function of improving the thermal stability of the glass at a suitable content. In addition, $Bi_2O_3$ is a component that contributes to an increase in the refractive index. On the other hand, in a case where the content of $Bi_2O_3$ is excessively high, the specific weight may increase. Further, the coloration of the glass may increase. Accordingly, it is preferable that the content of $Bi_2O_3$ is in the range described above.

In the optical glass according to the first embodiment, an upper limit of the total content [$TiO_2+Nb_2O_5+WO_3+Bi_2O_3$] of $TiO_2$, $Nb_2O_5$, $WO_3$, and $Bi_2O_3$ is preferably 80%, and more preferably 70% and 60% in this order. In addition, a lower limit of the total content is preferably 20%, and more preferably 25%, 30%, and 35% in this order.

All of $TiO_2$, $Nb_2O_5$, $WO_3$, and $Bi_2O_3$ are a component that contributes to an increase in the refractive index. Accordingly, it is preferable that the total content [$TiO_2+Nb_2O_5+WO_3+Bi_2O_3$] is in the range described above.

In the optical glass according to the first embodiment, a lower limit of the content of $Li_2O$ is preferably 0.0%, and more preferably 0.1%, 0.3%, 0.5%, 0.8%, 1.0%, 1.3%, and 1.5% in this order. An upper limit of the content of $Li_2O$ is preferably 10%, and more preferably 9%, 8%, 7%, 6%, and 5% in this order.

$Li_2O$ is a component that contributes to a decrease in the specific weight, and is particularly a component that contributes to an increase in the refractive index among alkali metals. On the other hand, in a case where the content of $Li_2O$ is excessively high, the thermal stability may decrease. Accordingly, it is preferable that the content of $Li_2O$ is in the range described above.

In the optical glass according to the first embodiment, an upper limit of the content of $Na_2O$ is preferably 10%, and more preferably 9%, 8%, and 7% in this order. A lower limit of the content of $Na_2O$ is preferably 0%, and more preferably 0.5%, 1.0%, 1.5%, and 2.0% in this order.

In the optical glass according to the first embodiment, an upper limit of the content of $K_2O$ is preferably 10%, and more preferably 8% and 5% in this order. A lower limit of the content of $K_2O$ is preferably 0%, and more preferably 0.5%, 1.0%, 1.5%, and 2.0% in this order. The content of $K_2O$ may be 0%.

$Na_2O$ and $K_2O$ have a function of improving the melting properties of the glass. On the other hand, in a case where the contents of $Na_2O$ and $K_2O$ are excessively high, the refractive index may decrease, in addition, the thermal stability may decrease. Accordingly, it is preferable that the contents of $Na_2O$ and $K_2O$ are in the ranges described above, respectively.

In the optical glass according to the first embodiment, an upper limit of the content of $Cs_2O$ is preferably 5%, and more preferably 3% and 1% in this order. A lower limit of the content of $Cs_2O$ is preferably 0%.

$Cs_2O$ has a function of improving the thermal stability of the glass, but in a case where the content of $Cs_2O$ increases, the chemical durability and the weather resistance may decrease. Accordingly, it is preferable that the content of $Cs_2O$ is in the range described above.

In the optical glass according to the first embodiment, a lower limit of a mass ratio $[Li_2O/(Li_2O+Na_2O+K_2O)]$ of the content of $Li_2O$ to the total content of $Li_2O$, $Na_2O$, and $K_2O$ is preferably 0.00, and more preferably 0.10, 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio $[Li_2O/(Li_2O+Na_2O+K_2O)]$ is in the range described above.

In the optical glass according to the first embodiment, a lower limit of a mass ratio $[Li_2O/(Li_2O+Na_2O+K_2O+Cs_2O)]$ of the content of $Li_2O$ to the total content of $Li_2O$, $Na_2O$, $K_2O$, and $Cs_2O$ is preferably 0.10, and more preferably 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio $[Li_2O/(Li_2O+Na_2O+K_2O+Cs_2O)]$ is in the range described above.

In the optical glass according to the first embodiment, a lower limit of the total content $[Li_2O+Na_2O+K_2O+Cs_2O]$ of $Li_2O$, $Na_2O$, $K_2O$, and $Cs_2O$ is preferably 1.5%, and more preferably 2%, 4%, and 6% in this order. An upper limit of the total content is preferably 15%, and more preferably 13% and 10% in this order.

In order to obtain optical glass excellent in the melting properties, it is preferable that the total content $[Li_2O+Na_2O+K_2O+Cs_2O]$ is in the range described above.

In the optical glass according to the first embodiment, an upper limit of the content of MgO is preferably 20%, and more preferably 15%, 10%, and 5% in this order. In addition, a lower limit of the content of MgO is preferably 0%.

In the optical glass according to the first embodiment, a lower limit of the content of CaO is preferably 1%, and more preferably 3%, 5%, and 8% in this order. An upper limit of the content of CaO is preferably 20%, and more preferably 18%, 15%, and 13% in this order.

MgO and CaO have a function of improving the melting properties of the glass. On the other hand, in a case where the contents of MgO and CaO are excessively high, the thermal stability may decrease. Accordingly, it is preferable that the contents of MgO and CaO are in the ranges described above, respectively.

In the optical glass according to the first embodiment, an upper limit of the content of SrO is preferably 10%, and more preferably 8%, 5%, and 3% in this order. In addition, a lower limit of the content of SrO is preferably 0%.

SrO has a function of improving the melting properties of the glass and of increasing the refractive index. On the other hand, in a case where the content of SrO is excessively high, the thermal stability may decrease, and the specific weight may increase. Accordingly, it is preferable that the content of SrO is in the range described above.

In the optical glass according to the first embodiment, an upper limit of the content of BaO is preferably 20%, and more preferably 17%, 15%, 13%, and 10% in this order. In addition, a lower limit of the content of BaO is preferably 0%.

BaO has a function of improving the melting properties of the glass and of increasing the refractive index. On the other hand, in a case where the content of BaO is excessively high, the thermal stability may decrease, and the specific weight may increase. Accordingly, it is preferable that the content of BaO is in the range described above.

In the optical glass according to the first embodiment, an upper limit of the content of ZnO is preferably 10%, and more preferably 8%, 5%, and 3% in this order. In addition, a lower limit of the content of ZnO is preferably 0%.

ZnO is a glass component having a function of improving the thermal stability of the glass. However, in a case where the content of ZnO is excessively high, the specific weight may increase. Accordingly, from the viewpoint of improving the thermal stability of the glass and of maintaining desired optical properties, it is preferable that the content of ZnO is in the range described above.

In the optical glass according to the first embodiment, an upper limit of the total content [MgO+CaO+SrO+BaO+ZnO] of MgO, CaO, SrO, BaO, and ZnO is preferably 40%, and more preferably 35%, 30%, and 25% in this order. In addition, a lower limit of the total content is preferably 3%, and more preferably 5%, 8%, and 10% in this order. From the viewpoint of suppressing an increase in the specific weight and of maintaining the thermal stability without hindering high dispersion, it is preferable that the total content is in the range described above.

In the optical glass according to the first embodiment, an upper limit of the content of $Ta_2O_5$ is preferably 10%, and more preferably 8%, 5%, and 3% in this order. In addition, a lower limit of the content of $Ta_2O_5$ is preferably 0%.

$Ta_2O_5$ is a component that contributes to an increase in the refractive index. In addition, $Ta_2O_5$ is a glass component having a function of improving the thermal stability of the glass, and is also a component for decreasing Pg,F. On the other hand, in a case where the content of $Ta_2O_5$ increases, the thermal stability of the glass may decrease, and when melting the glass, the unmelted residue of the glass raw material is likely to be generated. In addition, the specific weight may increase. Accordingly, it is preferable that the content of $Ta_2O_5$ is in the range described above.

In the optical glass according to the first embodiment, an upper limit of the content of $La_2O_3$ is preferably 10%, and more preferably 8%, 5%, and 3% in this order. In addition, a lower limit of the content of $La_2O_3$ is preferably 0%.

$La_2O_3$ is a component that contributes to an increase in the refractive index. On the other hand, in a case where the content of $La_2O_3$ increases, the specific weight may increase, and the thermal stability of the glass may decrease. Accordingly, from the viewpoint of suppressing an increase in the specific weight and a decrease in the thermal stability of the glass, it is preferable that the content of $La_2O_3$ is in the range described above.

In the optical glass according to the first embodiment, an upper limit of the content of $Y_2O_3$ is preferably 10%, and more preferably 8%, 5%, and 3% in this order. In addition, a lower limit of the content of $Y_2O_3$ is preferably 0%.

$Y_2O_3$ is a component that contributes to an increase in the refractive index. On the other hand, in a case where the content of $Y_2O_3$ excessively increases, the thermal stability of the glass may decrease, and the glass is likely to be devitrified during manufacturing. Accordingly, from the viewpoint of suppressing a decrease in the thermal stability of the glass, it is preferable that the content of $Y_2O_3$ is in the range described above.

In the optical glass according to the first embodiment, the content of $Sc_2O_3$ is preferably 2% or less. In addition, a lower limit of the content of $Sc_2O_3$ is preferably 0%.

In the optical glass according to the first embodiment, the content of $HfO_2$ is preferably 2% or less. In addition, a lower limit of the content of $HfO_2$ is preferably 0%.

$Sc_2O_3$ and $HfO_2$ have a function of increasing dispersivity of the glass, but are an expensive component. Accordingly, it is preferable that the contents of $Sc_2O_3$ and $HfO_2$ are in the ranges described above, respectively.

In the optical glass according to the first embodiment, the content of $Lu_2O_3$ is preferably 2% or less. In addition, a lower limit of the content of $Lu_2O_3$ is preferably 0%.

$Lu_2O_3$ has a function of increasing dispersivity of the glass, but has a high molecular weight, and thus, is also a glass component for increasing the specific weight of the glass. Accordingly, it is preferable that the content of $Lu_2O_3$ is in the range described above.

In the optical glass according to the first embodiment, the content of $GeO_2$ is preferably 2% or less. In addition, a lower limit of the content of $GeO_2$ is preferably 0%.

$GeO_2$ has a function of increasing dispersivity of the glass, but is a prominently expensive component among the glass components that are generally used. Accordingly, from the viewpoint of reducing a manufacturing cost of the glass, it is preferable that the content of $GeO_2$ is in the range described above.

In the optical glass according to the first embodiment, an upper limit of the content of $Gd_2O_3$ is preferably 3.0%, and more preferably 2.0%. In addition, a lower limit of the content of $Gd_2O_3$ is preferably 0%.

$Gd_2O_3$ is a component that contributes to an increase in the refractive index. On the other hand, in a case where the content of $Gd_2O_3$ excessively increases, the thermal stability of the glass may decrease. In addition, in a case where the content of $Gd_2O_3$ excessively increases, the specific weight of the glass may increase, which is not preferable. Accordingly, from the viewpoint of suppressing an increase in the specific weight while excellently maintaining the thermal stability of the glass, it is preferable that the content of $Gd_2O_3$ is in the range described above.

In the optical glass according to the first embodiment, the content of $Yb_2O_3$ is preferably 2% or less. In addition, a lower limit of the content of $Yb_2O_3$ is preferably 0%.

$Yb_2O_3$ has a molecular weight higher than those of $La_2O_3$, $Gd_2O_3$, and $Y_2O_3$, and thus, increases the specific weight of the glass. In a case where the specific weight of the glass increases, the mass of an optical element increases. Accordingly, it is desirable to suppress an increase in the specific weight of the glass by reducing the content of $Yb_2O_3$.

In addition, in a case where the content of $Yb_2O_3$ is excessively high, the thermal stability of the glass may decrease. From the viewpoint of preventing a decrease in the thermal stability of the glass and of suppressing an increase in the specific weight, it is preferable that the content of $Yb_2O_3$ is in the range described above.

In the optical glass according to the first embodiment, an upper limit of the total content $[La_2O_3+Gd_2O_3+Y_2O_3]$ of $La_2O_3$, $Gd_2O_3$, and $Y_2O_3$ is preferably 10%, and more preferably 8%, 5%, and 3% in this order. A lower limit of the total content is 0%. The total content may be 0%.

From the viewpoint of suppressing an increase in the specific weight and of excellently maintaining the thermal stability, it is preferable that the total content $[La_2O_3+Gd_2O_3+Y_2O_3]$ is in the range described above.

In the optical glass according to the first embodiment, a lower limit of a mass ratio $[Li_2O/\{100-(SiO_2+B_2O_3+P_2O_5+GeO_2)\}]$ of the content of $Li_2O$ to the total content of the glass components other than $SiO_2$, $B_2O_3$, $P_2O_5$, and $GeO_2$ is preferably 0.00, and more preferably 0.02, 0.03, 0.04, 0.05, and 0.06 in this order. An upper limit of the mass ratio is preferably 0.20, and more preferably 0.15, 0.13, and 0.10 in this order.

Note that, the total content of all the glass components is 100% by mass. Therefore, the total content of the glass components other than $SiO_2$, $B_2O_3$, $P_2O_5$, and $GeO_2$ is represented by $[100-(SiO_2+B_2O_3+P_2O_5+GeO_2)]$. From the viewpoint of obtaining optical glass having a high refractive index and a reduced specific weight, it is preferable that the mass ratio $[Li_2O/\{100-(SiO_2+B_2O_3+P_2O_5+GeO_2)\}]$ is in the range described above.

In the optical glass according to the first embodiment, a lower limit of a mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ of the content of $TiO_2$ to the total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is preferably 0.40, and more preferably 0.42, 0.44, 0.46, 0.48, and 0.50 in this order. An upper limit of the mass ratio is preferably 0.80, and more preferably 0.75, 0.70, and 0.65 in this order.

From the viewpoint of increasing the refractive index while suppressing an increase in the specific weight, it is preferable that the mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ is in the range described above.

It is preferable that the optical glass according to the first embodiment mainly contains the glass components described above, that is, $Li_2O$ and $TiO_2$ as an essential component, and $SiO_2$, $P_2O_5$, $B_2O_3$, $Al_2O_3$, $ZrO_2$, $Nb_2O_5$, $WO_3$, $Bi_2O_3$, $Na_2O$, $K_2O$, $Cs_2O$, MgO, CaO, SrO, BaO, ZnO, $Ta_2O_5$, $La_2O_3$, $Y_2O_3$, $Sc_2O_3$, $HfO_2$, $Lu_2O_3$, $GeO_2$, $Gd_2O_3$, and $Yb_2O_3$ as an arbitrary component, and the total content of the glass components described above is preferably 95% or more, more preferably 98% or more, even more preferably 99% or more, and still even more preferably 99.5% or more.

Note that, it is preferable that the optical glass according to the first embodiment basically contains the glass components described above, and other components can also be contained within a range not impairing the functions and the effects of the present invention. In addition, in the present invention, containing inevitable impurities is not excluded.

(Other Components)

All of Pb, As, Cd, Tl, Be, and Se have toxicity. Accordingly, it is particularly preferable that the optical glass according to the first embodiment does not contain such elements as the glass component. The content of each of the elements described above is preferably less than 0.5%, and more preferably less than 0.1%, less than 0.05%, and less than 0.01% in this order, in terms of an oxide.

All of U, Th, and Ra are a radioactive element. Accordingly, it is particularly preferable that the optical glass according to the first embodiment does not contain such elements as the glass component. The content of each of the elements described above is preferably less than 0.5%, and more preferably less than 0.1%, less than 0.05%, and less than 0.01% in this order, in terms of an oxide.

V, Cr, Mn, Fe, Co, Ni, Cu, Pr, Nd, Pm, Sm, Eu, Tb, Dy, Ho, Er, and Tm increase the coloration of the glass, and can be a fluorescent light source. Accordingly, it is particularly preferable that the optical glass according to the first embodiment does not contain such elements as the glass component. The content of each of the elements described above is preferably less than 0.5%, and more preferably less than 0.1%, less than 0.05%, and less than 0.01% in this order, in terms of an oxide.

Sb($Sb_2O_3$) and Ce($CeO_2$) are an element that functions as a clarificant and can be added arbitrarily. Among them, Sb($Sb_2O_3$) is a clarificant having a high clarifying effect. Ce($CeO_2$) has a clarifying effect lower than that of Sb($Sb_2O_3$). In a case where Ce($CeO_2$) is added in large amounts, the coloration of the glass tends to be thickened.

Note that, herein, the contents of Sb($Sb_2O_3$) and Ce($CeO_2$) are represented by an external ratio, and are not included in the total content of all the glass components represented in terms of an oxide. That is, herein, the total content of all the glass components excluding Sb($Sb_2O_3$) and Ce($CeO_2$) is 100% by mass.

The content of $Sb_2O_3$ is represented by an external ratio. That is, in the optical glass according to the first embodiment, the content of $Sb_2O_3$ when the total content of all the glass components other than $Sb_2O_3$ and $CeO_2$ is 100% by mass is preferably 1% by mass or less, and more preferably 0.1% by mass or less, 0.05% by mass or less, and 0.03% by mass or less in this order. The content of $Sb_2O_3$ may be 0% by mass.

The content of $CeO_2$ is also represented by an external ratio. That is, in the optical glass according to the first embodiment, the content of $CeO_2$ when the total content of all the glass components other than $CeO_2$ and $Sb_2O_3$ is 100% by mass is preferably 2% by mass or less, and more preferably 10% by mass or less, 0.5% by mass or less, and 0.10% by mass or less in this order. The content of $CeO_2$ may be 0% by mass. By setting the content of $CeO_2$ to be in the range described above, clarifying properties of the glass can be improved.

(Properties of Glass)

<Abbe's Number νd>

In the optical glass according to the first embodiment, an Abbe's number νd is preferably 15 to 30. The Abbe's number νd may be 18 to 25, or may be 20 to 24. By setting the Abbe's number νd to be in the range described above, glass having desired dispersivity can be obtained. The Abbe's number νd can be controlled by adjusting the contents of $TiO_2$, $Nb_2O_5$, $WO_3$, and $Bi_2O_3$, which are a glass component that contributes to high dispersion.

<Refractive Index nd>

In the optical glass according to the first embodiment, a lower limit of the refractive index nd is 1.86. The lower limit of the refractive index nd can also be 1.87, 1.88, 1.89, or 1.90. In addition, an upper limit of the refractive index nd can be 2.20, and can also be 2.15, 2.10, or 2.05. The refractive index can be controlled by adjusting the contents of $TiO_2$, $Nb_2O_5$, $WO_3$, $Bi_2O_3$, $ZrO_2$, $La_2O_3$, $Gd_2O_3$, $Y_2O_3$, and $Ta_2O_5$, which are a glass component that contributes to an increase in the refractive index.

<Specific Weight of Glass>

The optical glass according to the first embodiment is high-refractive index glass and has the specific weight that is not high. In a case where the specific weight of the glass can be reduced, the weight of a lens can be reduced. On the other hand, in a case where the specific weight is excessively low, a decrease in the thermal stability is caused.

Therefore, in the optical glass according to the first embodiment, the specific weight is preferably 4.2 or less, and more preferably 4.0 or less, 3.8 or less, 3.6 or less, and 3.4 or less in this order.

The specific weight can be controlled by adjusting the content of each of the glass components. In particular, by adjusting the content of $Li_2O$ or $TiO_2$, the specific weight can be reduced while maintaining a high refractive index.

In addition, in the optical glass according to the first embodiment, a ratio [Refractive Index nd/Specific Weight] of the refractive index nd to the specific weight is preferably 0.50 or more, more preferably 0.52 or more, and even more preferably 0.54 or more. By setting the ratio [Refractive Index nd/Specific Weight] to be in the range described above, optical glass having a high refractive index and a comparatively reduced specific weight can be obtained.

<Glass Transition Temperature Tg>

In the optical glass according to the first embodiment, an upper limit of a glass transition temperature Tg is preferably 690° C., and more preferably 680° C., 660° C., 650° C., 630° C., and 600° C. in this order. A lower limit of the glass transition temperature Tg is not particularly limited, and is generally 500° C., and preferably 550° C.

The glass transition temperature Tg can be controlled by adjusting the total content of the alkali metals.

By the upper limit of the glass transition temperature Tg satisfying the range described above, an increase in a molding temperature when reheat-pressing the glass and an annealing temperature can be suppressed, and a thermal damage on a reheat press molding facility and an annealing facility can be reduced.

By the lower limit of the glass transition temperature Tg satisfying the range described above, reheat press moldability and the thermal stability of the glass are likely to be excellently maintained while maintaining a desired Abbe's number and a desired refractive index.

<Light Transmissivity of Glass>

Light transmissivity of the optical glass according to the first embodiment can be evaluated by coloration degrees λ80, λ70, and λ5.

A spectral transmittance of a glass sample having a thickness of 10.0 mm±0.1 mm is measured in a range of a wavelength of 200 to 700 nm, and a wavelength at which an external transmittance is 80% is 80, a wavelength at which an external transmittance is 70% is λ70, and a wavelength at which an external transmittance is 5% is λ5.

λ80 of the optical glass according to the first embodiment is preferably 700 nm or less, more preferably 650 nm or less, and even more preferably 600 nm or less.

λ70 is preferably 600 nm or less, more preferably 550 nm or less, and even more preferably 500 nm or less.

λ5 is preferably 500 nm or less, more preferably 450 nm or less, and even more preferably 400 nm or less.

(Manufacturing of Optical Glass)

The glass raw materials may be blended to have the predetermined composition described above, and the optical glass according to the first embodiment may be prepared by the blended glass raw materials in accordance with a known glass manufacturing method. For example, a plurality of types of compounds are blended and sufficiently mixed to be a batch raw material, and the batch raw material is put in a quartz crucible or a platinum crucible and roughly melted. A melted product obtained by the rough melting is rapidly cooled and pulverized to prepare cullet. Further, the cullet is put in a platinum crucible and heated and remelted to be molten glass, and the molten glass is further clarified and homogenized, and then, is molded and gradually cooled to obtain optical glass. A known method may be applied to the molding and the gradual cooling of the molten glass.

Note that, the compound used when blending the batch raw material is not particularly limited insofar as a desired glass component can be introduced into the glass to have a desired content, and examples of such a compound include an oxide, a carbonate, a nitrate, a hydroxide, a fluoride, and the like.

(Manufacturing of Optical Element and Others)

A known method may be applied to the preparation of an optical element by using the optical glass according to the first embodiment. For example, in the manufacturing of the optical glass described above, the molten glass is cast into a mold and molded into the shape of a plate, and a glass material including the optical glass according to the present invention is prepared. The obtained glass material is suitably cut, ground, and polished, and a cut piece having a size and a shape suitable for press molding is prepared. The cut piece is heated and softened, and is press-molded (reheat-pressed) by a known method, and an optical element blank having a shape similar to the shape of the optical element is prepared. The optical element blank is annealed, and is ground and polished by a known method, and an optical element is prepared.

An optical functional surface of the prepared optical element may be coated with an antireflective film, a total reflection film, and the like, in accordance with the intended use.

According to one aspect of the present invention, an optical element including the optical glass described above can be provided. As the type of optical element, a lens such as a planar lens, a spherical lens, and an aspherical lens, a prism, a diffraction grating, a light guide plate, and the like can be exemplified. As the shape of the lens, various shapes such as a biconvex lens, a plano-convex lens, a biconcave lens, a plano-concave lens, a convex meniscus lens, and a concave meniscus lens can be exemplified. As the use of the light guide plate, a display device such as an augmented reality (AR) display type spectacle type device or a mixed reality (MR) display type spectacle type device, and the like can be exemplified. Such a light guide plate is plate-shaped glass that can be attached to the frame of the spectacle type device, and includes the optical glass described above. A diffraction grating for changing a traveling direction of light that is propagated through the light guide plate by repeating total reflection may be formed on the surface of the light guide plate, as necessary. The diffraction grating can be formed by a known method. In a case of wearing a spectacle type device including the light guide plate, the light that is propagated through the light guide plate is incident on the pupils, and thus, the function of augmented reality (AR) display or mixed reality (MR) display is exhibited. Such a spectacle type device, for example, is disclosed in JP Patent Application Laid Open (Translation of PCT Application) No. 2017-534352 and the like. Note that, the light guide plate can be prepared by a known method. The optical element can be manufactured by a method including a step of processing a glass molded body containing the optical glass. As the processing, severing, cutting, rough grinding, fine grinding, polishing, and the like can be exemplified. By using the glass when performing such processing, a damage can be reduced, and a high-quality optical element can be stably supplied.

(Image Display Device)

Hereinafter, a light guide plate that is one aspect of the present invention, and an image display device using the light guide plate will be described in detail with reference to the drawing. Note that, in the drawings, the same reference numerals are applied to the same or corresponding parts, and the description will not be repeated.

FIG. 2 is a diagram illustrating the configuration of a head mounted display 1 (hereinafter, will be abbreviated to the "HMD 1") using a light guide plate 10 that is one aspect of the present invention, in which FIG. 2(*a*) is a front perspective view of the HMD 1, and FIG. 2(*b*) is a rear perspective view of the HMD 1. As illustrated in FIG. 2(*a*) and FIG. 2(*b*), a spectacle lens 3 is attached to the front portion of a spectacle type frame 2 to be worn on the head of a user. A backlight 4 for illuminating an image is attached to an attachment portion 2*a* of the spectacle type frame 2. A signal processing device 5 for projecting an image and a speaker 6 reproducing a voice are provided in a temple portion of the spectacle type frame 2. Flexible printed circuits (FPC) 7 configuring wiring drawn out from a circuit of the signal processing device 5 are wired along the spectacle type frame 2. A display element unit (for example, a liquid crystal display element) 20 is wired by the FPC 7 to the center position of both eyes of the user, and is retained such that approximately the center portion of the display element unit 20 is arranged on an optical axis of the backlight 4. The display element unit 20 is relatively fixed to the light guide plate 10 to be positioned approximately in the center portion of the light guide plate 10. In addition, holographic optical elements (HOE) 32R and 32L (first optical elements) are closely fixed onto a first surface 10*a* of the light guide plate 10 by adhesion or the like in positions in front of the eyes of the user, respectively. A HOE 52R and a HOE 52L are stacked on a second surface 10*b* of the light guide plate 10 in a position facing the display element unit 20 through the light guide plate 10.

FIG. 3 is a side view schematically illustrating the configuration of the HMD 1 that is one aspect of the present invention. Note that, in FIG. 3, in order to clarify the drawing, only main parts of the image display device are illustrated, and the spectacle type frame 2 and the like are not illustrated. As illustrated in FIG. 3, the HMD 1 has a structure symmetrical to a center line X connecting the center of an image display element 24 and the center of the light guide plate 10. In addition, light of each wavelength incident on the light guide plate 10 from the image display element 24 is divided into two parts as described below and is guided to each of the right eye and the left eye of the user. The light path of the light of each wavelength to be guided to each of the eyes is also approximately symmetrical to the center line X.

As illustrated in FIG. 3, the backlight 4 includes a laser light source 21, a diffusion optical system 22, and a microlens array 23. The display element unit 20 is an image generating unit including the image display element 24, and for example, is activated by a field sequential method. The laser light source 21 includes laser light sources corresponding to each wavelength of R (a wavelength of 436 nm), G (a wavelength of 546 nm), and B (a wavelength of 633 nm), and sequentially applies light of each wavelength at a high speed. The light of each wavelength is incident on the diffusion optical system 22 and the microlens array 23, is converted into even and highly directional parallel light flux having no unevenness in the amount of light, and is perpendicularly incident on a display panel surface of the image display element 24.

The image display element 24, for example, is a transmissive liquid crystal (LCDT-LCOS) panel that is activated by a field sequential method. The image display element 24 modulates the light of each wavelength, in accordance with an image signal generated by an image engine (not illustrated) of the signal processing device 5. The light of each wavelength that is modulated by pixels in an effective region of the image display element 24 is incident on the light guide plate 10 with the sectional surface of the predetermined light flux (approximately the same shape as that of the effective region). Note that, the image display element 24, for example, can also be replaced with display elements in other forms such as a digital mirror device (DMD), a reflective liquid crystal (LCOS) panel, micro electro mechanical systems (MEMS), an organic electro-luminescence (EL), and an inorganic EL.

Note that, the display element unit 20 is not limited to the display element using the field sequential method, and may be an image generating unit simultaneous display element (a display element including RGB color filters with a predetermined array on the front surface of an exiting surface). In this case, as the light source, for example, a white light source is used.

As illustrated in FIG. 3, the light of each wavelength that is modulated by the image display element 24 is sequentially incident on the inside of the light guide plate 10 from the first surface 10*a*. The HOE 52R and the HOE 52L (second optical elements) are stacked on the second surface 10*b* of the light guide plate 10. The HOE 52R and the HOE 52L, for example, are a reflective volume-phase type HOE in a rectangular shape, and have a configuration in which three photopolymers in which each interference fringe corresponding to the light of each wavelength of R, G, and B is recorded are stacked. That is, the HOE 52R and the HOE 52L are configured to have a wavelength selection function of diffracting the light of each wavelength of R, G, and B and transmitting light of other wavelengths.

Note that, the HOE 32R and the HOE 32L are also a reflective volume-phase type HOE, and have the same layered structure as that of the HOE 52R and the HOE 52L. The HOE 32R and the HOE 32L and the HOE 52R and the HOE 52L, for example, may have approximately the same pitch of an interference fringe pattern.

The centers of the HOE 52R and the HOE 52L are coincident with each other, and the HOE 52R and the HOE 52L are stacked in a state where the interference fringe pattern is reversed by 180 (deg). Then, the HOE 52R and the HOE 52L are closely fixed onto the second surface 10*b* of the light guide plate 10 by adhesion or the like such that the centers are coincident with the center line X in the stacked state. The light of each wavelength that is modulated by the image display element 24 is sequentially incident on the HOE 52R and the HOE 52L through the light guide plate 10.

The HOE 52R and the HOE 52L apply a predetermined angle to diffract the light of each wavelength, in order to guide the light of each wavelength that is sequentially incident to each of the right eye and the left eye. The light of each wavelength that is diffracted by the HOE 52R and the HOE 52L repeats the total reflection on the interface between the light guide plate 10 and the air, is propagated through the light guide plate 10, and is incident on each of the HOE 32R and the HOE 32L. Here, the HOE 52R and the HOE 52L apply the same diffraction angle to the light of each wavelength. Accordingly, light of all wavelengths having approximately the same incident position with respect to the light guide plate 10 (or according to another expression, exiting from approximately the same coordinates in the effective region of the image display element 24) is propagated through approximately the same light path inside the light guide plate 10, and is incident on approximately the same position on the HOE 32R and the HOE 32L. According to another viewpoint, the HOE 52R and the HOE 52L diffract the light of each wavelength of RGB such that a pixel position relationship of an image in the effective region that is displayed in the effective region of the image display element 24 is faithfully reproduced on the HOE 32R and the HOE 32L.

As described above, in one aspect of the present invention, each of the HOE 52R and the HOE 52L diffracts the light of all wavelengths exiting from approximately the same coordinates in the effective region of the image display element 24 to be incident on approximately the same position of each of the HOE 32R and the HOE 32L. Alternatively, the HOE 52R and the HOE 52L may be configured to diffract the light of all wavelengths configuring originally the same pixels relatively shifted in the effective region of the image display element 24 to be incident on approximately the same position on the HOE 32R and the HOE 32L.

The light of each wavelength incident on the HOE 32R and the HOE 32L is diffracted by the HOE 32R and the HOE 32L, and sequentially exits from the second surface 10*b* of the light guide plate 10 to the outside approximately perpendicularly. As described above, the light of each wavelength exiting as approximately parallel light forms an image on each of the right eye retina and the left eye retina of the user, as a virtual image I as the image generated by the image display element 24. In addition, the HOE 32R and the HOE 32L may have a condenser function such that the user is capable of observing the virtual image I of an enlarged image. That is, light incident on the peripheral region of the HOE 32R and the HOE 32L may exit at an angle to be close to the center of the pupil, and may form an image on the retina of the user. Alternatively, in order for the user to observe the virtual image I of the enlarged image, the HOE 52R and the HOE 52L may diffract the light of each wavelength of RGB such that the pixel position relationship on the HOE 32R and the HOE 32L is in the enlarged similar shape with respect to the pixel position relationship of the image in the effective region that is displayed in the effective region of the image display element 24.

Since the equivalent optical path length in air of the light traveling through the light guide plate 10 decreases as a refractive index is high, an apparent viewing angle to the width of the image display element 24 can be increased by using the optical glass according to this embodiment that has a high refractive index. Further, since the refractive index is high, but the specific weight is suppressed to be low in the optical glass according to this embodiment, a light guide plate that is lightweight and has the effects described above can be provided.

Note that, the light guide plate that is one aspect of the present invention can be used in a see-through type transmissive head mounted display, a non-transmissive head mounted display, or the like.

In such head mounted displays, since the light guide plate includes the optical glass of this embodiment that has a high refractive index and a low specific weight, the head mounted displays have an excellent sense of immersion according to a wide viewing angle, and are preferable as an image display device that is used by being combined with an information terminal, is used to provide augmented reality (AR) or the like, or is used to provide movie watching, a game, virtual reality (VR), or the like.

The head mounted display has been described as an example, but the light guide plate may be attached to other image display devices.

Second Embodiment

Optical glass according to a second embodiment, in which a content of $SiO_2$ is 1 to 50% by mass, a content of $TiO_2$ is 1 to 50% by mass, a content of BaO is 0 to 16.38% by mass, a content of $Nb_2O_5$ is 1 to 50% by mass, a total content [$Li_2O+Na_2O+K_2O+Cs_2O$] of $Li_2O$, $Na_2O$, $K_2O$, and $Cs_2O$ is 0.1 to 20% by mass, a total content [$La_2O_3+Gd_2O_3+Y_2O_3$] of $La_2O_3$, $Gd_2O_3$, and $Y_2O_3$ is 0 to 10% by mass, a total content [$TiO_2+Nb_2O_5$] of $TiO_2$ and $Nb_2O_5$ is 45 to 65% by mass, a mass ratio [$TiO_2/(TiO_2+Nb_2O_5)$] of the content of $TiO_2$ to the total content of $TiO_2$ and $Nb_2O_5$ is 0.3 or more, a mass ratio [$Li_2O/(Li_2O+Na_2O+K_2O+Cs_2O)$] of the content of $Li_2O$ to the total content of $Li_2O$, $Na_2O$, $K_2O$, and $Cs_2O$ is 0.1 to 1, an Abbe's number νd is 25 or less, and a refractive index nd is 1.86 or more.

In the optical glass according to the second embodiment, the content of $SiO_2$ is 1 to 50%. A lower limit of the content of $SiO_2$ is preferably 10%, and more preferably 12%, 15%, 18%, and 20% in this order. In addition, an upper limit of the content of $SiO_2$ is preferably 40%, and more preferably 38%, 35%, 33%, and 30% in this order.

$SiO_2$ is a network-forming component of the glass. By setting the content of $SiO_2$ to be in the range described above, thermal stability, chemical durability, and weather resistance of the glass can be improved, and the viscosity of molten glass can be increased. On the other hand, in a case where the content of $SiO_2$ is excessively high, the refractive index of the glass may decrease, and desired optical properties may not be obtained.

In the optical glass according to the second embodiment, the content of $TiO_2$ is 1 to 50%. A lower limit of the content of $TiO_2$ is preferably 10%, and more preferably 13%, 15%, 18%, and 20% in this order. In addition, an upper limit of the content of $TiO_2$ is preferably 45%, and more preferably 40% and 35% in this order.

By setting the content of $TiO_2$ to be in the range described above, the refractive index can be increased, and the stability of the glass can be improved. In addition, the refractive index can be increased without increasing the specific weight. On the other hand, in a case where the content of $TiO_2$ is excessively high, the thermal stability may decrease.

In the optical glass according to the second embodiment, the content of BaO is 0 to 16.38%. An upper limit of the content of BaO is preferably 15%, and more preferably 13% and 10% in this order. In addition, a lower limit of the content of BaO is preferably 0%.

By setting the content of BaO to be in the range described above, melting properties of the glass can be improved, and the refractive index can be increased. On the other hand, in a case where the content of BaO is excessively high, the thermal stability may decrease, and the specific weight may increase.

In the optical glass according to the second embodiment, the content of $Nb_2O_5$ is 1 to 50%. A lower limit of the content of $Nb_2O_5$ is preferably 10%, and more preferably 13% and 15% in this order. In addition, an upper limit of the content of $Nb_2O_5$ is preferably 50%, and more preferably 45%, 40%, and 35% in this order.

By setting the content of $Nb_2O_5$ to be in the range described above, the refractive index can be increased, and the stability of the glass can be improved. On the other hand, in a case where the content of $Nb_2O_5$ is excessively high, the specific weight may increase, and the thermal stability may decrease.

In the optical glass according to the second embodiment, the total content [$Li_2O+Na_2O+K_2O+Cs_2O$] of $Li_2O$, $Na_2O$, $K_2O$, and $Cs_2O$ is 0.1 to 20%. A lower limit of the total content is preferably 1.5%, and preferably 2%, 4%, and 6% in this order. An upper limit of the total content is preferably 15%, and more preferably 13% and 10% in this order.

By setting the total content [$Li_2O+Na_2O+K_2O+Cs_2O$] to be in the range described above, optical glass excellent in the melting properties can be obtained.

In the optical glass according to the second embodiment, the total content [$La_2O_3+Gd_2O_3+Y_2O_3$] of $La_2O_3$, $Gd_2O_3$, and $Y_2O_3$ is 0 to 10%. An upper limit of the total content is preferably 8%, and more preferably 5% and 3% in this order. A lower limit of the total content is 0%. The total content may be 0%.

From the viewpoint of suppressing an increase in the specific weight and of excellently maintaining the thermal stability, it is preferable that the total content [$La_2O_3+Gd_2O_3+Y_2O_3$] is in the range described above.

In the optical glass according to the second embodiment, the total content [$TiO_2+Nb_2O_5$] of $TiO_2$ and $Nb_2O_5$ is 45 to 65%. A lower limit of the total content is preferably 20%, and more preferably 25%, 30%, and 35% in this order. In addition, an upper limit of the total content is preferably 63%, and more preferably 61%, 59%, and 57% in this order.

By setting the total content [$TiO_2+Nb_2O_5$] to be in the range described above, the refractive index can be increased, and glass having desired optical properties can be obtained.

In the optical glass according to the second embodiment, the mass ratio [$TiO_2/(TiO_2+Nb_2O_5)$] of the content of $TiO_2$ to the total content of $TiO_2$ and $Nb_2O_5$ is 0.3 or more. A lower limit of the mass ratio is preferably 0.35, and more preferably 0.40 and 0.45 in this order. An upper limit of the mass ratio is preferably 0.80, and more preferably 0.75, 0.70, and 0.65 in this order.

By setting the mass ratio [$TiO_2/(TiO_2+Nb_2O_5)$] to be in the range described above, optical glass having a high refractive index and a reduced specific weight can be obtained.

In the optical glass according to the second embodiment, the mass ratio [$Li_2O/(Li_2O+Na_2O+K_2O+Cs_2O)$] of the content of $Li_2O$ to the total content of $Li_2O$, $Na_2O$, $K_2O$, and $Cs_2O$ is 0.1 to 1. A lower limit of the mass ratio is preferably 0.15, and more preferably 0.20 and 0.25 in this order. An upper limit of the mass ratio is preferably 0.80, and more preferably 0.75, 0.70, and 0.65 in this order.

By setting the mass ratio [$Li_2O/(Li_2O+Na_2O+K_2O+Cs_2O)$] to be in the range described above, optical glass having a high refractive index and a reduced specific weight can be obtained.

<Abbe's Number νd>

In the optical glass according to the second embodiment, the Abbe's number νd is 25 or less. The Abbe's number νd may be 15 to 25, may be 18 to 25, or may be 20 to 24. By setting the Abbe's number νd to be in the range described above, glass having desired dispersivity can be obtained. The Abbe's number νd can be controlled by adjusting the contents of $TiO_2$, $Nb_2O_5$, $WO_3$, and $Bi_2O_3$, which are a glass component that contributes to high dispersion.

<Refractive Index nd>

In the optical glass according to the second embodiment, the refractive index nd is 1.86 or more. A lower limit of the refractive index nd can be 1.87, and can also be 1.88, 1.89, or 1.90. In addition, an upper limit of the refractive index nd can be 2.20, and can also be 2.15, 2.10, or 2.05. The refractive index can be controlled by adjusting the contents of $TiO_2$, $Nb_2O_5$, $WO_3$, $Bi_2O_3$, $ZrO_2$, $La_2O_3$, $Gd_2O_3$, $Y_2O_3$, and $Ta_2O_5$, which are a glass component that contributes to an increase in the refractive index.

Non-restrictive examples of the content, the ratio, and the properties of glass components other than the above in the optical glass according to the second embodiment will be described.

In the optical glass according to the second embodiment, an upper limit of the content of $P_2O_5$ is preferably 10%, and more preferably 8%, 5%, and 3% in this order. The content of $P_2O_5$ may be 0%.

In order to obtain optical glass having a high refractive index and a reduced specific weight, it is preferable that the content of $P_2O_5$ is in the range described above.

In the optical glass according to the second embodiment, an upper limit of the content of $B_2O_3$ is preferably 10%, and more preferably 8%, 5%, and 3% in this order. In addition, a lower limit of the content of $B_2O_3$ is preferably 0%, and more preferably is 0.5%, 0.8%, and 1.0% in this order.

$B_2O_3$ is a network-forming component of the glass. $B_2O_3$ has a function of improving the thermal stability of the glass, but in a case where the content of $B_2O_3$ is excessively high, the refractive index may decrease. Accordingly, it is preferable that the content of $B_2O_3$ is in the range described above.

In the optical glass according to the second embodiment, an upper limit of the content of $Al_2O_3$ is preferably 10%, and more preferably 8%, 5%, and 3% in this order. The content of $Al_2O_3$ may be 0%.

$Al_2O_3$ has a function of increasing the chemical durability, but in a case where the content of $Al_2O_3$ is excessively high, the melting properties of the glass may be degraded. Accordingly, it is preferable that the content of $Al_2O_3$ is in the range described above.

In the optical glass according to the second embodiment, a lower limit of the total content $[SiO_2+Al_2O_3]$ of $SiO_2$ and $Al_2O_3$ is preferably 10%, and more preferably 13%, 15%, 18%, and 20% in this order. In addition, an upper limit of the total content is preferably 50%, and more preferably 45%, 40%, 35%, and 30% in this order.

In order to increase the thermal stability of the glass, it is preferable that the total content $[SiO_2+Al_2O_3]$ is in the range described above.

In the optical glass according to the second embodiment, a lower limit of a mass ratio $[B_2O_3/(SiO_2+Al_2O_3)]$ of the content of $B_2O_3$ and the total content of $SiO_2$ and $Al_2O_3$ is preferably 0.01, and more preferably 0.02, 0.03, and 0.04 in this order. An upper limit of the mass ratio is preferably 0.20, and more preferably 0.18, 0.15, 0.13, and 0.10 in this order.

From the viewpoint of improving the chemical durability and the thermal stability, it is preferable that the mass ratio $[B_2O_3/(SiO_2+Al_2O_3)]$ is in the range described above.

In the optical glass according to the second embodiment, a lower limit of the total content $[B_2O_3+P_2O_5]$ of $B_2O_3$ and $P_2O_5$ is preferably 0.5%, and more preferably 0.8% and 1.0% in this order. In addition, an upper limit of the total content is preferably 10%, and more preferably 8%, 5%, and 3% in this order.

From the viewpoint of improving the chemical durability and the thermal stability, it is preferable that the total content $[B_2O_3+P_2O_5]$ is in the range described above.

In the optical glass according to the second embodiment, a lower limit of the total content $[B_2O_3+SiO_2]$ of $B_2O_3$ and $SiO_2$ is preferably 10%, and more preferably 15%, 18%, and 20% in this order. In addition, an upper limit of the total content is preferably 50%, and more preferably 45%, 40%, and 35% in this order.

In order to obtain optical glass having a high refractive index, it is preferable that the total content $[B_2O_3+SiO_2]$ is in the range described above.

In the optical glass according to the second embodiment, a lower limit of the content of $ZrO_2$ is preferably 0%, and more preferably 0.10%, 0.5%, and 1.0% in this order. In addition, an upper limit of the content of $ZrO_2$ is preferably 10%, and more preferably 8%, 5%, and 3% in this order. The content of $ZrO_2$ may be 0%.

$ZrO_2$ is a component that contributes to an increase in the refractive index. On the other hand, in a case where the content of $ZrO_2$ is excessively high, the thermal stability may decrease, and the specific weight may increase. Accordingly, it is preferable that the content of $ZrO_2$ is in the range described above.

In the optical glass according to the second embodiment, an upper limit of the content of $WO_3$ is preferably 10%, and more preferably 8%, 5%, and 3% in this order. The content of $WO_3$ may be 0%.

$WO_3$ is a component that contributes to an increase in the refractive index. On the other hand, in a case where the content of $WO_3$ is excessively high, the thermal stability may decrease, the specific weight may increase, the coloration of the glass may increase, and a transmittance may decrease. Accordingly, it is preferable that the content of $WO_3$ is in the range described above.

In the optical glass according to the second embodiment, an upper limit of the content of $Bi_2O_3$ is preferably 10%, and more preferably 8%, 5%, and 3% in this order. In addition, a lower limit of the content of $Bi_2O_3$ is preferably 0%. The content of $Bi_2O_3$ may be 0%.

$Bi_2O_3$ has a function of improving the thermal stability of the glass at a suitable amount. In addition, $Bi_2O_3$ is a component that contributes to an increase in the refractive index. On the other hand, in a case where the content of $Bi_2O_3$ is excessively high, the specific weight may increase. Further, the coloration of the glass may increase. Accordingly, it is preferable that the content of $Bi_2O_3$ is in the range described above.

In the optical glass according to the second embodiment, an upper limit of the total content $[TiO_2+Nb_2O_5+WO_3+Bi_2O_3]$ of $TiO_2$, $Nb_2O_5$, $WO_3$, and $Bi_2O_3$ is preferably 80%, and more preferably 70% and 60% in this order. In addition, a lower limit of the total content is preferably 20%, and more preferably 25%, 30%, and 35% in this order.

All of $TiO_2$, $Nb_2O_5$, $WO_3$, and $Bi_2O_3$ are a component that contributes to an increase in the refractive index. Accordingly, it is preferable that the total content $[TiO_2+Nb_2O_5+WO_3+Bi_2O_3]$ is in the range described above.

In the optical glass according to the second embodiment, a lower limit of the content of $Li_2O$ is preferably 0.1%, and more preferably 0.3%, 0.5%, 0.8%, 1.0%, 1.3%, and 1.5% in this order. An upper limit of the content of $Li_2O$ is preferably 10%, and more preferably 9%, 8%, 7%, 6%, and 5% in this order.

$Li_2O$ is a component that contributes to a decrease in the specific weight, and is particularly a component that contributes to an increase in the refractive index among alkali metals. On the other hand, in a case where the content of $Li_2O$ is excessively high, the thermal stability may decrease. Accordingly, it is preferable that the content of $Li_2O$ is in the range described above.

In the optical glass according to the second embodiment, an upper limit of the content of $Na_2O$ is preferably 10%, and more preferably 9%, 8%, and 7% in this order. A lower limit of the content of $Na_2O$ is preferably 0%, and more preferably 0.5%, 1.0%, 1.5%, and 2.0% in this order.

In the optical glass according to the second embodiment, an upper limit of the content of $K_2O$ is preferably 10%, and more preferably 8% and 5% in this order. A lower limit of the content of $K_2O$ is preferably 0%, and more preferably 0.5%, 1.0%, 1.5%, and 2.0% in this order. The content of $K_2O$ may be 0%.

$Na_2O$ and $K_2O$ have a function of improving the melting properties of the glass. On the other hand, in a case where the contents of $Na_2O$ and $K_2O$ are excessively high, the refractive index may decrease, and the thermal stability may decrease. Accordingly, it is preferable that the contents of $Na_2O$ and $K_2O$ are in the ranges described above, respectively.

In the optical glass according to the second embodiment, an upper limit of the content of $Cs_2O$ is preferably 5%, and more preferably 3% and 1% in this order. A lower limit of the content of $Cs_2O$ is preferably 0%.

$Cs_2O$ has a function of improving the thermal stability of the glass, but in a case where the content of $Cs_2O$ increases, the chemical durability and the weather resistance may decrease. Accordingly, it is preferable that the content of $Cs_2O$ is in the range described above.

In the optical glass according to the second embodiment, a lower limit of a mass ratio $[Li_2O/(Li_2O+Na_2O+K_2O)]$ of the content of $Li_2O$ to the total content of $Li_2O$, $Na_2O$, and $K_2O$ is preferably 0.10, and more preferably 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio $[Li_2O/(Li_2O+Na_2O+K_2O)]$ is in the range described above.

In the optical glass according to the second embodiment, a lower limit of the total content $[Na_2O+K_2O+Cs_2O]$ of $Na_2O$, $K_2O$, and $Cs_2O$ is preferably 0%. An upper limit of the total content is preferably 11.0%, and more preferably 10.0%, 9.0%, 8.0%, 7.0%, and 6.0% in this order.

In order to maintain a high refractive index while maintaining the thermal stability of the glass, it is preferable that the total content $[Na_2O+K_2O+Cs_2O]$ is in the range described above.

In the optical glass according to the second embodiment, an upper limit of the content of MgO is preferably 20%, and more preferably 15%, 10%, and 5% in this order. In addition, a lower limit of the content of MgO is preferably 0%.

In the optical glass according to the second embodiment, a lower limit of the content of CaO is preferably 1%, and more preferably 3%, 5%, and 8% in this order. An upper limit of the content of CaO is preferably 20%, and more preferably 18%, 15%, and 13% in this order.

MgO and CaO have a function of improving the melting properties of the glass. On the other hand, in a case where the contents of MgO and CaO are excessively high, the thermal stability may decrease. Accordingly, it is preferable that the contents of MgO and CaO are in the ranges described above, respectively.

In the optical glass according to the second embodiment, an upper limit of the content of SrO is preferably 10%, and more preferably 8%, 5%, and 3% in this order. In addition, a lower limit of the content of SrO is preferably 0%.

SrO has a function of improving the melting properties of the glass and of increasing the refractive index. On the other hand, in a case where the content of SrO is excessively high, the thermal stability may decrease, and the specific weight may increase. Accordingly, it is preferable that the content of SrO is in the range described above.

In the optical glass according to the second embodiment, an upper limit of the content of ZnO is preferably 10%, and more preferably 8%, 5%, and 3% in this order. In addition, a lower limit of the content of ZnO is preferably 0%.

ZnO is a glass component having a function of improving the thermal stability of the glass. However, in a case where the content of ZnO is excessively high, the specific weight may increase. Accordingly, from the viewpoint of improving the thermal stability of the glass and of maintaining desired optical properties, it is preferable that the content of ZnO is in the range described above.

In the optical glass according to the second embodiment, an upper limit of the total content [MgO+CaO+SrO+BaO+ZnO] of MgO, CaO, SrO, BaO, and ZnO is preferably 40%, and more preferably 35%, 30%, and 25% in this order. In addition, a lower limit of the total content is preferably 3%, and more preferably 5%, 8%, and 10% in this order. From the viewpoint of suppressing an increase in the specific weight and of maintaining the thermal stability without hindering high dispersion, it is preferable that the total content is in the range described above.

In the optical glass according to the second embodiment, an upper limit of the content of $Ta_2O_5$ is preferably 10%, and more preferably 8%, 5%, and 3% in this order. In addition, a lower limit of the content of $Ta_2O_5$ is preferably 0%.

$Ta_2O_5$ is a component that contributes to an increase in the refractive index. In addition, $Ta_2O_5$ is a glass component having a function of improving the thermal stability of the glass, and is also a component for decreasing Pg,F. On the other hand, in a case where the content of $Ta_2O_5$ increases, the thermal stability of the glass may decrease, and when melting the glass, the unmelted residue of the glass raw material is likely to be generated. In addition, the specific weight may increase. Accordingly, it is preferable that the content of $Ta_2O_5$ is in the range described above.

In the optical glass according to the second embodiment, an upper limit of the content of $La_2O_3$ is preferably 10%, and more preferably 8%, 5%, and 3% in this order. In addition, a lower limit of the content of $La_2O_3$ is preferably 0%.

$La_2O_3$ is a component that contributes to an increase in the refractive index. On the other hand, in a case where the content of $La_2O_3$ increases, the specific weight may increase, and the thermal stability of the glass may decrease. Accordingly, from the viewpoint of suppressing an increase in the specific weight and a decrease in the thermal stability of the glass, it is preferable that the content of $La_2O_3$ is in the range described above.

In the optical glass according to the second embodiment, an upper limit of the content of $Y_2O_3$ is preferably 10%, and more preferably 8%, 5%, and 3% in this order. In addition, a lower limit of the content of $Y_2O_3$ is preferably 0%.

$Y_2O_3$ is a component that contributes to an increase in the refractive index. On the other hand, in a case where the content of $Y_2O_3$ excessively increases, the thermal stability of the glass may decrease, and the glass is likely to be devitrified during manufacturing. Accordingly, from the viewpoint of suppressing a decrease in the thermal stability of the glass, it is preferable that the content of $Y_2O_3$ is in the range described above.

In the optical glass according to the second embodiment, the content of $Sc_2O_3$ is preferably 2% or less. In addition, a lower limit of the content of $Sc_2O_3$ is preferably 0%.

In the optical glass according to the second embodiment, the content of $HfO_2$ is preferably 2% or less. In addition, a lower limit of the content of $HfO_2$ is preferably 0%.

$Sc_2O_3$ and $HfO_2$ have a function of increasing dispersivity of the glass, but are an expensive component. Accordingly, it is preferable that the contents of $Sc_2O_3$ and $HfO_2$ are in the ranges described above, respectively.

In the optical glass according to the second embodiment, the content of $Lu_2O_3$ is preferably 2% or less. In addition, a lower limit of the content of $Lu_2O_3$ is preferably 0%.

$Lu_2O_3$ has a function of increasing dispersivity of the glass, but has a high molecular weight, and thus, is also a glass component for increasing the specific weight of the glass. Accordingly, it is preferable that the content of $Lu_2O_3$ is in the range described above.

In the optical glass according to the second embodiment, the content of $GeO_2$ is preferably 2% or less. In addition, a lower limit of the content of $GeO_2$ is preferably 0%.

$GeO_2$ has a function of increasing dispersivity of the glass, but is a prominently expensive component among the glass components that are generally used. Accordingly, from the viewpoint of reducing a manufacturing cost of the glass, it is preferable that the content of $GeO_2$ is in the range described above.

In the optical glass according to the second embodiment, an upper limit of the content of $Gd_2O_3$ is preferably 3.0%, and more preferably 2.0%. In addition, a lower limit of the content of $Gd_2O_3$ is preferably 0%.

$Gd_2O_3$ is a component that contributes to an increase in the refractive index. On the other hand, in a case where the content of $Gd_2O_3$ excessively increases, the thermal stability of the glass may decrease. In addition, in a case where the content of $Gd_2O_3$ excessively increases, the specific weight of the glass may increase, which is not preferable. Accordingly, from the viewpoint of suppressing an increase in the specific weight while excellently maintaining the thermal stability of the glass, it is preferable that the content of $Gd_2O_3$ is in the range described above.

In the optical glass according to the second embodiment, the content of $Yb_2O_3$ is preferably 2% or less. In addition, a lower limit of the content of $Yb_2O_3$ is preferably 0%.

$Yb_2O_3$ has a molecular weight higher than those of $La_2O_3$, $Gd_2O_3$, and $Y_2O_3$, and thus, increases the specific weight of the glass. In a case where the specific weight of the glass increases, the mass of an optical element increases. Accordingly, it is desirable to suppress an increase in the specific weight of the glass by reducing the content of $Yb_2O_3$.

In addition, in a case where the content of $Yb_2O_3$ is excessively high, the thermal stability of the glass may decrease. From the viewpoint of preventing a decrease in the thermal stability of the glass and of suppressing an increase in the specific weight, it is preferable that the content of $Yb_2O_3$ is in the range described above.

In the optical glass according to the second embodiment, a lower limit of a mass ratio $[Li_2O/\{100-(SiO_2+B_2O_3+P_2O_5+GeO_2)\}]$ of the content of $Li_2O$ to the total content of the glass components other than $SiO_2$, $B_2O_3$, $P_2O_5$, and $GeO_2$ is preferably 0.02, and more preferably 0.03, 0.04, 0.05, and 0.06 in this order. An upper limit of the mass ratio is preferably 0.20, and more preferably 0.15, 0.13, and 0.10 in this order.

Note that, the total content of all the glass components is 100% by mass. Therefore, the total content of the glass components other than $SiO_2$, $B_2O_3$, $P_2O_5$, and $GeO_2$ is represented by $[100-(SiO_2+B_2O_3+P_2O_5+GeO_2)]$. From the viewpoint of obtaining optical glass having a high refractive index and a reduced specific weight, it is preferable that the mass ratio $[Li_2O/\{100-(SiO_2+B_2O_3+P_2O_5+GeO_2)\}]$ is in the range described above.

In the optical glass according to the second embodiment, a lower limit of a mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ of the content of $TiO_2$ to the total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is preferably 0.40, and more preferably 0.42, 0.44, 0.46, 0.48, and 0.50 in this order. An upper limit of the mass ratio is preferably 0.80, and more preferably 0.75, 0.70, and 0.65 in this order.

From the viewpoint of suppressing an increase in the specific weight and of increasing the refractive index, it is preferable that the mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ is in the range described above.

It is preferable that the optical glass according to the second embodiment mainly contains the glass components described above, that is, $SiO_2$, $TiO_2$, and $Nb_2O_5$ as an essential component, and BaO, $P_2O_5$, $B_2O_3$, $Al_2O_3$, $ZrO_2$, $WO_3$, $Bi_2O_3$, $Li_2O$, $Na_2O$, $K_2O$, $Cs_2O$, MgO, CaO, SrO, ZnO, $Ta_2O_5$, $La_2O_3$, $Y_2O_3$, $Sc_2O_3$, $HfO_2$, $Lu_2O_3$, $GeO_2$, $Gd_2O_3$, and $Yb_2O_3$ as an arbitrary component, and the total content of the glass components described above is preferably 95% or more, more preferably 98% or more, even more preferably 99% or more, and still even more preferably 99.5% or more.

Note that, it is preferable that the optical glass according to the second embodiment basically contains the glass components described above, and other components can also be contained within a range not impairing the functions and the effects of the present invention. In addition, in the present invention, containing inevitable impurities is not excluded.

(Other Components)

All of Pb, As, Cd, Tl, Be, and Se have toxicity. Accordingly, it is particularly preferable that the optical glass according to the second embodiment does not contain such elements as the glass component. The content of each of the elements described above is preferably less than 0.5%, and more preferably less than 0.1%, less than 0.05%, and less than 0.01% in this order, in terms of an oxide.

All of U, Th, and Ra are a radioactive element. Accordingly, it is particularly preferable that the optical glass according to the second embodiment does not contain such elements as the glass component. The content of each of the elements is preferably less than 0.5%, and more preferably less than 0.1%, less than 0.05%, and less than 0.01% in this order, in terms of an oxide.

V, Cr, Mn, Fe, Co, Ni, Cu, Pr, Nd, Pm, Sm, Eu, Tb, Dy, Ho, Er, and Tm increase the coloration of the glass, and can be a fluorescent light source. Accordingly, it is particularly preferable that the optical glass according to the second embodiment does not contain such elements as the glass component. The content of each of the elements described above is preferably less than 0.5%, and more preferably less than 0.1%, less than 0.05%, and less than 0.01% in this order, in terms of an oxide.

Sb($Sb_2O_3$) and Ce($CeO_2$) are an element that functions as a clarificant and can be added arbitrarily. Among them, Sb($Sb_2O_3$) is a clarificant having a high clarifying effect.

$Ce(CeO_2)$ has a clarifying effect lower than that of $Sb(Sb_2O_3)$. In a case where $Ce(CeO_2)$ is added in large amounts, the coloration of the glass tends to be thickened.

Note that, herein, the contents of $Sb(Sb_2O_3)$ and $Ce(CeO_2)$ are represented by an external ratio, and are not included in the total content of all the glass components represented in terms of an oxide. That is, herein, the total content of all the glass components excluding $Sb(Sb_2O_3)$ and $Ce(CeO_2)$ is 100% by mass.

The content of $Sb_2O_3$ is represented by an external ratio. That is, in the optical glass according to the second embodiment, the content of $Sb_2O_3$ when the total content of all the glass components other than $Sb_2O_3$ and $CeO_2$ is 100% by mass is preferably 1% by mass or less, and more preferably 0.1% by mass or less, 0.05% by mass or less, and 0.03% by mass or less in this order. The content of $Sb_2O_3$ may be 0% by mass.

The content of $CeO_2$ is also represented by an external ratio. That is, in the optical glass according to the second embodiment, the content of $CeO_2$ when the total content of all the glass components other than $CeO_2$ and $Sb_2O_3$ is 100% by mass is preferably 2% by mass or less, and more preferably 1% by mass or less, 0.5% by mass or less, and 0.1% by mass or less in this order. The content of $CeO_2$ may be 0% by mass. By setting the content of $CeO_2$ to be in the range described above, clarifying properties of the glass can be improved.

(Properties of Glass)

<Specific Weight of Glass>

The optical glass according to the second embodiment is high-refractive index glass and has the specific weight that is not high. In a case where the specific weight of the glass can be reduced, the weight of a lens can be reduced. On the other hand, in a case where the specific weight is excessively low, a decrease in the thermal stability is caused.

Therefore, in the optical glass according to the second embodiment, the specific weight is preferably 4.2 or less, and more preferably 4.0 or less, 3.8 or less, 3.6 or less, and 3.4 or less in this order.

The specific weight can be controlled by adjusting the content of each of the glass components. In particular, by adjusting the content of $Li_2O$ or $TiO_2$, the specific weight can be reduced while maintaining a high refractive index.

Note that, in the optical glass according to the second embodiment, the refractive index nd and the specific weight preferably satisfy Expression (1) described below, more preferably satisfy Expression (2) described below, and even more preferably satisfy Expression (3) described below. By the refractive index nd and the specific weight satisfying the following expressions, optical glass having a high refractive index and a comparatively reduced specific weight can be obtained.

$$nd \geq 0.2 \times \text{Specific Weight} + 1.18 \quad (1)$$

$$nd \geq 0.2 \times \text{Specific Weight} + 1.19 \quad (2)$$

$$nd \geq 0.2 \times \text{Specific Weight} + 1.20 \quad (3)$$

In addition, in the optical glass according to the second embodiment, a ratio [Refractive Index nd/Specific Weight] of the refractive index nd to the specific weight is preferably 0.50 or more, more preferably 0.52 or more, and even more preferably 0.54 or more. By setting the ratio [Refractive Index nd/Specific Weight] to be in the range described above, optical glass having a high refractive index and a comparatively reduced specific weight can be obtained.

<Glass Transition Temperature Tg>

In the optical glass according to the second embodiment, an upper limit of a glass transition temperature Tg is preferably 680° C., and more preferably 670° C., 660° C., 650° C., 630° C., and 600° C. in this order. A lower limit of the glass transition temperature Tg is not particularly limited, and is generally 500° C., and preferably 550° C.

The glass transition temperature Tg can be controlled by adjusting the total content of the alkali metals.

By the upper limit of the glass transition temperature Tg satisfying the range described above, an increase in a molding temperature when reheat-pressing the glass and an annealing temperature can be suppressed, and a thermal damage on a reheat press molding facility and an annealing facility can be reduced.

By the lower limit of the glass transition temperature Tg satisfying the range described above, reheat press moldability and the thermal stability of the glass are likely to be excellently maintained while maintaining a desired Abbe's number and a desired refractive index.

<Light Transmissivity of Glass>

Light transmissivity of the optical glass according to the second embodiment can be evaluated by coloration degrees λ80, λ70, and λ5.

A spectral transmittance of a glass sample having a thickness of 10.0 mm±0.1 mm is measured in a range of a wavelength 200 to 700 nm, and a wavelength at which an external transmittance is 80% is λ80, a wavelength at which an external transmittance is 70% is λ70, and a wavelength at which an external transmittance is 5% is λ5.

λ80 of the optical glass according to the second embodiment is preferably 700 nm or less, more preferably 650 nm or less, and even more preferably 600 nm or less.

λ70 is preferably 600 nm or less, more preferably 550 nm or less, and even more preferably 500 nm or less.

λ5 is preferably 500 nm or less, more preferably 450 nm or less, and even more preferably 400 nm or less.

(Manufacturing of Optical Glass)

The glass raw materials may be blended to have the predetermined composition described above, and the optical glass according to the second embodiment may be prepared by the blended glass raw material in accordance with a known glass manufacturing method. For example, a plurality of types of compounds are blended and sufficiently mixed to be a batch raw material, and the batch raw material is put in a quartz crucible or a platinum crucible and roughly melted. A melted product obtained by the rough melting is rapidly cooled and pulverized to prepare cullet. Further, the cullet is put in a platinum crucible and heated and remelted to be molten glass, and the molten glass is further clarified and homogenized, and then, is molded and gradually cooled to obtain optical glass. A known method may be applied to the molding and the gradual cooling of the molten glass.

Note that, the compound used when blending the batch raw material is not particularly limited insofar as a desired glass component can be introduced into the glass to have a desired content, and examples of such a compound include an oxide, a carbonate, a nitrate, a hydroxide, a fluoride, and the like.

(Manufacturing of Optical Element and Others)

A known method may be applied to the preparation of an optical element by using the optical glass according to the second embodiment. For example, in the manufacturing of the optical glass described above, the molten glass is cast into a mold and molded into the shape of a plate, and a glass material including the optical glass according to the present invention is prepared. The obtained glass material is suitably cut, ground, and polished, and a cut piece having a size and a shape suitable for press molding is prepared. The cut piece is heated and softened, and is press-molded (reheat-pressed) by a known method, and an optical element blank having a shape similar to the shape of the optical element is prepared. The optical element blank is annealed, and is ground and polished by a known method, and an optical element is prepared.

An optical functional surface of the prepared optical element may be coated with an antireflective film, a total reflection film, and the like, in accordance with the intended use.

According to one aspect of the present invention, an optical element including the optical glass described above can be provided. As the type of optical element, a lens such as a planar lens, a spherical lens, and an aspherical lens, a prism, a diffraction grating, a light guide plate, and the like can be exemplified. As the shape of the lens, various shapes such as a biconvex lens, a plano-convex lens, a biconcave lens, a plano-concave lens, a convex meniscus lens, and a concave meniscus lens can be exemplified. As the use of the light guide plate, a display device such as an augmented reality (AR) display type spectacle type device or a mixed reality (MR) display type spectacle type device, and the like can be exemplified. Such a light guide plate is plate glass that can be attached to the frame of the spectacle type device, and includes the optical glass described above. A diffraction grating for changing a traveling direction of light that is propagated through the light guide plate by repeating total reflection may be formed on the surface of the light guide plate, as necessary. The diffraction grating can be formed by a known method. In a case of wearing a spectacle type device including the light guide plate, the light that is propagated through the light guide plate is incident on the pupils, and thus, the function of augmented reality (AR) display or mixed reality (MR) display is exhibited. Such a spectacle type device, for example, is disclosed in JP Patent Application Laid Open (Translation of PCT Application) No. 2017-534352 and the like. Note that, the light guide plate can be prepared by a known method. The optical element can be manufactured by a method including a step of processing a glass molded body containing the optical glass. As the processing, severing, cutting, rough grinding, fine grinding, polishing, and the like can be exemplified. By using the glass when performing such processing, a damage can be reduced, and a high-quality optical element can be stably supplied.

(Image Display Device)

An image display device according to the second embodiment can be the same as that of the first embodiment.

Third Embodiment

Optical glass according to a third embodiment, in which a content of $SiO_2$ is 1 to 50% by mass, a content of $TiO_2$ is 1 to 50% by mass, a content of $Nb_2O_5$ is 1 to 50% by mass, a content of $Na_2O$ is 0 to 8% by mass, a total content [$TiO_2$+$Nb_2O_5$] of $TiO_2$ and $Nb_2O_5$ is 40 to 80% by mass, a mass ratio [$TiO_2$/($TiO_2$+$Nb_2O_5$)] of the content of $TiO_2$ to the total content of $TiO_2$ and $Nb_2O_5$ is 0.3 or more, a refractive index nd is 1.88 or more, and a ratio [Refractive Index nd/Specific Weight] of the refractive index nd to a specific weight is 0.50 or more.

In the optical glass according to the third embodiment, the content of $SiO_2$ is 1 to 50%. A lower limit of the content of $SiO_2$ is preferably 10%, and more preferably 12%, 15%, 18%, and 20% in this order. In addition, an upper limit of the content of $SiO_2$ is preferably 40%, and more preferably 38%, 35%, 33%, and 30% in this order.

$SiO_2$ is a network-forming component of the glass. By setting the content of $SiO_2$ to be in the range described above, thermal stability, chemical durability, and weather resistance of the glass can be improved, and the viscosity of molten glass can be increased. On the other hand, in a case where the content of $SiO_2$ is excessively high, the refractive index of the glass may decrease, and desired optical properties may not be obtained.

In the optical glass according to the third embodiment, the content of $TiO_2$ is 1 to 50%. A lower limit of the content of $TiO_2$ is preferably 10%, and more preferably 13%, 15%, 18%, and 20% in this order. In addition, an upper limit of the content of $TiO_2$ is preferably 50%, and more preferably 45%, 40%, and 35% in this order.

By setting the content of $TiO_2$ to be in the range described above, the refractive index can be increased, and the stability of the glass can be improved. In addition, the refractive index can be increased without increasing the specific weight. On the other hand, in a case where the content of $TiO_2$ is excessively high, the thermal stability may decrease.

In the optical glass according to the third embodiment, the content of $Nb_2O_5$ is 1 to 50%. A lower limit of the content of $Nb_2O_5$ is preferably 10%, and more preferably 13% and 15% in this order. In addition, an upper limit of the content of $Nb_2O_5$ is preferably 50%, and more preferably 45%, 40%, and 35% in this order.

By setting the content of $Nb_2O_5$ to be in the range described above, the refractive index can be increased, and the stability of the glass can be improved. On the other hand, in a case where the content of $Nb_2O_5$ is excessively high, the specific weight may increase, and the thermal stability may decrease.

In the optical glass according to the third embodiment, the content of $Na_2O$ is 0 to 8%. A lower limit of the content of $Na_2O$ is preferably 0.5%, and more preferably 1.0%, 1.5%, and 2.0% in this order. In addition, an upper limit of the content of $Na_2O$ is preferably 7%, and more preferably 6.5%, 5.5%, and 4.5% in this order.

By setting the content of $Na_2O$ to be in the range described above, melting properties of the glass can be improved. On the other hand, in a case where the content of $Na_2O$ is excessively high, the refractive index may decrease, and the thermal stability may decrease.

In the optical glass according to the third embodiment, the total content [$TiO_2$+$Nb_2O_5$] of $TiO_2$ and $Nb_2O_5$ is 40 to 80%. A lower limit of the total content is preferably 42%, and more preferably 44%, 46%, and 48% in this order. In addition, an upper limit of the total content is preferably 70%, and more preferably 65%, 60%, and 55% in this order.

By setting the total content [$TiO_2$+$Nb_2O_5$] to be in the range described above, the refractive index can be increased, and glass having desired optical properties can be obtained.

In the optical glass according to the third embodiment, the mass ratio [$TiO_2$/($TiO_2$+$Nb_2O_5$)] of the content of $TiO_2$ to the total content of $TiO_2$ and $Nb_2O_5$ is 0.3 or more. A lower limit of the mass ratio is preferably 0.35, and more preferably 0.40 and 0.45 in this order. An upper limit of the mass ratio is preferably 0.80, and more preferably 0.75, 0.70, and 0.65 in this order.

By setting the mass ratio [$TiO_2$/($TiO_2$+$Nb_2O_5$)] to be in the range described above, optical glass having a high refractive index and a reduced specific weight can be obtained.

In the optical glass according to the third embodiment, the refractive index nd is 1.88 or more. A lower limit of the refractive index nd can be 1.89, and can also be 1.90. In addition, an upper limit of the refractive index nd can be 2.20, and can also be 2.15, 2.10, or 2.05. The refractive index can be controlled by adjusting the contents of $TiO_2$, $Nb_2O_5$, $WO_3$, $Bi_2O_3$, $ZrO_2$, $La_2O_3$, $Gd_2O_3$, $Y_2O_3$, and $Ta_2O_5$, which are a glass component that contributes to an increase in the refractive index.

In addition, in the optical glass according to the third embodiment, the ratio [Refractive Index nd/Specific Weight] of the refractive index nd to the specific weight is 0.50 or more. The ratio [Refractive Index nd/Specific Weight] is preferably 0.52 or more, and more preferably 0.54 or more. By setting the ratio [Refractive Index nd/Specific Weight] to be in the range described above, optical glass having a high refractive index and a comparatively reduced specific weight can be obtained.

Non-restrictive examples of the content, the ratio, and the properties of glass components other than the above in the optical glass according to the third embodiment will be described.

In the optical glass according to the third embodiment, an upper limit of the content of $P_2O_5$ is preferably 10%, and more preferably 8%, 5%, and 3% in this order. The content of $P_2O_5$ may be 0%.

In order to obtain optical glass having a high refractive index and a reduced specific weight, it is preferable that the content of $P_2O_5$ is in the range described above.

In the optical glass according to the third embodiment, an upper limit of the content of $B_2O_3$ is preferably 10%, and more preferably 8%, 5%, and 3% in this order. In addition, a lower limit of the content of $B_2O_3$ is preferably 0%, and more preferably 0.5%, 0.8%, and 1.0% in this order.

$B_2O_3$ is a network-forming component of the glass. $B_2O_3$ has a function of improving the thermal stability of the glass, but in a case where the content of $B_2O_3$ is excessively high, the refractive index may decrease. Accordingly, it is preferable that the content of $B_2O_3$ is in the range described above.

In the optical glass according to the third embodiment, an upper limit of the content of $Al_2O_3$ is preferably 10%, and more preferably 8%, 5%, and 3% in this order. The content of $Al_2O_3$ may be 0%.

$Al_2O_3$ has a function of increasing the chemical durability, but in a case where the content of $Al_2O_3$ is excessively high, the melting properties of the glass may be degraded. Accordingly, it is preferable that the content of $Al_2O_3$ is in the range described above.

In the optical glass according to the third embodiment, a lower limit of the total content [$SiO_2$+$Al_2O_3$] of $SiO_2$ and $Al_2O_3$ is preferably 10%, and more preferably 13%, 15%, 18%, and 20% in this order. In addition, an upper limit of the total content is preferably 50%, and more preferably 45%, 40%, 35%, and 30% in this order.

In order to increase the thermal stability of the glass, it is preferable that the total content [$SiO_2$+$Al_2O_3$] is in the range described above.

In the optical glass according to the third embodiment, a lower limit of a mass ratio [$B_2O_3$/($SiO_2$+$Al_2O_3$)] of the content of $B_2O_3$ to the total content of $SiO_2$ and $Al_2O_3$ is preferably 0.01, and more preferably 0.02, 0.03, and 0.04 in this order. An upper limit of the mass ratio is preferably 0.20, and more preferably 0.18, 0.15, 0.13, and 0.10 in this order.

From the viewpoint of improving the chemical durability and the thermal stability, it is preferable that the mass ratio [$B_2O_3$/($SiO_2$+$Al_2O_3$)] is in the range described above.

In the optical glass according to the third embodiment, a lower limit of the total content [$B_2O_3$+$P_2O_5$] of $B_2O_3$ and $P_2O_5$ is preferably 0.5%, and more preferably 0.8% and 1.0% in this order. In addition, an upper limit of the total content is preferably 10%, and more preferably 8%, 5%, and 3% in this order.

From the viewpoint of improving the chemical durability and the thermal stability, it is preferable that the total content [$B_2O_3$+$P_2O_5$] is in the range described above.

In the optical glass according to the third embodiment, a lower limit of the total content [$B_2O_3$+$SiO_2$] of $B_2O_3$ and $SiO_2$ is preferably 10%, and more preferably 15%, 18%, and 20% in this order. In addition, an upper limit of the total content is preferably 50%, and more preferably 45%, 40%, and 35% in this order.

In order to obtain optical glass having a high refractive index, it is preferable that the total content [$B_2O_3$+$SiO_2$] is in the range described above.

In the optical glass according to the third embodiment, a lower limit of the content of $ZrO_2$ is preferably 0%, and more preferably 0.1%, 0.5%, and 1.0% in this order. In addition, an upper limit of the content of $ZrO_2$ is preferably 10%, and more preferably 8%, 5%, and 3% in this order. The content of $ZrO_2$ may be 0%.

$ZrO_2$ is a component that contributes to an increase in the refractive index. On the other hand, in a case where the content of $ZrO_2$ is excessively high, the thermal stability may decrease, and the specific weight may increase. Accordingly, it is preferable that the content of $ZrO_2$ is in the range described above.

In the optical glass according to the third embodiment, an upper limit of the content of $WO_3$ is preferably 10%, and more preferably 8%, 5%, and 3% in this order. The content of $WO_3$ may be 0%.

$WO_3$ is a component that contributes to an increase in the refractive index. On the other hand, in a case where the content of $WO_3$ is excessively high, the thermal stability may decrease, the specific weight may increase, the coloration of the glass may increase, and a transmittance may decrease. Accordingly, it is preferable that the content of $WO_3$ is in the range described above.

In the optical glass according to the third embodiment, an upper limit of the content of $Bi_2O_3$ is preferably 10%, and more preferably 8%, 5%, and 3% in this order. In addition, a lower limit of the content of $Bi_2O_3$ is preferably 0%. The content of $Bi_2O_3$ may be 0%.

$Bi_2O_3$ has a function of improving the thermal stability of the glass at a suitable amount. In addition, $Bi_2O_3$ is a component that contributes to an increase in the refractive index. On the other hand, in a case where the content of $Bi_2O_3$ is excessively high, the specific weight may increase. Further, the coloration of the glass may increase. Accordingly, it is preferable that the content of $Bi_2O_3$ is in the range described above.

In the optical glass according to the third embodiment, an upper limit of the total content [$TiO_2$+$Nb_2O_5$+$WO_3$+$Bi_2O_3$] of $TiO_2$, $Nb_2O_5$, $WO_3$, and $Bi_2O_3$ is preferably 80%, and more preferably 70% and 60% in this order. In addition, a lower limit of the total content is preferably 20%, and more preferably 25%, 30%, and 35% in this order.

All of $TiO_2$, $Nb_2O_5$, $WO_3$, and $Bi_2O_3$ are a component that contributes to an increase in the refractive index. Accordingly, it is preferable that the total content [$TiO_2$+$Nb_2O_5$+$WO_3$+$Bi_2O_3$] is in the range described above.

In the optical glass according to the third embodiment, a lower limit of the content of $Li_2O$ is preferably 0.0%, and more preferably 0.1%, 0.3%, 0.5%, 0.8%, 1.0%, 1.3%, and 1.5% in this order. An upper limit of the content of $Li_2O$ is preferably 10%, and more preferably 9%, 8%, 7%, 6%, and 5% in this order.

$Li_2O$ is a component that contributes to a decrease in the specific weight, and is particularly a component that contributes to an increase in the refractive index among alkali metals. On the other hand, in a case where the content of $Li_2O$ is excessively high, the thermal stability may decrease. Accordingly, it is preferable that the content of $Li_2O$ is in the range described above.

In the optical glass according to the third embodiment, an upper limit of the content of $K_2O$ is preferably 10%, and more preferably 8% and 5% in this order. A lower limit of the content of $K_2O$ is preferably 0%, and more preferably 0.5%, 1.0%, 1.5%, and 2.0% in this order. The content of $K_2O$ may be 0%.

$K_2O$ has a function of improving the melting properties of the glass. On the other hand, in a case where the content of $K_2O$ is excessively high, the refractive index may decrease, and the thermal stability may decrease. Accordingly, it is preferable that the content of $K_2O$ is in the range described above.

In the optical glass according to the third embodiment, an upper limit of the content of $Cs_2O$ is preferably 5%, and more preferably 3% and 1% in this order. A lower limit of the content of $Cs_2O$ is preferably 0%.

$Cs_2O$ has a function of improving the thermal stability of the glass, but in a case where the content of $Cs_2O$ increases, the chemical durability and the weather resistance may decrease. Accordingly, it is preferable that the content of $Cs_2O$ is in the range described above.

In the optical glass according to the third embodiment, a lower limit of a mass ratio $[Li_2O/(Li_2O+Na_2O+K_2O)]$ of the content of $Li_2O$ to the total content of $Li_2O$, $Na_2O$, and $K_2O$ is preferably 0.00, and more preferably 0.10, 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio $[Li_2O/(Li_2O+Na_2O+K_2O)]$ is in the range described above.

In the optical glass according to the third embodiment, a lower limit of the total content $[Na_2O+K_2O+Cs_2O]$ of $Na_2O$, $K_2O$, and $Cs_2O$ is preferably 0%. An upper limit of the total content is preferably 11.0%, and more preferably 10.0%, 9.0%, 8.0%, 7.0%, and 6.0% in this order.

In order to maintain a high refractive index while maintaining the thermal stability of the glass, it is preferable that the total content $[Na_2O+K_2O+Cs_2O]$ is in the range described above.

In the optical glass according to the third embodiment, a lower limit of the total content $[Li_2O+Na_2O+K_2O+Cs_2O]$ of $Li_2O$, $Na_2O$, $K_2O$, and $Cs_2O$ is preferably 1.5%, and more preferably 2%, 4%, and 6% in this order. An upper limit of the total content is preferably 15%, and more preferably 13% and 10% in this order.

In order to obtain optical glass excellent in the melting properties, it is preferable that the total content $[Li_2O+Na_2O+K_2O+Cs_2O]$ is in the range described above.

In the optical glass according to the third embodiment, a lower limit of a mass ratio $[Li_2O/(Li_2O+Na_2O+K_2O+Cs_2O)]$ of the content of $Li_2O$ to the total content of $Li_2O$, $Na_2O$, $K_2O$, and $Cs_2O$ is preferably 0.00, and more preferably 0.10, 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio $[Li_2O/(Li_2O+Na_2O+K_2O+Cs_2O)]$ is in the range described above.

In the optical glass according to the third embodiment, an upper limit of the content of MgO is preferably 20%, and more preferably 15%, 10%, and 5% in this order. In addition, a lower limit of the content of MgO is preferably 0%.

In the optical glass according to the third embodiment, a lower limit of the content of CaO is preferably 1%, and more preferably 3%, 5%, and 8% in this order. An upper limit of the content of CaO is preferably 20%, and more preferably 18%, 15%, and 13% in this order.

MgO and CaO have a function of improving the melting properties of the glass. On the other hand, in a case where the contents of MgO and CaO are excessively high, the thermal stability may decrease. Accordingly, it is preferable that the contents of MgO and CaO are in the ranges described above, respectively.

In the optical glass according to the third embodiment, an upper limit of the content of SrO is preferably 10%, and more preferably 8%, 5%, and 3% in this order. In addition, a lower limit of the content of SrO is preferably 0%.

SrO has a function of improving the melting properties of the glass and of increasing the refractive index. On the other hand, in a case where the content of SrO is excessively high, the thermal stability may decrease, and the specific weight may increase. Accordingly, it is preferable that the content of SrO is in the range described above.

In the optical glass according to the third embodiment, the content of BaO is preferably 20% or less, and more preferably 17% or less, less than 16.0%, 15% or less, 13% or less, and 10% or less in this order. In addition, a lower limit of the content of BaO is preferably 0%.

By setting the content of BaO to be in the range described above, the melting properties of the glass can be improved, and the refractive index can be increased. On the other hand, in a case where the content of BaO is excessively high, the thermal stability may decrease, and the specific weight may increase.

In the optical glass according to the third embodiment, an upper limit of the content of ZnO is preferably 10%, and more preferably 8%, 5%, and 3% in this order. In addition, a lower limit of the content of ZnO is preferably 0%.

ZnO is a glass component having a function of improving the thermal stability of the glass. However, in a case where the content of ZnO is excessively high, the specific weight may increase. Accordingly, from the viewpoint of improving the thermal stability of the glass and of maintaining desired optical properties, it is preferable that the content of ZnO is in the range described above.

In the optical glass according to the third embodiment, an upper limit of the total content [MgO+CaO+SrO+BaO+ZnO] of MgO, CaO, SrO, BaO, and ZnO is preferably 40%, and more preferably 35%, 30%, and 25% in this order. In addition, a lower limit of the total content is preferably 3%, and more preferably 5%, 8%, and 10% in this order. From the viewpoint of suppressing an increase in the specific weight and of maintaining the thermal stability without hindering high dispersion, it is preferable that the total content is in the range described above.

In the optical glass according to the third embodiment, an upper limit of the content of $Ta_2O_5$ is preferably 10%, and more preferably 8%, 5%, and 3% in this order. In addition, a lower limit of the content of $Ta_2O_5$ is preferably 0%.

$Ta_2O_5$ is a component that contributes to an increase in the refractive index. In addition, $Ta_2O_5$ is a glass component having a function of improving the thermal stability of the glass, and is also a component for decreasing Pg,F. On the other hand, in a case where the content of $Ta_2O_5$ increases, the thermal stability of the glass may decrease, and when melting the glass, the unmelted residue of the glass raw material is likely to be generated. In addition, the specific weight may increase. Accordingly, it is preferable that the content of $Ta_2O_5$ is in the range described above.

In the optical glass according to the third embodiment, an upper limit of the content of $La_2O_3$ is preferably 10%, and more preferably 8%, 5%, and 3% in this order. In addition, a lower limit of the content of $La_2O_3$ is preferably 0%.

$La_2O_3$ is a component that contributes to an increase in the refractive index. On the other hand, in a case where the content of $La_2O_3$ increases, the specific weight may increase, and the thermal stability of the glass may decrease. Accordingly, from the viewpoint of suppressing an increase in the specific weight and a decrease in the thermal stability of the glass, it is preferable that the content of $La_2O_3$ is in the range described above.

In the optical glass according to the third embodiment, an upper limit of the content of $Y_2O_3$ is preferably 10%, and more preferably 8%, 5%, and 3% in this order. In addition, a lower limit of the content of $Y_2O_3$ is preferably 0%.

$Y_2O_3$ is a component that contributes to an increase in the refractive index. On the other hand, in a case where the content of $Y_2O_3$ excessively increases, the thermal stability of the glass may decrease, and the glass is likely to be devitrified during manufacturing. Accordingly, from the viewpoint of suppressing a decrease in the thermal stability of the glass, it is preferable that the content of $Y_2O_3$ is in the range described above.

In the optical glass according to the third embodiment, the content of $Sc_2O_3$ is preferably 2% or less. In addition, a lower limit of the content of $Sc_2O_3$ is preferably 0%.

In the optical glass according to the third embodiment, the content of $HfO_2$ is preferably 2% or less. In addition, a lower limit of the content of $HfO_2$ is preferably 0%.

$Sc_2O_3$ and $HfO_2$ have a function of increasing dispersivity of the glass, but are an expensive component. Accordingly, it is preferable that the contents of $Sc_2O_3$ and $HfO_2$ are in the ranges described above, respectively.

In the optical glass according to the third embodiment, the content of $Lu_2O_3$ is preferably 2% or less. In addition, a lower limit of the content of $Lu_2O_3$ is preferably 0%.

$Lu_2O_3$ has a function of increasing dispersivity of the glass, but has a high molecular weight, and thus, is also a glass component for increasing the specific weight of the glass. Accordingly, it is preferable that the content of $Lu_2O_3$ is in the range described above.

In the optical glass according to the third embodiment, the content of $GeO_2$ is preferably 2% or less. In addition, a lower limit of the content of $GeO_2$ is preferably 0%.

$GeO_2$ has a function of increasing dispersivity of the glass, but is a prominently expensive component among the glass components that are generally used. Accordingly, from the viewpoint of reducing a manufacturing cost of the glass, it is preferable that the content of $GeO_2$ is in the range described above.

In the optical glass according to the third embodiment, an upper limit of the content of $Gd_2O_3$ is preferably 3.0%, and more preferably 2.0%. In addition, a lower limit of the content of $Gd_2O_3$ is preferably 0%.

$Gd_2O_3$ is a component that contributes to an increase in the refractive index. On the other hand, in a case where the content of $Gd_2O_3$ excessively increases, the thermal stability of the glass may decrease. In addition, in a case where the content of $Gd_2O_3$ excessively increases, the specific weight of the glass may increase, which is not preferable. Accordingly, from the viewpoint of suppressing an increase in the specific weight while excellently maintaining the thermal stability of the glass, it is preferable that the content of $Gd_2O_3$ is in the range described above.

In the optical glass according to the third embodiment, the content of $Yb_2O_3$ is preferably 2% or less. In addition, a lower limit of the content of $Yb_2O_3$ is preferably 0%.

$Yb_2O_3$ has a molecular weight higher than those of $La_2O_3$, $Gd_2O_3$, and $Y_2O_3$, and thus, increases the specific weight of the glass. In a case where the specific weight of the glass increases, the mass of an optical element increases. Accordingly, it is desirable to suppress an increase in the specific weight of the glass by reducing the content of $Yb_2O_3$.

In addition, in a case where the content of $Yb_2O_3$ is excessively high, the thermal stability of the glass may decrease. From the viewpoint of preventing a decrease in the thermal stability of the glass and of suppressing an increase in the specific weight, it is preferable that the content of $Yb_2O_3$ is in the range described above.

In the optical glass according to the third embodiment, an upper limit of the total content $[La_2O_3+Gd_2O_3+Y_2O_3]$ of $La_2O_3$, $Gd_2O_3$, and $Y_2O_3$ is preferably 10%, and more preferably 8%, 5%, and 3% in this order. A lower limit of the total content is 0%. The total content may be 0%.

From the viewpoint of suppressing an increase in the specific weight and of excellently maintaining the thermal stability, it is preferable that the total content $[La_2O_3+Gd_2O_3+Y_2O_3]$ is in the range described above.

In the optical glass according to the third embodiment, a lower limit of a mass ratio $[Li_2O/\{100-(SiO_2+B_2O_3+P_2O_5+GeO_2)\}]$ of the content $Li_2O$ to the total content of the glass components other than $SiO_2$, $B_2O_3$, $P_2O_5$, and $GeO_2$ is preferably 0.00, and more preferably 0.02, 0.03, 0.04, 0.05, and 0.06 in this order. An upper limit of the mass ratio is preferably 0.20, and more preferably 0.15, 0.13, and 0.10 in this order.

Note that, the total content of all the glass components is 100% by mass. Therefore, the total content of the glass components other than $SiO_2$, $B_2O_3$, $P_2O_5$, and $GeO_2$ is represented by $[100-(SiO_2+B_2O_3+P_2O_5+GeO_2)]$. From the viewpoint of obtaining optical glass having a high refractive index and a reduced specific weight, it is preferable that the mass ratio $[Li_2O/\{100-(SiO_2+B_2O_3+P_2O_5+GeO_2)\}]$ is in the range described above.

In the optical glass according to the third embodiment, a lower limit of a mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ of the content of $TiO_2$ to the total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is preferably 0.40, and more preferably 0.42, 0.44, 0.46, 0.48, and 0.50 in this order. An upper limit of the mass ratio is preferably 0.80, and more preferably 0.75, 0.70, and 0.65 in this order.

From the viewpoint of suppressing an increase in the specific weight and of increasing the refractive index, it is preferable that the mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ is in the range described above.

It is preferable that the optical glass according to the third embodiment mainly contains the glass components described above, that is, $SiO_2$, $TiO_2$, and $Nb_2O_5$ as an essential component, and $Na_2O$, $P_2O_5$, $B_2O_3$, $Al_2O_3$, $ZrO_2$, $WO_3$, $Bi_2O_3$, $Li_2O$, $K_2O$, $Cs_2O$, MgO, CaO, SrO, BaO, ZnO, $Ta_2O_5$, $La_2O_3$, $Y_2O_3$, $Sc_2O_3$, $HfO_2$, $Lu_2O_3$, $GeO_2$, $Gd_2O_3$, and $Yb_2O_3$ as an arbitrary component, and the total content of the glass components described above is preferably 95% or more, more preferably 98% or more, even more preferably 99% or more, and still even more preferably 99.5% or more.

Note that, it is preferable that the optical glass according to the third embodiment basically contains the glass components described above, and other components can also be contained within a range not impairing the functions and the effects of the present invention. In addition, in the present invention, containing inevitable impurities is not excluded.

(Other Components)

All of Pb, As, Cd, Tl, Be, and Se have toxicity. Accordingly, it is particularly preferable that the optical glass according to the third embodiment does not contain such elements as the glass component. The content of each of the elements described above is preferably less than 0.5%, and more preferably less than 0.1%, less than 0.05%, and less than 0.01% in this order, in terms of an oxide.

All of U, Th, and Ra are a radioactive element. Accordingly, it is particularly preferable that the optical glass according to the third embodiment does not contain such elements as the glass component. The content of each of the elements is preferably less than 0.5%, and more preferably less than 0.1%, less than 0.05%, and less than 0.01% in this order, in terms of an oxide.

V, Cr, Mn, Fe, Co, Ni, Cu, Pr, Nd, Pm, Sm, Eu, Tb, Dy, Ho, Er, and Tm increase the coloration of the glass, and can be a fluorescent light source. Accordingly, it is particularly preferable that the optical glass according to the third embodiment does not contain such elements as the glass component. The content of each of the elements is preferably less than 0.5%, and more preferably less than 0.1%, less than 0.05%, and less than 0.01% in this order, in terms of an oxide.

Sb($Sb_2O_3$) and Ce($CeO_2$) are an element that functions as a clarificant and can be added arbitrary. Among them, Sb($Sb_2O_3$) is a clarificant having a high clarifying effect. Ce($CeO_2$) has a clarifying effect lower than that of Sb($Sb_2O_3$). In a case where Ce($CeO_2$) is added in large amounts, the coloration of the glass tends to be thickened.

Note that, herein, the contents of Sb($Sb_2O_3$) and Ce($CeO_2$) are represented by an external ratio, and are not included in the total content of all the glass components represented in terms of an oxide. That is, herein, the total content of all the glass components excluding Sb($Sb_2O_3$) and Ce($CeO_2$) is 100% by mass.

The content of $Sb_2O_3$ is represented by an external ratio. That is, in the optical glass according to the third embodiment, the content of $Sb_2O_3$ when the total content of all the glass components other than $Sb_2O_3$ and $CeO_2$ is 100% by mass is preferably 1% by mass or less, and more preferably 0.1% by mass or less, 0.05% by mass or less, and 0.03% by mass or less in this order. The content of $Sb_2O_3$ may be 0% by mass.

The content of $CeO_2$ is also represented by an external ratio. That is, in the optical glass according to the third embodiment, the content of $CeO_2$ when the total content of all the glass components other than $CeO_2$ and $Sb_2O_3$ is 100% by mass is preferably 2% by mass or less, and more preferably 1% by mass or less, 0.5% by mass or less, and 0.1% by mass or less in this order. The content of $CeO_2$ may be 0% by mass. By setting the content of $CeO_2$ to be in the range described above, clarifying properties of the glass can be improved.

(Properties of Glass)

<Abbe's Number νd>

In the optical glass according to the third embodiment, an Abbe's number νd is preferably 15 to 30. The Abbe's number νd may be 18 to 25, or may be 20 to 24. By setting the Abbe's number νd to be in the range described above, glass having desired dispersivity can be obtained. The Abbe's number νd can be controlled by adjusting the contents of $TiO_2$, $Nb_2O_5$, $WO_3$, and $Bi_2O_3$, which are a glass component that contributes to high dispersion.

<Specific Weight of Glass>

The optical glass according to the third embodiment is high-refractive index glass and has the specific weight that is not high. In a case where the specific weight of the glass can be reduced, the weight of a lens can be reduced. On the other hand, in a case where the specific weight is excessively low, a decrease in the thermal stability is caused.

Therefore, in the optical glass according to the third embodiment, the specific weight is preferably 4.2 or less, and more preferably 4.0 or less, 3.8 or less, 3.6 or less, and 3.4 or less in this order.

The specific weight can be controlled by adjusting the content of each of the glass components. In particular, by adjusting the content of $Li_2O$ or $TiO_2$, the specific weight can be reduced while maintaining a high refractive index.

Note that, in the optical glass according to the third embodiment, the refractive index nd and the specific weight preferably satisfy Expression (1) described below, more preferably satisfy Expression (2) described below, and even more preferably satisfy Expression (3) described below. By the refractive index nd and the specific weight satisfying the following expressions, optical glass having a high refractive index and a comparatively reduced specific weight can be obtained.

$$nd \geq 0.2 \times \text{Specific Weight} + 1.18 \quad (1)$$

$$nd \geq 0.2 \times \text{Specific Weight} + 1.19 \quad (2)$$

$$nd \geq 0.2 \times \text{Specific Weight} + 1.20 \quad (3)$$

<Glass Transition Temperature Tg>

In the optical glass according to the third embodiment, an upper limit of a glass transition temperature Tg is preferably 690° C., and more preferably 680° C., 660° C., 650° C., 630° C., and 600° C. in this order. A lower limit of the glass transition temperature Tg is not particularly limited, and is generally 500° C., and preferably 550° C.

The glass transition temperature Tg can be controlled by adjusting the total content of the alkali metals.

By the upper limit of the glass transition temperature Tg satisfying the range described above, an increase in a molding temperature when reheat-pressing the glass and an annealing temperature can be suppressed, and a thermal damage on a reheat press molding facility and an annealing facility can be reduced.

By the lower limit of the glass transition temperature Tg satisfying the range described above, reheat press moldability and the thermal stability of the glass are likely to be excellently maintained while maintaining a desired Abbe's number and a desired refractive index.

<Light Transmissivity of Glass>

Light transmissivity of the optical glass according to the third embodiment can be evaluated by coloration degrees λ80, λ70, and λ5.

A spectral transmittance of a glass sample having a thickness of 10.0 mm±0.1 mm is measured in a range of a wavelength of 200 to 700 nm, and a wavelength at which an external transmittance is 80% is 80, a wavelength at which an external transmittance is 70% is λ70, and a wavelength at which an external transmittance is 5% is λ5.

λ80 of the optical glass according to the third embodiment is preferably 700 nm or less, more preferably 650 nm or less, and even more preferably 600 nm or less.

λ70 is preferably 600 nm or less, more preferably 550 nm or less, and even more preferably 500 nm or less.

λ5 is preferably 500 nm or less, more preferably 450 nm or less, and even more preferably 400 nm or less.

(Manufacturing of Optical Glass)

The glass raw material may be blended to have the predetermined composition described above, and the optical glass according to the third embodiment may be prepared by the blended glass raw materials in accordance with a known glass manufacturing method. For example, a plurality of types of compounds are blended and sufficiently mixed to be a batch raw material, and the batch raw material is put in a quartz crucible or a platinum crucible and roughly melted. A melted product obtained by the rough melting is rapidly cooled and pulverized to prepare cullet. Further, the cullet is put in a platinum crucible and heated and remelted to be molten glass, and the molten glass is further clarified and homogenized, and then, is molded and gradually cooled to obtain optical glass. A known method may be applied to the molding and the gradual cooling of the molten glass.

Note that, the compound used when blending the batch raw material is not particularly limited insofar as a desired glass component can be introduced into the glass to have a desired content, and examples of such a compound include an oxide, a carbonate, a nitrate, a hydroxide, a fluoride, and the like.

(Manufacturing of Optical Element and Others)

A known method may be applied to the preparation of an optical element by using the optical glass according to the third embodiment. For example, in the manufacturing of the optical glass, the molten glass is cast into a mold and molded into the shape of a plate, and a glass material including the optical glass according to the present invention is prepared. The obtained glass material is suitably cut, ground, and polished, and a cut piece having a size and a shape suitable for press molding is prepared. The cut piece is heated and softened, and is press-molded (reheat-pressed) by a known method, and an optical element blank having a shape similar to the shape of the optical element is prepared. The optical element blank is annealed, and is ground and polished by a known method, and an optical element is prepared.

An optical functional surface of the prepared optical element may be coated with an antireflective film, a total reflection film, and the like, in accordance with the intended use.

According to one aspect of the present invention, an optical element including the optical glass described above can be provided. As the type of optical element, a lens such as a planar lens, a spherical lens, and an aspherical lens, a prism, a diffraction grating, a light guide plate, and the like can be exemplified. As the shape of the lens, various shapes such as a biconvex lens, a plano-convex lens, a biconcave lens, a plano-concave lens, a convex meniscus lens, and a concave meniscus lens can be exemplified. As the use of the light guide plate, a display device such as an augmented reality (AR) display type spectacle type device or a mixed reality (MR) display type spectacle type device, and the like can be exemplified. Such a light guide plate is a plate-shaped glass that can be attached to the frame of the spectacle type device, and includes the optical glass described above. A diffraction grating for changing a traveling direction of light that is propagated through the light guide plate by repeating total reflection may be formed on the surface of the light guide plate, as necessary. The diffraction grating can be formed by a known method. In a case of wearing a spectacle type device including the light guide plate, the light that is propagated through the light guide plate is incident on the pupils, and thus, the function of augmented reality (AR) display or mixed reality (MR) display is exhibited. Such a spectacle type device, for example, is disclosed in JP Patent Application Laid Open (Translation of PCT Application) No. 2017-534352 and the like. Note that, the light guide plate can be prepared by a known method. The optical element can be manufactured by a method including a step of processing a glass molded body containing the optical glass. As the processing, severing, cutting, rough grinding, fine grinding, polishing, and the like can be exemplified. By using the glass when performing such processing, a damage can be reduced, and a high-quality optical element can be stably supplied.

(Image Display Device)

An image display device according to the third embodiment can be the same as that of the first embodiment.

Fourth Embodiment

Optical glass according to a fourth embodiment, in which a mass ratio $[Li_2O/\{100-(SiO_2+B_2O_3+P_2O_5+GeO_2)\}]$ of a content of $Li_2O$ to a total content of glass components other than $SiO_2$, $B_2O_3$, $P_2O_5$, and $GeO_2$ is 0.02 or more, a mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ of a content of $TiO_2$ to a total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is 0.40 or more, and a refractive index nd is 1.86 or more.

In the optical glass according to the fourth embodiment, the mass ratio $[Li_2O/\{100-(SiO_2+B_2O_3+P_2O_5+GeO_2)\}]$ of the content of $Li_2O$ to the total content of the glass components other than $SiO_2$, $B_2O_3$, $P_2O_5$, and $GeO_2$ is 0.02 or more. A lower limit of the mass ratio is preferably 0.03, and more preferably 0.04, 0.05, and 0.06 in this order. An upper limit of the mass ratio is preferably 0.20, and more preferably 0.15, 0.13, and 0.10 in this order.

Note that, the total content of all the glass components is 100% by mass. Therefore, the total content of the glass components other than $SiO_2$, $B_2O_3$, $P_2O_5$, and $GeO_2$ is represented by $[100-(SiO_2+B_2O_3+P_2O_5+GeO_2)]$. By setting the mass ratio $[Li_2O/\{100-(SiO_2+B_2O_3+P_2O_5+GeO_2)\}]$ to be in the range described above, optical glass having a high refractive index and a reduced specific weight can be obtained.

In the optical glass according to the fourth embodiment, the mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ of the content of $TiO_2$ to the total content of $TiO_2$, $Nb_2O_5$, $WO_3$, $ZrO_2$, SrO, BaO, ZnO, $La_2O_3$, $Gd_2O_3$, $Y_2O_3$, $Ta_2O_5$, and $Bi_2O_3$ is 0.40 or more. A lower limit of the mass ratio is preferably 0.42, and more preferably 0.44, 0.46, 0.48, and 0.50 in this order. An upper limit of the mass ratio is preferably 0.80, and more preferably 0.75, 0.70, and 0.65 in this order.

By setting the mass ratio $[TiO_2/(TiO_2+Nb_2O_5+WO_3+ZrO_2+SrO+BaO+ZnO+La_2O_3+Gd_2O_3+Y_2O_3+Ta_2O_5+Bi_2O_3)]$ to be in the range described above, the refractive index can be increased while suppressing an increase in the specific weight.

Non-restrictive examples of the content and the ratio of glass components other than the above in the optical glass according to the fourth embodiment will be described.

In the optical glass according to the fourth embodiment, a lower limit of the content of $SiO_2$ is preferably 10%, and more preferably 12%, 15%, 18%, and 20% in this order. In addition, an upper limit of the content of $SiO_2$ is preferably 40%, and more preferably 38%, 35%, 33%, and 30% in this order.

$SiO_2$ is a network-forming component of the glass. In order to improve thermal stability, chemical durability, and weather resistance of the glass, and to improve the viscosity of molten glass, it is preferable that the content of $SiO_2$ is in the range described above. In a case where the content of $SiO_2$ is excessively high, the refractive index of the glass may decrease, and desired optical properties may not be obtained.

In the optical glass according to the fourth embodiment, an upper limit of the content of $P_2O_5$ is preferably 10%, and more preferably 8%, 5%, and 3% in this order. The content of $P_2O_5$ may be 0%.

In order to obtain optical glass having a high refractive index and a reduced specific weight, it is preferable that the content of $P_2O_5$ is in the range described above.

In the optical glass according to the fourth embodiment, an upper limit of the content of $B_2O_3$ is preferably 10%, and more preferably 8%, 5%, and 3% in this order. In addition, a lower limit of the content of $B_2O_3$ is preferably 0%, and more preferably 0.5%, 0.8%, and 1.0% in this order.

$B_2O_3$ is a network-forming component of the glass. $B_2O_3$ has a function of improving the thermal stability of the glass, but in a case where the content of $B_2O_3$ is excessively high, the refractive index may decrease. Accordingly, it is preferable that the content of $B_2O_3$ is in the range described above.

In the optical glass according to the fourth embodiment, an upper limit of the content of $Al_2O_3$ is preferably 10%, and more preferably 8%, 5%, and 3% in this order. The content of $Al_2O_3$ may be 0%.

$Al_2O_3$ has a function of increasing the chemical durability, but in a case where the content of $Al_2O_3$ is excessively high, melting properties of the glass may be degraded. Accordingly, it is preferable that the content of $Al_2O_3$ is in the range described above.

In the optical glass according to the fourth embodiment, a lower limit of the total content [$SiO_2$+$Al_2O_3$] of $SiO_2$ and $Al_2O_3$ is preferably 10%, and more preferably 13%, 15%, 18%, and 20% in this order. In addition, an upper limit of the total content is preferably 50%, and more preferably 45%, 40%, 35%, and 30% in this order.

In order to increase the thermal stability of the glass, it is preferable that the total content [$SiO_2$+$Al_2O_3$] is in the range described above.

In the optical glass according to the fourth embodiment, a lower limit of a mass ratio [$B_2O_3$/($SiO_2$+$Al_2O_3$)] of the content of $B_2O_3$ to the total content of $SiO_2$ and $Al_2O_3$ is preferably 0.01, and more preferably 0.02, 0.03, and 0.04 in this order. An upper limit of the mass ratio is preferably 0.20, and more preferably 0.18, 0.15, 0.13, and 0.10 in this order.

From the viewpoint of improving the chemical durability and the thermal stability, it is preferable that the mass ratio [$B_2O_3$/($SiO_2$+$Al_2O_3$)] is in the range described above.

In the optical glass according to the fourth embodiment, a lower limit of the total content [$B_2O_3$+$P_2O_5$] of $B_2O_3$ and $P_2O_5$ is preferably 0.5%, and more preferably 0.8% and 1.0% in this order. In addition, an upper limit of the total content is preferably 10%, and more preferably 8%, 5%, and 3% in this order.

From the viewpoint of improving the chemical durability and the thermal stability, it is preferable that the total content [$B_2O_3$+$P_2O_5$] is in the range described above.

In the optical glass according to the fourth embodiment, a lower limit of the total content [$B_2O_3$+$SiO_2$] of $B_2O_3$ and $SiO_2$ is preferably 10%, and more preferably 15%, 18%, and 20% in this order. In addition, an upper limit of the total content is preferably 50%, and more preferably 45%, 40%, and 35% in this order.

In order to obtain optical glass having a high refractive index, it is preferable that the total content [$B_2O_3$+$SiO_2$] is in the range described above.

In the optical glass according to the fourth embodiment, a lower limit of the content of $ZrO_2$ is preferably 0%, and more preferably 0.10%, 0.5%, and 1.0% in this order. In addition, an upper limit of the content of $ZrO_2$ is preferably 10%, and more preferably 8%, 5%, and 3% in this order. The content of $ZrO_2$ may be 0%.

$ZrO_2$ is a component that contributes to an increase in the refractive index. On the other hand, in a case where the content of $ZrO_2$ is excessively high, the thermal stability may decrease, and the specific weight may increase. Accordingly, it is preferable that the content of $ZrO_2$ is in the range described above.

In the optical glass according to the fourth embodiment, a lower limit of the content of $TiO_2$ is preferably 10%, and more preferably 13%, 15%, 18%, and 20% in this order. In addition, an upper limit of the content of $TiO_2$ is preferably 50%, and more preferably 45%, 40%, and 35% in this order.

$TiO_2$ is a component that contributes to an increase in the refractive index, and has a function of improving glass stability. In addition, the refractive index can be increased without increasing the specific weight. On the other hand, in a case where the content of $TiO_2$ is excessively high, the thermal stability may decrease. Accordingly, it is preferable that the content of $TiO_2$ is in the range described above.

In the optical glass according to the fourth embodiment, a lower limit of the content of $Nb_2O_5$ is preferably 10%, and more preferably 13% and 15% in this order. In addition, an upper limit of the content of $Nb_2O_5$ is preferably 50%, and more preferably 45%, 40%, and 35% in this order.

$Nb_2O_5$ is a component that contributes to an increase in the refractive index, and has a function of improving the glass stability. On the other hand, in a case where the content of $Nb_2O_5$ is excessively high, the specific weight may increase, and the thermal stability may decrease. Accordingly, it is preferable that the content of $Nb_2O_5$ is in the range described above.

In the optical glass according to the fourth embodiment, a lower limit of the total content [$TiO_2$+$Nb_2O_5$] of $TiO_2$ and $Nb_2O_5$ is preferably 20%, and more preferably 25%, 30%, and 35% in this order. In addition, an upper limit of the total content is preferably 70%, and more preferably 65%, 60%, and 55% in this order.

$TiO_2$ and $Nb_2O_5$ are a component that contributes to an increase in the refractive index. Therefore, in order to obtain glass having desired optical properties, it is preferable that the total content of $TiO_2$ and $Nb_2O_5$ is in the range described above.

In the optical glass according to the fourth embodiment, a lower limit of a mass ratio [$TiO_2$/($TiO_2$+$Nb_2O_5$)] of the content of $TiO_2$ to the total content of $TiO_2$ and $Nb_2O_5$ is preferably 0.20, and more preferably 0.25, 0.30, and 0.35 in this order. An upper limit of the mass ratio is preferably 0.80, and more preferably 0.75, 0.70, and 0.65 in this order.

In order to obtain optical glass having a high refractive index and a reduced specific weight, it is preferable that the mass ratio [$TiO_2$/($TiO_2$+$Nb_2O_5$)] is in the range described above.

In the optical glass according to the fourth embodiment, an upper limit of the content of $WO_3$ is preferably 10%, and more preferably 8%, 5%, and 3% in this order. The content of $WO_3$ may be 0%.

$WO_3$ is a component that contributes to an increase in the refractive index. On the other hand, in a case where the content of $WO_3$ is excessively high, the thermal stability may decrease, the specific weight may increase, the coloration of the glass may increase, and a transmittance may decrease. Accordingly, it is preferable that the content of $WO_3$ is in the range described above.

In the optical glass according to the fourth embodiment, an upper limit of the content of $Bi_2O_3$ is preferably 10%, and more preferably 8%, 5%, and 3% in this order. In addition, a lower limit of the content of $Bi_2O_3$ is preferably 0%. The content of $Bi_2O_3$ may be 0%.

$Bi_2O_3$ has a function of improving the thermal stability of the glass at a suitable amount. In addition, $Bi_2O_3$ is a component that contributes to an increase in the refractive index. On the other hand, in a case where the content of $Bi_2O_3$ is excessively high, the specific weight may increase. Further, the coloration of the glass may increase. Accordingly, it is preferable that the content of $Bi_2O_3$ is in the range described above.

In the optical glass according to the fourth embodiment, an upper limit of the total content [$TiO_2$+$Nb_2O_5$+$WO_3$+$Bi_2O_3$] of $TiO_2$, $Nb_2O_5$, $WO_3$, and $Bi_2O_3$ is preferably 80%, and more preferably 70% and 60% in this order. In addition, a lower limit of the total content is preferably 20%, and more preferably 25%, 30%, and 35% in this order.

All of $TiO_2$, $Nb_2O_5$, $WO_3$, and $Bi_2O_3$ are a component that contributes to an increase in the refractive index. Accordingly, it is preferable that the total content [$TiO_2$+$Nb_2O_5$+$WO_3$+$Bi_2O_3$] is in the range described above.

In the optical glass according to the fourth embodiment, a lower limit of the content of $Li_2O$ is preferably 0.1%, and more preferably 0.3%, 0.5%, 0.8%, 1.0%, 1.3%, and 1.5% in this order. An upper limit of the content of $Li_2O$ is preferably 10%, and more preferably 9%, 8%, 7%, 6%, and 5% in this order.

$Li_2O$ is a component that contributes to a decrease in the specific weight, and is particularly a component that contributes to an increase in the refractive index among alkali metals. On the other hand, in a case where the content of $Li_2O$ is excessively high, the thermal stability may decrease. Accordingly, it is preferable that the content of $Li_2O$ is in the range described above.

In the optical glass according to the fourth embodiment, an upper limit of the content of $Na_2O$ is preferably 10%, and more preferably 9%, 8%, and 7% in this order. A lower limit of the content of $Na_2O$ is preferably 0%, and more preferably 0.5%, 1.0%, 1.5%, and 2.0% in this order.

In the optical glass according to the fourth embodiment, an upper limit of the content of $K_2O$ is preferably 10%, and more preferably 8% and 5% in this order. A lower limit of the content of $K_2O$ is preferably 0%, and more preferably 0.5%, 1.0%, 1.5%, and 2.0% in this order. The content of $K_2O$ may be 0%.

$Na_2O$ and $K_2O$ have a function of improving the melting properties of the glass. On the other hand, in a case where the contents of $Na_2O$ and $K_2O$ are excessively high, the refractive index may decrease, and the thermal stability may decrease. Accordingly, it is preferable that the contents of $Na_2O$ and $K_2O$ are in the ranges described above, respectively.

In the optical glass according to the fourth embodiment, an upper limit of the content of $Cs_2O$ is preferably 5%, and more preferably 3% and 1% in this order. A lower limit of the content of $Cs_2O$ is preferably 0%.

$Cs_2O$ has a function of improving the thermal stability of the glass, but in a case where the content of $Cs_2O$ increases, the chemical durability and the weather resistance may decrease. Accordingly, it is preferable that the content of $Cs_2O$ is in the range described above.

In the optical glass according to the fourth embodiment, a lower limit of a mass ratio [$Li_2O$/($Li_2O$+$Na_2O$+$K_2O$)] of the content of $Li_2O$ to the total content of $Li_2O$, $Na_2O$, and $K_2O$ is preferably 0.10, and more preferably 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio [$Li_2O$/($Li_2O$+$Na_2O$+$K_2O$)] is in the range described above.

In the optical glass according to the fourth embodiment, a lower limit of a mass ratio [$Li_2O$/($Li_2O$+$Na_2O$+$K_2O$+$Cs_2O$)] of the content of $Li_2O$ to the total content of $Li_2O$, $Na_2O$, $K_2O$, and $Cs_2O$ is preferably 0.10, and more preferably 0.15, 0.20, and 0.25 in this order. An upper limit of the mass ratio is preferably 1.00, and more preferably 0.80, 0.75, 0.70, and 0.65 in this order.

In order to obtain optical glass having a high refractive index and a reduced specific weight, it is preferable that the mass ratio [$Li_2O$/($Li_2O$+$Na_2O$+$K_2O$+$Cs_2O$)] is in the range described above.

In the optical glass according to the fourth embodiment, a lower limit of the total content [$Na_2O$+$K_2O$+$Cs_2O$] of $Na_2O$, $K_2O$, and $Cs_2O$ is preferably 0%. An upper limit of the total content is preferably 11.0%, and more preferably 10.0%, 9.0%, 8.0%, 7.0%, and 6.0% in this order.

In order to maintain a high refractive index while maintaining the thermal stability of the glass, it is preferable that the total content [$Na_2O$+$K_2O$+$Cs_2O$] is in the range described above.

In the optical glass according to the fourth embodiment, a lower limit of the total content [$Li_2O$+$Na_2O$+$K_2O$+$Cs_2O$] of $Li_2O$, $Na_2O$, $K_2O$, and $Cs_2O$ is preferably 1.5%, and more preferably 2%, 4%, and 6% in this order. An upper limit of the total content is preferably 15%, and more preferably 13% and 10% in this order.

In order to obtain optical glass excellent in the melting properties, it is preferable that the total content [$Li_2O$+$Na_2O$+$K_2O$+$Cs_2O$] is in the range described above.

In the optical glass according to the fourth embodiment, an upper limit of the content of MgO is preferably 20%, and more preferably 15%, 10%, and 5% in this order. In addition, a lower limit of the content of MgO is preferably 0%.

In the optical glass according to the fourth embodiment, a lower limit of the content of CaO is preferably 1%, and more preferably 3%, 5%, and 8% in this order. An upper limit of the content of CaO is preferably 20%, and more preferably 18%, 15%, and 13% in this order.

MgO and CaO have a function of improving the melting properties of the glass. On the other hand, in a case where the contents of MgO and CaO are excessively high, the thermal stability may decrease. Accordingly, it is preferable that the contents of MgO and CaO are in the ranges described above, respectively.

In the optical glass according to the fourth embodiment, an upper limit of the content of SrO is preferably 10%, and more preferably 8%, 5%, and 3% in this order. In addition, a lower limit of the content of SrO is preferably 0%.

SrO has a function of improving the melting properties of the glass and of increasing the refractive index. On the other hand, in a case where the content of SrO is excessively high, the thermal stability may decrease, and the specific weight may increase. Accordingly, it is preferable that the content of SrO is in the range described above.

In the optical glass according to the fourth embodiment, an upper limit of the content of BaO is preferably 20%, and more preferably 17%, 15%, 13%, and 10% in this order. In addition, a lower limit of the content of BaO is preferably 0%.

BaO has a function of improving the melting properties of the glass and of increasing the refractive index. On the other hand, in a case where the content of BaO is excessively high, the thermal stability may decrease, and the specific weight may increase. Accordingly, it is preferable that the content of BaO is in the range described above.

In the optical glass according to the fourth embodiment, an upper limit of the content of ZnO is preferably 10%, and more preferably 8%, 5%, and 3% in this order. In addition, a lower limit of the content of ZnO is preferably 0%.

ZnO is a glass component having a function of improving the thermal stability of the glass. However, in a case where the content of ZnO is excessively high, the specific weight may increase. Accordingly, from the viewpoint of improving the thermal stability of the glass and of maintaining desired optical properties, it is preferable that the content of ZnO is in the range described above.

In the optical glass according to the fourth embodiment, an upper limit of the total content [MgO+CaO+SrO+BaO+ZnO] of MgO, CaO, SrO, BaO, and ZnO is preferably 40%, and more preferably 35%, 30%, and 25% in this order. In addition, a lower limit of the total content is preferably 3%, and more preferably 5%, 8%, and 10% in this order. From the viewpoint of suppressing an increase in the specific weight and of maintaining the thermal stability without hindering high dispersion, it is preferable that the total content is in the range described above.

In the optical glass according to the fourth embodiment, an upper limit of the content of $Ta_2O_5$ is preferably 10%, and more preferably 8%, 5%, and 3% in this order. In addition, a lower limit of the content of $Ta_2O_5$ is preferably 0%.

$Ta_2O_5$ is a component that contributes to an increase in the refractive index. In addition, $Ta_2O_5$ is a glass component having a function of improving the thermal stability of the glass, and is also a component for decreasing Pg,F. On the other hand, in a case where the content of $Ta_2O_5$ increases, the thermal stability of the glass may decrease, and when melting the glass, the unmelted residue of the glass raw material is likely to be generated. In addition, the specific weight may increase. Accordingly, it is preferable that the content of $Ta_2O_5$ is in the range described above.

In the optical glass according to the fourth embodiment, an upper limit of the content of $La_2O_3$ is preferably 10%, and more preferably 8%, 5%, and 3% in this order. In addition, a lower limit of the content of $La_2O_3$ is preferably 0%.

$La_2O_3$ is a component that contributes to an increase in the refractive index. On the other hand, in a case where the content of $La_2O_3$ increases, the specific weight may increase, and the thermal stability of the glass may decrease. Accordingly, from the viewpoint of suppressing an increase in the specific weight and a decrease in the thermal stability of the glass, it is preferable that the content of $La_2O_3$ is in the range described above.

In the optical glass according to the fourth embodiment, an upper limit of the content of $Y_2O_3$ is preferably 10%, and more preferably 8%, 5%, and 3% in this order. In addition, a lower limit of the content of $Y_2O_3$ is preferably 0%.

$Y_2O_3$ is a component that contributes to an increase in the refractive index. On the other hand, in a case where the content of $Y_2O_3$ excessively increases, the thermal stability of the glass may decrease, and the glass is likely to be devitrified during manufacturing. Accordingly, from the viewpoint of suppressing a decrease in the thermal stability of the glass, it is preferable that the content of $Y_2O_3$ is in the range described above.

In the optical glass according to the fourth embodiment, the content of $Sc_2O_3$ is preferably 2% or less. In addition, a lower limit of the content of $Sc_2O_3$ is preferably 0%.

In the optical glass according to the fourth embodiment, the content of $HfO_2$ is preferably 2% or less. In addition, a lower limit of the content of $HfO_2$ is preferably 0%.

$Sc_2O_3$ and $HfO_2$ have a function of increasing dispersivity of the glass, but are an expensive component. Accordingly, it is preferable that the contents of $Sc_2O_3$ and $HfO_2$ are in the ranges described above, respectively.

In the optical glass according to the fourth embodiment, the content of $Lu_2O_3$ is preferably 2% or less. In addition, a lower limit of the content of $Lu_2O_3$ is preferably 0%.

$Lu_2O_3$ has a function of increasing dispersivity of the glass, but has a high molecular weight, and thus, is also a glass component for increasing the specific weight of the glass. Accordingly, it is preferable that the content of $Lu_2O_3$ is in the range described above.

In the optical glass according to the fourth embodiment, the content of $GeO_2$ is preferably 2% or less. In addition, a lower limit of the content of $GeO_2$ is preferably 0%.

$GeO_2$ has a function of increasing dispersivity of the glass, but is a prominently expensive component among the glass components that are generally used. Accordingly, from the viewpoint of reducing a manufacturing cost of the glass, it is preferable that the content of $GeO_2$ is in the range described above.

In the optical glass according to the fourth embodiment, an upper limit of the content of $Gd_2O_3$ is preferably 3.0%, and more preferably 2.0%. In addition, a lower limit of the content of $Gd_2O_3$ is preferably 0%.

$Gd_2O_3$ is a component that contributes to an increase in the refractive index. On the other hand, in a case where the content of $Gd_2O_3$ excessively increases, the thermal stability of the glass may decrease. In addition, in a case where the content of $Gd_2O_3$ excessively increases, the specific weight of the glass may increase, which is not preferable. Accordingly, from the viewpoint of suppressing an increase in the specific weight while excellently maintaining the thermal stability of the glass, it is preferable that the content of $Gd_2O_3$ is in the range described above.

In the optical glass according to the fourth embodiment, the content of $Yb_2O_3$ is preferably 2% or less. In addition, a lower limit of the content of $Yb_2O_3$ is preferably 0%.

$Yb_2O_3$ has a molecular weight higher than those of $La_2O_3$, $Gd_2O_3$, and $Y_2O_3$, and thus, increases the specific weight of the glass. In a case where the specific weight of the glass increases, the mass of an optical element increases. Accordingly, it is desirable to suppress an increase in the specific weight of the glass by reducing the content of $Yb_2O_3$.

In addition, in a case where the content of $Yb_2O_3$ is excessively high, the thermal stability of the glass may decrease. From the viewpoint of preventing a decrease in the thermal stability of the glass and of suppressing an increase in the specific weight, it is preferable that the content of $Yb_2O_3$ is in the range described above.

In the optical glass according to the fourth embodiment, an upper limit of the total content [$La_2O_3$+$Gd_2O_3$+$Y_2O_3$] of $La_2O_3$, $Gd_2O_3$, and $Y_2O_3$ is preferably 10%, and more preferably 8%, 5%, and 3% in this order. A lower limit of the total content is 0%. The total content may be 0%.

From the viewpoint of suppressing an increase in the specific weight and of excellently maintaining the thermal stability, it is preferable that the total content [$La_2O_3$+$Gd_2O_3$+$Y_2O_3$] is in the range described above.

It is preferable that the optical glass according to the fourth embodiment mainly contains the glass components described above, that is, $Li_2O$ and $TiO_2$ as an essential component, and $SiO_2$, $P_2O_5$, $B_2O_3$, $Al_2O_3$, $ZrO_2$, $Nb_2O_5$, $WO_3$, $Bi_2O_3$, $Na_2O$, $K_2O$, $Cs_2O$, MgO, CaO, SrO, BaO, ZnO, $Ta_2O_5$, $La_2O_3$, $Y_2O_3$, $Sc_2O_3$, $HfO_2$, $Lu_2O_3$, $GeO_2$, $Gd_2O_3$, and $Yb_2O_3$ as an arbitrary component, and the total content of the glass components described above is preferably 95% or more, more preferably 98% or more, even more preferably 99% or more, and still even more preferably 99.5% or more.

Note that, it is preferable that the optical glass according to the fourth embodiment basically contains the glass components described above, and other components can also be contained within a range not impairing the functions and the effects of the present invention. In addition, in the present invention, containing inevitable impurities is not excluded.

(Other Components)

All of Pb, As, Cd, Tl, Be, and Se have toxicity. Accordingly, it is particularly preferable that the optical glass according to the fourth embodiment does not contain such elements as the glass component. The content of each of the elements described above is preferably less than 0.5%, and more preferably less than 0.1%, less than 0.05%, and less than 0.01% in this order, in terms of an oxide.

All of U, Th, and Ra are a radioactive element. Accordingly, it is particularly preferable that the optical glass according to the fourth embodiment does not contain such elements as the glass component. The content of each of the elements described above is preferably less than 0.5%, and more preferably less than 0.1%, less than 0.05%, and less than 0.01% in this order, in terms of an oxide.

V, Cr, Mn, Fe, Co, Ni, Cu, Pr, Nd, Pm, Sm, Eu, Tb, Dy, Ho, Er, and Tm increase the coloration of the glass, and can be a fluorescent light source. Accordingly, it is particularly preferable that the optical glass according to the fourth embodiment does not contain such elements as the glass component. The content of each of the elements described above is preferably less than 0.5%, and more preferably less than 0.1%, less than 0.05%, and less than 0.01% in this order, in terms of an oxide.

Sb($Sb_2O_3$) and Ce($CeO_2$) are an element that functions as a clarificant and can be added arbitrarily. Among them, Sb($Sb_2O_3$) is a clarificant having a high clarifying effect. Ce($CeO_2$) has a clarifying effect lower than that of Sb($Sb_2O_3$). In a case where Ce($CeO_2$) is added in large amounts, the coloration of the glass tends to be thickened.

Note that, herein, the contents of Sb($Sb_2O_3$) and Ce($CeO_2$) are represented by an external ratio, and are not included in the total content of all the glass components represented in terms of an oxide. That is, herein, the total content of all the glass components excluding Sb($Sb_2O_3$) and Ce($CeO_2$) is 100% by mass.

The content of $Sb_2O_3$ is represented by an external ratio. That is, in the optical glass according to the fourth embodiment, the content of $Sb_2O_3$ when the total content of all the glass components other than $Sb_2O_3$ and $CeO_2$ is 100% by mass is preferably 1% by mass or less, and more preferably 0.1% by mass or less, 0.05% by mass or less, and 0.03% by mass or less in this order. The content of $Sb_2O_3$ may be 0% by mass.

The content of $CeO_2$ is also represented by an external ratio. That is, in the optical glass according to the fourth embodiment, the content of $CeO_2$ when the total content of all the glass components other than $CeO_2$ and $Sb_2O_3$ is 100% by mass is preferably 2% by mass or less, and more preferably 1% by mass or less, 0.5% by mass or less, and 0.1% by mass or less in this order. The content of $CeO_2$ may be 0% by mass. By setting the content of $CeO_2$ to be in the range described above, clarifying properties of the glass can be improved.

(Properties of Glass)

<Abbe's Number νd>

In the optical glass according to the fourth embodiment, an Abbe's number νd is preferably 15 to 30. The Abbe's number νd may be 18 to 25, or may be 20 to 24. By setting the Abbe's number νd to be in the range described above, glass having desired dispersivity can be obtained. The Abbe's number νd can be controlled by adjusting the contents of $TiO_2$, $Nb_2O_5$, $WO_3$, and $Bi_2O_3$, which are a glass component that contributes to high dispersion.

<Refractive Index nd>

In the optical glass according to the fourth embodiment, a lower limit of the refractive index nd is 1.86. The lower limit of the refractive index nd can also be 1.87, 1.88, 1.89, or 1.90. In addition, an upper limit of the refractive index nd can be 2.20, and can also be 2.15, 2.10, or 2.05. The refractive index can be controlled by adjusting the contents of $TiO_2$, $Nb_2O_5$, $WO_3$, $Bi_2O_3$, $ZrO_2$, $La_2O_3$, $Gd_2O_3$, $Y_2O_3$, and $Ta_2O_5$, which are a glass component that contributes to an increase in the refractive index.

<Specific Weight of Glass>

The optical glass according to the fourth embodiment is high-refractive index glass and has the specific weight that is not high. In a case where the specific weight of the glass can be reduced, the weight of a lens can be reduced. On the other hand, in a case where the specific weight is excessively low, a decrease in the thermal stability is caused.

Therefore, in the optical glass according to the fourth embodiment, the specific weight is preferably 4.2 or less, and more preferably 4.0 or less, 3.8 or less, 3.6 or less, and 3.4 or less in this order.

The specific weight can be controlled by adjusting the content of each of the glass components. In particular, by adjusting the content of $Li_2O$ or $TiO_2$, the specific weight can be reduced while maintaining a high refractive index.

Note that, in the optical glass according to the fourth embodiment, the refractive index nd and the specific weight preferably satisfy Expression (1) described below, more preferably satisfy Expression (2) described below, and even more preferably satisfy Expression (3) described below. By the refractive index nd and specific weight satisfying the following expressions, optical glass having a high refractive index and a comparatively reduced specific weight can be obtained.

$$nd \geq 0.2 \times \text{Specific Weight} + 1.18 \quad (1)$$

$$nd \geq 0.2 \times \text{Specific Weight} + 1.20 \quad (2)$$

$$nd \geq 0.2 \times \text{Specific Weight} + 1.22 \quad (3)$$

In addition, in the optical glass according to the fourth embodiment, a ratio [Refractive Index nd/Specific Weight] of the refractive index nd to the specific weight is preferably 0.50 or more, more preferably 0.52 or more, and even more preferably 0.54 or more. By setting the ratio [Refractive Index nd/Specific Weight] to be in the range described above, optical glass having a high refractive index and a comparatively reduced specific weight can be obtained.

<Glass Transition Temperature Tg>

In the optical glass according to the fourth embodiment, an upper limit of a glass transition temperature Tg is preferably 660° C., and more preferably 650° C., 630° C., and 600° C. in this order. A lower limit of the glass transition temperature Tg is not particularly limited, and is generally 500° C., and preferably 550° C.

The glass transition temperature Tg can be controlled by adjusting the total content of the alkali metals.

By the upper limit of the glass transition temperature Tg satisfying the range described above, an increase in a molding temperature when reheat-pressing the glass and an annealing temperature can be suppressed, and a thermal damage on a reheat press molding facility and an annealing facility can be reduced.

By the lower limit of the glass transition temperature Tg satisfying the range described above, reheat press moldability and the thermal stability of the glass are likely to be excellently maintained while maintaining a desired Abbe's number and a desired refractive index.

<Light Transmissivity of Glass>

Light transmissivity of the optical glass according to the fourth embodiment can be evaluated by coloration degrees λ80, λ70, and λ5.

A spectral transmittance of a glass sample having a thickness of 10.0 mm±0.1 mm is measured in a range of a wavelength 200 to 700 nm, and a wavelength at which an external transmittance is 80% is 80, a wavelength at which an external transmittance is 70% is λ70, and a wavelength at which an external transmittance is 5% is λ5.

λ80 of the optical glass according to the fourth embodiment is preferably 700 nm or less, more preferably 650 nm or less, and even more preferably 600 nm or less.

λ70 is preferably 600 nm or less, more preferably 550 nm or less, and even more preferably 500 nm or less.

λ5 is preferably 500 nm or less, more preferably 450 nm or less, and even more preferably 400 nm or less.

(Manufacturing of Optical Glass)

The glass raw materials may be blended to have the predetermined composition described above, and the optical glass according to the fourth embodiment may be prepared by the blended glass raw materials in accordance with a known glass manufacturing method. For example, a plurality of types of compounds are blended and sufficiently mixed to be a batch raw material, and the batch raw material is put in a quartz crucible or a platinum crucible and roughly melted. A melted product obtained by the rough melting is rapidly cooled and pulverized to prepare cullet. Further, the cullet is put in a platinum crucible and heated and remelted to be molten glass, and the molten glass is further clarified and homogenized, and then, is molded and gradually cooled to obtain optical glass. A known method may be applied to the molding and the gradual cooling of the molten glass.

Note that, the compound used when blending the batch raw material is not particularly limited insofar as a desired glass component can be introduced into the glass to have a desired content, and examples of such a compound include an oxide, a carbonate, a nitrate, a hydroxide, a fluoride, and the like.

(Manufacturing of Optical Element and Others)

A known method may be applied to the preparation of an optical element by using the optical glass according to the fourth embodiment. For example, in the manufacturing of the optical glass described above, the molten glass is cast into a mold and molded into the shape of a plate, and a glass material including the optical glass according to the present invention is prepared. The obtained glass material is suitably cut, ground, and polished, and a cut piece having a size and a shape suitable for press molding is prepared. The cut piece is heated and softened, and is press-molded (reheat-pressed) by a known method, and an optical element blank having a shape similar to the shape of the optical element is prepared. The optical element blank is annealed, and is ground and polished by a known method, and an optical element is prepared.

An optical functional surface of the prepared optical element may be coated with an antireflective film, a total reflection film, and the like, in accordance with the intended use.

According to one aspect of the present invention, an optical element including the optical glass described above can be provided. As the type of optical element, a lens such as a planar lens, a spherical lens, and an aspherical lens, a prism, a diffraction grating, a light guide plate, and the like can be exemplified. As the shape of the lens, various shapes such as a biconvex lens, a plano-convex lens, a biconcave lens, a plano-concave lens, a convex meniscus lens, and a concave meniscus lens can be exemplified. As the use of the light guide plate, a display device such as an augmented reality (AR) display type spectacle type device or a mixed reality (MR) display type spectacle type device, and the like can be exemplified. Such a light guide plate is plate glass that can be attached to the frame of the spectacle type device, and includes the optical glass described above. A diffraction grating for changing a traveling direction of light that is propagated through the light guide plate by repeating total reflection may be formed on the surface of the light guide plate, as necessary. The diffraction grating can be formed by a known method. In a case of wearing a spectacle type device including the light guide plate, the light that is propagated through the light guide plate is incident on the pupils, and thus, the function of augmented reality (AR) display or mixed reality (MR) display is exhibited. Such a spectacle type device, for example, is disclosed in JP Patent Application Laid Open (Translation of PCT Application) No. 2017-534352 and the like. Note that, the light guide plate can be prepared by a known method. The optical element can be manufactured by a method including a step of processing a glass molded body containing the optical glass. As the processing, severing, cutting, rough grinding, fine grinding, polishing, and the like can be exemplified. By using the glass when performing such processing, a damage can be reduced, and a high-quality optical element can be stably supplied.

(Image Display Device)

An image display device according to the fourth embodiment can be the same as that of the first embodiment.

EXAMPLES

Hereinafter, the present invention will be described in more detail by Examples. Here, the present invention is not limited to the embodiments described in Examples.

Note that, Example 1 corresponds to the first embodiment, Example 2 corresponds to the second embodiment, Example 3 corresponds to the third embodiment, and Example 4 corresponds to the fourth embodiment.

Example 1

Example 1-1

Glass samples having glass compositions shown in Tables 1-1(1), 1-1(2), 1-1(3), and 1-1(4) were prepared by the following procedure, and various evaluations were performed.

[Manufacturing of Optical Glass]

First, an oxide, a hydroxide, a carbonate, and a nitrate corresponding to structural components of the glass were prepared as a raw material, the raw materials were weighed and blended such that a glass composition of optical glass to be obtained was each of the compositions shown in Tables 1-1(1), 1-1(2), 1-1(3), and 1-1(4), and the raw materials were sufficiently mixed. A blended raw material (a batch raw material) obtained as described above was put in a platinum crucible, and was heated at 1350° C. to 1400° C. for 2 hours to be molten glass, and the molten glass was stirred, homogenized, and clarified, and then, was cast into a mold that was preheated to a suitable temperature. The cast glass was subjected to a heat treatment at approximately a glass transition temperature Tg for 30 minutes, and was allowed to cool in a furnace to a room temperature, and thus, a glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Tables 1-1(1), 1-1(2), 1-1(3), and 1-1(4).

[Measurement of Optical Properties]

The obtained glass sample was further subjected to an annealing treatment at approximately the glass transition temperature Tg for approximately 30 minutes to 2 hours, and then, was cooled in the furnace to the room temperature at a temperature decrease rate of −30° C./hour, and thus, an annealed sample was obtained. In the obtained annealed sample, refractive indices nd, ng, nF, and nC, and an Abbe's number νd, a specific weight, the glass transition temperature Tg, λ80, λ70, and λ5 were measured. Results are shown in Tables 1-2(1), 1-2(2), 1-2(3), and 1-2(4).

(i) Refractive Indices nd, ng, nF, and nC and Abbe's Number νd

In the annealed sample, the refractive indices nd, ng, nF, and nC were measured by a refractive index measurement method of JIS standard JIS B 7071-1, and the Abbe's number νd was calculated on the basis of the following expression.

$$\nu d=(nd-1)/(nF-nC)$$

(ii) Specific Weight

The specific weight was measured by an Archimedes method.

(iii) Glass Transition Temperature Tg

The glass transition temperature Tg was measured at a temperature increase rate of 10° C./minute by using a differential scanning calorimetric analyzer (DSC3300SA), manufactured by NETZSCH Japan K.K.

(iv) λ80, λ70, and λ5

In the annealed sample having a thickness of 10.0 mm±0.1 mm, a spectral transmittance was measured in a range of a wavelength of 200 to 700 nm. A wavelength at which an external transmittance was 80% was λ80, a wavelength at which an external transmittance was 70% was λ70, and a wavelength at which an external transmittance was 5% was λ5.

TABLE 1-1(1)

| No. | Glass composition (% by mass) | | | | | | | | | | | |
|---|---|---|---|---|---|---|---|---|---|---|---|---|
| | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 1-1 | 0 | 21.48 | 1.02 | 0 | 3.09 | 2.49 | 0 | 0 | 9.41 | 0 | 10.78 | 26.46 |
| 1-2 | 0 | 21.29 | 1.01 | 0 | 2.21 | 4.23 | 0 | 0 | 9.33 | 0 | 10.68 | 26.21 |
| 1-3 | 0 | 21.17 | 1 | 0 | 2.2 | 2.45 | 0 | 2.28 | 9.28 | 0 | 10.63 | 26.09 |
| 1-4 | 0 | 20.99 | 0.99 | 0 | 2.18 | 2.43 | 0 | 0 | 12.34 | 0 | 10.53 | 25.85 |
| 1-5 | 0 | 24.06 | 2.26 | 0 | 4.43 | 2.79 | 0 | 0 | 10.55 | 0 | 2.22 | 29.64 |
| 1-6 | 0 | 24.22 | 1.15 | 0 | 4.94 | 2.81 | 0 | 0 | 10.61 | 0 | 2.24 | 29.83 |
| 1-7 | 0 | 23.74 | 1.12 | 0 | 4.61 | 2.75 | 0 | 0 | 10.4 | 0 | 2.19 | 29.25 |
| 1-8 | 0 | 23.68 | 1.12 | 0 | 4.35 | 3.24 | 0 | 0 | 10.38 | 0 | 2.19 | 29.17 |
| 1-9 | 0 | 23.65 | 1.12 | 0 | 4.35 | 2.74 | 0 | 0.65 | 10.36 | 0 | 2.18 | 29.12 |
| 1-10 | 0 | 23.59 | 1.12 | 0 | 4.34 | 2.73 | 0 | 0 | 11.23 | 0 | 2.18 | 29.04 |
| 1-11 | 0 | 24.22 | 1.15 | 0 | 4.92 | 2.8 | 0 | 0 | 10.61 | 0 | 0 | 29.84 |
| 1-12 | 0 | 24.11 | 1.14 | 0 | 4.68 | 2.79 | 0.68 | 0 | 10.56 | 0 | 0 | 29.7 |
| 1-13 | 0 | 26.33 | 1.15 | 0 | 4.95 | 2.82 | 0 | 0 | 10.68 | 0 | 0 | 27.44 |
| 1-14 | 0 | 24.58 | 2.31 | 0 | 4.99 | 2.85 | 0 | 0 | 10.77 | 0 | 0 | 27.64 |
| 1-15 | 0 | 26.8 | 1.17 | 0 | 5.04 | 2.87 | 0 | 0 | 10.87 | 0 | 0 | 30.55 |
| 1-16 | 0 | 25.02 | 2.35 | 0 | 5.08 | 2.9 | 0 | 0 | 10.96 | 0 | 0 | 30.8 |
| 1-17 | 0 | 28.98 | 1.18 | 0 | 5.07 | 2.89 | 0 | 0 | 10.94 | 0 | 0 | 28.09 |
| 1-18 | 0 | 27.06 | 1.18 | 1.71 | 5.08 | 2.9 | 0 | 0 | 10.97 | 0 | 0 | 28.18 |
| 1-19 | 0 | 27.39 | 1.2 | 0 | 5.65 | 2.94 | 0 | 0 | 11.11 | 0 | 0 | 28.51 |
| 1-20 | 0 | 27.01 | 1.18 | 0 | 5.08 | 2.9 | 0 | 0 | 12.83 | 0 | 0 | 28.12 |
| 1-21 | 0 | 27.24 | 1.19 | 0 | 5.12 | 3.96 | 0 | 0 | 11.05 | 0 | 0 | 28.37 |
| 1-22 | 0 | 29.5 | 1.2 | 0 | 5.16 | 2.94 | 0 | 0 | 11.14 | 0 | 0 | 31.31 |
| 1-23 | 0 | 29.38 | 1.2 | 0 | 5.64 | 2.93 | 0 | 0 | 9.2 | 0 | 0 | 28.48 |
| 1-24 | 0 | 29.34 | 1.2 | 0 | 4.63 | 3.97 | 0 | 0 | 11.08 | 0 | 0 | 31.13 |
| 1-25 | 0 | 30.04 | 1.22 | 0 | 5.26 | 3 | 0 | 0 | 11.34 | 0 | 0 | 34.64 |
| 1-26 | 0 | 22.31 | 1.15 | 0 | 4.92 | 2.81 | 0 | 0 | 12.44 | 0 | 0 | 29.87 |
| 1-27 | 0 | 23.9 | 1.13 | 0 | 4.38 | 2.77 | 0 | 0 | 12.26 | 0 | 0 | 29.44 |
| 1-28 | 0 | 23.59 | 1.12 | 0 | 3.85 | 2.73 | 0 | 0 | 13.87 | 0 | 0 | 29.06 |
| 1-29 | 0 | 24.74 | 1.17 | 0 | 5.52 | 2.86 | 0 | 0 | 10.84 | 0 | 0 | 27.84 |
| 1-30 | 0 | 23.73 | 1.12 | 0 | 3.87 | 2.75 | 2.99 | 0 | 10.4 | 0 | 0 | 29.22 |
| 1-31 | 0 | 22.49 | 1.16 | 0 | 4.96 | 3.84 | 0 | 0 | 10.71 | 0 | 0 | 30.13 |

TABLE 1-1(1)-continued

| | | | | | | | | | | | | |
|---|---|---|---|---|---|---|---|---|---|---|---|---|
| 1-32 | 0 | 24.42 | 1.16 | 0 | 4.96 | 3.84 | 0 | 0 | 8.87 | 0 | 0 | 30.07 |
| 1-33 | 0 | 25.96 | 1.14 | 0 | 4.64 | 2.78 | 0 | 0 | 10.53 | 1.66 | 0 | 27.03 |
| 1-34 | 0 | 25.75 | 1.13 | 0 | 4.6 | 2.76 | 0 | 0 | 10.45 | 0 | 2.44 | 26.82 |
| 1-35 | 0 | 25.88 | 1.13 | 0 | 4.62 | 2.77 | 0 | 0 | 10.5 | 0 | 0 | 26.96 |
| 1-36 | 0 | 25.89 | 1.13 | 0 | 4.86 | 2.77 | 0 | 0 | 10.5 | 0 | 0 | 24.4 |
| 1-37 | 0 | 25.84 | 1.13 | 0 | 3.87 | 3.21 | 2.44 | 0 | 10.48 | 0 | 0 | 26.9 |
| 1-38 | 0 | 25.62 | 1.12 | 0 | 3.07 | 4.78 | 2.42 | 0 | 10.39 | 0 | 0 | 26.69 |
| 1-39 | 0 | 25.41 | 1.11 | 0 | 2.28 | 6.31 | 2.4 | 0 | 10.31 | 0 | 0 | 26.48 |
| 1-40 | 0 | 25.21 | 1.1 | 0 | 1.51 | 7.83 | 2.38 | 0 | 10.22 | 0 | 0 | 26.26 |
| 1-41 | 0 | 25.46 | 1.11 | 0 | 4.78 | 2.73 | 0 | 0 | 10.32 | 0 | 0 | 21.48 |
| 1-42 | 0 | 25.04 | 1.1 | 0 | 4.71 | 2.68 | 0 | 0 | 10.15 | 0 | 0 | 18.66 |
| 1-43 | 0 | 26.05 | 1.14 | 0 | 4.68 | 1.62 | 2.46 | 0 | 10.57 | 0 | 0 | 27.13 |
| 1-44 | 0 | 26.27 | 1.15 | 0 | 5.51 | 0 | 2.48 | 0 | 10.66 | 0 | 0 | 27.36 |
| 1-45 | 1.15 | 26.1 | 1.14 | 0 | 4.66 | 2.8 | 0 | 0 | 10.58 | 0 | 0 | 27.18 |
| 1-46 | 0 | 26.18 | 1.15 | 0.83 | 4.68 | 2.81 | 0 | 0 | 10.62 | 0 | 0 | 27.26 |
| 1-47 | 0 | 25.86 | 1.13 | 0 | 4.62 | 2.77 | 0 | 0 | 10.49 | 0.83 | 1.23 | 26.92 |
| 1-48 | 0 | 25.2 | 1.1 | 0 | 4.27 | 2.7 | 0 | 0 | 10.22 | 0 | 4.78 | 26.24 |
| 1-49 | 0 | 24.67 | 1.08 | 0 | 3.95 | 2.64 | 0 | 0 | 10 | 0 | 7.01 | 25.7 |
| 1-50 | 0 | 26.26 | 1.13 | 0 | 4.61 | 2.77 | 0 | 0 | 10.46 | 0 | 2.45 | 26.23 |
| 1-51 | 0 | 26.39 | 1.13 | 0 | 4.63 | 2.78 | 0 | 0 | 10.51 | 0 | 2.46 | 26.97 |
| 1-52 | 0 | 25.87 | 1.13 | 0 | 4.67 | 2.77 | 0 | 0 | 10.49 | 0 | 1.96 | 26.95 |
| 1-53 | 0 | 25.62 | 1.12 | 0 | 4.34 | 2.75 | 0.75 | 0 | 10.39 | 0 | 2.43 | 26.69 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 1-1 | 23.47 | 1.8 | 0 | 0 | 0 | 0 | 0 | 100 | 0.03 |
| 1-2 | 23.26 | 1.78 | 0 | 0 | 0 | 0 | 0 | 100 | 0.03 |
| 1-3 | 23.13 | 1.77 | 0 | 0 | 0 | 0 | 0 | 100 | 0.03 |
| 1-4 | 22.93 | 1.76 | 0 | 0 | 0 | 0 | 0 | 100 | 0.03 |
| 1-5 | 22.03 | 2.02 | 0 | 0 | 0 | 0 | 0 | 100 | 0.03 |
| 1-6 | 22.17 | 2.03 | 0 | 0 | 0 | 0 | 0 | 100 | 0.03 |
| 1-7 | 25.94 | 0 | 0 | 0 | 0 | 0 | 0 | 100 | 0.03 |
| 1-8 | 25.87 | 0 | 0 | 0 | 0 | 0 | 0 | 100 | 0.03 |
| 1-9 | 25.83 | 0 | 0 | 0 | 0 | 0 | 0 | 100 | 0.03 |
| 1-10 | 25.77 | 0 | 0 | 0 | 0 | 0 | 0 | 100 | 0.03 |
| 1-11 | 26.46 | 0 | 0 | 0 | 0 | 0 | 0 | 100 | 0.03 |
| 1-12 | 26.34 | 0 | 0 | 0 | 0 | 0 | 0 | 100 | 0.03 |
| 1-13 | 26.63 | 0 | 0 | 0 | 0 | 0 | 0 | 100 | 0.03 |
| 1-14 | 26.86 | 0 | 0 | 0 | 0 | 0 | 0 | 100 | 0.03 |
| 1-15 | 22.7 | 0 | 0 | 0 | 0 | 0 | 0 | 100 | 0.03 |
| 1-16 | 22.89 | 0 | 0 | 0 | 0 | 0 | 0 | 100 | 0.03 |
| 1-17 | 22.85 | 0 | 0 | 0 | 0 | 0 | 0 | 100 | 0.03 |
| 1-18 | 22.92 | 0 | 0 | 0 | 0 | 0 | 0 | 100 | 0.03 |
| 1-19 | 23.2 | 0 | 0 | 0 | 0 | 0 | 0 | 100 | 0.03 |
| 1-20 | 22.88 | 0 | 0 | 0 | 0 | 0 | 0 | 100 | 0.03 |
| 1-21 | 23.07 | 0 | 0 | 0 | 0 | 0 | 0 | 100 | 0.03 |
| 1-22 | 18.75 | 0 | 0 | 0 | 0 | 0 | 0 | 100 | 0.03 |
| 1-23 | 23.17 | 0 | 0 | 0 | 0 | 0 | 0 | 100 | 0.03 |
| 1-24 | 18.65 | 0 | 0 | 0 | 0 | 0 | 0 | 100 | 0.03 |
| 1-25 | 14.5 | 0 | 0 | 0 | 0 | 0 | 0 | 100 | 0.03 |
| 1-26 | 26.5 | 0 | 0 | 0 | 0 | 0 | 0 | 100 | 0.03 |
| 1-27 | 26.12 | 0 | 0 | 0 | 0 | 0 | 0 | 100 | 0.03 |
| 1-28 | 25.78 | 0 | 0 | 0 | 0 | 0 | 0 | 100 | 0.03 |
| 1-29 | 27.03 | 0 | 0 | 0 | 0 | 0 | 0 | 100 | 0.03 |
| 1-30 | 25.92 | 0 | 0 | 0 | 0 | 0 | 0 | 100 | 0.03 |
| 1-31 | 26.71 | 0 | 0 | 0 | 0 | 0 | 0 | 100 | 0.03 |
| 1-32 | 26.68 | 0 | 0 | 0 | 0 | 0 | 0 | 100 | 0.03 |
| 1-33 | 26.26 | 0 | 0 | 0 | 0 | 0 | 0 | 100 | 0.03 |
| 1-34 | 26.05 | 0 | 0 | 0 | 0 | 0 | 0 | 100 | 0.03 |
| 1-35 | 26.17 | 1.97 | 0 | 0 | 0 | 0 | 0 | 100 | 0.03 |
| 1-36 | 30.45 | 0 | 0 | 0 | 0 | 0 | 0 | 100 | 0.03 |
| 1-37 | 26.13 | 0 | 0 | 0 | 0 | 0 | 0 | 100 | 0.03 |
| 1-38 | 25.91 | 0 | 0 | 0 | 0 | 0 | 0 | 100 | 0.03 |
| 1-39 | 25.7 | 0 | 0 | 0 | 0 | 0 | 0 | 100 | 0.03 |
| 1-40 | 25.49 | 0 | 0 | 0 | 0 | 0 | 0 | 100 | 0.03 |
| 1-41 | 34.12 | 0 | 0 | 0 | 0 | 0 | 0 | 100 | 0.03 |
| 1-42 | 37.66 | 0 | 0 | 0 | 0 | 0 | 0 | 100 | 0.03 |
| 1-43 | 26.35 | 0 | 0 | 0 | 0 | 0 | 0 | 100 | 0.03 |
| 1-44 | 26.57 | 0 | 0 | 0 | 0 | 0 | 0 | 100 | 0.03 |
| 1-45 | 26.39 | 0 | 0 | 0 | 0 | 0 | 0 | 100 | 0.03 |
| 1-46 | 26.47 | 0 | 0 | 0 | 0 | 0 | 0 | 100 | 0.03 |
| 1-47 | 26.15 | 0 | 0 | 0 | 0 | 0 | 0 | 100 | 0.03 |
| 1-48 | 25.49 | 0 | 0 | 0 | 0 | 0 | 0 | 100 | 0.03 |

TABLE 1-1(1)-continued

| | | | | | | | | | |
|---|---|---|---|---|---|---|---|---|---|
| 1-49 | 24.95 | 0 | 0 | 0 | 0 | 0 | 0 | 100 | 0.03 |
| 1-50 | 26.09 | 0 | 0 | 0 | 0 | 0 | 0 | 100 | 0.03 |
| 1-51 | 25.13 | 0 | 0 | 0 | 0 | 0 | 0 | 100 | 0.03 |
| 1-52 | 26.16 | 0 | 0 | 0 | 0 | 0 | 0 | 100 | 0.03 |
| 1-53 | 25.91 | 0 | 0 | 0 | 0 | 0 | 0 | 100 | 0.03 |

TABLE 1-1(2)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 1-54 | 0 | 25.69 | 1.12 | 0 | 4.59 | 2.26 | 0.75 | 0 | 10.42 | 0 | 2.43 | 26.76 |
| 1-55 | 0.28 | 25.68 | 1.12 | 0 | 4.59 | 2.75 | 0 | 0 | 10.42 | 0 | 2.43 | 26.76 |
| 1-56 | 0 | 26.41 | 1.13 | 0 | 4.63 | 2.78 | 0 | 0 | 10.51 | 0 | 0 | 26.36 |
| 1-57 | 0 | 26.51 | 1.14 | 0 | 4.65 | 2.79 | 0 | 0 | 10.56 | 0 | 0 | 27.11 |
| 1-58 | 0 | 25.75 | 1.13 | 0 | 4.84 | 1.77 | 0.75 | 0 | 10.45 | 0 | 2.44 | 26.82 |
| 1-59 | 0 | 25.62 | 1.12 | 0 | 4.58 | 1.76 | 1.49 | 0 | 10.39 | 0 | 2.43 | 26.69 |
| 1-60 | 0 | 26.61 | 0.57 | 0 | 4.58 | 2.75 | 0 | 0 | 10.4 | 0 | 2.43 | 26.72 |
| 1-61 | 0 | 24.9 | 1.69 | 0 | 4.62 | 2.77 | 0 | 0 | 10.49 | 0 | 2.45 | 26.93 |
| 1-62 | 0 | 25.84 | 0.58 | 0 | 4.86 | 2.77 | 0 | 0 | 10.48 | 0 | 2.45 | 26.9 |
| 1-63 | 0 | 25.67 | 0.57 | 0 | 4.59 | 2.75 | 0 | 0 | 11.3 | 0 | 2.43 | 26.73 |
| 1-64 | 0 | 25.14 | 1.1 | 0 | 4.26 | 2.21 | 0.73 | 0 | 10.19 | 0 | 4.77 | 26.18 |
| 1-65 | 0 | 25.8 | 1.13 | 0 | 4.61 | 2.27 | 0.75 | 0 | 10.46 | 0 | 2.45 | 27.5 |
| 1-66 | 0 | 16.53 | 0.93 | 0 | 2.05 | 2.28 | 0 | 0 | 8.63 | 0 | 17.95 | 28.46 |
| 1-67 | 0 | 19.4 | 0.92 | 0 | 2.02 | 0.64 | 0 | 0 | 8.5 | 0 | 17.68 | 28.03 |
| 1-68 | 0 | 20.71 | 0.98 | 0 | 2.15 | 2.4 | 0 | 0 | 9.07 | 0 | 10.39 | 29.94 |
| 1-69 | 0 | 20.12 | 0.95 | 0 | 2.09 | 2.33 | 0 | 0 | 8.82 | 0 | 10.1 | 24.78 |
| 1-70 | 0 | 16.12 | 0.91 | 0 | 2 | 0.63 | 0 | 0 | 8.41 | 0 | 17.5 | 31.84 |
| 1-71 | 0 | 16.71 | 0.94 | 0 | 2.47 | 0.66 | 0 | 0 | 8.72 | 0 | 14.07 | 33.01 |
| 1-72 | 0 | 16.71 | 0.94 | 0 | 2.07 | 2.31 | 0 | 0 | 8.72 | 0 | 9.99 | 28.77 |
| 1-73 | 0 | 16.35 | 0.92 | 0 | 2.22 | 0.64 | 0 | 0 | 8.53 | 0 | 17.75 | 32.31 |
| 1-74 | 0 | 16.06 | 0.9 | 0 | 1.99 | 0.63 | 0 | 0 | 8.38 | 0 | 19.42 | 31.72 |
| 1-75 | 0 | 25.76 | 1.13 | 0 | 4.6 | 2.27 | 0.75 | 0 | 10.45 | 0 | 0 | 27.46 |
| 1-76 | 0 | 25.1 | 1.1 | 0 | 4.25 | 2.21 | 0.73 | 0 | 10.18 | 0 | 2.38 | 26.14 |
| 1-77 | 0 | 25.06 | 1.1 | 0 | 4.25 | 2.21 | 0.73 | 0 | 10.16 | 0 | 0 | 26.09 |
| 1-78 | 0 | 24.8 | 1.09 | 0 | 4.2 | 2.18 | 0.72 | 0 | 10.06 | 0 | 4.7 | 25.82 |
| 1-79 | 0 | 25.62 | 1.12 | 0 | 4.58 | 2.26 | 0.75 | 0 | 10.39 | 0 | 2.43 | 26.04 |
| 1-80 | 0 | 25.84 | 1.13 | 0 | 4.62 | 2.27 | 0.75 | 0 | 10.48 | 0 | 2.45 | 27.54 |
| 1-81 | 0 | 24.97 | 1.09 | 0 | 4.23 | 2.2 | 0.73 | 0 | 10.13 | 0 | 4.73 | 24.77 |
| 1-82 | 0 | 25.17 | 1.1 | 0 | 4.27 | 2.22 | 0.73 | 0 | 10.21 | 0 | 4.77 | 26.22 |
| 1-83 | 0 | 25.68 | 1.12 | 0 | 4.59 | 2.26 | 0.75 | 0 | 10.42 | 0 | 0 | 27.38 |
| 1-84 | 0 | 25.96 | 1.14 | 0 | 4.64 | 2.29 | 0.76 | 0 | 10.53 | 0 | 0 | 27.68 |
| 1-85 | 0 | 25.03 | 1.1 | 0 | 4.24 | 2.2 | 0.73 | 0 | 10.15 | 0 | 2.37 | 26.07 |
| 1-86 | 0 | 25.3 | 1.11 | 0 | 4.29 | 2.23 | 0.74 | 0 | 10.26 | 0 | 2.4 | 26.33 |
| 1-87 | 0 | 25.97 | 0.56 | 0 | 4.24 | 2.2 | 0.73 | 0 | 10.15 | 0 | 4.75 | 26.08 |
| 1-88 | 0 | 24.3 | 1.65 | 0 | 4.28 | 2.22 | 0.73 | 0 | 10.23 | 0 | 4.78 | 26.29 |
| 1-89 | 0 | 23.45 | 2.2 | 0 | 4.29 | 2.23 | 0.74 | 0 | 10.28 | 0 | 4.8 | 26.39 |
| 1-90 | 0 | 25.5 | 1.11 | 0 | 4.29 | 2.23 | 0.74 | 0 | 10.27 | 0 | 2.4 | 26.1 |
| 1-91 | 0 | 25.54 | 1.11 | 0 | 4.3 | 2.23 | 0.74 | 0 | 10.28 | 0 | 2.4 | 26.41 |
| 1-92 | 0 | 25.32 | 1.11 | 0 | 4.29 | 2.23 | 0.74 | 0 | 10.53 | 0 | 2.4 | 26 |
| 1-93 | 0 | 25.39 | 1.11 | 0 | 4.3 | 2.23 | 0.74 | 0 | 10.56 | 0 | 2.41 | 26.44 |
| 1-94 | 0 | 25.32 | 1.11 | 0 | 4.36 | 2.23 | 0.74 | 0 | 10.27 | 0 | 3.12 | 26.54 |
| 1-95 | 0 | 26.82 | 1.09 | 0 | 3.84 | 2.2 | 0.73 | 0 | 10.12 | 0 | 3.08 | 26.17 |
| 1-96 | 0 | 25.19 | 1.1 | 0 | 3.87 | 3.18 | 0.73 | 0 | 10.22 | 0 | 3.1 | 26.43 |
| 1-97 | 0 | 23.65 | 1.12 | 0 | 4.4 | 3.23 | 0.74 | 0 | 10.36 | 0 | 3.15 | 26.8 |
| 1-98 | 0 | 26.85 | 1.13 | 0 | 4.62 | 2.28 | 0.75 | 0 | 10.5 | 0 | 2.45 | 26.31 |
| 1-99 | 0 | 27.07 | 1.14 | 0 | 4.66 | 2.3 | 0.76 | 0 | 10.59 | 0 | 2.47 | 27.83 |
| 1-100 | 0 | 18.82 | 0.89 | 0 | 1.62 | 0 | 0 | 0 | 8.25 | 2.32 | 17.16 | 28.8 |
| 1-101 | 0 | 15.03 | 0.85 | 0 | 1.55 | 0 | 0 | 0 | 6.5 | 2.21 | 16.32 | 27.41 |
| 1-102 | 0 | 14.89 | 0.84 | 0 | 1.18 | 0 | 0 | 0 | 7.77 | 2.18 | 16.16 | 27.14 |
| 1-103 | 0 | 14.55 | 0.82 | 0 | 0.63 | 0 | 0 | 0 | 7.59 | 2.14 | 15.8 | 29.29 |
| 1-104 | 0 | 14.29 | 0.81 | 0 | 0.62 | 0 | 0 | 0 | 7.46 | 2.1 | 15.51 | 26.04 |
| 1-105 | 0 | 14.7 | 0.83 | 0 | 0 | 2.41 | 0 | 0 | 7.67 | 2.16 | 15.96 | 26.8 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 1-54 | 25.98 | 0 | 0 | 0 | 0 | 0 | 0 | 100 | 0.03 |
| 1-55 | 25.97 | 0 | 0 | 0 | 0 | 0 | 0 | 100 | 0.03 |
| 1-56 | 26.21 | 1.97 | 0 | 0 | 0 | 0 | 0 | 100 | 0.03 |
| 1-57 | 25.26 | 1.98 | 0 | 0 | 0 | 0 | 0 | 100 | 0.03 |
| 1-58 | 26.05 | 0 | 0 | 0 | 0 | 0 | 0 | 100 | 0.03 |
| 1-59 | 25.92 | 0 | 0 | 0 | 0 | 0 | 0 | 100 | 0.03 |
| 1-60 | 25.94 | 0 | 0 | 0 | 0 | 0 | 0 | 100 | 0.03 |
| 1-61 | 26.15 | 0 | 0 | 0 | 0 | 0 | 0 | 100 | 0.03 |

TABLE 1-1(2)-continued

| | | | | | | | | | |
|---|---|---|---|---|---|---|---|---|---|
| 1-62 | 26.12 | 0 | 0 | 0 | 0 | 0 | 0 | 100 | 0.03 |
| 1-63 | 25.96 | 0 | 0 | 0 | 0 | 0 | 0 | 100 | 0.03 |
| 1-64 | 25.42 | 0 | 0 | 0 | 0 | 0 | 0 | 100 | 0.03 |
| 1-65 | 25.03 | 0 | 0 | 0 | 0 | 0 | 0 | 100 | 0.03 |
| 1-66 | 21.52 | 1.65 | 0 | 0 | 0 | 0 | 0 | 100 | 0.03 |
| 1-67 | 21.19 | 1.62 | 0 | 0 | 0 | 0 | 0 | 100 | 0.03 |
| 1-68 | 22.63 | 1.73 | 0 | 0 | 0 | 0 | 0 | 100 | 0.03 |
| 1-69 | 29.13 | 1.68 | 0 | 0 | 0 | 0 | 0 | 100 | 0.03 |
| 1-70 | 20.98 | 1.61 | 0 | 0 | 0 | 0 | 0 | 100 | 0.03 |
| 1-71 | 21.75 | 1.67 | 0 | 0 | 0 | 0 | 0 | 100 | 0.03 |
| 1-72 | 28.82 | 1.67 | 0 | 0 | 0 | 0 | 0 | 100 | 0.03 |
| 1-73 | 21.28 | 0 | 0 | 0 | 0 | 0 | 0 | 100 | 0.03 |
| 1-74 | 20.9 | 0 | 0 | 0 | 0 | 0 | 0 | 100 | 0.03 |
| 1-75 | 24.99 | 0 | 0 | 0 | 0 | 2.59 | 0 | 100 | 0.03 |
| 1-76 | 25.38 | 0 | 0 | 0 | 0 | 2.53 | 0 | 100 | 0.03 |
| 1-77 | 25.35 | 0 | 0 | 0 | 0 | 5.05 | 0 | 100 | 0.03 |
| 1-78 | 23.04 | 0 | 0 | 3.39 | 0 | 0 | 0 | 100 | 0.03 |
| 1-79 | 24.86 | 1.95 | 0 | 0 | 0 | 0 | 0 | 100 | 0.03 |
| 1-80 | 22.95 | 1.97 | 0 | 0 | 0 | 0 | 0 | 100 | 0.03 |
| 1-81 | 25.25 | 1.9 | 0 | 0 | 0 | 0 | 0 | 100 | 0.03 |
| 1-82 | 23.39 | 1.92 | 0 | 0 | 0 | 0 | 0 | 100 | 0.03 |
| 1-83 | 24.92 | 0 | 0 | 0 | 2.88 | 0 | 0 | 100 | 0.03 |
| 1-84 | 25.19 | 0 | 0 | 0 | 0 | 0 | 1.81 | 100 | 0.03 |
| 1-85 | 25.31 | 0 | 0 | 0 | 2.8 | 0 | 0 | 100 | 0.03 |
| 1-86 | 25.57 | 0 | 0 | 0 | 0 | 0 | 1.77 | 100 | 0.03 |
| 1-87 | 25.32 | 0 | 0 | 0 | 0 | 0 | 0 | 100 | 0.03 |
| 1-88 | 25.52 | 0 | 0 | 0 | 0 | 0 | 0 | 100 | 0.03 |
| 1-89 | 25.62 | 0 | 0 | 0 | 0 | 0 | 0 | 100 | 0.03 |
| 1-90 | 25.59 | 0 | 0 | 0 | 0 | 0 | 1.77 | 100 | 0.03 |
| 1-91 | 25.22 | 0 | 0 | 0 | 0 | 0 | 1.77 | 100 | 0.03 |
| 1-92 | 25.61 | 0 | 0 | 0 | 0 | 0 | 1.77 | 100 | 0.03 |
| 1-93 | 25.05 | 0 | 0 | 0 | 0 | 0 | 1.77 | 100 | 0.03 |
| 1-94 | 25.29 | 0 | 0 | 0 | 0 | 1.02 | 0 | 100 | 0.03 |
| 1-95 | 24.94 | 0 | 0 | 0 | 0 | 1.01 | 0 | 100 | 0.03 |
| 1-96 | 25.17 | 0 | 0 | 0 | 0 | 1.01 | 0 | 100 | 0.03 |
| 1-97 | 25.52 | 0 | 0 | 0 | 0 | 1.03 | 0 | 100 | 0.03 |
| 1-98 | 25.11 | 0 | 0 | 0 | 0 | 0 | 0 | 100 | 0.03 |
| 1-99 | 23.18 | 0 | 0 | 0 | 0 | 0 | 0 | 100 | 0.03 |
| 1-100 | 20.56 | 1.58 | 0 | 0 | 0 | 0 | 0 | 100 | 0.03 |
| 1-101 | 22.74 | 7.39 | 0 | 0 | 0 | 0 | 0 | 100 | 0.03 |
| 1-102 | 22.52 | 7.32 | 0 | 0 | 0 | 0 | 0 | 100 | 0.03 |
| 1-103 | 22.02 | 7.16 | 0 | 0 | 0 | 0 | 0 | 100 | 0.03 |
| 1-104 | 26.14 | 7.03 | 0 | 0 | 0 | 0 | 0 | 100 | 0.03 |
| 1-105 | 22.24 | 7.23 | 0 | 0 | 0 | 0 | 0 | 100 | 0.03 |

TABLE 1-1(3)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 1-106 | 0 | 25.67 | 1.12 | 0 | 4.11 | 3.24 | 0.75 | 0 | 10.41 | 0 | 2.43 | 27.37 |
| 1-107 | 0 | 25.54 | 1.12 | 0 | 3.62 | 4.2 | 0.74 | 0 | 10.36 | 0 | 2.42 | 27.22 |
| 1-108 | 0 | 25.54 | 1.12 | 0 | 4.09 | 2.25 | 2.23 | 0 | 10.36 | 0 | 2.42 | 27.21 |
| 1-109 | 0 | 27.32 | 1.11 | 0 | 4.07 | 2.24 | 0.74 | 0 | 10.31 | 0 | 2.41 | 27.12 |
| 1-110 | 0 | 26.02 | 1.14 | 0 | 4.65 | 2.29 | 0.76 | 0 | 10.55 | 0 | 2.47 | 29.01 |
| 1-111 | 0 | 25.85 | 1.13 | 0 | 4.38 | 2.28 | 0.75 | 0 | 11.38 | 0 | 2.45 | 28.83 |
| 1-112 | 0 | 25.6 | 1.12 | 0 | 3.87 | 2.25 | 2.98 | 0 | 10.83 | 0 | 1.21 | 27.3 |
| 1-113 | 0 | 27.28 | 1.15 | 0 | 4.7 | 2.32 | 0.77 | 0 | 11.13 | 0 | 1.25 | 28.04 |
| 1-114 | 0 | 27.04 | 1.14 | 0 | 4.66 | 2.3 | 0.76 | 0 | 11.03 | 0 | 1.24 | 26.52 |
| 1-115 | 0 | 25.86 | 1.13 | 0 | 4.62 | 1.29 | 2.26 | 0 | 10.94 | 0 | 1.23 | 27.57 |
| 1-116 | 0 | 25.73 | 1.13 | 0 | 4.6 | 0.29 | 3.75 | 0 | 10.88 | 0 | 1.22 | 27.43 |
| 1-117 | 0 | 25.66 | 1.12 | 0 | 4.11 | 2.26 | 0.75 | 0 | 12.63 | 0 | 1.22 | 27.35 |
| 1-118 | 0 | 26.1 | 1.13 | 0 | 4.32 | 2.28 | 0.75 | 0 | 11.39 | 0 | 1.23 | 28.84 |
| 1-119 | 0 | 25.88 | 1.13 | 0 | 4.27 | 2.53 | 0.75 | 0 | 11.39 | 0 | 1.23 | 28.85 |
| 1-120 | 0 | 25.88 | 1.13 | 0 | 4.32 | 2.28 | 0.94 | 0 | 11.39 | 0 | 1.23 | 28.86 |
| 1-121 | 0 | 25.88 | 1.13 | 0 | 4.38 | 2.03 | 1.13 | 0 | 11.39 | 0 | 1.23 | 28.86 |
| 1-122 | 0 | 26.2 | 1.15 | 0 | 4.68 | 2.31 | 0.76 | 0 | 11.54 | 0 | 0 | 27.93 |
| 1-123 | 0 | 26.1 | 1.14 | 0 | 4.66 | 2.3 | 0.76 | 0 | 10.59 | 0 | 0 | 29.12 |
| 1-124 | 0 | 25.99 | 1.14 | 0 | 4.64 | 2.29 | 0.76 | 0 | 10.54 | 0 | 0 | 28.35 |
| 1-125 | 0 | 25.88 | 1.13 | 0 | 4.62 | 2.28 | 0.75 | 0 | 10.5 | 0 | 0 | 27.6 |
| 1-126 | 0 | 26.32 | 1.15 | 0 | 4.7 | 2.32 | 0.77 | 0 | 11.59 | 0 | 0 | 28.7 |
| 1-127 | 0 | 26.88 | 1.13 | 0 | 4.39 | 2.28 | 0.75 | 0 | 10.51 | 0 | 0 | 28.92 |
| 1-128 | 0 | 27.37 | 1.13 | 0 | 4.63 | 1.54 | 0.75 | 0 | 10.51 | 0 | 0 | 28.92 |
| 1-129 | 0 | 26.49 | 1.15 | 0 | 4.68 | 2.31 | 0.76 | 0 | 10.62 | 0 | 0 | 29.22 |
| 1-130 | 0 | 27.24 | 1.11 | 0 | 4.52 | 2.23 | 0.74 | 0 | 10.26 | 0 | 2.4 | 26.96 |
| 1-131 | 0 | 28.66 | 1.09 | 0 | 4.43 | 2.18 | 0.72 | 0 | 10.06 | 0 | 2.35 | 26.44 |

TABLE 1-1(3)-continued

| | | | | | | | | | | | | |
|---|---|---|---|---|---|---|---|---|---|---|---|---|
| 1-132 | 0 | 31.28 | 1.05 | 0 | 4.27 | 2.1 | 0.7 | 0 | 9.69 | 0 | 2.26 | 25.47 |
| 1-133 | 0 | 27.75 | 1.13 | 0 | 4.14 | 2.27 | 0.75 | 0 | 11.37 | 0 | 0 | 27.53 |
| 1-134 | 0 | 25.93 | 1.14 | 0 | 4.15 | 2.28 | 2.27 | 0 | 11.42 | 0 | 0 | 27.65 |
| 1-135 | 0 | 26.07 | 1.14 | 0 | 4.66 | 1.3 | 2.28 | 0 | 11.48 | 0 | 0 | 27.78 |
| 1-136 | 0 | 25.8 | 1.13 | 0 | 4.13 | 1.28 | 3.76 | 0 | 11.36 | 0 | 0 | 27.51 |
| 1-137 | 0 | 27.61 | 1.13 | 0 | 4.59 | 2.26 | 0.75 | 0 | 11.32 | 0 | 0 | 27.4 |
| 1-138 | 0 | 26.55 | 1.16 | 0 | 4.74 | 2.34 | 0.77 | 0 | 11.69 | 0 | 0 | 26.99 |
| 1-139 | 0 | 26.78 | 1.17 | 0 | 4.79 | 2.36 | 0.78 | 0 | 11.79 | 0 | 0 | 28.55 |
| 1-140 | 0 | 26.81 | 1.13 | 0 | 4.14 | 2.27 | 0.75 | 0 | 12.27 | 0 | 0 | 27.56 |
| 1-141 | 0 | 26.12 | 1.71 | 0 | 4.43 | 2.3 | 0.76 | 0 | 11.5 | 0 | 0 | 27.84 |
| 1-142 | 0 | 26.2 | 1.71 | 0 | 4.44 | 2.31 | 0.76 | 0 | 11.54 | 0 | 0 | 27.94 |
| 1-143 | 0 | 26.24 | 1.15 | 0 | 4.69 | 2.31 | 0.76 | 0 | 11.55 | 0 | 0 | 27.99 |
| 1-144 | 0 | 25.99 | 1.6 | 0 | 4.7 | 2.31 | 0.77 | 0 | 11.11 | 0 | 0 | 28.02 |
| 1-145 | 0 | 26.72 | 1.17 | 0 | 4.78 | 2.35 | 0.78 | 0 | 11.76 | 0 | 0 | 26.51 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 1-106 | 24.9 | 0 | 0 | 0 | 0 | 0 | 0 | 100 | 0.03 |
| 1-107 | 24.78 | 0 | 0 | 0 | 0 | 0 | 0 | 100 | 0.03 |
| 1-108 | 24.78 | 0 | 0 | 0 | 0 | 0 | 0 | 100 | 0.03 |
| 1-109 | 24.68 | 0 | 0 | 0 | 0 | 0 | 0 | 100 | 0.03 |
| 1-110 | 23.11 | 0 | 0 | 0 | 0 | 0 | 0 | 100 | 0.03 |
| 1-111 | 22.95 | 0 | 0 | 0 | 0 | 0 | 0 | 100 | 0.03 |
| 1-112 | 24.84 | 0 | 0 | 0 | 0 | 0 | 0 | 100 | 0.03 |
| 1-113 | 23.36 | 0 | 0 | 0 | 0 | 0 | 0 | 100 | 0.03 |
| 1-114 | 25.31 | 0 | 0 | 0 | 0 | 0 | 0 | 100 | 0.03 |
| 1-115 | 25.1 | 0 | 0 | 0 | 0 | 0 | 0 | 100 | 0.03 |
| 1-116 | 24.97 | 0 | 0 | 0 | 0 | 0 | 0 | 100 | 0.03 |
| 1-117 | 24.9 | 0 | 0 | 0 | 0 | 0 | 0 | 100 | 0.03 |
| 1-118 | 22.97 | 0.99 | 0 | 0 | 0 | 0 | 0 | 100 | 0.03 |
| 1-119 | 22.98 | 0.99 | 0 | 0 | 0 | 0 | 0 | 100 | 0.03 |
| 1-120 | 22.98 | 0.99 | 0 | 0 | 0 | 0 | 0 | 100 | 0.03 |
| 1-121 | 22.98 | 0.99 | 0 | 0 | 0 | 0 | 0 | 100 | 0.03 |
| 1-122 | 25.43 | 0 | 0 | 0 | 0 | 0 | 0 | 100 | 0.03 |
| 1-123 | 25.33 | 0 | 0 | 0 | 0 | 0 | 0 | 100 | 0.03 |
| 1-124 | 26.29 | 0 | 0 | 0 | 0 | 0 | 0 | 100 | 0.03 |
| 1-125 | 27.24 | 0 | 0 | 0 | 0 | 0 | 0 | 100 | 0.03 |
| 1-126 | 24.45 | 0 | 0 | 0 | 0 | 0 | 0 | 100 | 0.03 |
| 1-127 | 25.14 | 0 | 0 | 0 | 0 | 0 | 0 | 100 | 0.03 |
| 1-128 | 25.15 | 0 | 0 | 0 | 0 | 0 | 0 | 100 | 0.03 |
| 1-129 | 24.77 | 0 | 0 | 0 | 0 | 0 | 0 | 100 | 0.03 |
| 1-130 | 24.54 | 0 | 0 | 0 | 0 | 0 | 0 | 100 | 0.03 |
| 1-131 | 24.07 | 0 | 0 | 0 | 0 | 0 | 0 | 100 | 0.03 |
| 1-132 | 23.18 | 0 | 0 | 0 | 0 | 0 | 0 | 100 | 0.03 |
| 1-133 | 25.06 | 0 | 0 | 0 | 0 | 0 | 0 | 100 | 0.03 |
| 1-134 | 25.16 | 0 | 0 | 0 | 0 | 0 | 0 | 100 | 0.03 |
| 1-135 | 25.29 | 0 | 0 | 0 | 0 | 0 | 0 | 100 | 0.03 |
| 1-136 | 25.03 | 0 | 0 | 0 | 0 | 0 | 0 | 100 | 0.03 |
| 1-137 | 24.94 | 0 | 0 | 0 | 0 | 0 | 0 | 100 | 0.03 |
| 1-138 | 25.76 | 0 | 0 | 0 | 0 | 0 | 0 | 100 | 0.03 |
| 1-139 | 23.78 | 0 | 0 | 0 | 0 | 0 | 0 | 100 | 0.03 |
| 1-140 | 25.07 | 0 | 0 | 0 | 0 | 0 | 0 | 100 | 0.03 |
| 1-141 | 25.34 | 0 | 0 | 0 | 0 | 0 | 0 | 100 | 0.03 |
| 1-142 | 23.27 | 0 | 0 | 0 | 0 | 0 | 1.83 | 100 | 0.03 |
| 1-143 | 23.31 | 2 | 0 | 0 | 0 | 0 | 0 | 100 | 0.03 |
| 1-144 | 25.5 | 0 | 0 | 0 | 0 | 0 | 0 | 100 | 0 |
| 1-145 | 25.93 | 0 | 0 | 0 | 0 | 0 | 0 | 100 | 0 |

TABLE 1-1(4)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 1-146 | 0 | 26.84 | 1.18 | 0 | 4.8 | 2.36 | 0.78 | 0 | 11.82 | 0 | 0 | 27.28 |
| 1-147 | 0 | 26.96 | 1.18 | 0 | 4.82 | 2.37 | 0.78 | 0 | 11.87 | 0 | 0 | 28.08 |
| 1-148 | 0 | 27.08 | 1.19 | 0 | 4.84 | 2.38 | 0.79 | 0 | 11.92 | 0 | 0 | 28.86 |
| 1-149 | 0 | 26.14 | 1.14 | 0 | 4.91 | 2.3 | 0.76 | 0 | 11.51 | 0 | 0 | 27.88 |
| 1-150 | 0 | 26.07 | 1.14 | 0 | 4.66 | 2.79 | 0.76 | 0 | 11.48 | 0 | 0 | 27.8 |
| 1-151 | 0 | 26.01 | 1.14 | 0 | 4.65 | 2.29 | 1.51 | 0 | 11.45 | 0 | 0 | 27.72 |
| 1-152 | 0 | 25.97 | 1.14 | 0 | 4.64 | 2.29 | 0.76 | 0 | 12.33 | 0 | 0 | 27.67 |
| 1-153 | 0 | 25.58 | 1.12 | 0 | 4.57 | 2.25 | 0.74 | 0 | 10.37 | 0 | 2.42 | 26.02 |
| 1-154 | 0 | 25.37 | 1.11 | 0 | 4.53 | 2.23 | 0.74 | 0 | 10.29 | 0 | 2.4 | 24.54 |
| 1-155 | 0 | 25.63 | 1.12 | 0 | 4.34 | 2.26 | 0.75 | 0 | 11.28 | 0 | 2.43 | 27.32 |
| 1-156 | 0 | 25.44 | 1.11 | 0 | 4.31 | 2.24 | 0.74 | 0 | 10.32 | 1.63 | 2.41 | 27.12 |

TABLE 1-1(4)-continued

| | | | | | | | | | | | | |
|---|---|---|---|---|---|---|---|---|---|---|---|---|
| 1-157 | 0 | 25.53 | 1.12 | 0 | 4.33 | 2.25 | 0.74 | 0 | 10.35 | 0 | 2.42 | 27.21 |
| 1-158 | 0 | 25.36 | 1.11 | 0 | 4.3 | 2.23 | 0.74 | 0 | 10.29 | 0 | 2.4 | 27.03 |
| 1-159 | 0 | 24.85 | 1.13 | 0 | 4.61 | 2.27 | 0.75 | 0 | 11.36 | 0 | 2.45 | 27.53 |
| 1-160 | 0 | 24.67 | 1.12 | 0 | 4.58 | 2.26 | 0.75 | 0 | 10.39 | 1.64 | 2.43 | 27.3 |
| 1-161 | 0 | 25.71 | 0.57 | 0 | 4.59 | 2.26 | 0.75 | 0 | 11.32 | 0 | 2.44 | 27.41 |
| 1-162 | 0 | 25.52 | 0.57 | 0 | 4.56 | 2.25 | 0.74 | 0 | 10.35 | 1.63 | 2.42 | 27.2 |
| 1-163 | 0 | 25.65 | 1.13 | 0 | 4.62 | 2.28 | 0.75 | 0 | 10.48 | 0 | 2.45 | 27.56 |
| 1-164 | 0 | 25.72 | 1.13 | 0 | 4.6 | 2.27 | 0.75 | 0 | 10.44 | 0 | 2.44 | 27.68 |
| 1-165 | 0 | 25.69 | 1.13 | 0 | 4.61 | 2.27 | 0.75 | 0 | 10.46 | 0 | 2.44 | 27.63 |
| 1-166 | 0 | 25.76 | 1.13 | 0 | 4.57 | 2.27 | 0.75 | 0 | 10.45 | 0 | 2.44 | 27.64 |
| 1-167 | 0 | 25.94 | 1.13 | 0 | 4.6 | 2.27 | 0.75 | 0 | 10.44 | 0 | 2.44 | 27.45 |
| 1-168 | 0 | 25.51 | 1.13 | 0 | 4.63 | 2.28 | 0.75 | 0 | 10.5 | 0 | 2.45 | 27.62 |
| 1-169 | 0 | 25.9 | 1.13 | 0 | 4.61 | 2.27 | 0.75 | 0 | 10.47 | 0 | 2.45 | 27.38 |
| 1-170 | 0 | 25.59 | 1.13 | 0 | 4.61 | 2.27 | 0.75 | 0 | 10.46 | 0 | 2.44 | 27.74 |
| 1-171 | 0 | 13.35 | 0.93 | 0 | 2.83 | 0.65 | 0 | 0 | 8.61 | 0 | 17.92 | 32.59 |
| 1-172 | 0 | 13.42 | 0.93 | 0 | 2.06 | 2.29 | 0 | 0 | 8.66 | 0 | 18.01 | 34.89 |
| 1-173 | 0 | 13.61 | 0.95 | 0 | 2.09 | 2.32 | 0 | 0 | 8.78 | 0 | 18.27 | 37.52 |
| 1-174 | 0 | 13.33 | 0.93 | 0 | 2.04 | 2.27 | 0 | 0 | 8.6 | 0 | 17.89 | 33.6 |
| 1-175 | 0 | 13.52 | 0.94 | 0 | 2.07 | 2.3 | 0 | 0 | 8.72 | 0 | 18.14 | 36.19 |
| 1-176 | 0 | 13.48 | 0.94 | 0 | 2.46 | 1.48 | 0 | 0 | 8.7 | 0 | 18.09 | 35.03 |
| 1-177 | 0 | 13.54 | 0.94 | 0 | 2.87 | 0.66 | 0 | 0 | 8.73 | 0 | 18.17 | 35.18 |
| 1-178 | 0 | 13.58 | 0.95 | 0 | 3.2 | 0 | 0 | 0 | 8.76 | 0 | 18.23 | 35.31 |
| 1-179 | 0 | 24.94 | 1.09 | 0 | 3.77 | 2.2 | 0.73 | 1.24 | 10.11 | 0 | 4.73 | 25.97 |
| 1-180 | 0 | 24.82 | 1.09 | 0 | 3.75 | 2.18 | 0.72 | 0 | 11.79 | 0 | 4.71 | 25.84 |
| 1-181 | 0 | 24.46 | 1.07 | 0 | 3.69 | 2.15 | 0.71 | 0 | 9.92 | 3.13 | 4.64 | 25.49 |
| 1-182 | 0 | 24.61 | 1.08 | 0 | 3.94 | 2.17 | 0.72 | 0 | 9.98 | 0 | 7 | 25.62 |
| 1-183 | 0 | 23.82 | 1.04 | 0 | 3.16 | 2.1 | 0.69 | 0 | 9.66 | 6.1 | 4.52 | 24.82 |
| 1-184 | 0 | 23.96 | 1.05 | 0 | 3.4 | 2.11 | 0.7 | 0 | 9.72 | 3.07 | 6.81 | 24.95 |
| 1-185 | 0 | 24.1 | 1.06 | 0 | 3.64 | 2.12 | 0.7 | 0 | 9.77 | 0 | 9.14 | 25.1 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 1-146 | 24.94 | 0 | 0 | 0 | 0 | 0 | 0 | 100 | 0 |
| 1-147 | 23.94 | 0 | 0 | 0 | 0 | 0 | 0 | 100 | 0 |
| 1-148 | 22.94 | 0 | 0 | 0 | 0 | 0 | 0 | 100 | 0 |
| 1-149 | 25.36 | 0 | 0 | 0 | 0 | 0 | 0 | 100 | 0 |
| 1-150 | 25.3 | 0 | 0 | 0 | 0 | 0 | 0 | 100 | 0 |
| 1-151 | 25.23 | 0 | 0 | 0 | 0 | 0 | 0 | 100 | 0 |
| 1-152 | 25.2 | 0 | 0 | 0 | 0 | 0 | 0 | 100 | 0 |
| 1-153 | 26.93 | 0 | 0 | 0 | 0 | 0 | 0 | 100 | 0.03 |
| 1-154 | 28.79 | 0 | 0 | 0 | 0 | 0 | 0 | 100 | 0.03 |
| 1-155 | 24.87 | 0 | 0 | 0 | 0 | 0 | 0 | 100 | 0.03 |
| 1-156 | 24.68 | 0 | 0 | 0 | 0 | 0 | 0 | 100 | 0.03 |
| 1-157 | 24.77 | 0 | 1.28 | 0 | 0 | 0 | 0 | 100 | 0.03 |
| 1-158 | 24.61 | 1.93 | 0 | 0 | 0 | 0 | 0 | 100 | 0.03 |
| 1-159 | 25.05 | 0 | 0 | 0 | 0 | 0 | 0 | 100 | 0.03 |
| 1-160 | 24.86 | 0 | 0 | 0 | 0 | 0 | 0 | 100 | 0.03 |
| 1-161 | 24.95 | 0 | 0 | 0 | 0 | 0 | 0 | 100 | 0.03 |
| 1-162 | 24.76 | 0 | 0 | 0 | 0 | 0 | 0 | 100 | 0.03 |
| 1-163 | 25.08 | 0 | 0 | 0 | 0 | 0 | 0 | 100 | 0.03 |
| 1-164 | 24.97 | 0 | 0 | 0 | 0 | 0 | 0 | 100 | 0.03 |
| 1-165 | 25.02 | 0 | 0 | 0 | 0 | 0 | 0 | 100 | 0.03 |
| 1-166 | 24.99 | 0 | 0 | 0 | 0 | 0 | 0 | 100 | 0.03 |
| 1-167 | 24.98 | 0 | 0 | 0 | 0 | 0 | 0 | 100 | 0.03 |
| 1-168 | 25.13 | 0 | 0 | 0 | 0 | 0 | 0 | 100 | 0.03 |
| 1-169 | 25.04 | 0 | 0 | 0 | 0 | 0 | 0 | 100 | 0.03 |
| 1-170 | 25.01 | 0 | 0 | 0 | 0 | 0 | 0 | 100 | 0.03 |
| 1-171 | 21.47 | 1.65 | 0 | 0 | 0 | 0 | 0 | 100 | 0.03 |
| 1-172 | 18.09 | 1.65 | 0 | 0 | 0 | 0 | 0 | 100 | 0.03 |
| 1-173 | 14.78 | 1.68 | 0 | 0 | 0 | 0 | 0 | 100 | 0.03 |
| 1-174 | 19.7 | 1.64 | 0 | 0 | 0 | 0 | 0 | 100 | 0.03 |
| 1-175 | 16.45 | 1.67 | 0 | 0 | 0 | 0 | 0 | 100 | 0.03 |
| 1-176 | 18.16 | 1.66 | 0 | 0 | 0 | 0 | 0 | 100 | 0.03 |
| 1-177 | 18.24 | 1.67 | 0 | 0 | 0 | 0 | 0 | 100 | 0.03 |
| 1-178 | 18.3 | 1.67 | 0 | 0 | 0 | 0 | 0 | 100 | 0.03 |
| 1-179 | 25.22 | 0 | 0 | 0 | 0 | 0 | 0 | 100 | 0.03 |
| 1-180 | 25.1 | 0 | 0 | 0 | 0 | 0 | 0 | 100 | 0.03 |
| 1-181 | 24.74 | 0 | 0 | 0 | 0 | 0 | 0 | 100 | 0.03 |
| 1-182 | 24.88 | 0 | 0 | 0 | 0 | 0 | 0 | 100 | 0.03 |
| 1-183 | 24.09 | 0 | 0 | 0 | 0 | 0 | 0 | 100 | 0.03 |
| 1-184 | 24.23 | 0 | 0 | 0 | 0 | 0 | 0 | 100 | 0.03 |
| 1-185 | 24.37 | 0 | 0 | 0 | 0 | 0 | 0 | 100 | 0.03 |

TABLE 1-2(1)

| | Glass composition (% by mass) | Glass properties | | | | | | | |
|---|---|---|---|---|---|---|---|---|---|
| No. | $Na_2O$ + $K_2O$ + $Cs_2O$ | nd | νd | Specific weight | Tg (° C.) | λ80 (nm) | λ70 (nm) | λ5 (nm) | nd − (0.2*Specific Weight + 1.18) |
| 1-1 | 2.49 | 1.92564 | 23.09 | 3.639 | 605 | 556 | 460 | 376 | 0.01784 |
| 1-2 | 4.23 | 1.91696 | 23.17 | 3.631 | 607 | 541 | 454 | 374 | 0.01076 |
| 1-3 | 2.45 | 1.92371 | 23.31 | 3.656 | 615 | 572 | 467 | 377 | 0.01251 |
| 1-4 | 2.43 | 1.92372 | 23.50 | 3.659 | 623 | 552 | 453 | 374 | 0.01192 |
| 1-5 | 2.79 | 1.91048 | | 3.410 | 580 | 554 | 458 | 375 | 0.04848 |
| 1-6 | 2.81 | 1.91272 | 23.06 | 3.418 | 583 | 548 | 456 | 374 | 0.04912 |
| 1-7 | 2.75 | 1.92316 | 22.52 | 3.441 | 583 | 556 | 461 | 377 | 0.05496 |
| 1-8 | 3.24 | 1.92110 | | 3.441 | | 555 | 459 | 376 | 0.05290 |
| 1-9 | 2.74 | 1.92309 | | 3.448 | | N/A | 497 | 378 | 0.05349 |
| 1-10 | 2.73 | 1.92293 | 22.63 | 3.449 | | 541 | 455 | 376 | 0.05313 |
| 1-11 | 2.80 | 1.92337 | | 3.400 | 580 | N/A | 484 | 378 | 0.06337 |
| 1-12 | 3.47 | 1.91933 | | 3.394 | 577 | 549 | 459 | 376 | 0.06053 |
| 1-13 | 2.82 | 1.90059 | 23.31 | 3.364 | 582 | 666 | 459 | 374 | 0.04779 |
| 1-14 | 2.85 | 1.90590 | 22.97 | 3.372 | 571 | N/A | 478 | 374 | 0.05150 |
| 1-15 | 2.87 | 1.90099 | 23.01 | 3.333 | | 693 | 460 | 374 | 0.05439 |
| 1-16 | 2.90 | 1.90643 | 22.88 | 3.341 | | N/A | 500 | 375 | 0.05823 |
| 1-17 | 2.89 | 1.87843 | 23.92 | 3.298 | 581 | 544 | 443 | 372 | 0.03883 |
| 1-18 | 2.90 | 1.87702 | 23.79 | 3.295 | 575 | N/A | 461 | 373 | 0.03802 |
| 1-19 | 2.94 | 1.88584 | 23.83 | 3.313 | 573 | 514 | 438 | 371 | 0.04324 |
| 1-20 | 2.90 | 1.88581 | 24.02 | 3.329 | 582 | 528 | 439 | 371 | 0.04001 |
| 1-21 | 3.96 | 1.88185 | 23.84 | 3.311 | | 508 | 437 | 370 | 0.03965 |
| 1-22 | 2.94 | 1.87894 | 23.70 | 3.266 | 582 | 526 | 443 | 372 | 0.04574 |
| 1-23 | 2.93 | 1.87815 | 23.64 | 3.281 | | 514 | 442 | 372 | 0.04195 |
| 1-24 | 3.97 | 1.87486 | 23.77 | 3.262 | | 505 | 437 | 372 | 0.04246 |
| 1-25 | 3.00 | 1.87931 | 23.56 | 3.232 | | 650 | 452 | 374 | 0.05291 |
| 1-26 | 2.81 | 1.93027 | 22.53 | 3.429 | 580 | 562 | 473 | 379 | 0.06447 |
| 1-27 | 2.77 | 1.92297 | 21.40 | 3.415 | 587 | 573 | 475 | 380 | 0.05997 |
| 1-28 | 2.73 | 1.92238 | 22.77 | 3.429 | 594 | 564 | 471 | 379 | 0.05658 |
| 1-29 | 2.86 | 1.90832 | 23.09 | 3.381 | 572 | 555 | 465 | 376 | 0.05212 |
| 1-30 | 5.74 | 1.90598 | 22.63 | 3.372 | 578 | 563 | 471 | 378 | 0.05158 |
| 1-31 | 3.84 | 1.92643 | 22.32 | 3.413 | 572 | 590 | 480 | 380 | 0.06383 |
| 1-32 | 3.84 | 1.91948 | | 3.382 | | 666 | 487 | 381 | 0.06308 |
| 1-33 | 2.78 | 1.90072 | 23.33 | 3.393 | 580 | 560 | 469 | 377 | 0.04212 |
| 1-34 | 2.76 | 1.90098 | 23.35 | 3.413 | 585 | 569 | 468 | 376 | 0.03838 |
| 1-35 | 2.77 | 1.90423 | 23.18 | 3.392 | 585 | 570 | 470 | 377 | 0.04583 |
| 1-36 | 2.77 | 1.90037 | 23.40 | 3.397 | 580 | 568 | 466 | 375 | 0.04097 |
| 1-37 | 5.65 | 1.88576 | 23.40 | 3.343 | 578 | 553 | 465 | 375 | 0.03716 |
| 1-38 | 7.20 | 1.87933 | 23.47 | 3.341 | | 548 | 463 | 375 | 0.03113 |
| 1-39 | 8.71 | 1.87258 | 23.57 | 3.336 | | 549 | 461 | 374 | 0.02538 |
| 1-40 | 10.21 | 1.86530 | | 3.331 | | 602 | 464 | 373 | 0.01910 |
| 1-41 | 2.73 | 1.89768 | 23.50 | 3.429 | | 554 | 461 | 374 | 0.03188 |
| 1-42 | 2.68 | 1.89943 | 23.74 | 3.458 | | 559 | 461 | 373 | 0.02783 |
| 1-43 | 4.08 | 1.89182 | 22.03 | 3.345 | | 556 | 466 | 377 | 0.04282 |
| 1-44 | 2.48 | 1.89719 | 23.33 | 3.345 | | 564 | 469 | 377 | 0.04819 |
| 1-45 | 2.80 | 1.89548 | 23.20 | 3.352 | | 569 | 468 | 377 | 0.04508 |
| 1-46 | 2.81 | 1.89641 | 23.24 | 3.356 | | 549 | 464 | 377 | 0.04521 |
| 1-47 | 2.77 | 1.90091 | 23.33 | 3.404 | 584 | 545 | 462 | 376 | 0.04011 |
| 1-48 | 2.70 | 1.90124 | 23.49 | 3.457 | 586 | 565 | 469 | 377 | 0.02984 |
| 1-49 | 2.64 | 1.90126 | 23.64 | 3.504 | 590 | 562 | 466 | 376 | 0.02046 |
| 1-50 | 2.77 | 1.89547 | 23.57 | 3.406 | 586 | 561 | 464 | 375 | 0.03427 |
| 1-51 | 2.78 | 1.89561 | 23.51 | 3.398 | 582 | 551 | 461 | 375 | 0.03601 |
| 1-52 | 2.77 | 1.90107 | 23.33 | 3.402 | 581 | 551 | 465 | 376 | 0.04067 |
| 1-53 | 3.50 | 1.89703 | 23.40 | 3.405 | 580 | 565 | 469 | 377 | 0.03603 |

TABLE 1-2(2)

| | Glass composition (% by mass) | Glass properties | | | | | | | |
|---|---|---|---|---|---|---|---|---|---|
| No. | $Na_2O$ + $K_2O$ + $Cs_2O$ | nd | νd | Specific weight | Tg (° C.) | λ80 (nm) | λ70 (nm) | λ5 (nm) | nd − (0.2*Specific Weight + 1.18) |
| 1-54 | 3.01 | 1.89909 | 23.40 | 3.406 | 581 | 566 | 468 | 376 | 0.03789 |
| 1-55 | 2.75 | 1.89968 | 23.36 | 3.408 | 582 | 569 | 466 | 376 | 0.03808 |
| 1-56 | 2.78 | 1.8991 | 23.43 | 3.380 | 584 | 626 | 474 | 376 | 0.04310 |
| 1-57 | 2.79 | 1.89915 | 23.42 | 3.375 | 586 | 579 | 468 | 376 | 0.04415 |
| 1-58 | 2.52 | 1.90093 | 23.39 | 3.407 | 583 | 570 | 470 | 376 | 0.03953 |
| 1-59 | 3.25 | 1.89667 | 23.45 | 3.400 | 582 | 557 | 465 | 376 | 0.03667 |
| 1-60 | 2.75 | 1.89848 | 23.46 | 3.404 | 586 | 553 | 466 | 377 | 0.03768 |
| 1-61 | 2.77 | 1.90705 | 23.43 | 3.417 | 578 | 561 | 472 | 378 | 0.04365 |
| 1-62 | 2.77 | 1.90226 | 23.30 | 3.418 | 586 | 556 | 466 | 377 | 0.03866 |

TABLE 1-2(2)-continued

| No. | Glass composition (% by mass) Na2O + K2O + Cs2O | Glass properties nd | νd | Specific weight | Tg (° C.) | λ80 (nm) | λ70 (nm) | λ5 (nm) | nd − (0.2*Specific Weight + 1.18) |
|---|---|---|---|---|---|---|---|---|---|
| 1-63 | 2.75 | 1.90216 | 23.37 | 3.425 | 589 | 551 | 464 | 376 | 0.03716 |
| 1-64 | 2.94 | 1.89924 | 23.48 | 3.452 | 587 | 566 | 470 | 377 | 0.02884 |
| 1-65 | 3.02 | 1.89899 | 23.53 | 3.399 | 583 | 565 | 469 | 377 | 0.03919 |
| 1-66 | 2.28 | 1.9636 | 23.38 | 3.858 | 621 | 648 | 499 | 387 | 0.01200 |
| 1-67 | 0.64 | 1.95856 | 22.26 | 3.830 | 639 | 656 | 499 | 387 | 0.01256 |
| 1-68 | 2.40 | 1.95316 | 22.30 | 3.668 | 621 | 668 | 500 | 387 | 0.03956 |
| 1-69 | 2.33 | 1.95215 | 21.79 | 3.720 | 618 | N/A | 524 | 385 | 0.02815 |
| 1-70 | 0.63 | 1.99951 | 21.92 | 3.890 | 636 | N/A | 518 | 394 | 0.04151 |
| 1-71 | 0.66 | 2.00242 | 21.02 | 3.817 | 628 | N/A | 526 | 395 | 0.05902 |
| 1-72 | 2.31 | 1.99474 | 20.78 | 3.787 | 616 | N/A | 520 | 393 | 0.05734 |
| 1-73 | 0.64 | 1.99624 | 21.02 | 3.865 | 629 | N/A | 517 | 396 | 0.04324 |
| 1-74 | 0.63 | 1.99462 | 21.17 | 3.907 | 637 | N/A | 516 | 395 | 0.03322 |
| 1-75 | 3.02 | 1.90223 | 23.36 | 3.405 | 585 | 566 | 472 | 378 | 0.04123 |
| 1-76 | 2.94 | 1.9023 | 23.44 | 3.459 | 589 | 564 | 469 | 377 | 0.03050 |
| 1-77 | 2.94 | 1.90575 | 23.55 | 3.467 | 590 | 560 | 468 | 377 | 0.03235 |
| 1-78 | 2.90 | 1.89824 | 23.79 | 3.498 | 589 | 549 | 462 | 376 | 0.01864 |
| 1-79 | 3.01 | 1.89573 | 23.72 | 3.414 | 584 | 559 | 468 | 376 | 0.03293 |
| 1-80 | 3.02 | 1.8959 | 23.61 | 3.399 | 586 | 569 | 472 | 377 | 0.03610 |
| 1-81 | 2.93 | 1.89591 | 23.90 | 3.468 | 590 | 561 | 466 | 376 | 0.02231 |
| 1-82 | 2.95 | 1.89598 | 23.79 | 3.452 | 588 | 555 | 465 | 376 | 0.02558 |
| 1-83 | 3.01 | 1.90158 | 23.38 | 3.419 | 586 | 561 | 470 | 377 | 0.03778 |
| 1-84 | 3.05 | 1.90054 | 23.36 | 3.382 | 586 | 561 | 468 | 377 | 0.04414 |
| 1-85 | 2.93 | 1.90183 | 23.54 | 3.473 | 588 | 553 | 465 | 377 | 0.02723 |
| 1-86 | 2.97 | 1.90052 | 23.54 | 3.436 | 587 | 551 | 464 | 376 | 0.03332 |
| 1-87 | 2.93 | 1.89651 | 23.73 | 3.446 | 591 | 559 | 467 | 376 | 0.02731 |
| 1-88 | 2.95 | 1.90232 | 23.46 | 3.456 | 581 | 564 | 471 | 377 | 0.03112 |
| 1-89 | 2.97 | 1.90443 | 23.38 | 3.460 | 579 | 564 | 470 | 377 | 0.03243 |
| 1-90 | 2.97 | 1.89848 | 23.60 | 3.433 | 586 | 554 | 468 | 377 | 0.03188 |
| 1-91 | 2.97 | 1.89833 | 23.60 | 3.43 | 590 | 559 | 469 | 377 | 0.03233 |
| 1-92 | 2.97 | 1.89847 | 23.69 | 3.437 | 590 | 548 | 466 | 376 | 0.03107 |
| 1-93 | 2.97 | 1.89856 | 23.63 | 3.432 | 582 | 552 | 464 | 376 | 0.03216 |
| 1-94 | 2.97 | 1.90048 | 23.64 | 3.438 | | 571 | 475 | 377 | 0.03288 |
| 1-95 | 2.93 | 1.89251 | 23.60 | 3.42 | | 565 | 469 | 377 | 0.02851 |
| 1-96 | 3.91 | 1.89666 | 23.51 | 3.438 | | 558 | 467 | 377 | 0.02906 |
| 1-97 | 3.97 | 1.90344 | 23.43 | 3.452 | | 563 | 467 | 376 | 0.03304 |
| 1-98 | 3.03 | 1.88811 | 23.77 | 3.379 | | 575 | 466 | 375 | 0.03231 |
| 1-99 | 3.06 | 1.88831 | 23.71 | 3.365 | | 569 | 464 | 375 | 0.03531 |
| 1-100 | 0.00 | 1.96914 | 22.11 | 3.89 | 657 | 639 | 500 | 388 | 0.01114 |
| 1-101 | 0.00 | 2.01059 | 21.43 | 4.05 | 661 | N/A | 538 | 393 | 0.02059 |
| 1-102 | 0.00 | 2.00864 | 21.62 | 4.05 | 670 | N/A | 511 | 391 | 0.01864 |
| 1-103 | 0.00 | 2.02551 | 20.90 | 4.06 | 677 | N/A | 549 | 399 | 0.03351 |
| 1-104 | 0.00 | 2.02450 | 21.08 | 4.09 | 678 | N/A | 540 | 397 | 0.02650 |
| 1-105 | 2.41 | 1.99093 | 21.75 | 4.01 | 688 | N/A | 514 | 391 | 0.00893 |

TABLE 1-2(3)

| No. | Glass composition (% by mass) Na2O + K2O + Cs2O | Glass properties nd | νd | Specific weight | Tg (° C.) | λ80 (nm) | λ70 (nm) | λ5 (nm) | nd − (0.2*Specific Weight + 1.18) |
|---|---|---|---|---|---|---|---|---|---|
| 1-106 | 3.99 | 1.89542 | 23.34 | 3.396 | 580 | 557 | 467 | 377 | 0.03622 |
| 1-107 | 4.94 | 1.8914 | 23.41 | 3.395 | 584 | 566 | 468 | 376 | 0.0324 |
| 1-108 | 4.48 | 1.89093 | 23.44 | 3.384 | 581 | 566 | 468 | 376 | 0.03413 |
| 1-109 | 2.98 | 1.89112 | 23.14 | 3.38 | 590 | 556 | 465 | 377 | 0.03512 |
| 1-110 | 3.05 | 1.89951 | 23.23 | 3.38 | 583 | 551 | 468 | 378 | 0.04351 |
| 1-111 | 3.03 | 1.89942 | 23.36 | 3.388 | 588 | 553 | 467 | 377 | 0.04182 |
| 1-112 | 5.23 | 1.8865 | 23.56 | 3.356 | 582 | 549 | 465 | 376 | 0.0353 |
| 1-113 | 3.09 | 1.88826 | 23.64 | 3.345 | 582 | 545 | 463 | 376 | 0.03926 |
| 1-114 | 3.06 | 1.88811 | 23.75 | 3.361 | | 546 | 464 | 376 | 0.03591 |
| 1-115 | 3.55 | 1.89457 | 23.41 | 3.365 | | 552 | 466 | 377 | 0.04157 |
| 1-116 | 4.04 | 1.88953 | 23.5 | 3.351 | | 544 | 465 | 377 | 0.03933 |
| 1-117 | 3.01 | 1.89895 | 23.5 | 3.393 | | 543 | 465 | 377 | 0.04035 |
| 1-118 | 3.03 | 1.90024 | 23.75 | 3.376 | 588 | 558 | 469 | 378 | 0.04504 |
| 1-119 | 3.28 | 1.90025 | 23.29 | 3.378 | 590 | 558 | 469 | 378 | 0.04465 |
| 1-120 | 3.22 | 1.90023 | 23.29 | 3.379 | | 553 | 467 | 378 | 0.04443 |
| 1-121 | 3.16 | 1.89992 | 23.3 | 3.377 | | 552 | 465 | 377 | 0.04452 |
| 1-122 | 3.07 | 1.89897 | 23.3 | 3.359 | 583 | 561 | 472 | 378 | 0.04717 |
| 1-123 | 3.06 | 1.90618 | 22.84 | 3.361 | 583 | 566 | 475 | 379 | 0.05398 |

TABLE 1-2(3)-continued

| | Glass composition (% by mass) | Glass properties | | | | | | | |
|---|---|---|---|---|---|---|---|---|---|
| No. | $Na_2O + K_2O + Cs_2O$ | nd | νd | Specific weight | Tg (° C.) | λ80 (nm) | λ70 (nm) | λ5 (nm) | nd − (0.2*Specific Weight + 1.18) |
| 1-124 | 3.05 | 1.90622 | 22.85 | 3.369 | 583 | 570 | 474 | 379 | 0.05242 |
| 1-125 | 3.03 | 1.90606 | 22.92 | 3.376 | 582 | 609 | 475 | 378 | 0.05086 |
| 1-126 | 3.09 | 1.89901 | 23.27 | 3.351 | 584 | 566 | 472 | 377 | 0.04881 |
| 1-127 | 3.03 | 1.90185 | 22.87 | 3.351 | 586 | 595 | 479 | 379 | 0.05165 |
| 1-128 | 2.29 | 1.90097 | 22.89 | 3.347 | 587 | 670 | 486 | 380 | 0.05157 |
| 1-129 | 3.07 | 1.90296 | 22.92 | 3.35 | 583 | 560 | 469 | 378 | 0.05296 |
| 1-130 | 2.97 | 1.88883 | 23.63 | 3.372 | 585 | 556 | 466 | 377 | 0.03443 |
| 1-131 | 2.9 | 1.8786 | 23.91 | 3.349 | 589 | 548 | 461 | 375 | 0.0288 |
| 1-132 | 2.8 | 1.85463 | 24.38 | 3.293 | 589 | 567 | 474 | 376 | 0.01603 |
| 1-133 | 3.02 | 1.8907 | 23.4 | 3.342 | 590 | 598 | 475 | 377 | 0.0423 |
| 1-134 | 4.55 | 1.89048 | 23.4 | 3.345 | 583 | 561 | 471 | 377 | 0.04148 |
| 1-135 | 3.58 | 1.89424 | 23.38 | 3.346 | 582 | 564 | 471 | 377 | 0.04504 |
| 1-136 | 5.04 | 1.88593 | 23.54 | 3.332 | 584 | 552 | 466 | 377 | 0.03953 |
| 1-137 | 3.01 | 1.88866 | 23.57 | 3.337 | 585 | 557 | 464 | 376 | 0.04126 |
| 1-138 | 3.11 | 1.89279 | 23.57 | 3.353 | 581 | 559 | 468 | 377 | 0.04219 |
| 1-139 | 3.14 | 1.89292 | 23.51 | 3.337 | 580 | 552 | 464 | 376 | 0.04552 |
| 1-140 | 3.02 | 1.89479 | 23.47 | 3.356 | 590 | 556 | 469 | 377 | 0.04359 |
| 1-141 | 3.06 | 1.89777 | 23.26 | 3.354 | 582 | 578 | 474 | 378 | 0.04697 |
| 1-142 | 3.07 | 1.8924 | 23.68 | 3.361 | 585 | 550 | 466 | 377 | 0.0402 |
| 1-143 | 3.07 | 1.89572 | 23.57 | 3.36 | 587 | 551 | 466 | 377 | 0.04372 |
| 1-144 | 3.08 | 1.89843 | 23.24 | 3.354 | 581 | 546 | 454 | 372 | 0.04763 |
| 1-145 | 3.13 | 1.88954 | 23.77 | 3.348 | 580 | N/A | N/A | 377 | 0.03994 |

TABLE 1-2(4)

| | Glass composition (% by mass) | Glass properties | | | | | | | |
|---|---|---|---|---|---|---|---|---|---|
| No. | $Na_2O + K_2O + Cs_2O$ | nd | νd | Specific weight | Tg (° C.) | λ80 (nm) | λ70 (nm) | λ5 (nm) | nd − (0.2*Specific Weight + 1.18) |
| 1-146 | 3.14 | 1.88958 | 23.73 | 3.343 | 582 | N/A | 668 | 376 | 0.04098 |
| 1-147 | 3.15 | 1.88967 | 23.64 | 3.335 | 581 | N/A | 580 | 375 | 0.04267 |
| 1-148 | 3.17 | 1.8876 | 23.54 | 3.326 | 582 | N/A | 546 | 374 | 0.0424 |
| 1-149 | 3.06 | 1.89782 | 23.38 | 3.353 | 580 | 665 | 533 | 377 | 0.04722 |
| 1-150 | 3.55 | 1.8959 | 23.39 | 3.353 | 583 | N/A | 556 | 377 | 0.0453 |
| 1-151 | 3.8 | 1.89363 | 23.44 | 3.349 | 583 | N/A | 599 | 379 | 0.04383 |
| 1-152 | 3.05 | 1.89767 | 23.49 | 3.364 | 584 | N/A | 628 | 379 | 0.04487 |
| 1-153 | 2.99 | 1.89935 | 23.42 | 3.411 | 581 | 583 | 500 | 381 | 0.03715 |
| 1-154 | 2.97 | 1.89904 | 23.53 | 3.43 | 584 | 578 | 490 | 378 | 0.03304 |
| 1-155 | 3.01 | 1.89932 | 23.41 | 3.406 | 588 | 593 | 497 | 380 | 0.03812 |
| 1-156 | 2.98 | 1.89937 | 23.62 | 3.426 | 587 | 580 | 500 | 381 | 0.03417 |
| 1-157 | 2.99 | 1.90099 | 23.35 | 3.423 | 578 | 565 | 489 | 379 | 0.03639 |
| 1-158 | 2.97 | 1.90325 | 23.32 | 3.426 | 588 | 591 | 500 | 381 | 0.03805 |
| 1-159 | 3.02 | 1.90299 | 23.41 | 3.412 | 582 | 576 | 488 | 378 | 0.04059 |
| 1-160 | 3.01 | 1.90284 | 23.41 | 3.437 | 583 | 570 | 490 | 379 | 0.03544 |
| 1-161 | 3.01 | 1.90019 | 23.49 | 3.413 | 588 | 576 | 496 | 380 | 0.03759 |
| 1-162 | 2.99 | 1.9003 | 23.51 | 3.433 | 586 | | | | 0.0337 |
| 1-163 | 3.03 | 1.90041 | 23.31 | 3.4 | 582 | 592 | 484 | 378 | 0.04041 |
| 1-164 | 3.02 | 1.90055 | 23.31 | 3.4 | | 591 | 483 | 378 | 0.04055 |
| 1-165 | 3.02 | 1.9005 | 23.29 | 3.401 | 583 | 576 | 474 | 377 | 0.0403 |
| 1-166 | 3.02 | 1.90049 | 23.29 | 3.4 | | 572 | 473 | 377 | 0.04049 |
| 1-167 | 3.02 | 1.89837 | 23.37 | 3.389 | 573 | 567 | 479 | 379 | 0.04057 |
| 1-168 | 3.03 | 1.90132 | 23.29 | 3.4 | 582 | 569 | 483 | 379 | 0.04132 |
| 1-169 | 3.02 | 1.89832 | 23.38 | 3.397 | 583 | 567 | 477 | 378 | 0.03892 |
| 1-170 | 3.02 | 1.90151 | 23.25 | 3.402 | 583 | 558 | 473 | 378 | 0.04111 |
| 1-171 | 0.65 | 2.01328 | 20.96 | 3.919 | 604 | N/A | 522 | 398 | 0.04948 |
| 1-172 | 2.29 | 2.00332 | 20.96 | 3.88 | 612 | N/A | 525 | 397 | 0.04732 |
| 1-173 | 2.32 | 2.00373 | 20.82 | 3.854 | 618 | N/A | 522 | 400 | 0.05293 |
| 1-174 | 2.27 | 2.00319 | 21.01 | 3.89 | 619 | N/A | 517 | 396 | 0.04519 |
| 1-175 | 2.3 | 2.00338 | 20.89 | 3.871 | 619 | 681 | 511 | 396 | 0.04918 |
| 1-176 | 1.48 | 2.00866 | 20.89 | 3.888 | 605 | N/A | 527 | 399 | 0.05106 |
| 1-177 | 0.66 | 2.01517 | 20.82 | 3.894 | 609 | N/A | 527 | 400 | 0.05637 |
| 1-178 | 0 | 2.01957 | 20.77 | 3.903 | 621 | N/A | 529 | 400 | 0.05897 |

TABLE 1-2(4)-continued

| | Glass composition (% by mass) | Glass properties | | | | | | | |
|---|---|---|---|---|---|---|---|---|---|
| No. | $Na_2O + K_2O + Cs_2O$ | nd | νd | Specific weight | Tg (° C.) | λ80 (nm) | λ70 (nm) | λ5 (nm) | nd − (0.2*Specific Weight + 1.18) |
| 1-179 | 2.93 | 1.89886 | 23.64 | 3.456 | 584 | 609 | 502 | 380 | 0.02766 |
| 1-180 | 2.9 | 1.89904 | 23.74 | 3.464 | 594 | 587 | 488 | 378 | 0.02624 |
| 1-181 | 2.86 | 1.89897 | 23.78 | 3.505 | 593 | 573 | 484 | 378 | 0.01797 |
| 1-182 | 2.89 | 1.89946 | 23.69 | 3.496 | 590 | 562 | 478 | 378 | 0.02026 |
| 1-183 | 2.79 | 1.89862 | 24.01 | 3.542 | 598 | 564 | 481 | 378 | 0.01022 |
| 1-184 | 2.81 | 1.89917 | 23.93 | 3.534 | 589 | 567 | 482 | 379 | 0.01237 |
| 1-185 | 2.82 | 1.89987 | 23.81 | 3.529 | 589 | 559 | 479 | 378 | 0.01407 |

Example 1-2

The optical glasses (Nos. 1-1 to 1-105) prepared in Example 1-1 were compared with the optical glasses disclosed in Examples of Patent Documents 1 to 4. In a graph in which the refractive index nd is a vertical axis, and the specific weight is a horizontal axis, the optical glasses of Example 1-1 and the optical glasses disclosed in Examples of Patent Documents 1 to 4 were plotted. Results are illustrated in FIG. 1.

As illustrated in FIG. 1, the optical glass of Example 1-1 and the optical glasses disclosed in Examples of Patent Documents 1 to 4 are distinguished by a straight line of nd=0.2×Specific Weight+1.18.

That is, it was found that the optical glass of the present invention was distinctively distinguished from the optical glasses disclosed in Examples of Patent Documents 1 to 4 by the straight line of nd=0.2×Specific Weight+1.18, and had a remarkable effect that a ratio was low with respect to the same refractive index nd.

Example 1-3

A lens blank was prepared by using each of the optical glasses prepared in Example 1-1 in accordance with a known method, and various lenses were prepared by processing the lens blank in accordance with a known method such as polishing.

The prepared optical lens was various lenses such as a planar lens, a biconvex lens, a biconcave lens, a plano-convex lens, a plano-concave lens, a concave meniscus lens, and a convex meniscus lens.

A secondary chromatic aberration was capable of being excellently corrected by combining various lenses with a lens including another type of optical glass.

In addition, the glass had a low specific weight, and thus, each of the lenses had a small weight compared to a lens having the same optical properties and size, and was suitable for goggle type or spectacle type AR display device or MR display device. Similarly, a prism was prepared by using various optical glasses prepared in Example 1-1.

Example 1-4

Each of the optical glasses prepared in Example 1-1 was processed into the shape of a rectangular thin plate having Length of 50 mm×Width of 20 mm×Thickness of 1.0 mm to obtain a light guide plate. The light guide plate was built in the head mounted display 1 illustrated in FIG. 2.

In the head mounted display obtained as described above, an image was evaluated in an eye-point position, and a high-brightness and high-contrast image was capable of being observed at a wide viewing angle.

Example 2

Example 2-1

Glass samples having glass compositions shown in Tables 2-1(1), 2-1(2), 2-1(3), 2-1(4), 2-2(1), 2-2(2), 2-2(3), and 2-2(4) were prepared by the following procedure, and various evaluations were performed.

[Manufacturing of Optical Glass]

First, an oxide, a hydroxide, a carbonate, and a nitrate corresponding to structural components of the glass were prepared as a raw material, the raw materials were weighed and blended such that a glass composition of optical glass to be obtained was each of the compositions shown in Tables 2-1(1), 2-1(2), 2-1(3), 2-1(4), 2-2(1), 2-2(2), 2-2(3), and 2-2(4), and the raw materials were sufficiently mixed. A blended raw material (a batch raw material) obtained as described above was put in a platinum crucible, and was heated at 1350° C. to 1400° C. for 2 hours to be molten glass, and the molten glass was stirred, homogenized, and clarified, and then, was cast into a mold that was preheated to a suitable temperature. The cast glass was subjected to a heat treatment at approximately a glass transition temperature Tg for 30 minutes, and was allowed to cool in a furnace to a room temperature, and thus, a glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Tables 2-1(1), 2-1(2), 2-1(3), 2-1(4), 2-2(1), 2-2(2), 2-2(3), and 2-2(4).

[Measurement of Optical Properties]

The obtained glass sample was further subjected to an annealing treatment at approximately the glass transition temperature Tg for approximately 30 minutes to 2 hours, and then, was cooled in the furnace to the room temperature at a temperature decrease rate of −30° C./hour, and thus, an annealed sample was obtained. In the obtained annealed sample, refractive indices nd, ng, nF, and nC, an Abbe's number νd, a specific weight, the glass transition temperature Tg, λ80, λ70, and λ5 were measured. Results are shown in Tables 2-3(1), 2-3(2), 2-3(3), and 2-3(4).

(i) Refractive Indices nd, ng, nF, and nC and Abbe's Number νd

In the annealed sample, the refractive indices nd, ng, nF, and nC were measured by a refractive index measurement method of JIS standard JIS B 7071-1, and the Abbe's number νd was calculated on the basis of the following expression.

$$\nu d=(nd-1)/(nF-nC)$$

(ii) Specific Weight

The specific weight was measured by an Archimedes method.

(iii) Glass Transition Temperature Tg

The glass transition temperature Tg was measured at a temperature increase rate of 10° C./minute by using a differential scanning calorimetric analyzer (DSC3300SA), manufactured by NETZSCH Japan K.K.

(iv) λ80, λ70, and λ5

In the annealed sample having a thickness of 10.0 mm±0.1 mm, a spectral transmittance was measured in a range of a wavelength of 200 to 700 nm. A wavelength at which an external transmittance was 80% was λ80, a wavelength at which an external transmittance was 70% was 270, and a wavelength at which an external transmittance was 5% was λ5.

TABLE 2-1(1)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 2-1 | 0.00 | 21.48 | 1.02 | 0.00 | 3.09 | 2.49 | 0.00 | 0.00 | 9.41 | 0.00 | 10.78 | 26.46 |
| 2-2 | 0.00 | 21.29 | 1.01 | 0.00 | 2.21 | 4.23 | 0.00 | 0.00 | 9.33 | 0.00 | 10.68 | 26.21 |
| 2-3 | 0.00 | 21.17 | 1.00 | 0.00 | 2.20 | 2.45 | 0.00 | 2.28 | 9.28 | 0.00 | 10.63 | 26.09 |
| 2-4 | 0.00 | 20.99 | 0.99 | 0.00 | 2.18 | 2.43 | 0.00 | 0.00 | 12.34 | 0.00 | 10.53 | 25.85 |
| 2-5 | 0.00 | 24.22 | 1.15 | 0.00 | 4.94 | 2.81 | 0.00 | 0.00 | 10.61 | 0.00 | 2.24 | 29.83 |
| 2-6 | 0.00 | 23.74 | 1.12 | 0.00 | 4.61 | 2.75 | 0.00 | 0.00 | 10.40 | 0.00 | 2.19 | 29.25 |
| 2-7 | 0.00 | 23.59 | 1.12 | 0.00 | 4.34 | 2.73 | 0.00 | 0.00 | 11.23 | 0.00 | 2.18 | 29.04 |
| 2-8 | 0.00 | 26.33 | 1.15 | 0.00 | 4.95 | 2.82 | 0.00 | 0.00 | 10.68 | 0.00 | 0.00 | 27.44 |
| 2-9 | 0.00 | 24.58 | 2.31 | 0.00 | 4.99 | 2.85 | 0.00 | 0.00 | 10.77 | 0.00 | 0.00 | 27.64 |
| 2-10 | 0.00 | 26.80 | 1.17 | 0.00 | 5.04 | 2.87 | 0.00 | 0.00 | 10.87 | 0.00 | 0.00 | 30.55 |
| 2-11 | 0.00 | 25.02 | 2.35 | 0.00 | 5.08 | 2.90 | 0.00 | 0.00 | 10.96 | 0.00 | 0.00 | 30.80 |
| 2-12 | 0.00 | 28.98 | 1.18 | 0.00 | 5.07 | 2.89 | 0.00 | 0.00 | 10.94 | 0.00 | 0.00 | 28.09 |
| 2-13 | 0.00 | 27.06 | 1.18 | 1.71 | 5.08 | 2.90 | 0.00 | 0.00 | 10.97 | 0.00 | 0.00 | 28.18 |
| 2-14 | 0.00 | 27.39 | 1.20 | 0.00 | 5.65 | 2.94 | 0.00 | 0.00 | 11.11 | 0.00 | 0.00 | 28.51 |
| 2-15 | 0.00 | 27.01 | 1.18 | 0.00 | 5.08 | 2.90 | 0.00 | 0.00 | 12.83 | 0.00 | 0.00 | 28.12 |
| 2-16 | 0.00 | 27.24 | 1.19 | 0.00 | 5.12 | 3.96 | 0.00 | 0.00 | 11.05 | 0.00 | 0.00 | 28.37 |
| 2-17 | 0.00 | 29.50 | 1.20 | 0.00 | 5.16 | 2.94 | 0.00 | 0.00 | 11.14 | 0.00 | 0.00 | 31.31 |
| 2-18 | 0.00 | 29.38 | 1.20 | 0.00 | 5.64 | 2.93 | 0.00 | 0.00 | 9.20 | 0.00 | 0.00 | 28.48 |
| 2-19 | 0.00 | 29.34 | 1.20 | 0.00 | 4.63 | 3.97 | 0.00 | 0.00 | 11.08 | 0.00 | 0.00 | 31.13 |
| 2-20 | 0.00 | 30.04 | 1.22 | 0.00 | 5.26 | 3.00 | 0.00 | 0.00 | 11.34 | 0.00 | 0.00 | 34.64 |
| 2-21 | 0.00 | 22.31 | 1.15 | 0.00 | 4.92 | 2.81 | 0.00 | 0.00 | 12.44 | 0.00 | 0.00 | 29.87 |
| 2-22 | 0.00 | 23.90 | 1.13 | 0.00 | 4.38 | 2.77 | 0.00 | 0.00 | 12.26 | 0.00 | 0.00 | 29.44 |
| 2-23 | 0.00 | 23.59 | 1.12 | 0.00 | 3.85 | 2.73 | 0.00 | 0.00 | 13.87 | 0.00 | 0.00 | 29.06 |
| 2-24 | 0.00 | 24.74 | 1.17 | 0.00 | 5.52 | 2.86 | 0.00 | 0.00 | 10.84 | 0.00 | 0.00 | 27.84 |
| 2-25 | 0.00 | 23.73 | 1.12 | 0.00 | 3.87 | 2.75 | 2.99 | 0.00 | 10.40 | 0.00 | 0.00 | 29.22 |
| 2-26 | 0.00 | 22.49 | 1.16 | 0.00 | 4.96 | 3.84 | 0.00 | 0.00 | 10.71 | 0.00 | 0.00 | 30.13 |
| 2-27 | 0.00 | 25.96 | 1.14 | 0.00 | 4.64 | 2.78 | 0.00 | 0.00 | 10.53 | 1.66 | 0.00 | 27.03 |
| 2-28 | 0.00 | 25.75 | 1.13 | 0.00 | 4.60 | 2.76 | 0.00 | 0.00 | 10.45 | 0.00 | 2.44 | 26.82 |
| 2-29 | 0.00 | 25.88 | 1.13 | 0.00 | 4.62 | 2.77 | 0.00 | 0.00 | 10.50 | 0.00 | 0.00 | 26.96 |
| 2-30 | 0.00 | 25.89 | 1.13 | 0.00 | 4.86 | 2.77 | 0.00 | 0.00 | 10.50 | 0.00 | 0.00 | 24.40 |
| 2-31 | 0.00 | 25.84 | 1.13 | 0.00 | 3.87 | 3.21 | 2.44 | 0.00 | 10.48 | 0.00 | 0.00 | 26.90 |
| 2-32 | 0.00 | 25.62 | 1.12 | 0.00 | 3.07 | 4.78 | 2.42 | 0.00 | 10.39 | 0.00 | 0.00 | 26.69 |
| 2-33 | 0.00 | 25.41 | 1.11 | 0.00 | 2.28 | 6.31 | 2.40 | 0.00 | 10.31 | 0.00 | 0.00 | 26.48 |
| 2-34 | 0.00 | 25.46 | 1.11 | 0.00 | 4.78 | 2.73 | 0.00 | 0.00 | 10.32 | 0.00 | 0.00 | 21.48 |
| 2-35 | 0.00 | 25.04 | 1.10 | 0.00 | 4.71 | 2.68 | 0.00 | 0.00 | 10.15 | 0.00 | 0.00 | 18.66 |
| 2-36 | 0.00 | 26.05 | 1.14 | 0.00 | 4.68 | 1.62 | 2.46 | 0.00 | 10.57 | 0.00 | 0.00 | 27.13 |
| 2-37 | 0.00 | 26.27 | 1.15 | 0.00 | 5.51 | 0.00 | 2.48 | 0.00 | 10.66 | 0.00 | 0.00 | 27.36 |
| 2-38 | 1.15 | 26.10 | 1.14 | 0.00 | 4.66 | 2.80 | 0.00 | 0.00 | 10.58 | 0.00 | 0.00 | 27.18 |
| 2-39 | 0.00 | 26.18 | 1.15 | 0.83 | 4.68 | 2.81 | 0.00 | 0.00 | 10.62 | 0.00 | 0.00 | 27.26 |
| 2-40 | 0.00 | 25.86 | 1.13 | 0.00 | 4.62 | 2.77 | 0.00 | 0.00 | 10.49 | 0.83 | 1.23 | 26.92 |
| 2-41 | 0.00 | 25.20 | 1.10 | 0.00 | 4.27 | 2.70 | 0.00 | 0.00 | 10.22 | 0.00 | 4.78 | 26.24 |
| 2-42 | 0.00 | 24.67 | 1.08 | 0.00 | 3.95 | 2.64 | 0.00 | 0.00 | 10.00 | 0.00 | 7.01 | 25.70 |
| 2-43 | 0.00 | 26.26 | 1.13 | 0.00 | 4.61 | 2.77 | 0.00 | 0.00 | 10.46 | 0.00 | 2.45 | 26.23 |
| 2-44 | 0.00 | 26.39 | 1.13 | 0.00 | 4.63 | 2.78 | 0.00 | 0.00 | 10.51 | 0.00 | 2.46 | 26.97 |
| 2-45 | 0.00 | 25.87 | 1.13 | 0.00 | 4.67 | 2.77 | 0.00 | 0.00 | 10.49 | 0.00 | 1.96 | 26.95 |
| 2-46 | 0.00 | 25.62 | 1.12 | 0.00 | 4.34 | 2.75 | 0.75 | 0.00 | 10.39 | 0.00 | 2.43 | 26.69 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 2-1 | 23.47 | 1.80 | 0.00 | 0.00 | 0.00 | 0.00 | 0.00 | 100.00 | 0.03 |
| 2-2 | 23.26 | 1.78 | 0.00 | 0.00 | 0.00 | 0.00 | 0.00 | 100.00 | 0.03 |
| 2-3 | 23.13 | 1.77 | 0.00 | 0.00 | 0.00 | 0.00 | 0.00 | 100.00 | 0.03 |
| 2-4 | 22.93 | 1.76 | 0.00 | 0.00 | 0.00 | 0.00 | 0.00 | 100.00 | 0.03 |
| 2-5 | 22.17 | 2.03 | 0.00 | 0.00 | 0.00 | 0.00 | 0.00 | 100.00 | 0.03 |
| 2-6 | 25.94 | 0.00 | 0.00 | 0.00 | 0.00 | 0.00 | 0.00 | 100.00 | 0.03 |
| 2-7 | 25.77 | 0.00 | 0.00 | 0.00 | 0.00 | 0.00 | 0.00 | 100.00 | 0.03 |
| 2-8 | 26.63 | 0.00 | 0.00 | 0.00 | 0.00 | 0.00 | 0.00 | 100.00 | 0.03 |
| 2-9 | 26.86 | 0.00 | 0.00 | 0.00 | 0.00 | 0.00 | 0.00 | 100.00 | 0.03 |
| 2-10 | 22.70 | 0.00 | 0.00 | 0.00 | 0.00 | 0.00 | 0.00 | 100.00 | 0.03 |
| 2-11 | 22.89 | 0.00 | 0.00 | 0.00 | 0.00 | 0.00 | 0.00 | 100.00 | 0.03 |
| 2-12 | 22.85 | 0.00 | 0.00 | 0.00 | 0.00 | 0.00 | 0.00 | 100.00 | 0.03 |

TABLE 2-1(1)-continued

| | | | | | | | | | |
|---|---|---|---|---|---|---|---|---|---|
| 2-13 | 22.92 | 0.00 | 0.00 | 0.00 | 0.00 | 0.00 | 0.00 | 100.00 | 0.03 |
| 2-14 | 23.20 | 0.00 | 0.00 | 0.00 | 0.00 | 0.00 | 0.00 | 100.00 | 0.03 |
| 2-15 | 22.88 | 0.00 | 0.00 | 0.00 | 0.00 | 0.00 | 0.00 | 100.00 | 0.03 |
| 2-16 | 23.07 | 0.00 | 0.00 | 0.00 | 0.00 | 0.00 | 0.00 | 100.00 | 0.03 |
| 2-17 | 18.75 | 0.00 | 0.00 | 0.00 | 0.00 | 0.00 | 0.00 | 100.00 | 0.03 |
| 2-18 | 23.17 | 0.00 | 0.00 | 0.00 | 0.00 | 0.00 | 0.00 | 100.00 | 0.03 |
| 2-19 | 18.65 | 0.00 | 0.00 | 0.00 | 0.00 | 0.00 | 0.00 | 100.00 | 0.03 |
| 2-20 | 14.50 | 0.00 | 0.00 | 0.00 | 0.00 | 0.00 | 0.00 | 100.00 | 0.03 |
| 2-21 | 26.50 | 0.00 | 0.00 | 0.00 | 0.00 | 0.00 | 0.00 | 100.00 | 0.03 |
| 2-22 | 26.12 | 0.00 | 0.00 | 0.00 | 0.00 | 0.00 | 0.00 | 100.00 | 0.03 |
| 2-23 | 25.78 | 0.00 | 0.00 | 0.00 | 0.00 | 0.00 | 0.00 | 100.00 | 0.03 |
| 2-24 | 27.03 | 0.00 | 0.00 | 0.00 | 0.00 | 0.00 | 0.00 | 100.00 | 0.03 |
| 2-25 | 25.92 | 0.00 | 0.00 | 0.00 | 0.00 | 0.00 | 0.00 | 100.00 | 0.03 |
| 2-26 | 26.71 | 0.00 | 0.00 | 0.00 | 0.00 | 0.00 | 0.00 | 100.00 | 0.03 |
| 2-27 | 26.26 | 0.00 | 0.00 | 0.00 | 0.00 | 0.00 | 0.00 | 100.00 | 0.03 |
| 2-28 | 26.05 | 0.00 | 0.00 | 0.00 | 0.00 | 0.00 | 0.00 | 100.00 | 0.03 |
| 2-29 | 26.17 | 1.97 | 0.00 | 0.00 | 0.00 | 0.00 | 0.00 | 100.00 | 0.03 |
| 2-30 | 30.45 | 0.00 | 0.00 | 0.00 | 0.00 | 0.00 | 0.00 | 100.00 | 0.03 |
| 2-31 | 26.13 | 0.00 | 0.00 | 0.00 | 0.00 | 0.00 | 0.00 | 100.00 | 0.03 |
| 2-32 | 25.91 | 0.00 | 0.00 | 0.00 | 0.00 | 0.00 | 0.00 | 100.00 | 0.03 |
| 2-33 | 25.70 | 0.00 | 0.00 | 0.00 | 0.00 | 0.00 | 0.00 | 100.00 | 0.03 |
| 2-34 | 34.12 | 0.00 | 0.00 | 0.00 | 0.00 | 0.00 | 0.00 | 100.00 | 0.03 |
| 2-35 | 37.66 | 0.00 | 0.00 | 0.00 | 0.00 | 0.00 | 0.00 | 100.00 | 0.03 |
| 2-36 | 26.35 | 0.00 | 0.00 | 0.00 | 0.00 | 0.00 | 0.00 | 100.00 | 0.03 |
| 2-37 | 26.57 | 0.00 | 0.00 | 0.00 | 0.00 | 0.00 | 0.00 | 100.00 | 0.03 |
| 2-38 | 26.39 | 0.00 | 0.00 | 0.00 | 0.00 | 0.00 | 0.00 | 100.00 | 0.03 |
| 2-39 | 26.47 | 0.00 | 0.00 | 0.00 | 0.00 | 0.00 | 0.00 | 100.00 | 0.03 |
| 2-40 | 26.15 | 0.00 | 0.00 | 0.00 | 0.00 | 0.00 | 0.00 | 100.00 | 0.03 |
| 2-41 | 25.49 | 0.00 | 0.00 | 0.00 | 0.00 | 0.00 | 0.00 | 100.00 | 0.03 |
| 2-42 | 24.95 | 0.00 | 0.00 | 0.00 | 0.00 | 0.00 | 0.00 | 100.00 | 0.03 |
| 2-43 | 26.09 | 0.00 | 0.00 | 0.00 | 0.00 | 0.00 | 0.00 | 100.00 | 0.03 |
| 2-44 | 25.13 | 0.00 | 0.00 | 0.00 | 0.00 | 0.00 | 0.00 | 100.00 | 0.03 |
| 2-45 | 26.16 | 0.00 | 0.00 | 0.00 | 0.00 | 0.00 | 0.00 | 100.00 | 0.03 |
| 2-46 | 25.91 | 0.00 | 0.00 | 0.00 | 0.00 | 0.00 | 0.00 | 100.00 | 0.03 |

TABLE 2-1(2)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 2-47 | 0.00 | 25.69 | 1.12 | 0.00 | 4.59 | 2.26 | 0.75 | 0.00 | 10.42 | 0.00 | 2.43 | 26.76 |
| 2-48 | 0.28 | 25.68 | 1.12 | 0.00 | 4.59 | 2.75 | 0.00 | 0.00 | 10.42 | 0.00 | 2.43 | 26.76 |
| 2-49 | 0.00 | 26.41 | 1.13 | 0.00 | 4.63 | 2.78 | 0.00 | 0.00 | 10.51 | 0.00 | 0.00 | 26.36 |
| 2-50 | 0.00 | 26.51 | 1.14 | 0.00 | 4.65 | 2.79 | 0.00 | 0.00 | 10.56 | 0.00 | 0.00 | 27.11 |
| 2-51 | 0.00 | 25.75 | 1.13 | 0.00 | 4.84 | 1.77 | 0.75 | 0.00 | 10.45 | 0.00 | 2.44 | 26.82 |
| 2-52 | 0.00 | 25.62 | 1.12 | 0.00 | 4.58 | 1.76 | 1.49 | 0.00 | 10.39 | 0.00 | 2.43 | 26.69 |
| 2-53 | 0.00 | 26.61 | 0.57 | 0.00 | 4.58 | 2.75 | 0.00 | 0.00 | 10.40 | 0.00 | 2.43 | 26.72 |
| 2-54 | 0.00 | 24.90 | 1.69 | 0.00 | 4.62 | 2.77 | 0.00 | 0.00 | 10.49 | 0.00 | 2.45 | 26.93 |
| 2-55 | 0.00 | 25.84 | 0.58 | 0.00 | 4.86 | 2.77 | 0.00 | 0.00 | 10.48 | 0.00 | 2.45 | 26.90 |
| 2-56 | 0.00 | 25.67 | 0.57 | 0.00 | 4.59 | 2.75 | 0.00 | 0.00 | 11.30 | 0.00 | 2.43 | 26.73 |
| 2-57 | 0.00 | 25.14 | 1.10 | 0.00 | 4.26 | 2.21 | 0.73 | 0.00 | 10.19 | 0.00 | 4.77 | 26.18 |
| 2-58 | 0.00 | 25.80 | 1.13 | 0.00 | 4.61 | 2.27 | 0.75 | 0.00 | 10.46 | 0.00 | 2.45 | 27.50 |
| 2-59 | 0.00 | 20.71 | 0.98 | 0.00 | 2.15 | 2.40 | 0.00 | 0.00 | 9.07 | 0.00 | 10.39 | 29.94 |
| 2-60 | 0.00 | 20.12 | 0.95 | 0.00 | 2.09 | 2.33 | 0.00 | 0.00 | 8.82 | 0.00 | 10.10 | 24.78 |
| 2-61 | 0.00 | 16.71 | 0.94 | 0.00 | 2.47 | 0.66 | 0.00 | 0.00 | 8.72 | 0.00 | 14.07 | 33.01 |
| 2-62 | 0.00 | 16.71 | 0.94 | 0.00 | 2.07 | 2.31 | 0.00 | 0.00 | 8.72 | 0.00 | 9.99 | 28.77 |
| 2-63 | 0.00 | 25.76 | 1.13 | 0.00 | 4.60 | 2.27 | 0.75 | 0.00 | 10.45 | 0.00 | 0.00 | 27.46 |
| 2-64 | 0.00 | 25.10 | 1.10 | 0.00 | 4.25 | 2.21 | 0.73 | 0.00 | 10.18 | 0.00 | 2.38 | 26.14 |
| 2-65 | 0.00 | 25.06 | 1.10 | 0.00 | 4.25 | 2.21 | 0.73 | 0.00 | 10.16 | 0.00 | 0.00 | 26.09 |
| 2-66 | 0.00 | 24.80 | 1.09 | 0.00 | 4.20 | 2.18 | 0.72 | 0.00 | 10.06 | 0.00 | 4.70 | 25.82 |
| 2-67 | 0.00 | 25.62 | 1.12 | 0.00 | 4.58 | 2.26 | 0.75 | 0.00 | 10.39 | 0.00 | 2.43 | 26.04 |
| 2-68 | 0.00 | 25.84 | 1.13 | 0.00 | 4.62 | 2.27 | 0.75 | 0.00 | 10.48 | 0.00 | 2.45 | 27.54 |
| 2-69 | 0.00 | 24.97 | 1.09 | 0.00 | 4.23 | 2.20 | 0.73 | 0.00 | 10.13 | 0.00 | 4.73 | 24.77 |
| 2-70 | 0.00 | 25.17 | 1.10 | 0.00 | 4.27 | 2.22 | 0.73 | 0.00 | 10.21 | 0.00 | 4.77 | 26.22 |
| 2-71 | 0.00 | 25.68 | 1.12 | 0.00 | 4.59 | 2.26 | 0.75 | 0.00 | 10.42 | 0.00 | 0.00 | 27.38 |
| 2-72 | 0.00 | 25.96 | 1.14 | 0.00 | 4.64 | 2.29 | 0.76 | 0.00 | 10.53 | 0.00 | 0.00 | 27.68 |
| 2-73 | 0.00 | 25.03 | 1.10 | 0.00 | 4.24 | 2.20 | 0.73 | 0.00 | 10.15 | 0.00 | 2.37 | 26.07 |
| 2-74 | 0.00 | 25.30 | 1.11 | 0.00 | 4.29 | 2.23 | 0.74 | 0.00 | 10.26 | 0.00 | 2.40 | 26.33 |
| 2-75 | 0.00 | 25.97 | 0.56 | 0.00 | 4.24 | 2.20 | 0.73 | 0.00 | 10.15 | 0.00 | 4.75 | 26.08 |
| 2-76 | 0.00 | 24.30 | 1.65 | 0.00 | 4.28 | 2.22 | 0.73 | 0.00 | 10.23 | 0.00 | 4.78 | 26.29 |
| 2-77 | 0.00 | 23.45 | 2.20 | 0.00 | 4.29 | 2.23 | 0.74 | 0.00 | 10.28 | 0.00 | 4.80 | 26.39 |
| 2-78 | 0.00 | 25.50 | 1.11 | 0.00 | 4.29 | 2.23 | 0.74 | 0.00 | 10.27 | 0.00 | 2.40 | 26.10 |
| 2-79 | 0.00 | 25.54 | 1.11 | 0.00 | 4.30 | 2.23 | 0.74 | 0.00 | 10.28 | 0.00 | 2.40 | 26.41 |
| 2-80 | 0.00 | 25.32 | 1.11 | 0.00 | 4.29 | 2.23 | 0.74 | 0.00 | 10.53 | 0.00 | 2.40 | 26.00 |
| 2-81 | 0.00 | 25.39 | 1.11 | 0.00 | 4.30 | 2.23 | 0.74 | 0.00 | 10.56 | 0.00 | 2.41 | 26.44 |
| 2-82 | 0.00 | 25.32 | 1.11 | 0.00 | 4.36 | 2.23 | 0.74 | 0.00 | 10.27 | 0.00 | 3.12 | 26.54 |

TABLE 2-1(2)-continued

| | | | | | | | | | | | | |
|---|---|---|---|---|---|---|---|---|---|---|---|---|
| 2-83 | 0.00 | 26.81 | 1.09 | 0.00 | 3.84 | 2.20 | 0.73 | 0.00 | 10.12 | 0.00 | 3.08 | 26.18 |
| 2-84 | 0.00 | 25.19 | 1.10 | 0.00 | 3.87 | 3.18 | 0.73 | 0.00 | 10.22 | 0.00 | 3.10 | 26.43 |
| 2-85 | 0.00 | 23.65 | 1.12 | 0.00 | 4.40 | 3.23 | 0.74 | 0.00 | 10.36 | 0.00 | 3.15 | 26.80 |
| 2-86 | 0.00 | 26.85 | 1.13 | 0.00 | 4.62 | 2.28 | 0.75 | 0.00 | 10.50 | 0.00 | 2.45 | 26.31 |
| 2-87 | 0.00 | 27.07 | 1.14 | 0.00 | 4.66 | 2.30 | 0.76 | 0.00 | 10.59 | 0.00 | 2.47 | 27.83 |
| 2-88 | 0.00 | 15.03 | 0.85 | 0.00 | 1.55 | 0.00 | 0.00 | 0.00 | 6.50 | 2.21 | 16.32 | 27.41 |
| 2-89 | 0.00 | 14.89 | 0.84 | 0.00 | 1.18 | 0.00 | 0.00 | 0.00 | 7.77 | 2.18 | 16.16 | 27.14 |
| 2-90 | 0.00 | 14.55 | 0.82 | 0.00 | 0.63 | 0.00 | 0.00 | 0.00 | 7.59 | 2.14 | 15.80 | 29.29 |
| 2-91 | 0.00 | 14.29 | 0.81 | 0.00 | 0.62 | 0.00 | 0.00 | 0.00 | 7.46 | 2.10 | 15.51 | 26.04 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 2-47 | 25.98 | 0.00 | 0.00 | 0.00 | 0.00 | 0.00 | 0.00 | 100.00 | 0.03 |
| 2-48 | 25.97 | 0.00 | 0.00 | 0.00 | 0.00 | 0.00 | 0.00 | 100.00 | 0.03 |
| 2-49 | 26.21 | 1.97 | 0.00 | 0.00 | 0.00 | 0.00 | 0.00 | 100.00 | 0.03 |
| 2-50 | 25.26 | 1.98 | 0.00 | 0.00 | 0.00 | 0.00 | 0.00 | 100.00 | 0.03 |
| 2-51 | 26.05 | 0.00 | 0.00 | 0.00 | 0.00 | 0.00 | 0.00 | 100.00 | 0.03 |
| 2-52 | 25.92 | 0.00 | 0.00 | 0.00 | 0.00 | 0.00 | 0.00 | 100.00 | 0.03 |
| 2-53 | 25.94 | 0.00 | 0.00 | 0.00 | 0.00 | 0.00 | 0.00 | 100.00 | 0.03 |
| 2-54 | 26.15 | 0.00 | 0.00 | 0.00 | 0.00 | 0.00 | 0.00 | 100.00 | 0.03 |
| 2-55 | 26.12 | 0.00 | 0.00 | 0.00 | 0.00 | 0.00 | 0.00 | 100.00 | 0.03 |
| 2-56 | 25.96 | 0.00 | 0.00 | 0.00 | 0.00 | 0.00 | 0.00 | 100.00 | 0.03 |
| 2-57 | 25.42 | 0.00 | 0.00 | 0.00 | 0.00 | 0.00 | 0.00 | 100.00 | 0.03 |
| 2-58 | 25.03 | 0.00 | 0.00 | 0.00 | 0.00 | 0.00 | 0.00 | 100.00 | 0.03 |
| 2-59 | 22.63 | 1.73 | 0.00 | 0.00 | 0.00 | 0.00 | 0.00 | 100.00 | 0.03 |
| 2-60 | 29.13 | 1.68 | 0.00 | 0.00 | 0.00 | 0.00 | 0.00 | 100.00 | 0.03 |
| 2-61 | 21.75 | 1.67 | 0.00 | 0.00 | 0.00 | 0.00 | 0.00 | 100.00 | 0.03 |
| 2-62 | 28.82 | 1.67 | 0.00 | 0.00 | 0.00 | 0.00 | 0.00 | 100.00 | 0.03 |
| 2-63 | 24.99 | 0.00 | 0.00 | 0.00 | 0.00 | 2.59 | 0.00 | 100.00 | 0.03 |
| 2-64 | 25.38 | 0.00 | 0.00 | 0.00 | 0.00 | 2.53 | 0.00 | 100.00 | 0.03 |
| 2-65 | 25.35 | 0.00 | 0.00 | 0.00 | 0.00 | 5.05 | 0.00 | 100.00 | 0.03 |
| 2-66 | 23.04 | 0.00 | 0.00 | 3.39 | 0.00 | 0.00 | 0.00 | 100.00 | 0.03 |
| 2-67 | 24.86 | 1.95 | 0.00 | 0.00 | 0.00 | 0.00 | 0.00 | 100.00 | 0.03 |
| 2-68 | 22.95 | 1.97 | 0.00 | 0.00 | 0.00 | 0.00 | 0.00 | 100.00 | 0.03 |
| 2-69 | 25.25 | 1.90 | 0.00 | 0.00 | 0.00 | 0.00 | 0.00 | 100.00 | 0.03 |
| 2-70 | 23.39 | 1.92 | 0.00 | 0.00 | 0.00 | 0.00 | 0.00 | 100.00 | 0.03 |
| 2-71 | 24.92 | 0.00 | 0.00 | 0.00 | 2.88 | 0.00 | 0.00 | 100.00 | 0.03 |
| 2-72 | 25.19 | 0.00 | 0.00 | 0.00 | 0.00 | 0.00 | 1.81 | 100.00 | 0.03 |
| 2-73 | 25.31 | 0.00 | 0.00 | 0.00 | 2.80 | 0.00 | 0.00 | 100.00 | 0.03 |
| 2-74 | 25.57 | 0.00 | 0.00 | 0.00 | 0.00 | 0.00 | 1.77 | 100.00 | 0.03 |
| 2-75 | 25.32 | 0.00 | 0.00 | 0.00 | 0.00 | 0.00 | 0.00 | 100.00 | 0.03 |
| 2-76 | 25.52 | 0.00 | 0.00 | 0.00 | 0.00 | 0.00 | 0.00 | 100.00 | 0.03 |
| 2-77 | 25.62 | 0.00 | 0.00 | 0.00 | 0.00 | 0.00 | 0.00 | 100.00 | 0.03 |
| 2-78 | 25.59 | 0.00 | 0.00 | 0.00 | 0.00 | 0.00 | 1.77 | 100.00 | 0.03 |
| 2-79 | 25.22 | 0.00 | 0.00 | 0.00 | 0.00 | 0.00 | 1.77 | 100.00 | 0.03 |
| 2-80 | 25.61 | 0.00 | 0.00 | 0.00 | 0.00 | 0.00 | 1.77 | 100.00 | 0.03 |
| 2-81 | 25.05 | 0.00 | 0.00 | 0.00 | 0.00 | 0.00 | 1.77 | 100.00 | 0.03 |
| 2-82 | 25.29 | 0.00 | 0.00 | 0.00 | 0.00 | 1.02 | 0.00 | 100.00 | 0.03 |
| 2-83 | 24.94 | 0.00 | 0.00 | 0.00 | 0.00 | 1.01 | 0.00 | 100.00 | 0.03 |
| 2-84 | 25.17 | 0.00 | 0.00 | 0.00 | 0.00 | 1.01 | 0.00 | 100.00 | 0.03 |
| 2-85 | 25.52 | 0.00 | 0.00 | 0.00 | 0.00 | 1.03 | 0.00 | 100.00 | 0.03 |
| 2-86 | 25.11 | 0.00 | 0.00 | 0.00 | 0.00 | 0.00 | 0.00 | 100.00 | 0.03 |
| 2-87 | 23.18 | 0.00 | 0.00 | 0.00 | 0.00 | 0.00 | 0.00 | 100.00 | 0.03 |
| 2-88 | 22.74 | 7.39 | 0.00 | 0.00 | 0.00 | 0.00 | 0.00 | 100.00 | 0.03 |
| 2-89 | 22.52 | 7.32 | 0.00 | 0.00 | 0.00 | 0.00 | 0.00 | 100.00 | 0.03 |
| 2-90 | 22.02 | 7.16 | 0.00 | 0.00 | 0.00 | 0.00 | 0.00 | 100.00 | 0.03 |
| 2-91 | 26.14 | 7.03 | 0.00 | 0.00 | 0.00 | 0.00 | 0.00 | 100.00 | 0.03 |

TABLE 2-1(3)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 2-92 | 0 | 25.67 | 1.12 | 0 | 4.11 | 3.24 | 0.75 | 0 | 10.41 | 0 | 2.43 | 27.37 |
| 2-93 | 0 | 25.54 | 1.12 | 0 | 3.62 | 4.2 | 0.74 | 0 | 10.36 | 0 | 2.42 | 27.22 |
| 2-91 | 0 | 25.54 | 1.12 | 0 | 4.09 | 2.25 | 2.23 | 0 | 10.36 | 0 | 2.42 | 27.21 |
| 2-95 | 0 | 27.32 | 1.11 | 0 | 4.07 | 2.24 | 0.74 | 0 | 10.31 | 0 | 2.41 | 27.12 |
| 2-96 | 0 | 26.02 | 1.14 | 0 | 4.65 | 2.29 | 0.76 | 0 | 10.55 | 0 | 2.47 | 29.01 |
| 2-97 | 0 | 25.85 | 1.13 | 0 | 4.38 | 2.28 | 0.75 | 0 | 11.38 | 0 | 2.45 | 28.83 |
| 2-98 | 0 | 25.6 | 1.12 | 0 | 3.87 | 2.25 | 2.98 | 0 | 10.83 | 0 | 1.21 | 27.3 |
| 2-99 | 0 | 27.28 | 1.15 | 0 | 4.7 | 2.32 | 0.77 | 0 | 11.13 | 0 | 1.25 | 28.04 |
| 2-100 | 0 | 27.04 | 1.14 | 0 | 4.66 | 2.3 | 0.76 | 0 | 11.03 | 0 | 1.24 | 26.52 |
| 2-101 | 0 | 25.86 | 1.13 | 0 | 4.62 | 1.29 | 2.26 | 0 | 10.94 | 0 | 1.23 | 27.57 |
| 2-102 | 0 | 25.73 | 1.13 | 0 | 4.6 | 0.29 | 3.75 | 0 | 10.88 | 0 | 1.22 | 27.43 |

TABLE 2-1(3)-continued

| | | | | | | | | | | | | |
|---|---|---|---|---|---|---|---|---|---|---|---|---|
| 2-103 | 0 | 25.66 | 1.12 | 0 | 4.11 | 2.26 | 0.75 | 0 | 12.63 | 0 | 1.22 | 27.35 |
| 2-104 | 0 | 26.1 | 1.13 | 0 | 4.32 | 2.28 | 0.75 | 0 | 11.39 | 0 | 1.23 | 28.84 |
| 2-105 | 0 | 25.88 | 1.13 | 0 | 4.27 | 2.53 | 0.75 | 0 | 11.39 | 0 | 1.23 | 28.85 |
| 2-106 | 0 | 25.88 | 1.13 | 0 | 4.32 | 2.28 | 0.94 | 0 | 11.39 | 0 | 1.23 | 28.86 |
| 2-107 | 0 | 25.88 | 1.13 | 0 | 4.38 | 2.03 | 1.13 | 0 | 11.39 | 0 | 1.23 | 28.86 |
| 2-108 | 0 | 26.2 | 1.15 | 0 | 4.68 | 2.31 | 0.76 | 0 | 11.54 | 0 | 0 | 27.93 |
| 2-109 | 0 | 26.1 | 1.14 | 0 | 4.66 | 2.3 | 0.76 | 0 | 10.59 | 0 | 0 | 29.12 |
| 2-110 | 0 | 25.99 | 1.14 | 0 | 4.64 | 2.29 | 0.76 | 0 | 10.54 | 0 | 0 | 28.35 |
| 2-111 | 0 | 25.88 | 1.13 | 0 | 4.62 | 2.28 | 0.75 | 0 | 10.5 | 0 | 0 | 27.6 |
| 2-112 | 0 | 26.32 | 1.15 | 0 | 4.7 | 2.32 | 0.77 | 0 | 11.59 | 0 | 0 | 28.7 |
| 2-113 | 0 | 26.88 | 1.13 | 0 | 4.39 | 2.28 | 0.75 | 0 | 10.51 | 0 | 0 | 28.92 |
| 2-114 | 0 | 27.37 | 1.13 | 0 | 4.63 | 1.54 | 0.75 | 0 | 10.51 | 0 | 0 | 28.92 |
| 2-115 | 0 | 26.49 | 1.15 | 0 | 4.68 | 2.31 | 0.76 | 0 | 10.62 | 0 | 0 | 29.22 |
| 2-116 | 0 | 27.24 | 1.11 | 0 | 4.52 | 2.23 | 0.74 | 0 | 10.26 | 0 | 2.4 | 26.96 |
| 2-117 | 0 | 28.66 | 1.09 | 0 | 4.43 | 2.18 | 0.72 | 0 | 10.06 | 0 | 2.35 | 26.44 |
| 2-118 | 0 | 27.75 | 1.13 | 0 | 4.14 | 2.27 | 0.75 | 0 | 11.37 | 0 | 0 | 27.53 |
| 2-119 | 0 | 25.93 | 1.14 | 0 | 4.15 | 2.28 | 2.27 | 0 | 11.42 | 0 | 0 | 27.65 |
| 2-120 | 0 | 26.07 | 1.14 | 0 | 4.66 | 1.3 | 2.28 | 0 | 11.48 | 0 | 0 | 27.78 |
| 2-121 | 0 | 25.8 | 1.13 | 0 | 4.13 | 1.28 | 3.76 | 0 | 11.36 | 0 | 0 | 27.51 |
| 2-122 | 0 | 27.61 | 1.13 | 0 | 4.59 | 2.26 | 0.75 | 0 | 11.32 | 0 | 0 | 27.4 |
| 2-123 | 0 | 26.55 | 1.16 | 0 | 4.74 | 2.34 | 0.77 | 0 | 11.69 | 0 | 0 | 26.99 |
| 2-124 | 0 | 26.78 | 1.17 | 0 | 4.79 | 2.36 | 0.78 | 0 | 11.79 | 0 | 0 | 28.55 |
| 2-125 | 0 | 26.81 | 1.13 | 0 | 4.14 | 2.27 | 0.75 | 0 | 12.27 | 0 | 0 | 27.56 |
| 2-126 | 0 | 26.12 | 1.71 | 0 | 4.43 | 2.3 | 0.76 | 0 | 11.5 | 0 | 0 | 27.84 |
| 2-127 | 0 | 26.2 | 1.71 | 0 | 4.44 | 2.31 | 0.76 | 0 | 11.54 | 0 | 0 | 27.94 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 2-92 | 24.9 | 0 | 0 | 0 | 0 | 0 | 0 | 100 | 0.03 |
| 2-93 | 24.78 | 0 | 0 | 0 | 0 | 0 | 0 | 100 | 0.03 |
| 2-91 | 24.78 | 0 | 0 | 0 | 0 | 0 | 0 | 100 | 0.03 |
| 2-95 | 24.68 | 0 | 0 | 0 | 0 | 0 | 0 | 100 | 0.03 |
| 2-96 | 23.11 | 0 | 0 | 0 | 0 | 0 | 0 | 100 | 0.03 |
| 2-97 | 22.95 | 0 | 0 | 0 | 0 | 0 | 0 | 100 | 0.03 |
| 2-98 | 24.84 | 0 | 0 | 0 | 0 | 0 | 0 | 100 | 0.03 |
| 2-99 | 23.36 | 0 | 0 | 0 | 0 | 0 | 0 | 100 | 0.03 |
| 2-100 | 25.31 | 0 | 0 | 0 | 0 | 0 | 0 | 100 | 0.03 |
| 2-101 | 25.1 | 0 | 0 | 0 | 0 | 0 | 0 | 100 | 0.03 |
| 2-102 | 24.97 | 0 | 0 | 0 | 0 | 0 | 0 | 100 | 0.03 |
| 2-103 | 24.9 | 0 | 0 | 0 | 0 | 0 | 0 | 100 | 0.03 |
| 2-104 | 22.97 | 0.99 | 0 | 0 | 0 | 0 | 0 | 100 | 0.03 |
| 2-105 | 22.98 | 0.99 | 0 | 0 | 0 | 0 | 0 | 100 | 0.03 |
| 2-106 | 22.98 | 0.99 | 0 | 0 | 0 | 0 | 0 | 100 | 0.03 |
| 2-107 | 22.98 | 0.99 | 0 | 0 | 0 | 0 | 0 | 100 | 0.03 |
| 2-108 | 25.43 | 0 | 0 | 0 | 0 | 0 | 0 | 100 | 0.03 |
| 2-109 | 25.33 | 0 | 0 | 0 | 0 | 0 | 0 | 100 | 0.03 |
| 2-110 | 26.29 | 0 | 0 | 0 | 0 | 0 | 0 | 100 | 0.03 |
| 2-111 | 27.24 | 0 | 0 | 0 | 0 | 0 | 0 | 100 | 0.03 |
| 2-112 | 24.45 | 0 | 0 | 0 | 0 | 0 | 0 | 100 | 0.03 |
| 2-113 | 25.14 | 0 | 0 | 0 | 0 | 0 | 0 | 100 | 0.03 |
| 2-114 | 25.15 | 0 | 0 | 0 | 0 | 0 | 0 | 100 | 0.03 |
| 2-115 | 24.77 | 0 | 0 | 0 | 0 | 0 | 0 | 100 | 0.03 |
| 2-116 | 24.54 | 0 | 0 | 0 | 0 | 0 | 0 | 100 | 0.03 |
| 2-117 | 24.07 | 0 | 0 | 0 | 0 | 0 | 0 | 100 | 0.03 |
| 2-118 | 25.06 | 0 | 0 | 0 | 0 | 0 | 0 | 100 | 0.03 |
| 2-119 | 25.16 | 0 | 0 | 0 | 0 | 0 | 0 | 100 | 0.03 |
| 2-120 | 25.29 | 0 | 0 | 0 | 0 | 0 | 0 | 100 | 0.03 |
| 2-121 | 25.03 | 0 | 0 | 0 | 0 | 0 | 0 | 100 | 0.03 |
| 2-122 | 24.94 | 0 | 0 | 0 | 0 | 0 | 0 | 100 | 0.03 |
| 2-123 | 25.76 | 0 | 0 | 0 | 0 | 0 | 0 | 100 | 0.03 |
| 2-124 | 23.78 | 0 | 0 | 0 | 0 | 0 | 0 | 100 | 0.03 |
| 2-125 | 25.07 | 0 | 0 | 0 | 0 | 0 | 0 | 100 | 0.03 |
| 2-126 | 25.34 | 0 | 0 | 0 | 0 | 0 | 0 | 100 | 0.03 |
| 2-127 | 23.27 | 0 | 0 | 0 | 0 | 0 | 1.83 | 100 | 0.03 |

TABLE 2-1(4)

| | Glass composition (% by mass) | | | | | | | | | | | |
|---|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO | $TiO_2$ |
| 2-128 | 0 | 26.24 | 1.15 | 0 | 4.69 | 2.31 | 0.76 | 0 | 11.55 | 0 | 0 | 27.99 |
| 2-129 | 0 | 25.99 | 1.6 | 0 | 4.7 | 2.31 | 0.77 | 0 | 11.11 | 0 | 0 | 28.02 |
| 2-130 | 0 | 26.72 | 1.17 | 0 | 4.78 | 2.35 | 0.78 | 0 | 11.76 | 0 | 0 | 26.51 |
| 2-131 | 0 | 26.84 | 1.18 | 0 | 4.8 | 2.36 | 0.78 | 0 | 11.82 | 0 | 0 | 27.28 |

TABLE 2-1(4)-continued

| | | | | | | | | | | | | |
|---|---|---|---|---|---|---|---|---|---|---|---|---|
| 2-132 | 0 | 26.96 | 1.18 | 0 | 4.82 | 2.37 | 0.78 | 0 | 11.87 | 0 | 0 | 28.08 |
| 2-133 | 0 | 27.08 | 1.19 | 0 | 4.84 | 2.38 | 0.79 | 0 | 11.92 | 0 | 0 | 28.86 |
| 2-134 | 0 | 26.14 | 1.14 | 0 | 4.91 | 2.3 | 0.76 | 0 | 11.51 | 0 | 0 | 27.88 |
| 2-135 | 0 | 26.07 | 1.14 | 0 | 4.66 | 2.79 | 0.76 | 0 | 11.48 | 0 | 0 | 27.8 |
| 2-136 | 0 | 26.01 | 1.14 | 0 | 4.65 | 2.29 | 1.51 | 0 | 11.45 | 0 | 0 | 27.72 |
| 2-137 | 0 | 25.97 | 1.14 | 0 | 4.64 | 2.29 | 0.76 | 0 | 12.33 | 0 | 0 | 27.67 |
| 2-138 | 0 | 25.58 | 1.12 | 0 | 4.57 | 2.25 | 0.74 | 0 | 10.37 | 0 | 2.42 | 26.02 |
| 2-139 | 0 | 25.37 | 1.11 | 0 | 4.53 | 2.23 | 0.74 | 0 | 10.29 | 0 | 2.4 | 24.54 |
| 2-140 | 0 | 25.63 | 1.12 | 0 | 4.34 | 2.26 | 0.75 | 0 | 11.28 | 0 | 2.43 | 27.32 |
| 2-141 | 0 | 25.44 | 1.11 | 0 | 4.31 | 2.24 | 0.74 | 0 | 10.32 | 1.63 | 2.41 | 27.12 |
| 2-142 | 0 | 25.53 | 1.12 | 0 | 4.33 | 2.25 | 0.74 | 0 | 10.35 | 0 | 2.42 | 27.21 |
| 2-143 | 0 | 25.36 | 1.11 | 0 | 4.3 | 2.23 | 0.74 | 0 | 10.29 | 0 | 2.4 | 27.03 |
| 2-144 | 0 | 24.85 | 1.13 | 0 | 4.61 | 2.27 | 0.75 | 0 | 11.36 | 0 | 2.45 | 27.53 |
| 2-145 | 0 | 24.67 | 1.12 | 0 | 4.58 | 2.26 | 0.75 | 0 | 10.39 | 1.64 | 2.43 | 27.3 |
| 2-146 | 0 | 25.71 | 0.57 | 0 | 4.59 | 2.26 | 0.75 | 0 | 11.32 | 0 | 2.44 | 27.41 |
| 2-147 | 0 | 25.52 | 0.57 | 0 | 4.56 | 2.25 | 0.74 | 0 | 10.35 | 1.63 | 2.42 | 27.2 |
| 2-148 | 0 | 25.65 | 1.13 | 0 | 4.62 | 2.28 | 0.75 | 0 | 10.48 | 0 | 2.45 | 27.56 |
| 2-149 | 0 | 25.72 | 1.13 | 0 | 4.6 | 2.27 | 0.75 | 0 | 10.44 | 0 | 2.44 | 27.68 |
| 2-150 | 0 | 25.69 | 1.13 | 0 | 4.61 | 2.27 | 0.75 | 0 | 10.46 | 0 | 2.44 | 27.63 |
| 2-151 | 0 | 25.76 | 1.13 | 0 | 4.57 | 2.27 | 0.75 | 0 | 10.45 | 0 | 2.44 | 27.64 |
| 2-152 | 0 | 25.94 | 1.13 | 0 | 4.6 | 2.27 | 0.75 | 0 | 10.44 | 0 | 2.44 | 27.45 |
| 2-153 | 0 | 25.51 | 1.13 | 0 | 4.63 | 2.28 | 0.75 | 0 | 10.5 | 0 | 2.45 | 27.62 |
| 2-154 | 0 | 25.9 | 1.13 | 0 | 4.61 | 2.27 | 0.75 | 0 | 10.47 | 0 | 2.45 | 27.38 |
| 2-155 | 0 | 25.59 | 1.13 | 0 | 4.61 | 2.27 | 0.75 | 0 | 10.46 | 0 | 2.44 | 27.74 |
| 2-156 | 0 | 24.94 | 1.09 | 0 | 3.77 | 2.2 | 0.73 | 1.24 | 10.11 | 0 | 4.73 | 25.97 |
| 2-157 | 0 | 24.82 | 1.09 | 0 | 3.75 | 2.18 | 0.72 | 0 | 11.79 | 0 | 4.71 | 25.84 |
| 2-158 | 0 | 24.46 | 1.07 | 0 | 3.69 | 2.15 | 0.71 | 0 | 9.92 | 3.13 | 4.64 | 25.49 |
| 2-159 | 0 | 24.61 | 1.08 | 0 | 3.94 | 2.17 | 0.72 | 0 | 9.98 | 0 | 7 | 25.62 |
| 2-160 | 0 | 23.82 | 1.04 | 0 | 3.16 | 2.1 | 0.69 | 0 | 9.66 | 6.1 | 4.52 | 24.82 |
| 2-161 | 0 | 23.96 | 1.05 | 0 | 3.4 | 2.11 | 0.7 | 0 | 9.72 | 3.07 | 6.81 | 24.95 |
| 2-162 | 0 | 24.1 | 1.06 | 0 | 3.64 | 2.12 | 0.7 | 0 | 9.77 | 0 | 9.14 | 25.1 |
| 2-163 | 0 | 24.79 | 1.09 | 0 | 4.2 | 2.18 | 0.72 | 0 | 10.05 | 0 | 4.7 | 25.82 |

| | Glass composition (% by mass) | | | | | | | | |
|---|---|---|---|---|---|---|---|---|---|
| No. | $Nb_2O_5$ | $ZrO_2$ | ZnO | $Ta_2O_5$ | $Gd_2O_3$ | $La_2O_3$ | $Y_2O_3$ | Total | $Sb_2O_3$ |
| 2-128 | 23.31 | 2 | 0 | 0 | 0 | 0 | 0 | 100 | 0.03 |
| 2-129 | 25.5 | 0 | 0 | 0 | 0 | 0 | 0 | 100 | 0 |
| 2-130 | 25.93 | 0 | 0 | 0 | 0 | 0 | 0 | 100 | 0 |
| 2-131 | 24.94 | 0 | 0 | 0 | 0 | 0 | 0 | 100 | 0 |
| 2-132 | 23.94 | 0 | 0 | 0 | 0 | 0 | 0 | 100 | 0 |
| 2-133 | 22.94 | 0 | 0 | 0 | 0 | 0 | 0 | 100 | 0 |
| 2-134 | 25.36 | 0 | 0 | 0 | 0 | 0 | 0 | 100 | 0 |
| 2-135 | 25.3 | 0 | 0 | 0 | 0 | 0 | 0 | 100 | 0 |
| 2-136 | 25.23 | 0 | 0 | 0 | 0 | 0 | 0 | 100 | 0 |
| 2-137 | 25.2 | 0 | 0 | 0 | 0 | 0 | 0 | 100 | 0 |
| 2-138 | 26.93 | 0 | 0 | 0 | 0 | 0 | 0 | 100 | 0.03 |
| 2-139 | 28.79 | 0 | 0 | 0 | 0 | 0 | 0 | 100 | 0.03 |
| 2-140 | 24.87 | 0 | 0 | 0 | 0 | 0 | 0 | 100 | 0.03 |
| 2-141 | 24.68 | 0 | 0 | 0 | 0 | 0 | 0 | 100 | 0.03 |
| 2-142 | 24.77 | 0 | 1.28 | 0 | 0 | 0 | 0 | 100 | 0.03 |
| 2-143 | 24.61 | 1.93 | 0 | 0 | 0 | 0 | 0 | 100 | 0.03 |
| 2-144 | 25.05 | 0 | 0 | 0 | 0 | 0 | 0 | 100 | 0.03 |
| 2-145 | 24.86 | 0 | 0 | 0 | 0 | 0 | 0 | 100 | 0.03 |
| 2-146 | 24.95 | 0 | 0 | 0 | 0 | 0 | 0 | 100 | 0.03 |
| 2-147 | 24.76 | 0 | 0 | 0 | 0 | 0 | 0 | 100 | 0.03 |
| 2-148 | 25.08 | 0 | 0 | 0 | 0 | 0 | 0 | 100 | 0.03 |
| 2-149 | 24.97 | 0 | 0 | 0 | 0 | 0 | 0 | 100 | 0.03 |
| 2-150 | 25.02 | 0 | 0 | 0 | 0 | 0 | 0 | 100 | 0.03 |
| 2-151 | 24.99 | 0 | 0 | 0 | 0 | 0 | 0 | 100 | 0.03 |
| 2-152 | 24.98 | 0 | 0 | 0 | 0 | 0 | 0 | 100 | 0.03 |
| 2-153 | 25.13 | 0 | 0 | 0 | 0 | 0 | 0 | 100 | 0.03 |
| 2-154 | 25.04 | 0 | 0 | 0 | 0 | 0 | 0 | 100 | 0.03 |
| 2-155 | 25.01 | 0 | 0 | 0 | 0 | 0 | 0 | 100 | 0.03 |
| 2-156 | 25.22 | 0 | 0 | 0 | 0 | 0 | 0 | 100 | 0.03 |
| 2-157 | 25.1 | 0 | 0 | 0 | 0 | 0 | 0 | 100 | 0.03 |
| 2-158 | 24.74 | 0 | 0 | 0 | 0 | 0 | 0 | 100 | 0.03 |
| 2-159 | 24.88 | 0 | 0 | 0 | 0 | 0 | 0 | 100 | 0.03 |
| 2-160 | 24.09 | 0 | 0 | 0 | 0 | 0 | 0 | 100 | 0.03 |
| 2-161 | 24.23 | 0 | 0 | 0 | 0 | 0 | 0 | 100 | 0.03 |
| 2-162 | 24.37 | 0 | 0 | 0 | 0 | 0 | 0 | 100 | 0.03 |
| 2-163 | 18.96 | 0 | 0 | 0 | 0 | 7.49 | 0 | 100 | 0.03 |

TABLE 2-2(1)

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-1 | 5.58 | 0.00 | 49.93 | 0.53 | 0.55 |
| 2-2 | 6.44 | 0.00 | 49.47 | 0.53 | 0.34 |
| 2-3 | 4.65 | 0.00 | 49.22 | 0.53 | 0.47 |
| 2-4 | 4.61 | 0.00 | 48.78 | 0.53 | 0.47 |
| 2-5 | 7.75 | 0.00 | 52.00 | 0.57 | 0.64 |
| 2-6 | 7.36 | 0.00 | 55.19 | 0.53 | 0.63 |
| 2-7 | 7.07 | 0.00 | 54.81 | 0.53 | 0.61 |
| 2-8 | 7.77 | 0.00 | 54.07 | 0.51 | 0.64 |
| 2-9 | 7.84 | 0.00 | 54.50 | 0.51 | 0.64 |
| 2-10 | 7.91 | 0.00 | 53.25 | 0.57 | 0.64 |
| 2-11 | 7.98 | 0.00 | 53.69 | 0.57 | 0.64 |
| 2-12 | 7.96 | 0.00 | 50.94 | 0.55 | 0.64 |
| 2-13 | 7.98 | 0.00 | 51.10 | 0.55 | 0.64 |
| 2-14 | 8.59 | 0.00 | 51.71 | 0.55 | 0.66 |
| 2-15 | 7.98 | 0.00 | 51.00 | 0.55 | 0.64 |
| 2-16 | 9.08 | 0.00 | 51.44 | 0.55 | 0.56 |
| 2-17 | 8.10 | 0.00 | 50.06 | 0.63 | 0.64 |
| 2-18 | 8.57 | 0.00 | 51.65 | 0.55 | 0.66 |
| 2-19 | 8.60 | 0.00 | 49.78 | 0.63 | 0.54 |
| 2-20 | 8.26 | 0.00 | 49.14 | 0.70 | 0.64 |
| 2-21 | 7.73 | 0.00 | 56.37 | 0.53 | 0.64 |
| 2-22 | 7.15 | 0.00 | 55.56 | 0.53 | 0.61 |
| 2-23 | 6.58 | 0.00 | 54.84 | 0.53 | 0.59 |
| 2-24 | 8.38 | 0.00 | 54.87 | 0.51 | 0.66 |
| 2-25 | 9.61 | 0.00 | 55.14 | 0.53 | 0.40 |
| 2-26 | 8.80 | 0.00 | 56.84 | 0.53 | 0.56 |
| 2-27 | 7.42 | 0.00 | 53.29 | 0.51 | 0.63 |
| 2-28 | 7.36 | 0.00 | 52.87 | 0.51 | 0.63 |
| 2-29 | 7.39 | 0.00 | 53.13 | 0.51 | 0.63 |
| 2-30 | 7.63 | 0.00 | 54.85 | 0.44 | 0.64 |
| 2-31 | 9.52 | 0.00 | 53.03 | 0.51 | 0.41 |
| 2-32 | 10.27 | 0.00 | 52.60 | 0.51 | 0.30 |
| 2-33 | 10.99 | 0.00 | 52.18 | 0.51 | 0.21 |
| 2-34 | 7.51 | 0.00 | 55.60 | 0.39 | 0.64 |
| 2-35 | 7.39 | 0.00 | 56.32 | 0.33 | 0.64 |
| 2-36 | 8.76 | 0.00 | 53.48 | 0.51 | 0.53 |
| 2-37 | 7.99 | 0.00 | 53.93 | 0.51 | 0.69 |
| 2-38 | 7.46 | 0.00 | 53.57 | 0.51 | 0.62 |
| 2-39 | 7.49 | 0.00 | 53.73 | 0.51 | 0.62 |
| 2-40 | 7.39 | 0.00 | 53.07 | 0.51 | 0.63 |
| 2-41 | 6.97 | 0.00 | 51.73 | 0.51 | 0.61 |
| 2-42 | 6.59 | 0.00 | 50.65 | 0.51 | 0.60 |
| 2-43 | 7.38 | 0.00 | 52.32 | 0.50 | 0.62 |
| 2-44 | 7.41 | 0.00 | 52.10 | 0.52 | 0.62 |
| 2-45 | 7.44 | 0.00 | 53.11 | 0.51 | 0.63 |
| 2-46 | 7.84 | 0.00 | 52.60 | 0.51 | 0.55 |

TABLE 2-2(2)

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-47 | 7.60 | 0.00 | 52.74 | 0.51 | 0.60 |
| 2-48 | 7.34 | 0.00 | 52.73 | 0.51 | 0.63 |
| 2-49 | 7.41 | 0.00 | 52.57 | 0.50 | 0.62 |
| 2-50 | 7.44 | 0.00 | 52.37 | 0.52 | 0.63 |
| 2-51 | 7.36 | 0.00 | 52.87 | 0.51 | 0.66 |
| 2-52 | 7.83 | 0.00 | 52.61 | 0.51 | 0.58 |
| 2-53 | 7.33 | 0.00 | 52.66 | 0.51 | 0.62 |
| 2-54 | 7.39 | 0.00 | 53.08 | 0.51 | 0.63 |
| 2-55 | 7.63 | 0.00 | 53.02 | 0.51 | 0.64 |
| 2-56 | 7.34 | 0.00 | 52.69 | 0.51 | 0.63 |
| 2-57 | 7.20 | 0.00 | 51.60 | 0.51 | 0.59 |
| 2-58 | 7.63 | 0.00 | 52.53 | 0.52 | 0.60 |
| 2-59 | 4.55 | 0.00 | 52.57 | 0.57 | 0.47 |
| 2-60 | 4.42 | 0.00 | 53.91 | 0.46 | 0.47 |
| 2-61 | 3.13 | 0.00 | 54.76 | 0.60 | 0.79 |

TABLE 2-2(2)-continued

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-62 | 4.38 | 0.00 | 57.59 | 0.50 | 0.47 |
| 2-63 | 7.62 | 0.00 | 52.45 | 0.52 | 0.60 |
| 2-64 | 7.19 | 0.00 | 51.52 | 0.51 | 0.59 |
| 2-65 | 7.19 | 0.00 | 51.44 | 0.51 | 0.59 |
| 2-66 | 7.10 | 0.00 | 48.86 | 0.53 | 0.59 |
| 2-67 | 7.59 | 0.00 | 50.90 | 0.51 | 0.60 |
| 2-68 | 7.64 | 0.00 | 50.49 | 0.55 | 0.60 |
| 2-69 | 7.16 | 0.00 | 50.02 | 0.50 | 0.59 |
| 2-70 | 7.22 | 0.00 | 49.61 | 0.53 | 0.59 |
| 2-71 | 7.60 | 2.88 | 52.30 | 0.52 | 0.60 |
| 2-72 | 7.69 | 1.81 | 52.87 | 0.52 | 0.60 |
| 2-73 | 7.17 | 2.80 | 51.38 | 0.51 | 0.59 |
| 2-74 | 7.26 | 1.77 | 51.90 | 0.51 | 0.59 |
| 2-75 | 7.17 | 0.00 | 51.40 | 0.51 | 0.59 |
| 2-76 | 7.23 | 0.00 | 51.81 | 0.51 | 0.59 |
| 2-77 | 7.26 | 0.00 | 52.01 | 0.51 | 0.59 |
| 2-78 | 7.26 | 1.77 | 51.69 | 0.50 | 0.59 |
| 2-79 | 7.27 | 1.77 | 51.63 | 0.51 | 0.59 |
| 2-80 | 7.26 | 1.77 | 51.61 | 0.50 | 0.59 |
| 2-81 | 7.27 | 1.77 | 51.49 | 0.51 | 0.59 |
| 2-82 | 7.33 | 0.00 | 51.83 | 0.51 | 0.59 |
| 2-83 | 6.77 | 0.00 | 51.12 | 0.51 | 0.57 |
| 2-84 | 7.78 | 0.00 | 51.60 | 0.51 | 0.50 |
| 2-85 | 8.37 | 0.00 | 52.32 | 0.51 | 0.53 |
| 2-86 | 7.65 | 0.00 | 51.42 | 0.51 | 0.60 |
| 2-87 | 7.72 | 0.00 | 51.01 | 0.55 | 0.60 |
| 2-88 | 1.55 | 0.00 | 50.15 | 0.55 | 1.00 |
| 2-89 | 1.18 | 0.00 | 49.66 | 0.55 | 1.00 |
| 2-90 | 0.63 | 0.00 | 51.31 | 0.57 | 1.00 |
| 2-91 | 0.62 | 0.00 | 52.18 | 0.50 | 1.00 |

TABLE 2-2(3)

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-92 | 8.1 | 0 | 52.27 | 0.52362732 | 0.507407407 |
| 2-93 | 8.56 | 0 | 52 | 0.523461538 | 0.422897196 |
| 2-94 | 8.57 | 0 | 51.99 | 0.523369879 | 0.477246208 |
| 2-95 | 7.05 | 0 | 51.8 | 0.523552124 | 0.577304965 |
| 2-96 | 7.7 | 0 | 52.12 | 0.556600153 | 0.603896104 |
| 2-97 | 7.41 | 0 | 51.78 | 0.556778679 | 0.591093117 |
| 2-98 | 9.1 | 0 | 52.14 | 0.523590334 | 0.425274725 |
| 2-99 | 7.79 | 0 | 51.4 | 0.545525292 | 0.603337612 |
| 2-100 | 7.72 | 0 | 51.83 | 0.511672776 | 0.603626943 |
| 2-101 | 8.17 | 0 | 52.67 | 0.523447883 | 0.565483476 |
| 2-102 | 8.64 | 0 | 52.4 | 0.523473282 | 0.532407407 |
| 2-103 | 7.12 | 0 | 52.25 | 0.523444976 | 0.577247191 |
| 2-104 | 7.35 | 0 | 51.81 | 0.556649296 | 0.587755102 |
| 2-105 | 7.55 | 0 | 51.83 | 0.556627436 | 0.565562914 |
| 2-106 | 7.54 | 0 | 51.84 | 0.556712963 | 0.572944297 |
| 2-107 | 7.54 | 0 | 51.84 | 0.556712963 | 0.580901857 |
| 2-108 | 7.75 | 0 | 53.36 | 0.523425787 | 0.603870968 |
| 2-109 | 7.72 | 0 | 54.45 | 0.534802571 | 0.603626943 |
| 2-110 | 7.69 | 0 | 54.64 | 0.518850659 | 0.603381014 |
| 2-111 | 7.65 | 0 | 54.84 | 0.503282276 | 0.603921569 |
| 2-112 | 7.79 | 0 | 53.15 | 0.539981185 | 0.603337612 |
| 2-113 | 7.42 | 0 | 54.06 | 0.534961154 | 0.591644205 |
| 2-114 | 6.92 | 0 | 54.07 | 0.534862216 | 0.669075145 |
| 2-115 | 7.75 | 0 | 53.99 | 0.541211335 | 0.603870968 |
| 2-116 | 7.49 | 0 | 51.5 | 0.523495146 | 0.603471295 |
| 2-117 | 7.33 | 0 | 50.51 | 0.523460701 | 0.604365621 |
| 2-118 | 7.16 | 0 | 52.59 | 0.523483552 | 0.578212291 |
| 2-119 | 8.7 | 0 | 52.81 | 0.52357508 | 0.477011494 |
| 2-120 | 8.24 | 0 | 53.07 | 0.523459582 | 0.565533981 |
| 2-121 | 9.17 | 0 | 52.54 | 0.523601066 | 0.450381679 |
| 2-122 | 7.6 | 0 | 52.34 | 0.523500191 | 0.603947368 |

TABLE 2-2(3)-continued

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-123 | 7.85 | 0 | 52.75 | 0.511658768 | 0.603821656 |
| 2-124 | 7.93 | 0 | 52.33 | 0.545576151 | 0.604035309 |
| 2-125 | 7.16 | 0 | 52.63 | 0.52365571 | 0.578212291 |
| 2-126 | 7.49 | 0 | 53.18 | 0.523505077 | 0.591455274 |
| 2-127 | 7.51 | 1.83 | 51.21 | 0.545596563 | 0.591211718 |

TABLE 2-2(4)

| No. | Glass composition (% by mass) $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ | $Li_2O/(Li_2O + Na_2O + K_2O + Cs_2O)$ |
|---|---|---|---|---|---|
| 2-128 | 7.76 | 0 | 51.3 | 0.545614035 | 0.604381443 |
| 2-129 | 7.78 | 0 | 53.52 | 0.523542601 | 0.604113111 |
| 2-130 | 7.91 | 0 | 52.44 | 0.50553013 | 0.604298357 |
| 2-131 | 7.94 | 0 | 52.22 | 0.522405209 | 0.604534005 |
| 2-132 | 7.97 | 0 | 52.02 | 0.539792388 | 0.60476788 |
| 2-133 | 8.01 | 0 | 51.8 | 0.557142857 | 0.604244694 |
| 2-134 | 7.97 | 0 | 53.24 | 0.523666416 | 0.616060226 |
| 2-135 | 8.21 | 0 | 53.1 | 0.52354049 | 0.567600487 |
| 2-136 | 8.45 | 0 | 52.95 | 0.523512748 | 0.550295858 |
| 2-137 | 7.69 | 0 | 52.87 | 0.523359183 | 0.603381014 |
| 2-138 | 7.56 | 0 | 52.95 | 0.491406988 | 0.604497354 |
| 2-139 | 7.5 | 0 | 53.33 | 0.46015376 | 0.604 |
| 2-140 | 7.35 | 0 | 52.19 | 0.523471929 | 0.59047619 |
| 2-141 | 7.29 | 0 | 51.8 | 0.523552124 | 0.59122085 |
| 2-142 | 7.32 | 0 | 51.98 | 0.523470566 | 0.591530055 |
| 2-143 | 7.27 | 0 | 51.64 | 0.523431448 | 0.591471802 |
| 2-144 | 7.63 | 0 | 52.58 | 0.523583111 | 0.604193971 |
| 2-145 | 7.59 | 0 | 52.16 | 0.523389571 | 0.60342556 |
| 2-146 | 7.6 | 0 | 52.36 | 0.523491215 | 0.603947368 |
| 2-147 | 7.55 | 0 | 51.96 | 0.5234796 | 0.60397351 |
| 2-148 | 7.65 | 0 | 52.64 | 0.523556231 | 0.603921569 |
| 2-149 | 7.62 | 0 | 52.65 | 0.525735992 | 0.603674541 |
| 2-150 | 7.63 | 0 | 52.65 | 0.524786325 | 0.604193971 |
| 2-151 | 7.59 | 0 | 52.63 | 0.525175755 | 0.602108037 |
| 2-152 | 7.62 | 0 | 52.43 | 0.523555216 | 0.603674541 |
| 2-153 | 7.66 | 0 | 52.75 | 0.523601896 | 0.604438642 |
| 2-154 | 7.63 | 0 | 52.42 | 0.522319725 | 0.604193971 |
| 2-155 | 7.63 | 0 | 52.75 | 0.525876777 | 0.604193971 |
| 2-156 | 6.7 | 0 | 51.19 | 0.50732565 | 0.562686567 |
| 2-157 | 6.65 | 0 | 50.94 | 0.507263447 | 0.563909774 |
| 2-158 | 6.55 | 0 | 50.23 | 0.507465658 | 0.563358779 |
| 2-159 | 6.83 | 0 | 50.5 | 0.507326733 | 0.576866764 |
| 2-160 | 5.95 | 0 | 48.91 | 0.507462687 | 0.531092437 |
| 2-161 | 6.21 | 0 | 49.18 | 0.507320049 | 0.547504026 |
| 2-162 | 6.46 | 0 | 49.47 | 0.507378209 | 0.563467492 |
| 2-163 | 7.10 | 7.49 | 44.78 | 0.576596695 | 0.591549296 |

TABLE 2-3(1)

| No. | Glass properties nd | νd | Specific weight | Tg (° C.) | λ80 (nm) | λ70 (nm) | λ5 (nm) |
|---|---|---|---|---|---|---|---|
| 2-1 | 1.92564 | 23.09 | 3.639 | 605 | 556 | 460 | 376 |
| 2-2 | 1.91696 | 23.17 | 3.631 | 607 | 541 | 454 | 374 |
| 2-3 | 1.92371 | 23.31 | 3.656 | 615 | 572 | 467 | 377 |
| 2-4 | 1.92372 | 23.50 | 3.659 | 623 | 552 | 453 | 374 |
| 2-5 | 1.91272 | 23.06 | 3.418 | 583 | 548 | 456 | 374 |
| 2-6 | 1.92316 | 22.52 | 3.441 | 583 | 556 | 461 | 377 |
| 2-7 | 1.92293 | 22.63 | 3.449 | | 541 | 455 | 376 |
| 2-8 | 1.90059 | 23.31 | 3.364 | 582 | 666 | 459 | 374 |
| 2-9 | 1.90590 | 22.97 | 3.372 | 571 | N/A | 478 | 374 |

TABLE 2-3(1)-continued

| No. | Glass properties nd | νd | Specific weight | Tg (° C.) | λ80 (nm) | λ70 (nm) | λ5 (nm) |
|---|---|---|---|---|---|---|---|
| 2-10 | 1.90099 | 23.01 | 3.333 | | 693 | 460 | 374 |
| 2-11 | 1.90643 | 22.88 | 3.341 | | N/A | 500 | 375 |
| 2-12 | 1.87843 | 23.92 | 3.298 | 581 | 544 | 443 | 372 |
| 2-13 | 1.87702 | 23.79 | 3.295 | 575 | N/A | 461 | 373 |
| 2-14 | 1.88584 | 23.83 | 3.313 | 573 | 514 | 438 | 371 |
| 2-15 | 1.88581 | 24.02 | 3.329 | 582 | 528 | 439 | 371 |
| 2-16 | 1.88185 | 23.84 | 3.311 | | 508 | 437 | 370 |
| 2-17 | 1.87894 | 23.70 | 3.266 | 582 | 526 | 443 | 372 |
| 2-18 | 1.87815 | 23.64 | 3.281 | | 514 | 442 | 372 |

TABLE 2-3(1)-continued

| No. | Glass properties nd | νd | Specific weight | Tg (° C.) | λ80 (nm) | λ70 (nm) | λ5 (nm) |
|---|---|---|---|---|---|---|---|
| 2-19 | 1.87486 | 23.77 | 3.262 | | 505 | 437 | 372 |
| 2-20 | 1.87931 | 23.56 | 3.232 | | 650 | 452 | 374 |
| 2-21 | 1.93027 | 22.53 | 3.429 | 580 | 562 | 473 | 379 |
| 2-22 | 1.92297 | 21.40 | 3.415 | 587 | 573 | 475 | 380 |
| 2-23 | 1.92238 | 22.77 | 3.429 | 594 | 564 | 471 | 379 |
| 2-24 | 1.90832 | 23.09 | 3.381 | 572 | 555 | 465 | 376 |
| 2-25 | 1.90598 | 22.63 | 3.372 | 578 | 563 | 471 | 378 |
| 2-26 | 1.92643 | 22.32 | 3.413 | 572 | 590 | 480 | 380 |
| 2-27 | 1.90072 | 23.33 | 3.393 | 580 | 560 | 469 | 377 |
| 2-28 | 1.90098 | 23.35 | 3.413 | 585 | 569 | 468 | 376 |
| 2-29 | 1.90423 | 23.18 | 3.392 | 585 | 570 | 470 | 377 |
| 2-30 | 1.90037 | 23.40 | 3.397 | 580 | 568 | 466 | 375 |
| 2-31 | 1.88576 | 23.40 | 3.343 | 578 | 553 | 465 | 375 |
| 2-32 | 1.87933 | 23.47 | 3.341 | | 548 | 463 | 375 |
| 2-33 | 1.87258 | 23.57 | 3.336 | | 549 | 461 | 374 |
| 2-34 | 1.89768 | 23.50 | 3.429 | | 554 | 461 | 374 |
| 2-35 | 1.89943 | 23.74 | 3.458 | | 559 | 461 | 373 |
| 2-36 | 1.89182 | 22.03 | 3.345 | | 556 | 466 | 377 |
| 2-37 | 1.89719 | 23.33 | 3.345 | | 564 | 469 | 377 |
| 2-38 | 1.89548 | 23.20 | 3.352 | | 569 | 468 | 377 |
| 2-39 | 1.89641 | 23.24 | 3.356 | | 549 | 464 | 377 |
| 2-40 | 1.90091 | 23.33 | 3.404 | 584 | 545 | 462 | 376 |
| 2-41 | 1.90124 | 23.49 | 3.457 | 586 | 565 | 469 | 377 |
| 2-42 | 1.90126 | 23.64 | 3.504 | 590 | 562 | 466 | 376 |
| 2-43 | 1.89547 | 23.57 | 3.406 | 586 | 561 | 464 | 375 |
| 2-44 | 1.89561 | 23.51 | 3.398 | 582 | 551 | 461 | 375 |
| 2-45 | 1.90107 | 23.33 | 3.402 | 581 | 551 | 465 | 376 |
| 2-46 | 1.89703 | 23.40 | 3.405 | 580 | 565 | 469 | 377 |

TABLE 2-3(2)

| No. | Glass properties nd | νd | Specific weight | Tg (° C.) | λ80 (nm) | λ70 (nm) | λ5 (nm) |
|---|---|---|---|---|---|---|---|
| 2-47 | 1.89909 | 23.40 | 3.406 | 581 | 566 | 468 | 376 |
| 2-48 | 1.89968 | 23.36 | 3.408 | 582 | 569 | 466 | 376 |
| 2-49 | 1.8991 | 23.43 | 3.380 | 584 | 626 | 474 | 376 |
| 2-50 | 1.89915 | 23.42 | 3.375 | 586 | 579 | 468 | 376 |

TABLE 2-3(2)-continued

| No. | Glass properties nd | νd | Specific weight | Tg (° C.) | λ80 (nm) | λ70 (nm) | λ5 (nm) |
|---|---|---|---|---|---|---|---|
| 2-51 | 1.90093 | 23.39 | 3.407 | 583 | 570 | 470 | 376 |
| 2-52 | 1.89667 | 23.45 | 3.400 | 582 | 557 | 465 | 376 |
| 2-53 | 1.89848 | 23.46 | 3.404 | 586 | 553 | 466 | 377 |
| 2-54 | 1.90705 | 23.43 | 3.417 | 578 | 561 | 472 | 378 |
| 2-55 | 1.90226 | 23.30 | 3.418 | 586 | 556 | 466 | 377 |
| 2-56 | 1.90216 | 23.37 | 3.425 | 589 | 551 | 464 | 376 |
| 2-57 | 1.89924 | 23.48 | 3.452 | 587 | 566 | 470 | 377 |
| 2-58 | 1.89899 | 23.53 | 3.399 | 583 | 565 | 469 | 377 |
| 2-59 | 1.95316 | 22.30 | 3.668 | 621 | 668 | 500 | 387 |
| 2-60 | 1.95215 | 21.79 | 3.720 | 618 | N/A | 524 | 385 |
| 2-61 | 2.00242 | 21.02 | 3.817 | 628 | N/A | 526 | 395 |
| 2-62 | 1.99474 | 20.78 | 3.787 | 616 | N/A | 520 | 393 |
| 2-63 | 1.90223 | 23.36 | 3.405 | 585 | 566 | 472 | 378 |
| 2-64 | 1.9023 | 23.44 | 3.459 | 589 | 564 | 469 | 377 |
| 2-65 | 1.90575 | 23.55 | 3.467 | 590 | 560 | 468 | 377 |
| 2-66 | 1.89824 | 23.79 | 3.498 | 589 | 549 | 462 | 376 |
| 2-67 | 1.89573 | 23.72 | 3.414 | 584 | 559 | 468 | 376 |
| 2-68 | 1.8959 | 23.61 | 3.399 | 586 | 569 | 472 | 377 |
| 2-69 | 1.89591 | 23.90 | 3.468 | 590 | 561 | 466 | 376 |
| 2-70 | 1.89598 | 23.79 | 3.452 | 588 | 555 | 465 | 376 |
| 2-71 | 1.90158 | 23.38 | 3.419 | 586 | 561 | 470 | 377 |
| 2-72 | 1.90054 | 23.36 | 3.382 | 586 | 561 | 468 | 377 |
| 2-73 | 1.90183 | 23.54 | 3.473 | 588 | 553 | 465 | 377 |
| 2-74 | 1.90052 | 23.54 | 3.436 | 587 | 551 | 464 | 376 |
| 2-75 | 1.89651 | 23.73 | 3.446 | 591 | 559 | 467 | 376 |
| 2-76 | 1.90232 | 23.46 | 3.456 | 581 | 564 | 471 | 377 |
| 2-77 | 1.90443 | 23.38 | 3.460 | 579 | 564 | 470 | 377 |
| 2-78 | 1.89848 | 23.60 | 3.433 | 586 | 554 | 468 | 377 |
| 2-79 | 1.89833 | 23.60 | 3.43 | 590 | 559 | 469 | 377 |
| 2-80 | 1.89847 | 23.69 | 3.437 | 590 | 548 | 466 | 376 |
| 2-81 | 1.89856 | 23.63 | 3.432 | 582 | 552 | 464 | 376 |
| 2-82 | 1.90048 | 23.64 | 3.438 | | 571 | 475 | 377 |
| 2-83 | 1.89251 | 23.60 | 3.42 | | 565 | 469 | 377 |
| 2-84 | 1.89666 | 23.51 | 3.438 | | 558 | 467 | 377 |
| 2-85 | 1.90344 | 23.43 | 3.452 | | 563 | 467 | 376 |
| 2-86 | 1.88811 | 23.77 | 3.379 | | 575 | 466 | 375 |
| 2-87 | 1.88831 | 23.71 | 3.365 | | 569 | 464 | 375 |
| 2-88 | 2.01059 | 21.43 | 4.05 | 661 | N/A | 538 | 393 |
| 2-89 | 2.00864 | 21.62 | 4.05 | 670 | N/A | 511 | 391 |
| 2-90 | 2.02551 | 20.90 | 4.06 | 677 | N/A | 549 | 399 |
| 2-91 | 2.02450 | 21.08 | 4.09 | 678 | N/A | 540 | 397 |

TABLE 2-3(3)

| No. | Glass propertes nd | νd | Specific weight | Tg (° C.) | λ80 (nm) | λ70 (nm) | λ5 (nm) |
|---|---|---|---|---|---|---|---|
| 2-92 | 1.89542 | 23.34 | 3.396 | 580 | 557 | 467 | 377 |
| 2-93 | 1.8914 | 23.41 | 3.395 | 584 | 566 | 468 | 376 |
| 2-94 | 1.89093 | 23.44 | 3.384 | 581 | 566 | 468 | 376 |
| 2-95 | 1.89112 | 23.14 | 3.38 | 590 | 556 | 465 | 377 |
| 2-96 | 1.89951 | 23.23 | 3.38 | 583 | 551 | 468 | 378 |
| 2-97 | 1.89942 | 23.36 | 3.388 | 588 | 553 | 467 | 377 |
| 2-98 | 1.8865 | 23.56 | 3.356 | 582 | 549 | 465 | 376 |
| 2-99 | 1.88826 | 23.64 | 3.345 | 582 | 545 | 463 | 376 |
| 2-100 | 1.88811 | 23.75 | 3.361 | | 546 | 464 | 376 |
| 2-101 | 1.89457 | 23.41 | 3.365 | | 552 | 466 | 377 |
| 2-102 | 1.88953 | 23.5 | 3.351 | | 544 | 465 | 377 |
| 2-103 | 1.89895 | 23.5 | 3.393 | | 543 | 465 | 377 |
| 2-104 | 1.90024 | 23.75 | 3.376 | 588 | 558 | 469 | 378 |
| 2-105 | 1.90025 | 23.29 | 3.378 | 590 | 558 | 469 | 378 |
| 2-106 | 1.90023 | 23.29 | 3.379 | | 553 | 467 | 378 |
| 2-107 | 1.89992 | 23.3 | 3.377 | | 552 | 465 | 377 |
| 2-108 | 1.89897 | 23.3 | 3.359 | 583 | 561 | 472 | 378 |
| 2-109 | 1.90618 | 22.84 | 3.361 | 583 | 566 | 475 | 379 |
| 2-110 | 1.90622 | 22.85 | 3.369 | 583 | 570 | 474 | 379 |
| 2-111 | 1.90606 | 22.92 | 3.376 | 582 | 609 | 475 | 378 |
| 2-112 | 1.89901 | 23.27 | 3.351 | 584 | 566 | 472 | 377 |
| 2-113 | 1.90185 | 22.87 | 3.351 | 586 | 595 | 479 | 379 |
| 2-114 | 1.90097 | 22.89 | 3.347 | 587 | 670 | 486 | 380 |
| 2-115 | 1.90296 | 22.92 | 3.35 | 583 | 560 | 469 | 378 |

TABLE 2-3(3)-continued

| | Glass propertes | | | | | | |
|---|---|---|---|---|---|---|---|
| No. | nd | νd | Specific weight | Tg (° C.) | λ80 (nm) | λ70 (nm) | λ5 (nm) |
| 2-116 | 1.88883 | 23.63 | 3.372 | 585 | 556 | 466 | 377 |
| 2-117 | 1.8786 | 23.91 | 3.349 | 589 | 548 | 461 | 375 |
| 2-118 | 1.8907 | 23.4 | 3.342 | 590 | 598 | 475 | 377 |
| 2-119 | 1.89048 | 23.4 | 3.345 | 583 | 561 | 471 | 377 |
| 2-120 | 1.89424 | 23.38 | 3.346 | 582 | 564 | 471 | 377 |
| 2-121 | 1.88593 | 23.54 | 3.332 | 584 | 552 | 466 | 377 |
| 2-122 | 1.88866 | 23.57 | 3.337 | 585 | 557 | 464 | 376 |
| 2-123 | 1.89279 | 23.57 | 3.353 | 581 | 559 | 468 | 377 |
| 2-124 | 1.89292 | 23.51 | 3.337 | 580 | 552 | 464 | 376 |
| 2-125 | 1.89479 | 23.47 | 3.356 | 590 | 556 | 469 | 377 |
| 2-126 | 1.89777 | 23.26 | 3.354 | 582 | 578 | 474 | 378 |
| 2-127 | 1.8924 | 23.68 | 3.361 | 585 | 550 | 466 | 377 |

TABLE 2-3(4)

| | Glass properties | | | | | | |
|---|---|---|---|---|---|---|---|
| No. | nd | νd | Specific weight | Tg (° C.) | λ80 (nm) | λ70 (nm) | λ5 (nm) |
| 2-128 | 1.89572 | 23.57 | 3.36 | 587 | 551 | 466 | 377 |
| 2-129 | 1.89843 | 23.24 | 3.354 | 581 | 546 | 454 | 372 |
| 2-130 | 1.88954 | 23.77 | 3.348 | 580 | N/A | N/A | 377 |
| 2-131 | 1.88958 | 23.73 | 3.343 | 582 | N/A | 668 | 376 |
| 2-132 | 1.88967 | 23.64 | 3.335 | 581 | N/A | 580 | 375 |
| 2-133 | 1.8876 | 23.54 | 3.326 | 582 | N/A | 546 | 374 |
| 2-134 | 1.89782 | 23.38 | 3.353 | 580 | 665 | 533 | 377 |
| 2-135 | 1.8959 | 23.39 | 3.353 | 583 | N/A | 556 | 377 |
| 2-136 | 1.89363 | 23.44 | 3.349 | 583 | N/A | 599 | 379 |
| 2-137 | 1.89767 | 23.49 | 3.364 | 584 | N/A | 628 | 379 |
| 2-138 | 1.89935 | 23.42 | 3.411 | 581 | 583 | 500 | 381 |
| 2-139 | 1.89904 | 23.53 | 3.43 | 584 | 578 | 490 | 378 |
| 2-140 | 1.89932 | 23.41 | 3.406 | 588 | 593 | 497 | 380 |
| 2-141 | 1.89937 | 23.62 | 3.426 | 587 | 580 | 500 | 381 |
| 2-142 | 1.90099 | 23.35 | 3.423 | 578 | 565 | 489 | 379 |
| 2-143 | 1.90325 | 23.32 | 3.426 | 588 | 591 | 500 | 381 |
| 2-144 | 1.90299 | 23.41 | 3.412 | 582 | 576 | 488 | 378 |
| 2-145 | 1.90284 | 23.41 | 3.437 | 583 | 570 | 490 | 379 |
| 2-146 | 1.90019 | 23.49 | 3.413 | 588 | 576 | 496 | 380 |
| 2-147 | 1.9003 | 23.51 | 3.433 | 586 | | | |
| 2-148 | 1.90041 | 23.31 | 3.4 | 582 | 592 | 484 | 378 |
| 2-149 | 1.90055 | 23.31 | 3.4 | | 591 | 483 | 378 |
| 2-150 | 1.9005 | 23.29 | 3.401 | 583 | 576 | 474 | 377 |
| 2-151 | 1.90049 | 23.29 | 3.4 | | 572 | 473 | 377 |
| 2-152 | 1.89837 | 23.37 | 3.389 | 573 | 567 | 479 | 379 |
| 2-153 | 1.90132 | 23.29 | 3.4 | 582 | 569 | 483 | 379 |
| 2-154 | 1.89832 | 23.38 | 3.397 | 583 | 567 | 477 | 378 |
| 2-155 | 1.90151 | 23.25 | 3.402 | 583 | 558 | 473 | 378 |
| 2-156 | 1.89886 | 23.64 | 3.456 | 584 | 609 | 502 | 380 |
| 2-157 | 1.89904 | 23.74 | 3.464 | 594 | 587 | 488 | 378 |
| 2-158 | 1.89897 | 23.78 | 3.505 | 593 | 573 | 484 | 378 |
| 2-159 | 1.89946 | 23.69 | 3.496 | 590 | 562 | 478 | 378 |
| 2-160 | 1.89862 | 24.01 | 3.542 | 598 | 564 | 481 | 378 |
| 2-161 | 1.89917 | 23.93 | 3.534 | 589 | 567 | 482 | 379 |
| 2-162 | 1.89987 | 23.81 | 3.529 | 589 | 559 | 479 | 378 |
| 2-163 | 1.88787 | 24.93 | 3.536 | 592 | 537 | 454 | 372 |

Example 2-2

A lens blank was prepared by using each of the optical glasses prepared in Example 2-1 in accordance with a known method, and various lenses were prepared by processing the lens blank in accordance with a known method such as polishing.

The prepared optical lens was various lenses such as a planar lens, a biconvex lens, a biconcave lens, a plano-convex lens, a plano-concave lens, a concave meniscus lens, and a convex meniscus lens.

A secondary chromatic aberration was capable of being excellently corrected by combining various lenses with a lens including another type of optical glass.

In addition, the glass had a low specific weight, and thus, each of the lenses had a small weight compared to a lens having the same optical properties and size, and was suitable for goggle type or spectacle type AR display device or MR display device. Similarly, a prism was prepared by using various optical glasses prepared in Example 2-1.

Example 2-3

Each of the optical glasses prepared in Example 2-1 was processed into the shape of a rectangular thin plate having Length of 50 mm×Width of 20 mm×Thickness of 1.0 mm to obtain a light guide plate. The light guide plate was built in the head mounted display 1 illustrated in FIG. 2.

In the head mounted display obtained as described above, an image was evaluated in an eye-point position, and a high-brightness and high-contrast image was capable of being observed at a wide viewing angle.

Example 3

Example 3-1

Glass samples having glass compositions shown in Tables 3-1(1), 3-1(2), 3-1(3), and 3-1(4) were prepared by the following procedure, and various evaluations were performed.

[Manufacturing of Optical Glass]

First, an oxide, a hydroxide, a carbonate, and a nitrate corresponding to structural components of the glass were prepared as a raw material, the raw materials were weighed and blended such that a glass composition of optical glass to be obtained was each of the compositions shown in Tables 3-1(1), 3-1(2), 3-1(3), and 3-1(4), and the raw materials were sufficiently mixed. A blended raw material (a batch raw material) obtained as described above was put in a platinum crucible, and was heated at 1350° C. to 1400° C. for 2 hours to be molten glass, and the molten glass was stirred, homogenized, and clarified, and then, was cast into a mold that was preheated to a suitable temperature. The cast glass was subjected to a heat treatment at approximately a glass transition temperature Tg for 30 minutes, and was allowed to cool in a furnace to a room temperature, and thus, a glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Tables 3-1(1), 3-1(2), 3-1(3), and 3-1(4).

[Measurement of Optical Properties]

The obtained glass sample was further subjected to an annealing treatment at approximately the glass transition temperature Tg for approximately 30 minutes to 2 hours, and then, was cooled in the furnace to the room temperature at a temperature decrease rate of −30° C./hour, and thus, an annealed sample was obtained. In the obtained annealed sample, refractive indices nd, ng, nF, and nC, an Abbe's number νd, a specific weight, the glass transition temperature Tg, λ80, λ70, and λ5 were measured. Results are shown in Tables 3-2(1), 3-2(2), 3-2(3), and 3-2(4).

(i) Refractive Indices nd, ng, nF, and nC and Abbe's Number νd

In the annealed sample, the refractive indices nd, ng, nF, and nC were measured by a refractive index measurement method of JIS standard JIS B 7071-1, and the Abbe's number νd was calculated on the basis of the following expression.

$$\nu d=(nd-1)/(nF-nC)$$

(ii) Specific Weight

The specific weight was measured by an Archimedes method.

(iii) Glass Transition Temperature Tg

The glass transition temperature Tg was measured at a temperature increase rate of 10° C./minute by using a differential scanning calorimetric analyzer (DSC3300SA), manufactured by NETZSCH Japan K.K.

(iv) λ80, λ70, and λ5

In the annealed sample having a thickness of 10.0 mm±0.1 mm, a spectral transmittance was measured in a range of a wavelength of 200 to 700 nm. A wavelength at which an external transmittance was 80% was λ80, a wavelength at which an external transmittance was 70% was λ70, and a wavelength at which an external transmittance was 5% was λ5.

TABLE 3-1(1)

| | Glass composition (% by mass) | | | | | | | | | | |
|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | Sro | BaO |
| 3-1 | 0.00 | 21.48 | 1.02 | 0.00 | 3.09 | 2.49 | 0.00 | 0.00 | 9.41 | 0.00 | 10.78 |
| 3-2 | 0.00 | 21.29 | 1.01 | 0.00 | 2.21 | 4.23 | 0.00 | 0.00 | 9.33 | 0.00 | 10.68 |
| 3-3 | 0.00 | 21.17 | 1.00 | 0.00 | 2.20 | 2.45 | 0.00 | 2.28 | 9.28 | 0.00 | 10.63 |
| 3-4 | 0.00 | 20.99 | 0.99 | 0.00 | 2.18 | 2.43 | 0.00 | 0.00 | 12.34 | 0.00 | 10.53 |
| 3-5 | 0.00 | 24.06 | 2.26 | 0.00 | 4.43 | 2.79 | 0.00 | 0.00 | 10.55 | 0.00 | 2.22 |
| 3-6 | 0.00 | 24.22 | 1.15 | 0.00 | 4.94 | 2.81 | 0.00 | 0.00 | 10.61 | 0.00 | 2.24 |
| 3-7 | 0.00 | 23.74 | 1.12 | 0.00 | 4.61 | 2.75 | 0.00 | 0.00 | 10.40 | 0.00 | 2.19 |
| 3-8 | 0.00 | 23.68 | 1.12 | 0.00 | 4.35 | 3.24 | 0.00 | 0.00 | 10.38 | 0.00 | 2.19 |
| 3-9 | 0.00 | 23.65 | 1.12 | 0.00 | 4.35 | 2.74 | 0.00 | 0.65 | 10.36 | 0.00 | 2.18 |
| 3-10 | 0.00 | 23.59 | 1.12 | 0.00 | 4.34 | 2.73 | 0.00 | 0.00 | 11.23 | 0.00 | 2.18 |
| 3-11 | 0.00 | 24.22 | 1.15 | 0.00 | 4.92 | 2.80 | 0.00 | 0.00 | 10.61 | 0.00 | 0.00 |
| 3-12 | 0.00 | 24.11 | 1.14 | 0.00 | 4.68 | 2.79 | 0.68 | 0.00 | 10.56 | 0.00 | 0.00 |
| 3-13 | 0.00 | 26.33 | 1.15 | 0.00 | 4.95 | 2.82 | 0.00 | 0.00 | 10.68 | 0.00 | 0.00 |
| 3-14 | 0.00 | 24.58 | 2.31 | 0.00 | 4.99 | 2.85 | 0.00 | 0.00 | 10.77 | 0.00 | 0.00 |
| 3-15 | 0.00 | 26.80 | 1.17 | 0.00 | 5.04 | 2.87 | 0.00 | 0.00 | 10.87 | 0.00 | 0.00 |
| 3-16 | 0.00 | 25.02 | 2.35 | 0.00 | 5.08 | 2.90 | 0.00 | 0.00 | 10.96 | 0.00 | 0.00 |
| 3-17 | 0.00 | 27.39 | 1.20 | 0.00 | 5.65 | 2.94 | 0.00 | 0.00 | 11.11 | 0.00 | 0.00 |
| 3-18 | 0.00 | 27.01 | 1.18 | 0.00 | 5.08 | 2.90 | 0.00 | 0.00 | 12.83 | 0.00 | 0.00 |
| 3-19 | 0.00 | 27.24 | 1.19 | 0.00 | 5.12 | 3.96 | 0.00 | 0.00 | 11.05 | 0.00 | 0.00 |
| 3-20 | 0.00 | 22.31 | 1.15 | 0.00 | 4.92 | 2.81 | 0.00 | 0.00 | 12.44 | 0.00 | 0.00 |
| 3-21 | 0.00 | 23.90 | 1.13 | 0.00 | 4.38 | 2.77 | 0.00 | 0.00 | 12.26 | 0.00 | 0.00 |
| 3-22 | 0.00 | 23.59 | 1.12 | 0.00 | 3.85 | 2.73 | 0.00 | 0.00 | 13.87 | 0.00 | 0.00 |
| 3-23 | 0.00 | 24.74 | 1.17 | 0.00 | 5.52 | 2.86 | 0.00 | 0.00 | 10.84 | 0.00 | 0.00 |
| 3-24 | 0.00 | 23.73 | 1.12 | 0.00 | 3.87 | 2.75 | 2.99 | 0.00 | 10.40 | 0.00 | 0.00 |
| 3-25 | 0.00 | 22.49 | 1.16 | 0.00 | 4.96 | 3.84 | 0.00 | 0.00 | 10.71 | 0.00 | 0.00 |
| 3-26 | 0.00 | 24.42 | 1.16 | 0.00 | 4.96 | 3.84 | 0.00 | 0.00 | 8.87 | 0.00 | 0.00 |
| 3-27 | 0.00 | 25.96 | 1.14 | 0.00 | 4.64 | 2.78 | 0.00 | 0.00 | 10.53 | 1.66 | 0.00 |
| 3-28 | 0.00 | 25.75 | 1.13 | 0.00 | 4.60 | 2.76 | 0.00 | 0.00 | 10.45 | 0.00 | 2.44 |
| 3-29 | 0.00 | 25.88 | 1.13 | 0.00 | 4.62 | 2.77 | 0.00 | 0.00 | 10.50 | 0.00 | 0.00 |
| 3-30 | 0.00 | 25.89 | 1.13 | 0.00 | 4.86 | 2.77 | 0.00 | 0.00 | 10.50 | 0.00 | 0.00 |

TABLE 3-1(1)-continued

Glass composition (% by mass)

| | | | | | | | | | | | |
|---|---|---|---|---|---|---|---|---|---|---|---|
| 3-31 | 0.00 | 25.84 | 1.13 | 0.00 | 3.87 | 3.21 | 2.44 | 0.00 | 10.48 | 0.00 | 0.00 |
| 3-32 | 0.00 | 25.46 | 1.11 | 0.00 | 4.78 | 2.73 | 0.00 | 0.00 | 10.32 | 0.00 | 0.00 |
| 3-33 | 0.00 | 25.04 | 1.10 | 0.00 | 4.71 | 2.68 | 0.00 | 0.00 | 10.15 | 0.00 | 0.00 |
| 3-34 | 0.00 | 26.05 | 1.14 | 0.00 | 4.68 | 1.62 | 2.46 | 0.00 | 10.57 | 0.00 | 0.00 |
| 3-35 | 0.00 | 26.27 | 1.15 | 0.00 | 5.51 | 0.00 | 2.48 | 0.00 | 10.66 | 0.00 | 0.00 |
| 3-36 | 1.15 | 26.10 | 1.14 | 0.00 | 4.66 | 2.80 | 0.00 | 0.00 | 10.58 | 0.00 | 0.00 |
| 3-37 | 0.00 | 26.18 | 1.15 | 0.83 | 4.68 | 2.81 | 0.00 | 0.00 | 10.62 | 0.00 | 0.00 |
| 3-38 | 0.00 | 25.86 | 1.13 | 0.00 | 4.62 | 2.77 | 0.00 | 0.00 | 10.49 | 0.83 | 1.23 |
| 3-39 | 0.00 | 25.20 | 1.10 | 0.00 | 4.27 | 2.70 | 0.00 | 0.00 | 10.22 | 0.00 | 4.78 |
| 3-40 | 0.00 | 24.67 | 1.08 | 0.00 | 3.95 | 2.64 | 0.00 | 0.00 | 10.00 | 0.00 | 7.01 |
| 3-41 | 0.00 | 26.26 | 1.13 | 0.00 | 4.61 | 2.77 | 0.00 | 0.00 | 10.46 | 0.00 | 2.45 |
| 3-42 | 0.00 | 26.39 | 1.13 | 0.00 | 4.63 | 2.78 | 0.00 | 0.00 | 10.51 | 0.00 | 2.46 |
| 3-43 | 0.00 | 25.87 | 1.13 | 0.00 | 4.67 | 2.77 | 0.00 | 0.00 | 10.49 | 0.00 | 1.96 |
| 3-44 | 0.00 | 25.62 | 1.12 | 0.00 | 4.34 | 2.75 | 0.75 | 0.00 | 10.39 | 0.00 | 2.43 |
| 3-45 | 0.00 | 25.69 | 1.12 | 0.00 | 4.59 | 2.26 | 0.75 | 0.00 | 10.42 | 0.00 | 2.43 |
| 3-46 | 0.28 | 25.68 | 1.12 | 0.00 | 4.59 | 2.75 | 0.00 | 0.00 | 10.42 | 0.00 | 2.43 |
| 3-47 | 0.00 | 26.41 | 1.13 | 0.00 | 4.63 | 2.78 | 0.00 | 0.00 | 10.51 | 0.00 | 0.00 |
| 3-48 | 0.00 | 26.51 | 1.14 | 0.00 | 4.65 | 2.79 | 0.00 | 0.00 | 10.56 | 0.00 | 0.00 |

| No. | $TiO_2$ | $Nb_2O_5$ | $ZrO_2$ | ZnO | $Ta_2O_5$ | $Gd_2O_3$ | $La_2O_3$ | $Y_2O_3$ | Total | $Sb_2O_3$ |
|---|---|---|---|---|---|---|---|---|---|---|
| 3-1 | 26.46 | 23.47 | 1.80 | 0.00 | 0.00 | 0.00 | 0.00 | 0.00 | 100.00 | 0.03 |
| 3-2 | 26.21 | 23.26 | 1.78 | 0.00 | 0.00 | 0.00 | 0.00 | 0.00 | 100.00 | 0.03 |
| 3-3 | 26.09 | 23.13 | 1.77 | 0.00 | 0.00 | 0.00 | 0.00 | 0.00 | 100.00 | 0.03 |
| 3-4 | 25.85 | 22.93 | 1.76 | 0.00 | 0.00 | 0.00 | 0.00 | 0.00 | 100.00 | 0.03 |
| 3-5 | 29.64 | 22.03 | 2.02 | 0.00 | 0.00 | 0.00 | 0.00 | 0.00 | 100.00 | 0.03 |
| 3-6 | 29.83 | 22.17 | 2.03 | 0.00 | 0.00 | 0.00 | 0.00 | 0.00 | 100.00 | 0.03 |
| 3-7 | 29.25 | 25.94 | 0.00 | 0.00 | 0.00 | 0.00 | 0.00 | 0.00 | 100.00 | 0.03 |
| 3-8 | 29.17 | 25.87 | 0.00 | 0.00 | 0.00 | 0.00 | 0.00 | 0.00 | 100.00 | 0.03 |
| 3-9 | 29.12 | 25.83 | 0.00 | 0.00 | 0.00 | 0.00 | 0.00 | 0.00 | 100.00 | 0.03 |
| 3-10 | 29.04 | 25.77 | 0.00 | 0.00 | 0.00 | 0.00 | 0.00 | 0.00 | 100.00 | 0.03 |
| 3-11 | 29.84 | 26.46 | 0.00 | 0.00 | 0.00 | 0.00 | 0.00 | 0.00 | 100.00 | 0.03 |
| 3-12 | 29.70 | 26.34 | 0.00 | 0.00 | 0.00 | 0.00 | 0.00 | 0.00 | 100.00 | 0.03 |
| 3-13 | 27.44 | 26.63 | 0.00 | 0.00 | 0.00 | 0.00 | 0.00 | 0.00 | 100.00 | 0.03 |
| 3-14 | 27.64 | 26.86 | 0.00 | 0.00 | 0.00 | 0.00 | 0.00 | 0.00 | 100.00 | 0.03 |
| 3-15 | 30.55 | 22.70 | 0.00 | 0.00 | 0.00 | 0.00 | 0.00 | 0.00 | 100.00 | 0.03 |
| 3-16 | 30.80 | 22.89 | 0.00 | 0.00 | 0.00 | 0.00 | 0.00 | 0.00 | 100.00 | 0.03 |
| 3-17 | 28.51 | 23.20 | 0.00 | 0.00 | 0.00 | 0.00 | 0.00 | 0.00 | 100.00 | 0.03 |
| 3-18 | 28.12 | 22.88 | 0.00 | 0.00 | 0.00 | 0.00 | 0.00 | 0.00 | 100.00 | 0.03 |
| 3-19 | 28.37 | 23.07 | 0.00 | 0.00 | 0.00 | 0.00 | 0.00 | 0.00 | 100.00 | 0.03 |
| 3-20 | 29.87 | 26.50 | 0.00 | 0.00 | 0.00 | 0.00 | 0.00 | 0.00 | 100.00 | 0.03 |
| 3-21 | 29.44 | 26.12 | 0.00 | 0.00 | 0.00 | 0.00 | 0.00 | 0.00 | 100.00 | 0.03 |
| 3-22 | 29.06 | 25.78 | 0.00 | 0.00 | 0.00 | 0.00 | 0.00 | 0.00 | 100.00 | 0.03 |
| 3-23 | 27.84 | 27.03 | 0.00 | 0.00 | 0.00 | 0.00 | 0.00 | 0.00 | 100.00 | 0.03 |
| 3-24 | 29.22 | 25.92 | 0.00 | 0.00 | 0.00 | 0.00 | 0.00 | 0.00 | 100.00 | 0.03 |
| 3-25 | 30.13 | 26.71 | 0.00 | 0.00 | 0.00 | 0.00 | 0.00 | 0.00 | 100.00 | 0.03 |
| 3-26 | 30.07 | 26.68 | 0.00 | 0.00 | 0.00 | 0.00 | 0.00 | 0.00 | 100.00 | 0.03 |
| 3-27 | 27.03 | 26.26 | 0.00 | 0.00 | 0.00 | 0.00 | 0.00 | 0.00 | 100.00 | 0.03 |
| 3-28 | 26.82 | 26.05 | 0.00 | 0.00 | 0.00 | 0.00 | 0.00 | 0.00 | 100.00 | 0.03 |
| 3-29 | 26.96 | 26.17 | 1.97 | 0.00 | 0.00 | 0.00 | 0.00 | 0.00 | 100.00 | 0.03 |
| 3-30 | 24.40 | 30.45 | 0.00 | 0.00 | 0.00 | 0.00 | 0.00 | 0.00 | 100.00 | 0.03 |
| 3-31 | 26.90 | 26.13 | 0.00 | 0.00 | 0.00 | 0.00 | 0.00 | 0.00 | 100.00 | 0.03 |
| 3-32 | 21.48 | 34.12 | 0.00 | 0.00 | 0.00 | 0.00 | 0.00 | 0.00 | 100.00 | 0.03 |
| 3-33 | 18.66 | 37.66 | 0.00 | 0.00 | 0.00 | 0.00 | 0.00 | 0.00 | 100.00 | 0.03 |
| 3-34 | 27.13 | 26.35 | 0.00 | 0.00 | 0.00 | 0.00 | 0.00 | 0.00 | 100.00 | 0.03 |
| 3-35 | 27.36 | 26.57 | 0.00 | 0.00 | 0.00 | 0.00 | 0.00 | 0.00 | 100.00 | 0.03 |
| 3-36 | 27.18 | 26.39 | 0.00 | 0.00 | 0.00 | 0.00 | 0.00 | 0.00 | 100.00 | 0.03 |
| 3-37 | 27.26 | 26.47 | 0.00 | 0.00 | 0.00 | 0.00 | 0.00 | 0.00 | 100.00 | 0.03 |
| 3-38 | 26.92 | 26.15 | 0.00 | 0.00 | 0.00 | 0.00 | 0.00 | 0.00 | 100.00 | 0.03 |
| 3-39 | 26.24 | 25.49 | 0.00 | 0.00 | 0.00 | 0.00 | 0.00 | 0.00 | 100.00 | 0.03 |
| 3-40 | 25.70 | 24.95 | 0.00 | 0.00 | 0.00 | 0.00 | 0.00 | 0.00 | 100.00 | 0.03 |
| 3-41 | 26.23 | 26.09 | 0.00 | 0.00 | 0.00 | 0.00 | 0.00 | 0.00 | 100.00 | 0.03 |
| 3-42 | 26.97 | 25.13 | 0.00 | 0.00 | 0.00 | 0.00 | 0.00 | 0.00 | 100.00 | 0.03 |
| 3-43 | 26.95 | 26.16 | 0.00 | 0.00 | 0.00 | 0.00 | 0.00 | 0.00 | 100.00 | 0.03 |
| 3-44 | 26.69 | 25.91 | 0.00 | 0.00 | 0.00 | 0.00 | 0.00 | 0.00 | 100.00 | 0.03 |
| 3-45 | 26.76 | 25.98 | 0.00 | 0.00 | 0.00 | 0.00 | 0.00 | 0.00 | 100.00 | 0.03 |
| 3-46 | 26.76 | 25.97 | 0.00 | 0.00 | 0.00 | 0.00 | 0.00 | 0.00 | 100.00 | 0.03 |
| 3-47 | 26.36 | 26.21 | 1.97 | 0.00 | 0.00 | 0.00 | 0.00 | 0.00 | 100.00 | 0.03 |
| 3-48 | 27.11 | 25.26 | 1.98 | 0.00 | 0.00 | 0.00 | 0.00 | 0.00 | 100.00 | 0.03 |

TABLE 3-1(2)

Glass composition (% by mass)

| No. | $P_2O_5$ | $SiO_2$ | $B_2O_3$ | $Al_2O_3$ | $Li_2O$ | $Na_2O$ | $K_2O$ | MgO | CaO | SrO | BaO |
|---|---|---|---|---|---|---|---|---|---|---|---|
| 3-49 | 0.00 | 25.75 | 1.13 | 0.00 | 4.84 | 1.77 | 0.75 | 0.00 | 10.45 | 0.00 | 2.44 |
| 3-50 | 0.00 | 25.62 | 1.12 | 0.00 | 4.58 | 1.76 | 1.49 | 0.00 | 10.39 | 0.00 | 2.43 |
| 3-51 | 0.00 | 26.61 | 0.57 | 0.00 | 4.58 | 2.75 | 0.00 | 0.00 | 10.40 | 0.00 | 2.43 |
| 3-52 | 0.00 | 24.90 | 1.69 | 0.00 | 4.62 | 2.77 | 0.00 | 0.00 | 10.49 | 0.00 | 2.45 |
| 3-53 | 0.00 | 25.84 | 0.58 | 0.00 | 4.86 | 2.77 | 0.00 | 0.00 | 10.48 | 0.00 | 2.45 |
| 3-54 | 0.00 | 25.67 | 0.57 | 0.00 | 4.59 | 2.75 | 0.00 | 0.00 | 11.30 | 0.00 | 2.43 |
| 3-55 | 0.00 | 25.14 | 1.10 | 0.00 | 4.26 | 2.21 | 0.73 | 0.00 | 10.19 | 0.00 | 4.77 |
| 3-56 | 0.00 | 25.80 | 1.13 | 0.00 | 4.61 | 2.27 | 0.75 | 0.00 | 10.46 | 0.00 | 2.45 |
| 3-57 | 0.00 | 16.53 | 0.93 | 0.00 | 2.05 | 2.28 | 0.00 | 0.00 | 8.63 | 0.00 | 17.95 |
| 3-58 | 0.00 | 19.40 | 0.92 | 0.00 | 2.02 | 0.64 | 0.00 | 0.00 | 8.50 | 0.00 | 17.68 |
| 3-59 | 0.00 | 20.71 | 0.98 | 0.00 | 2.15 | 2.40 | 0.00 | 0.00 | 9.07 | 0.00 | 10.39 |
| 3-60 | 0.00 | 20.12 | 0.95 | 0.00 | 2.09 | 2.33 | 0.00 | 0.00 | 8.82 | 0.00 | 10.10 |
| 3-61 | 0.00 | 16.12 | 0.91 | 0.00 | 2.00 | 0.63 | 0.00 | 0.00 | 8.41 | 0.00 | 17.50 |
| 3-62 | 0.00 | 16.71 | 0.94 | 0.00 | 2.47 | 0.66 | 0.00 | 0.00 | 8.72 | 0.00 | 14.07 |
| 3-63 | 0.00 | 16.71 | 0.94 | 0.00 | 2.07 | 2.31 | 0.00 | 0.00 | 8.72 | 0.00 | 9.99 |
| 3-64 | 0.00 | 16.35 | 0.92 | 0.00 | 2.22 | 0.64 | 0.00 | 0.00 | 8.53 | 0.00 | 17.75 |
| 3-65 | 0.00 | 16.06 | 0.90 | 0.00 | 1.99 | 0.63 | 0.00 | 0.00 | 8.38 | 0.00 | 19.42 |
| 3-66 | 0.00 | 25.76 | 1.13 | 0.00 | 4.60 | 2.27 | 0.75 | 0.00 | 10.45 | 0.00 | 0.00 |
| 3-67 | 0.00 | 25.10 | 1.10 | 0.00 | 4.25 | 2.21 | 0.73 | 0.00 | 10.18 | 0.00 | 2.38 |
| 3-68 | 0.00 | 25.06 | 1.10 | 0.00 | 4.25 | 2.21 | 0.73 | 0.00 | 10.16 | 0.00 | 0.00 |
| 3-69 | 0.00 | 24.80 | 1.09 | 0.00 | 4.20 | 2.18 | 0.72 | 0.00 | 10.06 | 0.00 | 4.70 |
| 3-70 | 0.00 | 25.62 | 1.12 | 0.00 | 4.58 | 2.26 | 0.75 | 0.00 | 10.39 | 0.00 | 2.43 |
| 3-71 | 0.00 | 25.84 | 1.13 | 0.00 | 4.62 | 2.27 | 0.75 | 0.00 | 10.48 | 0.00 | 2.45 |
| 3-72 | 0.00 | 24.97 | 1.09 | 0.00 | 4.23 | 2.20 | 0.73 | 0.00 | 10.13 | 0.00 | 4.73 |
| 3-73 | 0.00 | 25.17 | 1.10 | 0.00 | 4.27 | 2.22 | 0.73 | 0.00 | 10.21 | 0.00 | 4.77 |
| 3-74 | 0.00 | 25.68 | 1.12 | 0.00 | 4.59 | 2.26 | 0.75 | 0.00 | 10.42 | 0.00 | 0.00 |
| 3-75 | 0.00 | 25.96 | 1.14 | 0.00 | 4.64 | 2.29 | 0.76 | 0.00 | 10.53 | 0.00 | 0.00 |
| 3-76 | 0.00 | 25.03 | 1.10 | 0.00 | 4.24 | 2.20 | 0.73 | 0.00 | 10.15 | 0.00 | 2.37 |
| 3-77 | 0.00 | 25.30 | 1.11 | 0.00 | 4.29 | 2.23 | 0.74 | 0.00 | 10.26 | 0.00 | 2.40 |
| 3-78 | 0.00 | 25.97 | 0.56 | 0.00 | 4.24 | 2.20 | 0.73 | 0.00 | 10.15 | 0.00 | 4.75 |
| 3-79 | 0.00 | 24.30 | 1.65 | 0.00 | 4.28 | 2.22 | 0.73 | 0.00 | 10.23 | 0.00 | 4.78 |
| 3-80 | 0.00 | 23.45 | 2.20 | 0.00 | 4.29 | 2.23 | 0.74 | 0.00 | 10.28 | 0.00 | 4.80 |
| 3-81 | 0.00 | 25.50 | 1.11 | 0.00 | 4.29 | 2.23 | 0.74 | 0.00 | 10.27 | 0.00 | 2.40 |
| 3-82 | 0.00 | 25.54 | 1.11 | 0.00 | 4.30 | 2.23 | 0.74 | 0.00 | 10.28 | 0.00 | 2.40 |
| 3-83 | 0.00 | 25.32 | 1.11 | 0.00 | 4.29 | 2.23 | 0.74 | 0.00 | 10.53 | 0.00 | 2.40 |
| 3-84 | 0.00 | 25.39 | 1.11 | 0.00 | 4.30 | 2.23 | 0.74 | 0.00 | 10.56 | 0.00 | 2.41 |
| 3-85 | 0.00 | 25.32 | 1.11 | 0.00 | 4.36 | 2.23 | 0.74 | 0.00 | 10.27 | 0.00 | 3.12 |
| 3-86 | 0.00 | 26.81 | 1.09 | 0.00 | 3.84 | 2.20 | 0.73 | 0.00 | 10.12 | 0.00 | 3.08 |
| 3-87 | 0.00 | 25.19 | 1.10 | 0.00 | 3.87 | 3.18 | 0.73 | 0.00 | 10.22 | 0.00 | 3.10 |
| 3-88 | 0.00 | 23.65 | 1.12 | 0.00 | 4.40 | 3.23 | 0.74 | 0.00 | 10.36 | 0.00 | 3.15 |
| 3-89 | 0.00 | 26.85 | 1.13 | 0.00 | 4.62 | 2.28 | 0.75 | 0.00 | 10.50 | 0.00 | 2.45 |
| 3-90 | 0.00 | 27.07 | 1.14 | 0.00 | 4.66 | 2.30 | 0.76 | 0.00 | 10.59 | 0.00 | 2.47 |
| 3-91 | 0.00 | 18.82 | 0.89 | 0.00 | 1.62 | 0.00 | 0.00 | 0.00 | 8.25 | 2.32 | 17.16 |
| 3-92 | 0.00 | 15.03 | 0.85 | 0.00 | 1.55 | 0.00 | 0.00 | 0.00 | 6.50 | 2.21 | 16.32 |
| 3-93 | 0.00 | 14.89 | 0.84 | 0.00 | 1.18 | 0.00 | 0.00 | 0.00 | 7.77 | 2.18 | 16.16 |
| 3-94 | 0.00 | 14.55 | 0.82 | 0.00 | 0.63 | 0.00 | 0.00 | 0.00 | 7.59 | 2.14 | 15.80 |
| 3-95 | 0.00 | 14.70 | 0.83 | 0.00 | 0.00 | 2.41 | 0.00 | 0.00 | 7.67 | 2.16 | 15.96 |

| No. | $TiO_2$ | $Nb_2O_5$ | $ZrO_2$ | ZnO | $Ta_2O_5$ | $Gd_2O_3$ | $La_2O_3$ | $Y_2O_3$ | Total | $Sb_2O_3$ |
|---|---|---|---|---|---|---|---|---|---|---|
| 3-49 | 26.82 | 26.05 | 0.00 | 0.00 | 0.00 | 0.00 | 0.00 | 0.00 | 100.00 | 0.03 |
| 3-50 | 26.69 | 25.92 | 0.00 | 0.00 | 0.00 | 0.00 | 0.00 | 0.00 | 100.00 | 0.03 |
| 3-51 | 26.72 | 25.94 | 0.00 | 0.00 | 0.00 | 0.00 | 0.00 | 0.00 | 100.00 | 0.03 |
| 3-52 | 26.93 | 26.15 | 0.00 | 0.00 | 0.00 | 0.00 | 0.00 | 0.00 | 100.00 | 0.03 |
| 3-53 | 26.90 | 26.12 | 0.00 | 0.00 | 0.00 | 0.00 | 0.00 | 0.00 | 100.00 | 0.03 |
| 3-54 | 26.73 | 25.96 | 0.00 | 0.00 | 0.00 | 0.00 | 0.00 | 0.00 | 100.00 | 0.03 |
| 3-55 | 26.18 | 25.42 | 0.00 | 0.00 | 0.00 | 0.00 | 0.00 | 0.00 | 100.00 | 0.03 |
| 3-56 | 27.50 | 25.03 | 0.00 | 0.00 | 0.00 | 0.00 | 0.00 | 0.00 | 100.00 | 0.03 |
| 3-57 | 28.46 | 21.52 | 1.65 | 0.00 | 0.00 | 0.00 | 0.00 | 0.00 | 100.00 | 0.03 |
| 3-58 | 28.03 | 21.19 | 1.62 | 0.00 | 0.00 | 0.00 | 0.00 | 0.00 | 100.00 | 0.03 |
| 3-59 | 29.94 | 22.63 | 1.73 | 0.00 | 0.00 | 0.00 | 0.00 | 0.00 | 100.00 | 0.03 |
| 3-60 | 24.78 | 29.13 | 1.68 | 0.00 | 0.00 | 0.00 | 0.00 | 0.00 | 100.00 | 0.03 |
| 3-61 | 31.84 | 20.98 | 1.61 | 0.00 | 0.00 | 0.00 | 0.00 | 0.00 | 100.00 | 0.03 |
| 3-62 | 33.01 | 21.75 | 1.67 | 0.00 | 0.00 | 0.00 | 0.00 | 0.00 | 100.00 | 0.03 |
| 3-63 | 28.77 | 28.82 | 1.67 | 0.00 | 0.00 | 0.00 | 0.00 | 0.00 | 100.00 | 0.03 |
| 3-64 | 32.31 | 21.28 | 0.00 | 0.00 | 0.00 | 0.00 | 0.00 | 0.00 | 100.00 | 0.03 |
| 3-65 | 31.72 | 20.90 | 0.00 | 0.00 | 0.00 | 0.00 | 0.00 | 0.00 | 100.00 | 0.03 |
| 3-66 | 27.46 | 24.99 | 0.00 | 0.00 | 0.00 | 0.00 | 2.59 | 0.00 | 100.00 | 0.03 |
| 3-67 | 26.14 | 25.38 | 0.00 | 0.00 | 0.00 | 0.00 | 2.53 | 0.00 | 100.00 | 0.03 |
| 3-68 | 26.09 | 25.35 | 0.00 | 0.00 | 0.00 | 0.00 | 5.05 | 0.00 | 100.00 | 0.03 |
| 3-69 | 25.82 | 23.04 | 0.00 | 0.00 | 3.39 | 0.00 | 0.00 | 0.00 | 100.00 | 0.03 |
| 3-70 | 26.04 | 24.86 | 1.95 | 0.00 | 0.00 | 0.00 | 0.00 | 0.00 | 100.00 | 0.03 |
| 3-71 | 27.54 | 22.95 | 1.97 | 0.00 | 0.00 | 0.00 | 0.00 | 0.00 | 100.00 | 0.03 |
| 3-72 | 24.77 | 25.25 | 1.90 | 0.00 | 0.00 | 0.00 | 0.00 | 0.00 | 100.00 | 0.03 |
| 3-73 | 26.22 | 23.39 | 1.92 | 0.00 | 0.00 | 0.00 | 0.00 | 0.00 | 100.00 | 0.03 |
| 3-74 | 27.38 | 24.92 | 0.00 | 0.00 | 0.00 | 2.88 | 0.00 | 0.00 | 100.00 | 0.03 |

TABLE 3-1(2)-continued

| Glass composition (% by mass) | | | | | | | | | | |
|---|---|---|---|---|---|---|---|---|---|---|
| 3-75 | 27.68 | 25.19 | 0.00 | 0.00 | 0.00 | 0.00 | 0.00 | 1.81 | 100.00 | 0.03 |
| 3-76 | 26.07 | 25.31 | 0.00 | 0.00 | 0.00 | 2.80 | 0.00 | 0.00 | 100.00 | 0.03 |
| 3-77 | 26.33 | 25.57 | 0.00 | 0.00 | 0.00 | 0.00 | 0.00 | 1.77 | 100.00 | 0.03 |
| 3-78 | 26.08 | 25.32 | 0.00 | 0.00 | 0.00 | 0.00 | 0.00 | 0.00 | 100.00 | 0.03 |
| 3-79 | 26.29 | 25.52 | 0.00 | 0.00 | 0.00 | 0.00 | 0.00 | 0.00 | 100.00 | 0.03 |
| 3-80 | 26.39 | 25.62 | 0.00 | 0.00 | 0.00 | 0.00 | 0.00 | 0.00 | 100.00 | 0.03 |
| 3-81 | 26.10 | 25.59 | 0.00 | 0.00 | 0.00 | 0.00 | 0.00 | 1.77 | 100.00 | 0.03 |
| 3-82 | 26.41 | 25.22 | 0.00 | 0.00 | 0.00 | 0.00 | 0.00 | 1.77 | 100.00 | 0.03 |
| 3-83 | 26.00 | 25.61 | 0.00 | 0.00 | 0.00 | 0.00 | 0.00 | 1.77 | 100.00 | 0.03 |
| 3-84 | 26.44 | 25.05 | 0.00 | 0.00 | 0.00 | 0.00 | 0.00 | 1.77 | 100.00 | 0.03 |
| 3-85 | 26.54 | 25.29 | 0.00 | 0.00 | 0.00 | 0.00 | 1.02 | 0.00 | 100.00 | 0.03 |
| 3-86 | 26.18 | 24.94 | 0.00 | 0.00 | 0.00 | 0.00 | 1.01 | 0.00 | 100.00 | 0.03 |
| 3-87 | 26.43 | 25.17 | 0.00 | 0.00 | 0.00 | 0.00 | 1.01 | 0.00 | 100.00 | 0.03 |
| 3-88 | 26.80 | 25.52 | 0.00 | 0.00 | 0.00 | 0.00 | 1.03 | 0.00 | 100.00 | 0.03 |
| 3-89 | 26.31 | 25.11 | 0.00 | 0.00 | 0.00 | 0.00 | 0.00 | 0.00 | 100.00 | 0.03 |
| 3-90 | 27.83 | 23.18 | 0.00 | 0.00 | 0.00 | 0.00 | 0.00 | 0.00 | 100.00 | 0.03 |
| 3-91 | 28.80 | 20.56 | 1.58 | 0.00 | 0.00 | 0.00 | 0.00 | 0.00 | 100.00 | 0.03 |
| 3-92 | 27.41 | 22.74 | 7.39 | 0.00 | 0.00 | 0.00 | 0.00 | 0.00 | 100.00 | 0.03 |
| 3-93 | 27.14 | 22.52 | 7.32 | 0.00 | 0.00 | 0.00 | 0.00 | 0.00 | 100.00 | 0.03 |
| 3-94 | 29.29 | 22.02 | 7.16 | 0.00 | 0.00 | 0.00 | 0.00 | 0.00 | 100.00 | 0.03 |
| 3-95 | 26.80 | 22.24 | 7.23 | 0.00 | 0.00 | 0.00 | 0.00 | 0.00 | 100.00 | 0.03 |

TABLE 3-1(3)

| Glass composition (% by mass) | | | | | | | | | | | |
|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | Sro | BaO |
| 3-96 | 0 | 25.67 | 1.12 | 0 | 4.11 | 3.24 | 0.75 | 0 | 10.41 | 0 | 2.43 |
| 3-97 | 0 | 25.54 | 1.12 | 0 | 3.62 | 4.2 | 0.74 | 0 | 10.36 | 0 | 2.42 |
| 3-98 | 0 | 25.54 | 1.12 | 0 | 4.09 | 2.25 | 2.23 | 0 | 10.36 | 0 | 2.42 |
| 3-99 | 0 | 27.32 | 1.11 | 0 | 4.07 | 2.24 | 0.74 | 0 | 10.31 | 0 | 2.41 |
| 3-100 | 0 | 26.02 | 1.14 | 0 | 4.65 | 2.29 | 0.76 | 0 | 10.55 | 0 | 2.47 |
| 3-101 | 0 | 25.85 | 1.13 | 0 | 4.38 | 2.28 | 0.75 | 0 | 11.38 | 0 | 2.45 |
| 3-102 | 0 | 25.6 | 1.12 | 0 | 3.87 | 2.25 | 2.98 | 0 | 10.83 | 0 | 1.21 |
| 3-103 | 0 | 27.28 | 1.15 | 0 | 4.7 | 2.32 | 0.77 | 0 | 11.13 | 0 | 1.25 |
| 3-104 | 0 | 27.04 | 1.14 | 0 | 4.66 | 2.3 | 0.76 | 0 | 11.03 | 0 | 1.24 |
| 3-105 | 0 | 25.86 | 1.13 | 0 | 4.62 | 1.29 | 2.26 | 0 | 10.94 | 0 | 1.23 |
| 3-106 | 0 | 25.73 | 1.13 | 0 | 4.6 | 0.29 | 3.75 | 0 | 10.88 | 0 | 1.22 |
| 3-107 | 0 | 25.66 | 1.12 | 0 | 4.11 | 2.26 | 0.75 | 0 | 12.63 | 0 | 1.22 |
| 3-108 | 0 | 26.1 | 1.13 | 0 | 4.32 | 2.28 | 0.75 | 0 | 11.39 | 0 | 1.23 |
| 3-109 | 0 | 25.88 | 1.13 | 0 | 4.27 | 2.53 | 0.75 | 0 | 11.39 | 0 | 1.23 |
| 3-110 | 0 | 25.88 | 1.13 | 0 | 4.32 | 2.28 | 0.94 | 0 | 11.39 | 0 | 1.23 |
| 3-111 | 0 | 25.88 | 1.13 | 0 | 4.38 | 2.03 | 1.13 | 0 | 11.39 | 0 | 1.23 |
| 3-112 | 0 | 26.2 | 1.15 | 0 | 4.68 | 2.31 | 0.76 | 0 | 11.54 | 0 | 0 |
| 3-113 | 0 | 26.1 | 1.14 | 0 | 4.66 | 2.3 | 0.76 | 0 | 10.59 | 0 | 0 |
| 3-114 | 0 | 25.99 | 1.14 | 0 | 4.64 | 2.29 | 0.76 | 0 | 10.54 | 0 | 0 |
| 3-115 | 0 | 25.88 | 1.13 | 0 | 4.62 | 2.28 | 0.75 | 0 | 10.5 | 0 | 0 |
| 3-116 | 0 | 26.32 | 1.15 | 0 | 4.7 | 2.32 | 0.77 | 0 | 11.59 | 0 | 0 |
| 3-117 | 0 | 26.88 | 1.13 | 0 | 4.39 | 2.28 | 0.75 | 0 | 10.51 | 0 | 0 |
| 3-118 | 0 | 27.37 | 1.13 | 0 | 4.63 | 1.54 | 0.75 | 0 | 10.51 | 0 | 0 |
| 3-119 | 0 | 26.49 | 1.15 | 0 | 4.68 | 2.31 | 0.76 | 0 | 10.62 | 0 | 0 |
| 3-120 | 0 | 27.24 | 1.11 | 0 | 4.52 | 2.23 | 0.74 | 0 | 10.26 | 0 | 2.4 |
| 3-121 | 0 | 27.75 | 1.13 | 0 | 4.14 | 2.27 | 0.75 | 0 | 11.37 | 0 | 0 |
| 3-122 | 0 | 25.93 | 1.14 | 0 | 4.15 | 2.28 | 2.27 | 0 | 11.42 | 0 | 0 |
| 3-123 | 0 | 26.07 | 1.14 | 0 | 4.66 | 1.3 | 2.28 | 0 | 11.48 | 0 | 0 |
| 3-124 | 0 | 25.8 | 1.13 | 0 | 4.13 | 1.28 | 3.76 | 0 | 11.36 | 0 | 0 |
| 3-125 | 0 | 27.61 | 1.13 | 0 | 4.59 | 2.26 | 0.75 | 0 | 11.32 | 0 | 0 |
| 3-126 | 0 | 26.55 | 1.16 | 0 | 4.74 | 2.34 | 0.77 | 0 | 11.69 | 0 | 0 |
| 3-127 | 0 | 26.78 | 1.17 | 0 | 4.79 | 2.36 | 0.78 | 0 | 11.79 | 0 | 0 |
| 3-128 | 0 | 26.81 | 1.13 | 0 | 4.14 | 2.27 | 0.75 | 0 | 12.27 | 0 | 0 |
| 3-129 | 0 | 26.12 | 1.71 | 0 | 4.43 | 2.3 | 0.76 | 0 | 11.5 | 0 | 0 |
| 3-130 | 0 | 26.2 | 1.71 | 0 | 4.44 | 2.31 | 0.76 | 0 | 11.54 | 0 | 0 |
| 3-131 | 0 | 26.24 | 1.15 | 0 | 4.69 | 2.31 | 0.76 | 0 | 11.55 | 0 | 0 |
| 3-132 | 0 | 25.99 | 1.6 | 0 | 4.7 | 2.31 | 0.77 | 0 | 11.11 | 0 | 0 |
| 3-133 | 0 | 26.72 | 1.17 | 0 | 4.78 | 2.35 | 0.78 | 0 | 11.76 | 0 | 0 |
| 3-134 | 0 | 26.84 | 1.18 | 0 | 4.8 | 2.36 | 0.78 | 0 | 11.82 | 0 | 0 |

| No. | $TiO_2$ | $Nb_2O_5$ | $ZrO_2$ | ZnO | $Ta_2O_5$ | $Gd_2O_3$ | $La_2O_3$ | $Y_2O_3$ | Total | $Sb_2O_3$ |
|---|---|---|---|---|---|---|---|---|---|---|
| 3-96 | 27.37 | 24.9 | 0 | 0 | 0 | 0 | 0 | 0 | 100 | 0.03 |
| 3-97 | 27.22 | 24.78 | 0 | 0 | 0 | 0 | 0 | 0 | 100 | 0.03 |
| 3-98 | 27.21 | 24.78 | 0 | 0 | 0 | 0 | 0 | 0 | 100 | 0.03 |
| 3-99 | 27.12 | 24.68 | 0 | 0 | 0 | 0 | 0 | 0 | 100 | 0.03 |
| 3-100 | 29.01 | 23.11 | 0 | 0 | 0 | 0 | 0 | 0 | 100 | 0.03 |

TABLE 3-1(3)-continued

| Glass composition (% by mass) | | | | | | | | | | |
|---|---|---|---|---|---|---|---|---|---|---|
| 3-101 | 28.83 | 22.95 | 0 | 0 | 0 | 0 | 0 | 0 | 100 | 0.03 |
| 3-102 | 27.3 | 24.84 | 0 | 0 | 0 | 0 | 0 | 0 | 100 | 0.03 |
| 3-103 | 28.04 | 23.36 | 0 | 0 | 0 | 0 | 0 | 0 | 100 | 0.03 |
| 3-104 | 26.52 | 25.31 | 0 | 0 | 0 | 0 | 0 | 0 | 100 | 0.03 |
| 3-105 | 27.57 | 25.1 | 0 | 0 | 0 | 0 | 0 | 0 | 100 | 0.03 |
| 3-106 | 27.43 | 24.97 | 0 | 0 | 0 | 0 | 0 | 0 | 100 | 0.03 |
| 3-107 | 27.35 | 24.9 | 0 | 0 | 0 | 0 | 0 | 0 | 100 | 0.03 |
| 3-108 | 28.84 | 22.97 | 0.99 | 0 | 0 | 0 | 0 | 0 | 100 | 0.03 |
| 3-109 | 28.85 | 22.98 | 0.99 | 0 | 0 | 0 | 0 | 0 | 100 | 0.03 |
| 3-110 | 28.86 | 22.98 | 0.99 | 0 | 0 | 0 | 0 | 0 | 100 | 0.03 |
| 3-111 | 28.86 | 22.98 | 0.99 | 0 | 0 | 0 | 0 | 0 | 100 | 0.03 |
| 3-112 | 27.93 | 25.43 | 0 | 0 | 0 | 0 | 0 | 0 | 100 | 0.03 |
| 3-113 | 29.12 | 25.33 | 0 | 0 | 0 | 0 | 0 | 0 | 100 | 0.03 |
| 3-114 | 28.35 | 26.29 | 0 | 0 | 0 | 0 | 0 | 0 | 100 | 0.03 |
| 3-115 | 27.6 | 27.24 | 0 | 0 | 0 | 0 | 0 | 0 | 100 | 0.03 |
| 3-116 | 28.7 | 24.45 | 0 | 0 | 0 | 0 | 0 | 0 | 100 | 0.03 |
| 3-117 | 28.92 | 25.14 | 0 | 0 | 0 | 0 | 0 | 0 | 100 | 0.03 |
| 3-118 | 28.92 | 25.15 | 0 | 0 | 0 | 0 | 0 | 0 | 100 | 0.03 |
| 3-119 | 29.22 | 24.77 | 0 | 0 | 0 | 0 | 0 | 0 | 100 | 0.03 |
| 3-120 | 26.96 | 24.54 | 0 | 0 | 0 | 0 | 0 | 0 | 100 | 0.03 |
| 3-121 | 27.53 | 25.06 | 0 | 0 | 0 | 0 | 0 | 0 | 100 | 0.03 |
| 3-122 | 27.65 | 25.16 | 0 | 0 | 0 | 0 | 0 | 0 | 100 | 0.03 |
| 3-123 | 27.78 | 25.29 | 0 | 0 | 0 | 0 | 0 | 0 | 100 | 0.03 |
| 3-124 | 27.51 | 25.03 | 0 | 0 | 0 | 0 | 0 | 0 | 100 | 0.03 |
| 3-125 | 27.4 | 24.94 | 0 | 0 | 0 | 0 | 0 | 0 | 100 | 0.03 |
| 3-126 | 26.99 | 25.76 | 0 | 0 | 0 | 0 | 0 | 0 | 100 | 0.03 |
| 3-127 | 28.55 | 23.78 | 0 | 0 | 0 | 0 | 0 | 0 | 100 | 0.03 |
| 3-128 | 27.56 | 25.07 | 0 | 0 | 0 | 0 | 0 | 0 | 100 | 0.03 |
| 3-129 | 27.84 | 25.34 | 0 | 0 | 0 | 0 | 0 | 0 | 100 | 0.03 |
| 3-130 | 27.94 | 23.27 | 0 | 0 | 0 | 0 | 0 | 1.83 | 100 | 0.03 |
| 3-131 | 27.99 | 23.31 | 2 | 0 | 0 | 0 | 0 | 0 | 100 | 0.03 |
| 3-132 | 28.02 | 25.5 | 0 | 0 | 0 | 0 | 0 | 0 | 100 | 0 |
| 3-133 | 26.51 | 25.93 | 0 | 0 | 0 | 0 | 0 | 0 | 100 | 0 |
| 3-134 | 27.28 | 24.94 | 0 | 0 | 0 | 0 | 0 | 0 | 100 | 0 |

TABLE 3-1(4)

| Glass composition (% by mass) | | | | | | | | | | | |
|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO |
| 3-135 | 0 | 26.96 | 1.18 | 0 | 4.82 | 2.37 | 0.78 | 0 | 11.87 | 0 | 0 |
| 3-136 | 0 | 27.08 | 1.19 | 0 | 4.84 | 2.38 | 0.79 | 0 | 11.92 | 0 | 0 |
| 3-137 | 0 | 26.14 | 1.14 | 0 | 4.91 | 2.3 | 0.76 | 0 | 11.51 | 0 | 0 |
| 3-138 | 0 | 26.07 | 1.14 | 0 | 4.66 | 2.79 | 0.76 | 0 | 11.48 | 0 | 0 |
| 3-139 | 0 | 26.01 | 1.14 | 0 | 4.65 | 2.29 | 1.51 | 0 | 11.45 | 0 | 0 |
| 3-140 | 0 | 25.97 | 1.14 | 0 | 4.64 | 2.29 | 0.76 | 0 | 12.33 | 0 | 0 |
| 3-141 | 0 | 25.58 | 1.12 | 0 | 4.57 | 2.25 | 0.74 | 0 | 10.37 | 0 | 2.42 |
| 3-142 | 0 | 25.37 | 1.11 | 0 | 4.53 | 2.23 | 0.74 | 0 | 10.29 | 0 | 2.4 |
| 3-143 | 0 | 25.63 | 1.12 | 0 | 4.34 | 2.26 | 0.75 | 0 | 11.28 | 0 | 2.43 |
| 3-144 | 0 | 25.44 | 1.11 | 0 | 4.31 | 2.24 | 0.74 | 0 | 10.32 | 1.63 | 2.41 |
| 3-145 | 0 | 25.53 | 1.12 | 0 | 4.33 | 2.25 | 0.74 | 0 | 10.35 | 0 | 2.42 |
| 3-146 | 0 | 25.36 | 1.11 | 0 | 4.3 | 2.23 | 0.74 | 0 | 10.29 | 0 | 2.4 |
| 3-147 | 0 | 24.85 | 1.13 | 0 | 4.61 | 2.27 | 0.75 | 0 | 11.36 | 0 | 2.45 |
| 3-148 | 0 | 24.67 | 1.12 | 0 | 4.58 | 2.26 | 0.75 | 0 | 10.39 | 1.64 | 2.43 |
| 3-149 | 0 | 25.71 | 0.57 | 0 | 4.59 | 2.26 | 0.75 | 0 | 11.32 | 0 | 2.44 |
| 3-150 | 0 | 25.52 | 0.57 | 0 | 4.56 | 2.25 | 0.74 | 0 | 10.35 | 1.63 | 2.42 |
| 3-151 | 0 | 25.65 | 1.13 | 0 | 4.62 | 2.28 | 0.75 | 0 | 10.48 | 0 | 2.45 |
| 3-152 | 0 | 25.72 | 1.13 | 0 | 4.6 | 2.27 | 0.75 | 0 | 10.44 | 0 | 2.44 |
| 3-153 | 0 | 25.69 | 1.13 | 0 | 4.61 | 2.27 | 0.75 | 0 | 10.46 | 0 | 2.44 |
| 3-154 | 0 | 25.76 | 1.13 | 0 | 4.57 | 2.27 | 0.75 | 0 | 10.45 | 0 | 2.44 |
| 3-155 | 0 | 25.94 | 1.13 | 0 | 4.6 | 2.27 | 0.75 | 0 | 10.44 | 0 | 2.44 |
| 3-156 | 0 | 25.51 | 1.13 | 0 | 4.63 | 2.28 | 0.75 | 0 | 10.5 | 0 | 2.45 |
| 3-157 | 0 | 25.9 | 1.13 | 0 | 4.61 | 2.27 | 0.75 | 0 | 10.47 | 0 | 2.45 |
| 3-158 | 0 | 25.59 | 1.13 | 0 | 4.61 | 2.27 | 0.75 | 0 | 10.46 | 0 | 2.44 |
| 3-159 | 0 | 13.35 | 0.93 | 0 | 2.83 | 0.65 | 0 | 0 | 8.61 | 0 | 17.92 |
| 3-160 | 0 | 13.42 | 0.93 | 0 | 2.06 | 2.29 | 0 | 0 | 8.66 | 0 | 18.01 |
| 3-161 | 0 | 13.61 | 0.95 | 0 | 2.09 | 2.32 | 0 | 0 | 8.78 | 0 | 18.27 |
| 3-162 | 0 | 13.33 | 0.93 | 0 | 2.04 | 2.27 | 0 | 0 | 8.6 | 0 | 17.89 |
| 3-163 | 0 | 13.52 | 0.94 | 0 | 2.07 | 2.3 | 0 | 0 | 8.72 | 0 | 18.14 |
| 3-164 | 0 | 13.48 | 0.94 | 0 | 2.46 | 1.48 | 0 | 0 | 8.7 | 0 | 18.09 |
| 3-165 | 0 | 13.54 | 0.94 | 0 | 2.87 | 0.66 | 0 | 0 | 8.73 | 0 | 18.17 |
| 3-166 | 0 | 13.58 | 0.95 | 0 | 3.2 | 0 | 0 | 0 | 8.76 | 0 | 18.23 |
| 3-167 | 0 | 24.94 | 1.09 | 0 | 3.77 | 2.2 | 0.73 | 1.24 | 10.11 | 0 | 4.73 |
| 3-168 | 0 | 24.82 | 1.09 | 0 | 3.75 | 2.18 | 0.72 | 0 | 11.79 | 0 | 4.71 |

TABLE 3-1(4)-continued

| Glass composition (% by mass) | | | | | | | | | | | |
|---|---|---|---|---|---|---|---|---|---|---|---|
| 3-169 | 0 | 24.46 | 1.07 | 0 | 3.69 | 2.15 | 0.71 | 0 | 9.92 | 3.13 | 4.64 |
| 3-170 | 0 | 24.61 | 1.08 | 0 | 3.94 | 2.17 | 0.72 | 0 | 9.98 | 0 | 7 |
| 3-171 | 0 | 23.82 | 1.04 | 0 | 3.16 | 2.1 | 0.69 | 0 | 9.66 | 6.1 | 4.52 |
| 3-172 | 0 | 23.96 | 1.05 | 0 | 3.4 | 2.11 | 0.7 | 0 | 9.72 | 3.07 | 6.81 |
| 3-173 | 0 | 24.1 | 1.06 | 0 | 3.64 | 2.12 | 0.7 | 0 | 9.77 | 0 | 9.14 |
| 3-174 | 0 | 24.2 | 1.06 | 0 | 4.1 | 2.13 | 0.7 | 0 | 9.81 | 0 | 4.59 |
| 3-175 | 0 | 24.79 | 1.09 | 0 | 4.2 | 2.18 | 0.72 | 0 | 10.05 | 0 | 4.7 |
| 3-176 | 0 | 24.68 | 1.08 | 0 | 4.18 | 2.17 | 0.72 | 0 | 10.01 | 0 | 4.68 |
| 3-177 | 0 | 24.47 | 1.07 | 0 | 4.15 | 2.15 | 0.71 | 0 | 9.93 | 0 | 4.64 |
| 3-178 | 0 | 24.82 | 1.09 | 0 | 4.21 | 2.19 | 0.72 | 0 | 10.07 | 0 | 4.71 |

| No. | $TiO_2$ | $Nb_2O_5$ | $ZrO_2$ | ZnO | $Ta_2O_5$ | $Gd_2O_3$ | $La_2O_3$ | $Y_2O_3$ | Total | $Sb_2O_3$ |
|---|---|---|---|---|---|---|---|---|---|---|
| 3-135 | 28.08 | 23.94 | 0 | 0 | 0 | 0 | 0 | 0 | 100 | 0 |
| 3-136 | 28.86 | 22.94 | 0 | 0 | 0 | 0 | 0 | 0 | 100 | 0 |
| 3-137 | 27.88 | 25.36 | 0 | 0 | 0 | 0 | 0 | 0 | 100 | 0 |
| 3-138 | 27.8 | 25.3 | 0 | 0 | 0 | 0 | 0 | 0 | 100 | 0 |
| 3-139 | 27.72 | 25.23 | 0 | 0 | 0 | 0 | 0 | 0 | 100 | 0 |
| 3-140 | 27.67 | 25.2 | 0 | 0 | 0 | 0 | 0 | 0 | 100 | 0 |
| 3-141 | 26.02 | 26.93 | 0 | 0 | 0 | 0 | 0 | 0 | 100 | 0.03 |
| 3-142 | 24.54 | 28.79 | 0 | 0 | 0 | 0 | 0 | 0 | 100 | 0.03 |
| 3-143 | 27.32 | 24.87 | 0 | 0 | 0 | 0 | 0 | 0 | 100 | 0.03 |
| 3-144 | 27.12 | 24.68 | 0 | 0 | 0 | 0 | 0 | 0 | 100 | 0.03 |
| 3-145 | 27.21 | 24.77 | 0 | 1.28 | 0 | 0 | 0 | 0 | 100 | 0.03 |
| 3-146 | 27.03 | 24.61 | 1.93 | 0 | 0 | 0 | 0 | 0 | 100 | 0.03 |
| 3-147 | 27.53 | 25.05 | 0 | 0 | 0 | 0 | 0 | 0 | 100 | 0.03 |
| 3-148 | 27.3 | 24.86 | 0 | 0 | 0 | 0 | 0 | 0 | 100 | 0.03 |
| 3-149 | 27.41 | 24.95 | 0 | 0 | 0 | 0 | 0 | 0 | 100 | 0.03 |
| 3-150 | 27.2 | 24.76 | 0 | 0 | 0 | 0 | 0 | 0 | 100 | 0.03 |
| 3-151 | 27.56 | 25.08 | 0 | 0 | 0 | 0 | 0 | 0 | 100 | 0.03 |
| 3-152 | 27.68 | 24.97 | 0 | 0 | 0 | 0 | 0 | 0 | 100 | 0.03 |
| 3-153 | 27.63 | 25.02 | 0 | 0 | 0 | 0 | 0 | 0 | 100 | 0.03 |
| 3-154 | 27.64 | 24.99 | 0 | 0 | 0 | 0 | 0 | 0 | 100 | 0.03 |
| 3-155 | 27.45 | 24.98 | 0 | 0 | 0 | 0 | 0 | 0 | 100 | 0.03 |
| 3-156 | 27.62 | 25.13 | 0 | 0 | 0 | 0 | 0 | 0 | 100 | 0.03 |
| 3-157 | 27.38 | 25.04 | 0 | 0 | 0 | 0 | 0 | 0 | 100 | 0.03 |
| 3-158 | 27.74 | 25.01 | 0 | 0 | 0 | 0 | 0 | 0 | 100 | 0.03 |
| 3-159 | 32.59 | 21.47 | 1.65 | 0 | 0 | 0 | 0 | 0 | 100 | 0.03 |
| 3-160 | 34.89 | 18.09 | 1.65 | 0 | 0 | 0 | 0 | 0 | 100 | 0.03 |
| 3-161 | 37.52 | 14.78 | 1.68 | 0 | 0 | 0 | 0 | 0 | 100 | 0.03 |
| 3-162 | 33.6 | 19.7 | 1.64 | 0 | 0 | 0 | 0 | 0 | 100 | 0.03 |
| 3-163 | 36.19 | 16.45 | 1.67 | 0 | 0 | 0 | 0 | 0 | 100 | 0.03 |
| 3-164 | 35.03 | 18.16 | 1.66 | 0 | 0 | 0 | 0 | 0 | 100 | 0.03 |
| 3-165 | 35.18 | 18.24 | 1.67 | 0 | 0 | 0 | 0 | 0 | 100 | 0.03 |
| 3-166 | 35.31 | 18.3 | 1.67 | 0 | 0 | 0 | 0 | 0 | 100 | 0.03 |
| 3-167 | 25.97 | 25.22 | 0 | 0 | 0 | 0 | 0 | 0 | 100 | 0.03 |
| 3-168 | 25.84 | 25.1 | 0 | 0 | 0 | 0 | 0 | 0 | 100 | 0.03 |
| 3-169 | 25.49 | 24.74 | 0 | 0 | 0 | 0 | 0 | 0 | 100 | 0.03 |
| 3-170 | 25.62 | 24.88 | 0 | 0 | 0 | 0 | 0 | 0 | 100 | 0.03 |
| 3-171 | 24.82 | 24.09 | 0 | 0 | 0 | 0 | 0 | 0 | 100 | 0.03 |
| 3-172 | 24.95 | 24.23 | 0 | 0 | 0 | 0 | 0 | 0 | 100 | 0.03 |
| 3-173 | 25.1 | 24.37 | 0 | 0 | 0 | 0 | 0 | 0 | 100 | 0.03 |
| 3-174 | 21.62 | 24.48 | 0 | 0 | 0 | 0 | 7.31 | 0 | 100 | 0.03 |
| 3-175 | 25.82 | 18.96 | 0 | 0 | 0 | 0 | 7.49 | 0 | 100 | 0.03 |
| 3-176 | 25.69 | 16.85 | 0 | 0 | 0 | 0 | 9.94 | 0 | 100 | 0.03 |
| 3-177 | 25.5 | 17.51 | 0 | 0 | 0 | 9.87 | 0 | 0 | 100 | 0.03 |
| 3-178 | 25.83 | 16.54 | 0 | 0 | 0 | 3.89 | 3.5 | 2.43 | 100 | 0.03 |

TABLE 3-2(1)

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2$ + $Nb_2O_5$ | $TiO_2$/($TiO_2$ + $Nb_2O_5$) |
| 3-1 | 1.92564 | 23.09 | 3.639 | 605 | 556 | 460 | 376 | 0.53 | 49.93 | 0.53 |
| 3-2 | 1.91696 | 23.17 | 3.631 | 607 | 541 | 454 | 374 | 0.53 | 49.47 | 0.53 |
| 3-3 | 1.92371 | 23.31 | 3.656 | 615 | 572 | 467 | 377 | 0.53 | 49.22 | 0.53 |
| 3-4 | 1.92372 | 23.50 | 3.659 | 623 | 552 | 453 | 374 | 0.53 | 48.78 | 0.53 |
| 3-5 | 1.91048 | | 3.410 | 580 | 554 | 458 | 375 | 0.56 | 51.67 | 0.57 |
| 3-6 | 1.91272 | 23.06 | 3.418 | 583 | 548 | 456 | 374 | 0.56 | 52.00 | 0.57 |
| 3-7 | 1.92316 | 22.52 | 3.441 | 583 | 556 | 461 | 377 | 0.56 | 55.19 | 0.53 |
| 3-8 | 1.92110 | | 3.441 | | 555 | 459 | 376 | 0.56 | 55.04 | 0.53 |
| 3-9 | 1.92309 | | 3.448 | | N/A | 497 | 378 | 0.56 | 54.95 | 0.53 |

TABLE 3-2(1)-continued

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2$ + $Nb_2O_5$ | $TiO_2$/($TiO_2$ + $Nb_2O_5$) |
| 3-10 | 1.92293 | 22.63 | 3.449 | | 541 | 455 | 376 | 0.56 | 54.81 | 0.53 |
| 3-11 | 1.92337 | | 3.400 | 580 | N/A | 484 | 378 | 0.57 | 56.30 | 0.53 |
| 3-12 | 1.91933 | | 3.394 | 577 | 549 | 459 | 376 | 0.57 | 56.04 | 0.53 |
| 3-13 | 1.90059 | 23.31 | 3.364 | 582 | 666 | 459 | 374 | 0.56 | 54.07 | 0.51 |
| 3-14 | 1.90590 | 22.97 | 3.372 | 571 | N/A | 478 | 374 | 0.57 | 54.50 | 0.51 |
| 3-15 | 1.90099 | 23.01 | 3.333 | | 693 | 460 | 374 | 0.57 | 53.25 | 0.57 |
| 3-16 | 1.90643 | 22.88 | 3.341 | | N/A | 500 | 375 | 0.57 | 53.69 | 0.57 |
| 3-17 | 1.88584 | 23.83 | 3.313 | 573 | 514 | 438 | 371 | 0.57 | 51.71 | 0.55 |
| 3-18 | 1.88581 | 24.02 | 3.329 | 582 | 528 | 439 | 371 | 0.57 | 51.00 | 0.55 |
| 3-19 | 1.88185 | 23.84 | 3.311 | | 508 | 437 | 370 | 0.57 | 51.44 | 0.55 |
| 3-20 | 1.93027 | 22.53 | 3.429 | 580 | 562 | 473 | 379 | 0.56 | 56.37 | 0.53 |
| 3-21 | 1.92297 | 21.40 | 3.415 | 587 | 573 | 475 | 380 | 0.56 | 55.56 | 0.53 |
| 3-22 | 1.92238 | 22.77 | 3.429 | 594 | 564 | 471 | 379 | 0.56 | 54.84 | 0.53 |
| 3-23 | 1.90832 | 23.09 | 3.381 | 572 | 555 | 465 | 376 | 0.56 | 54.87 | 0.51 |
| 3-24 | 1.90598 | 22.63 | 3.372 | 578 | 563 | 471 | 378 | 0.57 | 55.14 | 0.53 |
| 3-25 | 1.92643 | 22.32 | 3.413 | 572 | 590 | 480 | 380 | 0.56 | 56.84 | 0.53 |
| 3-26 | 1.91948 | | 3.382 | | 666 | 487 | 381 | 0.57 | 56.75 | 0.53 |
| 3-27 | 1.90072 | 23.33 | 3.393 | 580 | 560 | 469 | 377 | 0.56 | 53.29 | 0.51 |
| 3-28 | 1.90098 | 23.35 | 3.413 | 585 | 569 | 468 | 376 | 0.56 | 52.87 | 0.51 |
| 3-29 | 1.90423 | 23.18 | 3.392 | 585 | 570 | 470 | 377 | 0.56 | 53.13 | 0.51 |
| 3-30 | 1.90037 | 23.40 | 3.397 | 580 | 568 | 466 | 375 | 0.56 | 54.85 | 0.44 |
| 3-31 | 1.88576 | 23.40 | 3.343 | 578 | 553 | 465 | 375 | 0.56 | 53.03 | 0.51 |
| 3-32 | 1.89768 | 23.50 | 3.429 | | 554 | 461 | 374 | 0.55 | 55.60 | 0.39 |
| 3-33 | 1.89943 | 23.74 | 3.458 | | 559 | 461 | 373 | 0.55 | 56.32 | 0.33 |
| 3-34 | 1.89182 | 22.03 | 3.345 | | 556 | 466 | 377 | 0.57 | 53.48 | 0.51 |
| 3-35 | 1.89719 | 23.33 | 3.345 | | 564 | 469 | 377 | 0.57 | 53.93 | 0.51 |
| 3-36 | 1.89548 | 23.20 | 3.352 | | 569 | 468 | 377 | 0.57 | 53.57 | 0.51 |
| 3-37 | 1.89641 | 23.24 | 3.356 | | 549 | 464 | 377 | 0.57 | 53.73 | 0.51 |
| 3-38 | 1.90091 | 23.33 | 3.404 | 584 | 545 | 462 | 376 | 0.56 | 53.07 | 0.51 |
| 3-39 | 1.90124 | 23.49 | 3.457 | 586 | 565 | 469 | 377 | 0.55 | 51.73 | 0.51 |
| 3-40 | 1.90126 | 23.64 | 3.504 | 590 | 562 | 466 | 376 | 0.54 | 50.65 | 0.51 |
| 3-41 | 1.89547 | 23.57 | 3.406 | 586 | 561 | 464 | 375 | 0.56 | 52.32 | 0.50 |
| 3-42 | 1.89561 | 23.51 | 3.398 | 582 | 551 | 461 | 375 | 0.56 | 52.10 | 0.52 |
| 3-43 | 1.90107 | 23.33 | 3.402 | 581 | 551 | 465 | 376 | 0.56 | 53.11 | 0.51 |
| 3-44 | 1.89703 | 23.40 | 3.405 | 580 | 565 | 469 | 377 | 0.56 | 52.60 | 0.51 |
| 3-45 | 1.89909 | 23.40 | 3.406 | 581 | 566 | 468 | 376 | 0.56 | 52.74 | 0.51 |
| 3-46 | 1.89968 | 23.36 | 3.408 | 582 | 569 | 466 | 376 | 0.56 | 52.73 | 0.51 |
| 3-47 | 1.8991 | 23.43 | 3.380 | 584 | 626 | 474 | 376 | 0.56 | 52.57 | 0.50 |
| 3-48 | 1.89915 | 23.42 | 3.375 | 586 | 579 | 468 | 376 | 0.56 | 52.37 | 0.52 |

TABLE 3-2(2)

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2$ + $Nb_2O_5$ | $TiO_2$/($TiO_2$ + $Nb_2O_5$) |
| 3-49 | 1.90093 | 23.39 | 3.407 | 583 | 570 | 470 | 376 | 0.56 | 52.87 | 0.51 |
| 3-50 | 1.89667 | 23.45 | 3.400 | 582 | 557 | 465 | 376 | 0.56 | 52.61 | 0.51 |
| 3-51 | 1.89848 | 23.46 | 3.404 | 586 | 553 | 466 | 377 | 0.56 | 52.66 | 0.51 |
| 3-52 | 1.90705 | 23.43 | 3.417 | 578 | 561 | 472 | 378 | 0.56 | 53.08 | 0.51 |
| 3-53 | 1.90226 | 23.30 | 3.418 | 586 | 556 | 466 | 377 | 0.56 | 53.02 | 0.51 |
| 3-54 | 1.90216 | 23.37 | 3.425 | 589 | 551 | 464 | 376 | 0.56 | 52.69 | 0.51 |
| 3-55 | 1.89924 | 23.48 | 3.452 | 587 | 566 | 470 | 377 | 0.55 | 51.60 | 0.51 |
| 3-56 | 1.89899 | 23.53 | 3.399 | 583 | 565 | 469 | 377 | 0.56 | 52.53 | 0.52 |
| 3-57 | 1.9636 | 23.38 | 3.858 | 621 | 648 | 499 | 387 | 0.51 | 49.98 | 0.57 |
| 3-58 | 1.95856 | 22.26 | 3.830 | 639 | 656 | 499 | 387 | 0.51 | 49.22 | 0.57 |
| 3-59 | 1.95316 | 22.30 | 3.668 | 621 | 668 | 500 | 387 | 0.53 | 52.57 | 0.57 |
| 3-60 | 1.95215 | 21.79 | 3.720 | 618 | N/A | 524 | 385 | 0.52 | 53.91 | 0.46 |
| 3-61 | 1.99951 | 21.92 | 3.890 | 636 | N/A | 518 | 394 | 0.51 | 52.82 | 0.60 |
| 3-62 | 2.00242 | 21.02 | 3.817 | 628 | N/A | 526 | 395 | 0.52 | 54.76 | 0.60 |
| 3-63 | 1.99474 | 20.78 | 3.787 | 616 | N/A | 520 | 393 | 0.53 | 57.59 | 0.50 |
| 3-64 | 1.99624 | 21.02 | 3.865 | 629 | N/A | 517 | 396 | 0.52 | 53.59 | 0.60 |
| 3-65 | 1.99462 | 21.17 | 3.907 | 637 | N/A | 516 | 395 | 0.51 | 52.62 | 0.60 |
| 3-66 | 1.90223 | 23.36 | 3.405 | 585 | 566 | 472 | 378 | 0.56 | 52.45 | 0.52 |
| 3-67 | 1.9023 | 23.44 | 3.459 | 589 | 564 | 469 | 377 | 0.55 | 51.52 | 0.51 |
| 3-68 | 1.90575 | 23.55 | 3.467 | 590 | 560 | 468 | 377 | 0.55 | 51.44 | 0.51 |
| 3-69 | 1.89824 | 23.79 | 3.498 | 589 | 549 | 462 | 376 | 0.54 | 48.86 | 0.53 |
| 3-70 | 1.89573 | 23.72 | 3.414 | 584 | 559 | 468 | 376 | 0.56 | 50.90 | 0.51 |
| 3-71 | 1.8959 | 23.61 | 3.399 | 586 | 569 | 472 | 377 | 0.56 | 50.49 | 0.55 |

TABLE 3-2(2)-continued

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2$ + $Nb_2O_5$ | $TiO_2$/($TiO_2$ + $Nb_2O_5$) |
| 3-72 | 1.89591 | 23.90 | 3.468 | 590 | 561 | 466 | 376 | 0.55 | 50.02 | 0.50 |
| 3-73 | 1.89598 | 23.79 | 3.452 | 588 | 555 | 465 | 376 | 0.55 | 49.61 | 0.53 |
| 3-74 | 1.90158 | 23.38 | 3.419 | 586 | 561 | 470 | 377 | 0.56 | 52.30 | 0.52 |
| 3-75 | 1.90054 | 23.36 | 3.382 | 586 | 561 | 468 | 377 | 0.56 | 52.87 | 0.52 |
| 3-76 | 1.90183 | 23.54 | 3.473 | 588 | 553 | 465 | 377 | 0.55 | 51.38 | 0.51 |
| 3-77 | 1.90052 | 23.54 | 3.436 | 587 | 551 | 464 | 376 | 0.55 | 51.90 | 0.51 |
| 3-78 | 1.89651 | 23.73 | 3.446 | 591 | 559 | 467 | 376 | 0.55 | 51.40 | 0.51 |
| 3-79 | 1.90232 | 23.46 | 3.456 | 581 | 564 | 471 | 377 | 0.55 | 51.81 | 0.51 |
| 3-80 | 1.90443 | 23.38 | 3.460 | 579 | 564 | 470 | 377 | 0.55 | 52.01 | 0.51 |
| 3-81 | 1.89848 | 23.60 | 3.433 | 586 | 554 | 468 | 377 | 0.55 | 51.69 | 0.50 |
| 3-82 | 1.89833 | 23.60 | 3.43 | 590 | 559 | 469 | 377 | 0.55 | 51.63 | 0.51 |
| 3-83 | 1.89847 | 23.69 | 3.437 | 590 | 548 | 466 | 376 | 0.55 | 51.61 | 0.50 |
| 3-84 | 1.89856 | 23.63 | 3.432 | 582 | 552 | 464 | 376 | 0.55 | 51.49 | 0.51 |
| 3-85 | 1.90048 | 23.64 | 3.438 | | 571 | 475 | 377 | 0.55 | 51.83 | 0.51 |
| 3-86 | 1.89251 | 23.60 | 3.42 | | 565 | 469 | 377 | 0.55 | 51.12 | 0.51 |
| 3-87 | 1.89666 | 23.51 | 3.438 | | 558 | 467 | 377 | 0.55 | 51.60 | 0.51 |
| 3-88 | 1.90344 | 23.43 | 3.452 | | 563 | 467 | 376 | 0.55 | 52.32 | 0.51 |
| 3-89 | 1.88811 | 23.77 | 3.379 | | 575 | 466 | 375 | 0.56 | 51.42 | 0.51 |
| 3-90 | 1.88831 | 23.71 | 3.365 | | 569 | 464 | 375 | 0.56 | 51.01 | 0.55 |
| 3-91 | 1.96914 | 22.11 | 3.89 | 657 | 639 | 500 | 388 | 0.51 | 49.36 | 0.58 |
| 3-92 | 2.01059 | 21.43 | 4.05 | 661 | N/A | 538 | 393 | 0.50 | 50.15 | 0.55 |
| 3-93 | 2.00864 | 21.62 | 4.05 | 670 | N/A | 511 | 391 | 0.50 | 49.66 | 0.55 |
| 3-94 | 2.02551 | 20.90 | 4.06 | 677 | N/A | 549 | 399 | 0.50 | 51.31 | 0.57 |
| 3-95 | 1.99093 | 21.75 | 4.01 | 688 | N/A | 514 | 391 | 0.50 | 49.04 | 0.55 |

TABLE 3-2(3)

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2$ + $Nb_2O_5$ | $TiO_2$/($TiO_2$ + $Nb_2O_5$) |
| 3-96 | 1.89542 | 23.34 | 3.396 | 580 | 557 | 467 | 377 | 0.5581331 | 52.27 | 0.52362732 |
| 3-97 | 1.8914 | 23.41 | 3.395 | 584 | 566 | 468 | 376 | 0.5571134 | 52 | 0.523461538 |
| 3-98 | 1.89093 | 23.44 | 3.384 | 581 | 566 | 468 | 376 | 0.55878546 | 51.99 | 0.523369879 |
| 3-99 | 1.89112 | 23.14 | 3.38 | 590 | 556 | 465 | 377 | 0.55950296 | 51.8 | 0.523552124 |
| 3-100 | 1.89951 | 23.23 | 3.38 | 583 | 551 | 468 | 378 | 0.56198521 | 52.12 | 0.556600153 |
| 3-101 | 1.89942 | 23.36 | 3.388 | 588 | 553 | 467 | 377 | 0.56063164 | 51.78 | 0.556778679 |
| 3-102 | 1.8865 | 23.56 | 3.356 | 582 | 549 | 465 | 376 | 0.56212753 | 52.14 | 0.523590334 |
| 3-103 | 1.88826 | 23.64 | 3.345 | 582 | 545 | 463 | 376 | 0.56450224 | 51.4 | 0.545525292 |
| 3-104 | 1.88811 | 23.75 | 3.361 | | 546 | 464 | 376 | 0.56177031 | 51.83 | 0.511672776 |
| 3-105 | 1.89457 | 23.41 | 3.365 | | 552 | 466 | 377 | 0.56302229 | 52.67 | 0.523447883 |
| 3-106 | 1.88953 | 23.5 | 3.351 | | 544 | 465 | 377 | 0.56387049 | 52.4 | 0.523473282 |
| 3-107 | 1.89895 | 23.5 | 3.393 | | 543 | 465 | 377 | 0.55966696 | 52.25 | 0.523444976 |
| 3-108 | 1.90024 | 23.75 | 3.376 | 588 | 558 | 469 | 378 | 0.5628673 | 51.81 | 0.556649296 |
| 3-109 | 1.90025 | 23.29 | 3.378 | 590 | 558 | 469 | 378 | 0.562537 | 51.83 | 0.556627436 |
| 3-110 | 1.90023 | 23.29 | 3.379 | | 553 | 467 | 378 | 0.5623646 | 51.84 | 0.556712963 |
| 3-111 | 1.89992 | 23.3 | 3.377 | | 552 | 465 | 377 | 0.56260586 | 51.84 | 0.556712963 |
| 3-112 | 1.89897 | 23.3 | 3.359 | 583 | 561 | 472 | 378 | 0.5653379 | 53.36 | 0.523425787 |
| 3-113 | 1.90618 | 22.84 | 3.361 | 583 | 566 | 475 | 379 | 0.56714668 | 54.45 | 0.534802571 |
| 3-114 | 1.90622 | 22.85 | 3.369 | 583 | 570 | 474 | 379 | 0.56581181 | 54.64 | 0.518850659 |
| 3-115 | 1.90606 | 22.92 | 3.376 | 582 | 609 | 475 | 378 | 0.56459123 | 54.84 | 0.503282276 |
| 3-116 | 1.89901 | 23.27 | 3.351 | 584 | 566 | 472 | 377 | 0.56669949 | 53.15 | 0.539981185 |
| 3-117 | 1.90185 | 22.87 | 3.351 | 586 | 595 | 479 | 379 | 0.567547 | 54.06 | 0.534961154 |
| 3-118 | 1.90097 | 22.89 | 3.347 | 587 | 670 | 486 | 380 | 0.56796235 | 54.07 | 0.534862216 |
| 3-119 | 1.90296 | 22.92 | 3.35 | 583 | 560 | 469 | 378 | 0.56804776 | 53.99 | 0.541211335 |
| 3-120 | 1.88883 | 23.63 | 3.372 | 585 | 556 | 466 | 377 | 0.56015125 | 51.5 | 0.523495146 |
| 3-121 | 1.8907 | 23.4 | 3.342 | 590 | 598 | 475 | 377 | 0.56573908 | 52.59 | 0.523483552 |
| 3-122 | 1.89048 | 23.4 | 3.345 | 583 | 561 | 471 | 377 | 0.56516592 | 52.81 | 0.52357508 |
| 3-123 | 1.89424 | 23.38 | 3.346 | 582 | 564 | 471 | 377 | 0.56612074 | 53.07 | 0.523459582 |
| 3-124 | 1.88593 | 23.54 | 3.332 | 584 | 552 | 466 | 377 | 0.5660054 | 52.54 | 0.523601066 |
| 3-125 | 1.88866 | 23.57 | 3.337 | 585 | 557 | 464 | 376 | 0.56597543 | 52.34 | 0.523500191 |
| 3-126 | 1.89279 | 23.57 | 3.353 | 581 | 559 | 468 | 377 | 0.56450641 | 52.75 | 0.511658768 |
| 3-127 | 1.89292 | 23.51 | 3.337 | 580 | 552 | 464 | 376 | 0.56725202 | 52.33 | 0.545576151 |
| 3-128 | 1.89479 | 23.47 | 3.356 | 590 | 556 | 469 | 377 | 0.56459774 | 52.63 | 0.52365571 |
| 3-129 | 1.89777 | 23.26 | 3.354 | 582 | 578 | 474 | 378 | 0.5658229 | 53.18 | 0.523505077 |

TABLE 3-2(3)-continued

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2 + Nb_2O_5$ | $TiO_2/(TiO_2 + Nb_2O_5)$ |
| 3-130 | 1.8924 | 23.68 | 3.361 | 585 | 550 | 466 | 377 | 0.56304671 | 51.21 | 0.545596563 |
| 3-131 | 1.89572 | 23.57 | 3.36 | 587 | 551 | 466 | 377 | 0.56420238 | 51.3 | 0.545614035 |
| 3-132 | 1.89843 | 23.24 | 3.354 | 581 | 546 | 454 | 372 | 0.56601968 | 53.52 | 0.523542601 |
| 3-133 | 1.88954 | 23.77 | 3.348 | 580 | N/A | N/A | 377 | 0.56437873 | 52.44 | 0.50553013 |
| 3-134 | 1.88958 | 23.73 | 3.343 | 582 | N/A | 668 | 376 | 0.56523482 | 52.22 | 0.522405209 |

TABLE 3-2(4)

| | Glass properties | | | | | | | | Glass composition (% by mass) | |
|---|---|---|---|---|---|---|---|---|---|---|
| No. | nd | νd | Specific weight | Tg (° C.) | λ80 (nm) | λ70 (nm) | λ5 (nm) | nd/Specific weight | $TiO_2 + Nb_2O_5$ | $TiO_2/(TiO_2 + Nb_2O_5)$ |
| 3-135 | 1.88967 | 23.64 | 3.335 | 581 | N/A | 580 | 375 | 0.56661769 | 52.02 | 0.539792388 |
| 3-136 | 1.8876 | 23.54 | 3.326 | 582 | N/A | 546 | 374 | 0.56752856 | 51.8 | 0.557142857 |
| 3-137 | 1.89782 | 23.38 | 3.353 | 580 | 665 | 533 | 377 | 0.56600656 | 53.24 | 0.523666416 |
| 3-138 | 1.8959 | 23.39 | 3.353 | 583 | N/A | 556 | 377 | 0.56543394 | 53.1 | 0.52354049 |
| 3-139 | 1.89363 | 23.44 | 3.349 | 583 | N/A | 599 | 379 | 0.56543147 | 52.95 | 0.523512748 |
| 3-140 | 1.89767 | 23.49 | 3.364 | 584 | N/A | 628 | 379 | 0.56411118 | 52.87 | 0.523359183 |
| 3-141 | 1.89935 | 23.42 | 3.411 | 581 | 583 | 500 | 381 | 0.55683084 | 52.95 | 0.491406988 |
| 3-142 | 1.89904 | 23.53 | 3.43 | 584 | 578 | 490 | 378 | 0.55365598 | 53.33 | 0.46015376 |
| 3-143 | 1.89932 | 23.41 | 3.406 | 588 | 593 | 497 | 380 | 0.55763946 | 52.19 | 0.523471929 |
| 3-144 | 1.89937 | 23.62 | 3.426 | 587 | 580 | 500 | 381 | 0.55439872 | 51.8 | 0.523552124 |
| 3-145 | 1.90099 | 23.35 | 3.423 | 578 | 565 | 489 | 379 | 0.55535787 | 51.98 | 0.523470566 |
| 3-146 | 1.90325 | 23.32 | 3.426 | 588 | 591 | 500 | 381 | 0.55553123 | 51.64 | 0.523431448 |
| 3-147 | 1.90299 | 23.41 | 3.412 | 582 | 576 | 488 | 378 | 0.55773447 | 52.58 | 0.523583111 |
| 3-148 | 1.90284 | 23.41 | 3.437 | 583 | 570 | 490 | 379 | 0.55363398 | 52.16 | 0.523389571 |
| 3-149 | 1.90019 | 23.49 | 3.413 | 588 | 576 | 496 | 380 | 0.55675066 | 52.36 | 0.523491215 |
| 3-150 | 1.9003 | 23.51 | 3.433 | 586 | | | | 0.55353918 | 51.96 | 0.5234796 |
| 3-151 | 1.90041 | 23.31 | 3.4 | 582 | 592 | 484 | 378 | 0.55894412 | 52.64 | 0.523556231 |
| 3-152 | 1.90055 | 23.31 | 3.4 | | 591 | 483 | 378 | 0.55898529 | 52.65 | 0.525735992 |
| 3-153 | 1.9005 | 23.29 | 3.401 | 583 | 576 | 474 | 377 | 0.55880623 | 52.65 | 0.524786325 |
| 3-154 | 1.90049 | 23.29 | 3.4 | | 572 | 473 | 377 | 0.55896765 | 52.63 | 0.525175755 |
| 3-155 | 1.89837 | 23.37 | 3.389 | 573 | 567 | 479 | 379 | 0.56015639 | 52.43 | 0.523555216 |
| 3-156 | 1.90132 | 23.29 | 3.4 | 582 | 569 | 483 | 379 | 0.55921176 | 52.75 | 0.523601896 |
| 3-157 | 1.89832 | 23.38 | 3.397 | 583 | 567 | 477 | 378 | 0.55882249 | 52.42 | 0.522319725 |
| 3-158 | 1.90151 | 23.25 | 3.402 | 583 | 558 | 473 | 378 | 0.55893886 | 52.75 | 0.525876777 |
| 3-159 | 2.01328 | 20.96 | 3.919 | 604 | N/A | 522 | 398 | 0.51372289 | 54.06 | 0.602848687 |
| 3-160 | 2.00332 | 20.96 | 3.88 | 612 | N/A | 525 | 397 | 0.51631959 | 52.98 | 0.658550396 |
| 3-161 | 2.00373 | 20.82 | 3.854 | 618 | N/A | 522 | 400 | 0.51990919 | 52.3 | 0.717399618 |
| 3-162 | 2.00319 | 21.01 | 3.89 | 619 | N/A | 517 | 396 | 0.51495887 | 53.3 | 0.630393996 |
| 3-163 | 2.00338 | 20.89 | 3.871 | 619 | 681 | 511 | 396 | 0.51753552 | 52.64 | 0.6875 |
| 3-164 | 2.00866 | 20.89 | 3.888 | 605 | N/A | 527 | 399 | 0.51663066 | 53.19 | 0.65858244 |
| 3-165 | 2.01517 | 20.82 | 3.894 | 609 | N/A | 527 | 400 | 0.51750642 | 53.42 | 0.658554848 |
| 3-166 | 2.01957 | 20.77 | 3.903 | 621 | N/A | 529 | 400 | 0.51744043 | 53.61 | 0.658645775 |
| 3-167 | 1.89886 | 23.64 | 3.456 | 584 | 609 | 502 | 380 | 0.54943866 | 51.19 | 0.50732565 |
| 3-168 | 1.89904 | 23.74 | 3.464 | 594 | 587 | 488 | 378 | 0.54822171 | 50.94 | 0.507263447 |
| 3-169 | 1.89897 | 23.78 | 3.505 | 593 | 573 | 484 | 378 | 0.54178887 | 50.23 | 0.507465658 |
| 3-170 | 1.89946 | 23.69 | 3.496 | 590 | 562 | 478 | 378 | 0.5433238 | 50.5 | 0.507326733 |
| 3-171 | 1.89862 | 24.01 | 3.542 | 598 | 564 | 481 | 378 | 0.53603049 | 48.91 | 0.507462687 |
| 3-172 | 1.89917 | 23.93 | 3.534 | 589 | 567 | 482 | 379 | 0.53739955 | 49.18 | 0.507320049 |
| 3-173 | 1.89987 | 23.81 | 3.529 | 589 | 559 | 479 | 378 | 0.53835931 | 49.47 | 0.507378209 |
| 3-174 | 1.88715 | 25.22 | 3.581 | 591 | 526 | 450 | 371 | 0.52698967 | 46.1 | 0.468980477 |
| 3-175 | 1.88787 | 24.93 | 3.536 | 592 | 537 | 454 | 372 | 0.53389989 | 44.78 | 0.576596695 |
| 3-176 | 1.88398 | 25.39 | 3.564 | 593 | 531 | 451 | 371 | 0.52861392 | 42.54 | 0.60390221 |
| 3-177 | 1.8839 | 25.13 | 3.604 | 596 | 531 | 450 | 371 | 0.52272475 | 43.01 | 0.592885375 |
| 3-178 | 1.88045 | 25.42 | 3.558 | 591 | 531 | 449 | 371 | 0.52851321 | 42.37 | 0.609629455 |

Example 3-2

A lens blank was prepared by using each of the optical glasses prepared in Example 3-1 in accordance with a known method, and various lenses were prepared by processing the lens blank in accordance with a known method such as polishing.

The prepared optical lens was various lenses such as a planar lens, a biconvex lens, a biconcave lens, a plano-convex lens, a plano-concave lens, a concave meniscus lens, and a convex meniscus lens.

A secondary chromatic aberration was capable of being excellently corrected by combining various lenses with a lens including another type of optical glass.

In addition, the glass had a low specific weight, and thus, each of the lenses had a small weight compared to a lens having the same optical properties and size, and was suitable for goggle type or spectacle type AR display device or MR display device. Similarly, a prism was prepared by using various optical glasses prepared in Example 3-1.

Example 3-3

Each of the optical glasses prepared in Example 3-1 was processed into the shape of a rectangular thin plate having Length of 50 mm×Width of 20 mm×Thickness of 1.0 mm to obtain a light guide plate. The light guide plate was built in the head mounted display 1 illustrated in FIG. 2.

In the head mounted display obtained as described above, an image was evaluated in an eye-point position, and a high-brightness and high-contrast image was capable of being observed at a wide viewing angle.

Example 4

Example 4-1

Glass samples having glass compositions shown in Tables 4-1(1), 4-1(2), 4-1(3), 4-1(4), 4-2(1), 4-2(2), 4-2(3), and 4-2(4) were prepared by the following procedure, and various evaluations were performed.

[Manufacturing of Optical Glass]

First, an oxide, a hydroxide, a carbonate, and a nitrate corresponding to structural components of the glass were prepared as a raw material, the raw materials were weighed and blended such that a glass composition of optical glass to be obtained was each of the compositions shown in Tables 4-1(1), 4-1(2), 4-1(3), 4-1(4), 4-2(1), 4-2(2), 4-2(3), and 4-2(4), and the raw materials were sufficiently mixed. A blended raw material (a batch raw material) obtained as described above was put in a platinum crucible, and was heated at 1350° C. to 1400° C. for 2 hours to be molten glass, and the molten glass was stirred, homogenized, and clarified, and then, was cast into a mold that was preheated to a suitable temperature. The cast glass was subjected to a heat treatment at approximately a glass transition temperature Tg for 30 minutes, and was allowed to cool in a furnace to a room temperature, and thus, a glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Tables 4-1(1), 4-1(2), 4-1(3), 4-1(4), 4-2(1), 4-2(2), 4-2(3), and 4-2(4).

[Measurement of Optical Properties]

The obtained glass sample was further subjected to an annealing treatment at approximately the glass transition temperature Tg for approximately 30 minutes to 2 hours, and then, was cooled in the furnace to the room temperature at a temperature decrease rate of −30° C./hour, and thus, an annealed sample was obtained. In the obtained annealed sample, refractive indices nd, ng, nF, and nC, an Abbe's number νd, a specific weight, the glass transition temperature Tg, λ80, λ70, and λ5 were measured. Results are shown in Tables 4-3(1), 4-3(2), 4-3(3), and 4-3(4).

(i) Refractive Indices nd, ng, nF, and nC and Abbe's Number νd

In the annealed sample, the refractive indices nd, ng, nF, and nC were measured by a refractive index measurement method of JIS standard JIS B 7071-1, and the Abbe's number νd was calculated on the basis of the following expression.

$$\nu d=(nd-1)/(nF-nC)$$

(ii) Specific Weight

The specific weight was measured by an Archimedes method.

(iii) Glass Transition Temperature Tg

The glass transition temperature Tg was measured at a temperature increase rate of 10° C./minute by using a differential scanning calorimetric analyzer (DSC3300SA), manufactured by NETZSCH Japan K.K.

(iv) λ80, λ70, and λ5

In the annealed sample having a thickness of 10.0 mm±0.1 mm, a spectral transmittance was measured in a range of a wavelength of 200 to 700 nm. A wavelength at which an external transmittance was 80% was λ80, a wavelength at which an external transmittance was 70% was λ70, and a wavelength at which an external transmittance was 5% was λ5.

TABLE 4-1(1)

| | % by mass | | | | | | | | | | |
|---|---|---|---|---|---|---|---|---|---|---|---|
| No. | $P_2O_5$ | $SiO_2$ | $B_2O_3$ | $Al_2O_3$ | $Li_2O$ | $Na_2O$ | $K_2O$ | MgO | CaO | SrO | BaO |
| 4-1 | 0.00 | 21.48 | 1.02 | 0.00 | 3.09 | 2.49 | 0.00 | 0.00 | 9.41 | 0.00 | 10.78 |
| 4-2 | 0.00 | 21.29 | 1.01 | 0.00 | 2.21 | 4.23 | 0.00 | 0.00 | 9.33 | 0.00 | 10.68 |
| 4-3 | 0.00 | 21.17 | 1.00 | 0.00 | 2.20 | 2.45 | 0.00 | 2.28 | 9.28 | 0.00 | 10.63 |
| 4-4 | 0.00 | 20.99 | 0.99 | 0.00 | 2.18 | 2.43 | 0.00 | 0.00 | 12.34 | 0.00 | 10.53 |
| 4-5 | 0.00 | 24.07 | 2.26 | 0.00 | 4.43 | 2.79 | 0.00 | 0.00 | 10.55 | 0.00 | 2.22 |
| 4-6 | 0.00 | 24.23 | 1.15 | 0.00 | 4.94 | 2.81 | 0.00 | 0.00 | 10.61 | 0.00 | 2.24 |
| 4-7 | 0.00 | 23.74 | 1.12 | 0.00 | 4.61 | 2.75 | 0.00 | 0.00 | 10.40 | 0.00 | 2.19 |
| 4-8 | 0.00 | 23.68 | 1.12 | 0.00 | 4.35 | 3.24 | 0.00 | 0.00 | 10.38 | 0.00 | 2.19 |
| 4-9 | 0.00 | 23.65 | 1.12 | 0.00 | 4.35 | 2.74 | 0.00 | 0.65 | 10.36 | 0.00 | 2.18 |
| 4-10 | 0.00 | 23.59 | 1.12 | 0.00 | 4.34 | 2.73 | 0.00 | 0.00 | 11.23 | 0.00 | 2.18 |
| 4-11 | 0.00 | 24.22 | 1.15 | 0.00 | 4.92 | 2.80 | 0.00 | 0.00 | 10.61 | 0.00 | 0.00 |
| 4-12 | 0.00 | 24.11 | 1.14 | 0.00 | 4.68 | 2.79 | 0.68 | 0.00 | 10.56 | 0.00 | 0.00 |
| 4-13 | 0.00 | 26.33 | 1.15 | 0.00 | 4.95 | 2.82 | 0.00 | 0.00 | 10.68 | 0.00 | 0.00 |
| 4-14 | 0.00 | 24.58 | 2.31 | 0.00 | 4.99 | 2.85 | 0.00 | 0.00 | 10.77 | 0.00 | 0.00 |
| 4-15 | 0.00 | 26.80 | 1.17 | 0.00 | 5.04 | 2.87 | 0.00 | 0.00 | 10.87 | 0.00 | 0.00 |
| 4-16 | 0.00 | 25.02 | 2.35 | 0.00 | 5.08 | 2.90 | 0.00 | 0.00 | 10.96 | 0.00 | 0.00 |
| 4-17 | 0.00 | 28.98 | 1.18 | 0.00 | 5.07 | 2.89 | 0.00 | 0.00 | 10.94 | 0.00 | 0.00 |
| 4-18 | 0.00 | 27.06 | 1.18 | 1.71 | 5.08 | 2.90 | 0.00 | 0.00 | 10.97 | 0.00 | 0.00 |
| 4-19 | 0.00 | 27.39 | 1.20 | 0.00 | 5.65 | 2.94 | 0.00 | 0.00 | 11.11 | 0.00 | 0.00 |
| 4-20 | 0.00 | 27.01 | 1.18 | 0.00 | 5.08 | 2.90 | 0.00 | 0.00 | 12.83 | 0.00 | 0.00 |
| 4-21 | 0.00 | 27.24 | 1.19 | 0.00 | 5.12 | 3.96 | 0.00 | 0.00 | 11.05 | 0.00 | 0.00 |
| 4-22 | 0.00 | 29.50 | 1.20 | 0.00 | 5.16 | 2.94 | 0.00 | 0.00 | 11.14 | 0.00 | 0.00 |
| 4-23 | 0.00 | 29.38 | 1.20 | 0.00 | 5.64 | 2.93 | 0.00 | 0.00 | 9.20 | 0.00 | 0.00 |
| 4-24 | 0.00 | 29.34 | 1.20 | 0.00 | 4.63 | 3.97 | 0.00 | 0.00 | 11.08 | 0.00 | 0.00 |
| 4-25 | 0.00 | 30.04 | 1.22 | 0.00 | 5.26 | 3.00 | 0.00 | 0.00 | 11.34 | 0.00 | 0.00 |

TABLE 4-1(1)-continued

| | % by mass | | | | | | | | | | |
|---|---|---|---|---|---|---|---|---|---|---|---|
| 4-26 | 0.00 | 22.31 | 1.15 | 0.00 | 4.92 | 2.81 | 0.00 | 0.00 | 12.44 | 0.00 | 0.00 |
| 4-27 | 0.00 | 23.90 | 1.13 | 0.00 | 4.38 | 2.77 | 0.00 | 0.00 | 12.26 | 0.00 | 0.00 |
| 4-28 | 0.00 | 23.59 | 1.12 | 0.00 | 3.85 | 2.73 | 0.00 | 0.00 | 13.87 | 0.00 | 0.00 |
| 4-29 | 0.00 | 24.74 | 1.17 | 0.00 | 5.52 | 2.86 | 0.00 | 0.00 | 10.84 | 0.00 | 0.00 |
| 4-30 | 0.00 | 23.73 | 1.12 | 0.00 | 3.87 | 2.75 | 2.99 | 0.00 | 10.40 | 0.00 | 0.00 |
| 4-31 | 0.00 | 22.49 | 1.16 | 0.00 | 4.96 | 3.84 | 0.00 | 0.00 | 10.71 | 0.00 | 0.00 |
| 4-32 | 0.00 | 24.42 | 1.16 | 0.00 | 4.96 | 3.84 | 0.00 | 0.00 | 8.87 | 0.00 | 0.00 |
| 4-33 | 0.00 | 25.96 | 1.14 | 0.00 | 4.64 | 2.78 | 0.00 | 0.00 | 10.53 | 1.66 | 0.00 |
| 4-34 | 0.00 | 25.75 | 1.13 | 0.00 | 4.60 | 2.76 | 0.00 | 0.00 | 10.45 | 0.00 | 2.44 |
| 4-35 | 0.00 | 25.88 | 1.13 | 0.00 | 4.62 | 2.77 | 0.00 | 0.00 | 10.50 | 0.00 | 0.00 |
| 4-36 | 0.00 | 25.89 | 1.13 | 0.00 | 4.86 | 2.77 | 0.00 | 0.00 | 10.50 | 0.00 | 0.00 |
| 4-37 | 0.00 | 25.84 | 1.13 | 0.00 | 3.87 | 3.21 | 2.44 | 0.00 | 10.48 | 0.00 | 0.00 |
| 4-38 | 0.00 | 25.62 | 1.12 | 0.00 | 3.07 | 4.78 | 2.42 | 0.00 | 10.39 | 0.00 | 0.00 |
| 4-39 | 0.00 | 25.41 | 1.11 | 0.00 | 2.28 | 6.31 | 2.40 | 0.00 | 10.31 | 0.00 | 0.00 |
| 4-40 | 0.00 | 25.21 | 1.10 | 0.00 | 1.51 | 7.83 | 2.38 | 0.00 | 10.22 | 0.00 | 0.00 |
| 4-41 | 0.00 | 26.05 | 1.14 | 0.00 | 4.68 | 1.62 | 2.46 | 0.00 | 10.57 | 0.00 | 0.00 |
| 4-42 | 0.00 | 26.27 | 1.15 | 0.00 | 5.51 | 0.00 | 2.48 | 0.00 | 10.66 | 0.00 | 0.00 |
| 4-43 | 1.15 | 26.16 | 1.14 | 0.00 | 4.43 | 2.81 | 0.00 | 0.00 | 10.61 | 0.00 | 0.00 |
| 4-44 | 0.00 | 26.18 | 1.15 | 0.83 | 4.68 | 2.81 | 0.00 | 0.00 | 10.62 | 0.00 | 0.00 |
| 4-45 | 0.00 | 25.86 | 1.13 | 0.00 | 4.62 | 2.77 | 0.00 | 0.00 | 10.49 | 0.83 | 1.23 |
| 4-46 | 0.00 | 25.20 | 1.10 | 0.00 | 4.27 | 2.70 | 0.00 | 0.00 | 10.22 | 0.00 | 4.78 |
| 4-47 | 0.00 | 24.67 | 1.08 | 0.00 | 3.95 | 2.64 | 0.00 | 0.00 | 10.00 | 0.00 | 7.01 |
| 4-48 | 0.00 | 26.27 | 1.13 | 0.00 | 4.61 | 2.77 | 0.00 | 0.00 | 10.46 | 0.00 | 2.45 |
| 4-49 | 0.00 | 26.39 | 1.13 | 0.00 | 4.63 | 2.78 | 0.00 | 0.00 | 10.51 | 0.00 | 2.46 |
| 4-50 | 0.00 | 25.87 | 1.13 | 0.00 | 4.67 | 2.77 | 0.00 | 0.00 | 10.49 | 0.00 | 1.96 |
| 4-51 | 0.00 | 25.62 | 1.12 | 0.00 | 4.34 | 2.75 | 0.75 | 0.00 | 10.39 | 0.00 | 2.43 |
| 4-52 | 0.00 | 25.69 | 1.12 | 0.00 | 4.59 | 2.26 | 0.75 | 0.00 | 10.42 | 0.00 | 2.43 |
| 4-53 | 0.28 | 25.76 | 1.12 | 0.00 | 4.60 | 2.76 | 0.00 | 0.00 | 10.45 | 0.00 | 2.14 |
| 4-54 | 0.00 | 18.82 | 0.89 | 0.00 | 1.62 | 0.00 | 0.00 | 0.00 | 8.25 | 2.32 | 17.16 |
| 4-55 | 0.00 | 26.40 | 1.13 | 0.00 | 4.63 | 2.78 | 0.00 | 0.00 | 10.51 | 0.00 | 0.00 |
| 4-56 | 0.00 | 26.51 | 1.14 | 0.00 | 4.65 | 2.79 | 0.00 | 0.00 | 10.56 | 0.00 | 0.00 |
| 4-57 | 0.00 | 25.75 | 1.13 | 0.00 | 4.84 | 1.77 | 0.75 | 0.00 | 10.45 | 0.00 | 2.44 |
| 4-58 | 0.00 | 25.62 | 1.12 | 0.00 | 4.58 | 1.76 | 1.49 | 0.00 | 10.39 | 0.00 | 2.43 |
| 4-59 | 0.00 | 26.60 | 0.57 | 0.00 | 4.58 | 2.75 | 0.00 | 0.00 | 10.40 | 0.00 | 2.43 |
| 4-60 | 0.00 | 24.90 | 1.69 | 0.00 | 4.62 | 2.77 | 0.00 | 0.00 | 10.49 | 0.00 | 2.45 |
| 4-61 | 0.00 | 25.84 | 0.58 | 0.00 | 4.86 | 2.77 | 0.00 | 0.00 | 10.48 | 0.00 | 2.45 |
| 4-62 | 0.00 | 25.67 | 0.57 | 0.00 | 4.59 | 2.75 | 0.00 | 0.00 | 11.30 | 0.00 | 2.43 |
| 4-63 | 0.00 | 25.14 | 1.10 | 0.00 | 4.26 | 2.21 | 0.73 | 0.00 | 10.19 | 0.00 | 4.77 |
| 4-64 | 0.00 | 25.80 | 1.13 | 0.00 | 4.61 | 2.27 | 0.75 | 0.00 | 10.46 | 0.00 | 2.45 |
| 4-65 | 0.00 | 16.53 | 0.93 | 0.00 | 2.05 | 2.28 | 0.00 | 0.00 | 8.63 | 0.00 | 17.95 |
| 4-66 | 0.00 | 19.40 | 0.92 | 0.00 | 2.02 | 0.64 | 0.00 | 0.00 | 8.50 | 0.00 | 17.68 |
| 4-67 | 0.00 | 20.71 | 0.98 | 0.00 | 2.15 | 2.40 | 0.00 | 0.00 | 9.07 | 0.00 | 10.39 |
| 4-68 | 0.00 | 16.12 | 0.91 | 0.00 | 2.00 | 0.63 | 0.00 | 0.00 | 8.41 | 0.00 | 17.50 |
| 4-69 | 0.00 | 16.71 | 0.94 | 0.00 | 2.47 | 0.66 | 0.00 | 0.00 | 8.72 | 0.00 | 14.07 |
| 4-70 | 0.00 | 16.71 | 0.94 | 0.00 | 2.07 | 2.31 | 0.00 | 0.00 | 8.72 | 0.00 | 9.99 |
| 4-71 | 0.00 | 16.35 | 0.92 | 0.00 | 2.22 | 0.64 | 0.00 | 0.00 | 8.53 | 0.00 | 17.75 |
| 4-72 | 0.00 | 16.06 | 0.90 | 0.00 | 1.99 | 0.63 | 0.00 | 0.00 | 8.38 | 0.00 | 19.42 |
| 4-73 | 0.00 | 25.76 | 1.13 | 0.00 | 4.60 | 2.27 | 0.75 | 0.00 | 10.45 | 0.00 | 0.00 |
| 4-74 | 0.00 | 25.10 | 1.10 | 0.00 | 4.25 | 2.21 | 0.73 | 0.00 | 10.18 | 0.00 | 2.38 |
| 4-75 | 0.00 | 25.06 | 1.10 | 0.00 | 4.25 | 2.21 | 0.73 | 0.00 | 10.16 | 0.00 | 0.00 |
| 4-76 | 0.00 | 24.80 | 1.09 | 0.00 | 4.20 | 2.18 | 0.72 | 0.00 | 10.06 | 0.00 | 4.70 |
| 4-77 | 0.00 | 25.62 | 1.12 | 0.00 | 4.58 | 2.26 | 0.75 | 0.00 | 10.39 | 0.00 | 2.43 |
| 4-78 | 0.00 | 25.84 | 1.13 | 0.00 | 4.62 | 2.27 | 0.75 | 0.00 | 10.48 | 0.00 | 2.45 |
| 4-79 | 0.00 | 24.97 | 1.09 | 0.00 | 4.23 | 2.20 | 0.73 | 0.00 | 10.13 | 0.00 | 4.73 |
| 4-80 | 0.00 | 25.17 | 1.10 | 0.00 | 4.27 | 2.22 | 0.73 | 0.00 | 10.21 | 0.00 | 4.77 |
| 4-81 | 0.00 | 25.68 | 1.12 | 0.00 | 4.59 | 2.26 | 0.75 | 0.00 | 10.42 | 0.00 | 0.00 |
| 4-82 | 0.00 | 25.96 | 1.14 | 0.00 | 4.64 | 2.29 | 0.76 | 0.00 | 10.53 | 0.00 | 0.00 |
| 4-83 | 0.00 | 25.03 | 1.10 | 0.00 | 4.24 | 2.20 | 0.73 | 0.00 | 10.15 | 0.00 | 2.37 |
| 4-84 | 0.00 | 25.30 | 1.11 | 0.00 | 4.29 | 2.23 | 0.74 | 0.00 | 10.26 | 0.00 | 2.40 |
| 4-85 | 0.00 | 25.97 | 0.56 | 0.00 | 4.24 | 2.20 | 0.73 | 0.00 | 10.15 | 0.00 | 4.75 |
| 4-86 | 0.00 | 24.30 | 1.65 | 0.00 | 4.28 | 2.22 | 0.73 | 0.00 | 10.23 | 0.00 | 4.78 |
| 4-87 | 0.00 | 23.45 | 2.20 | 0.00 | 4.29 | 2.23 | 0.74 | 0.00 | 10.28 | 0.00 | 4.80 |
| 4-88 | 0.00 | 25.50 | 1.11 | 0.00 | 4.29 | 2.23 | 0.74 | 0.00 | 10.27 | 0.00 | 2.40 |
| 4-89 | 0.00 | 25.54 | 1.11 | 0.00 | 4.30 | 2.23 | 0.74 | 0.00 | 10.28 | 0.00 | 2.40 |
| 4-90 | 0.00 | 25.32 | 1.11 | 0.00 | 4.29 | 2.23 | 0.74 | 0.00 | 10.53 | 0.00 | 2.40 |
| 4-91 | 0.00 | 25.39 | 1.11 | 0.00 | 4.30 | 2.23 | 0.74 | 0.00 | 10.56 | 0.00 | 2.41 |
| 4-92 | 0.00 | 25.32 | 1.11 | 0.00 | 4.36 | 2.23 | 0.74 | 0.00 | 10.27 | 0.00 | 3.12 |
| 4-93 | 0.00 | 26.82 | 1.09 | 0.00 | 3.84 | 2.20 | 0.73 | 0.00 | 10.12 | 0.00 | 3.08 |
| 4-94 | 0.00 | 25.19 | 1.10 | 0.00 | 3.87 | 3.18 | 0.73 | 0.00 | 10.22 | 0.00 | 3.10 |
| 4-95 | 0.00 | 23.65 | 1.12 | 0.00 | 4.40 | 3.23 | 0.74 | 0.00 | 10.36 | 0.00 | 3.15 |
| 4-96 | 0.00 | 26.84 | 1.13 | 0.00 | 4.62 | 2.28 | 0.75 | 0.00 | 10.50 | 0.00 | 2.45 |
| 4-97 | 0.00 | 27.07 | 1.14 | 0.00 | 4.66 | 2.30 | 0.76 | 0.00 | 10.59 | 0.00 | 2.47 |
| 4-98 | 0 | 25.67 | 1.12 | 0 | 4.11 | 3.24 | 0.75 | 0 | 10.41 | 0 | 2.43 |
| 4-99 | 0 | 25.54 | 1.12 | 0 | 3.62 | 4.2 | 0.74 | 0 | 10.36 | 0 | 2.42 |
| 4-100 | 0 | 25.54 | 1.12 | 0 | 4.09 | 2.25 | 2.23 | 0 | 10.36 | 0 | 2.42 |
| 4-101 | 0 | 27.32 | 1.11 | 0 | 4.07 | 2.24 | 0.74 | 0 | 10.31 | 0 | 2.41 |
| 4-102 | 0 | 26.02 | 1.14 | 0 | 4.65 | 2.29 | 0.76 | 0 | 10.55 | 0 | 2.47 |
| 4-103 | 0 | 25.85 | 1.13 | 0 | 4.38 | 2.28 | 0.75 | 0 | 11.38 | 0 | 2.45 |

TABLE 4-1(1)-continued

| % by mass | | | | | | | | | | | |
|---|---|---|---|---|---|---|---|---|---|---|---|
| 4-104 | 0 | 25.6 | 1.12 | 0 | 3.87 | 2.25 | 2.98 | 0 | 10.83 | 0 | 1.21 |
| 4-105 | 0 | 27.28 | 1.15 | 0 | 4.7 | 2.32 | 0.77 | 0 | 11.13 | 0 | 1.25 |
| 4-106 | 0 | 27.04 | 1.14 | 0 | 4.66 | 2.3 | 0.76 | 0 | 11.03 | 0 | 1.24 |
| 4-107 | 0 | 25.86 | 1.13 | 0 | 4.62 | 1.29 | 2.26 | 0 | 10.94 | 0 | 1.23 |
| 4-108 | 0 | 25.73 | 1.13 | 0 | 4.6 | 0.29 | 3.75 | 0 | 10.88 | 0 | 1.22 |
| 4-109 | 0 | 25.66 | 1.12 | 0 | 4.11 | 2.26 | 0.75 | 0 | 12.63 | 0 | 1.22 |
| 4-110 | 0 | 26.1 | 1.13 | 0 | 4.32 | 2.28 | 0.75 | 0 | 11.39 | 0 | 1.23 |
| 4-111 | 0 | 25.88 | 1.13 | 0 | 4.27 | 2.53 | 0.75 | 0 | 11.39 | 0 | 1.23 |
| 4-112 | 0 | 25.88 | 1.13 | 0 | 4.32 | 2.28 | 0.94 | 0 | 11.39 | 0 | 1.23 |
| 4-113 | 0 | 25.88 | 1.13 | 0 | 4.38 | 2.03 | 1.13 | 0 | 11.39 | 0 | 1.23 |
| 4-114 | 0 | 26.2 | 1.15 | 0 | 4.68 | 2.31 | 0.76 | 0 | 11.54 | 0 | 0 |
| 4-115 | 0 | 26.1 | 1.14 | 0 | 4.66 | 2.3 | 0.76 | 0 | 10.59 | 0 | 0 |
| 4-116 | 0 | 25.99 | 1.14 | 0 | 4.64 | 2.29 | 0.76 | 0 | 10.54 | 0 | 0 |
| 4-117 | 0 | 25.88 | 1.13 | 0 | 4.62 | 2.28 | 0.75 | 0 | 10.5 | 0 | 0 |
| 4-118 | 0 | 26.32 | 1.15 | 0 | 4.7 | 2.32 | 0.77 | 0 | 11.59 | 0 | 0 |
| 4-119 | 0 | 26.88 | 1.13 | 0 | 4.39 | 2.28 | 0.75 | 0 | 10.51 | 0 | 0 |
| 4-120 | 0 | 27.37 | 1.13 | 0 | 4.63 | 1.54 | 0.75 | 0 | 10.51 | 0 | 0 |
| 4-121 | 0 | 26.49 | 1.15 | 0 | 4.68 | 2.31 | 0.76 | 0 | 10.62 | 0 | 0 |
| 4-122 | 0 | 27.24 | 1.11 | 0 | 4.52 | 2.23 | 0.74 | 0 | 10.26 | 0 | 2.4 |
| 4-123 | 0 | 28.66 | 1.09 | 0 | 4.43 | 2.18 | 0.72 | 0 | 10.06 | 0 | 2.35 |
| 4-124 | 0 | 27.75 | 1.13 | 0 | 4.14 | 2.27 | 0.75 | 0 | 11.37 | 0 | 0 |
| 4-125 | 0 | 25.93 | 1.14 | 0 | 4.15 | 2.28 | 2.27 | 0 | 11.42 | 0 | 0 |
| 4-126 | 0 | 26.07 | 1.14 | 0 | 4.66 | 1.3 | 2.28 | 0 | 11.48 | 0 | 0 |
| 4-127 | 0 | 25.8 | 1.13 | 0 | 4.13 | 1.28 | 3.76 | 0 | 11.36 | 0 | 0 |
| 4-128 | 0 | 27.61 | 1.13 | 0 | 4.59 | 2.26 | 0.75 | 0 | 11.32 | 0 | 0 |
| 4-129 | 0 | 26.55 | 1.16 | 0 | 4.74 | 2.34 | 0.77 | 0 | 11.69 | 0 | 0 |
| 4-130 | 0 | 26.78 | 1.17 | 0 | 4.79 | 2.36 | 0.78 | 0 | 11.79 | 0 | 0 |
| 4-131 | 0 | 26.81 | 1.13 | 0 | 4.14 | 2.27 | 0.75 | 0 | 12.27 | 0 | 0 |
| 4-132 | 0 | 26.12 | 1.71 | 0 | 4.43 | 2.3 | 0.76 | 0 | 11.5 | 0 | 0 |
| 4-133 | 0 | 26.2 | 1.71 | 0 | 4.44 | 2.31 | 0.76 | 0 | 11.54 | 0 | 0 |
| 4-134 | 0 | 26.24 | 1.15 | 0 | 4.69 | 2.31 | 0.76 | 0 | 11.55 | 0 | 0 |
| 4-135 | 0 | 25.99 | 1.6 | 0 | 4.7 | 2.31 | 0.77 | 0 | 11.11 | 0 | 0 |
| 4-136 | 0 | 26.72 | 1.17 | 0 | 4.78 | 2.35 | 0.78 | 0 | 11.76 | 0 | 0 |
| 4-137 | 0 | 26.84 | 1.18 | 0 | 4.8 | 2.36 | 0.78 | 0 | 11.82 | 0 | 0 |
| 4-138 | 0 | 26.96 | 1.18 | 0 | 4.82 | 2.37 | 0.78 | 0 | 11.87 | 0 | 0 |
| 4-139 | 0 | 27.08 | 1.19 | 0 | 4.84 | 2.38 | 0.79 | 0 | 11.92 | 0 | 0 |
| 4-140 | 0 | 26.14 | 1.14 | 0 | 4.91 | 2.3 | 0.76 | 0 | 11.51 | 0 | 0 |
| 4-141 | 0 | 26.07 | 1.14 | 0 | 4.66 | 2.79 | 0.76 | 0 | 11.48 | 0 | 0 |
| 4-142 | 0 | 26.01 | 1.14 | 0 | 4.65 | 2.29 | 1.51 | 0 | 11.45 | 0 | 0 |
| 4-143 | 0 | 25.97 | 1.14 | 0 | 4.64 | 2.29 | 0.76 | 0 | 12.33 | 0 | 0 |
| 4-144 | 0 | 25.58 | 1.12 | 0 | 4.57 | 2.25 | 0.74 | 0 | 10.37 | 0 | 2.42 |
| 4-145 | 0 | 25.37 | 1.11 | 0 | 4.53 | 2.23 | 0.74 | 0 | 10.29 | 0 | 2.4 |
| 4-146 | 0 | 25.63 | 1.12 | 0 | 4.34 | 2.26 | 0.75 | 0 | 11.28 | 0 | 2.43 |
| 4-147 | 0 | 25.44 | 1.11 | 0 | 4.31 | 2.24 | 0.74 | 0 | 10.32 | 1.63 | 2.41 |
| 4-148 | 0 | 25.53 | 1.12 | 0 | 4.33 | 2.25 | 0.74 | 0 | 10.35 | 0 | 2.42 |
| 4-149 | 0 | 25.36 | 1.11 | 0 | 4.3 | 2.23 | 0.74 | 0 | 10.29 | 0 | 2.4 |
| 4-150 | 0 | 24.85 | 1.13 | 0 | 4.61 | 2.27 | 0.75 | 0 | 11.36 | 0 | 2.45 |
| 4-151 | 0 | 24.67 | 1.12 | 0 | 4.58 | 2.26 | 0.75 | 0 | 10.39 | 1.64 | 2.43 |
| 4-152 | 0 | 25.71 | 0.57 | 0 | 4.59 | 2.26 | 0.75 | 0 | 11.32 | 0 | 2.44 |
| 4-153 | 0 | 25.52 | 0.57 | 0 | 4.56 | 2.25 | 0.74 | 0 | 10.35 | 1.63 | 2.42 |
| 4-154 | 0 | 25.65 | 1.13 | 0 | 4.62 | 2.28 | 0.75 | 0 | 10.48 | 0 | 2.45 |
| 4-155 | 0 | 25.72 | 1.13 | 0 | 4.6 | 2.27 | 0.75 | 0 | 10.44 | 0 | 2.44 |
| 4-156 | 0 | 25.69 | 1.13 | 0 | 4.61 | 2.27 | 0.75 | 0 | 10.46 | 0 | 2.44 |
| 4-157 | 0 | 25.76 | 1.13 | 0 | 4.57 | 2.27 | 0.75 | 0 | 10.45 | 0 | 2.44 |
| 4-158 | 0 | 25.94 | 1.13 | 0 | 4.6 | 2.27 | 0.75 | 0 | 10.44 | 0 | 2.44 |
| 4-159 | 0 | 25.51 | 1.13 | 0 | 4.63 | 2.28 | 0.75 | 0 | 10.5 | 0 | 2.45 |
| 4-160 | 0 | 25.9 | 1.13 | 0 | 4.61 | 2.27 | 0.75 | 0 | 10.47 | 0 | 2.45 |
| 4-161 | 0 | 25.59 | 1.13 | 0 | 4.61 | 2.27 | 0.75 | 0 | 10.46 | 0 | 2.44 |
| 4-162 | 0 | 13.35 | 0.93 | 0 | 2.83 | 0.65 | 0 | 0 | 8.61 | 0 | 17.92 |
| 4-163 | 0 | 13.42 | 0.93 | 0 | 2.06 | 2.29 | 0 | 0 | 8.66 | 0 | 18.01 |
| 4-164 | 0 | 13.61 | 0.95 | 0 | 2.09 | 2.32 | 0 | 0 | 8.78 | 0 | 18.27 |
| 4-165 | 0 | 13.33 | 0.93 | 0 | 2.04 | 2.27 | 0 | 0 | 8.6 | 0 | 17.89 |
| 4-166 | 0 | 13.52 | 0.94 | 0 | 2.07 | 2.3 | 0 | 0 | 8.72 | 0 | 18.14 |
| 4-167 | 0 | 13.48 | 0.94 | 0 | 2.46 | 1.48 | 0 | 0 | 8.7 | 0 | 18.09 |
| 4-168 | 0 | 13.54 | 0.94 | 0 | 2.87 | 0.66 | 0 | 0 | 8.73 | 0 | 18.17 |
| 4-169 | 0 | 13.58 | 0.95 | 0 | 3.2 | 0 | 0 | 0 | 8.76 | 0 | 18.23 |
| 4-170 | 0 | 24.94 | 1.09 | 0 | 3.77 | 2.2 | 0.73 | 1.24 | 10.11 | 0 | 4.73 |
| 4-171 | 0 | 24.82 | 1.09 | 0 | 3.75 | 2.18 | 0.72 | 0 | 11.79 | 0 | 4.71 |
| 4-172 | 0 | 24.46 | 1.07 | 0 | 3.69 | 2.15 | 0.71 | 0 | 9.92 | 3.13 | 4.64 |
| 4-173 | 0 | 24.61 | 1.08 | 0 | 3.94 | 2.17 | 0.72 | 0 | 9.98 | 0 | 7 |
| 4-174 | 0 | 23.82 | 1.04 | 0 | 3.16 | 2.1 | 0.69 | 0 | 9.66 | 6.1 | 4.52 |
| 4-175 | 0 | 23.96 | 1.05 | 0 | 3.4 | 2.11 | 0.7 | 0 | 9.72 | 3.07 | 6.81 |
| 4-176 | 0 | 24.1 | 1.06 | 0 | 3.64 | 2.12 | 0.7 | 0 | 9.77 | 0 | 9.14 |

| No. | $TiO_2$ | $Nb_2O_5$ | $ZrO_2$ | ZnO | $Ta_2O_5$ | $Gd_2O_3$ | $La_2O_3$ | $Y_2O_3$ | Total | $Sb_2O_3$ |
|---|---|---|---|---|---|---|---|---|---|---|
| 4-1 | 26.46 | 23.47 | 1.80 | 0.00 | 0.00 | 0.00 | 0.00 | 0.00 | 100.00 | 0.03 |
| 4-2 | 26.21 | 23.26 | 1.78 | 0.00 | 0.00 | 0.00 | 0.00 | 0.00 | 100.00 | 0.03 |

TABLE 4-1(1)-continued

| % by mass | | | | | | | | | | |
|---|---|---|---|---|---|---|---|---|---|---|
| 4-3 | 26.09 | 23.13 | 1.77 | 0.00 | 0.00 | 0.00 | 0.00 | 0.00 | 100.00 | 0.03 |
| 4-4 | 25.85 | 22.93 | 1.76 | 0.00 | 0.00 | 0.00 | 0.00 | 0.00 | 100.00 | 0.03 |
| 4-5 | 29.63 | 22.03 | 2.02 | 0.00 | 0.00 | 0.00 | 0.00 | 0.00 | 100.00 | 0.03 |
| 4-6 | 29.82 | 22.17 | 2.03 | 0.00 | 0.00 | 0.00 | 0.00 | 0.00 | 100.00 | 0.03 |
| 4-7 | 29.25 | 25.94 | 0.00 | 0.00 | 0.00 | 0.00 | 0.00 | 0.00 | 100.00 | 0.03 |
| 4-8 | 29.17 | 25.87 | 0.00 | 0.00 | 0.00 | 0.00 | 0.00 | 0.00 | 100.00 | 0.03 |
| 4-9 | 29.12 | 25.83 | 0.00 | 0.00 | 0.00 | 0.00 | 0.00 | 0.00 | 100.00 | 0.03 |
| 4-10 | 29.04 | 25.77 | 0.00 | 0.00 | 0.00 | 0.00 | 0.00 | 0.00 | 100.00 | 0.03 |
| 4-11 | 29.84 | 26.46 | 0.00 | 0.00 | 0.00 | 0.00 | 0.00 | 0.00 | 100.00 | 0.03 |
| 4-12 | 29.70 | 26.34 | 0.00 | 0.00 | 0.00 | 0.00 | 0.00 | 0.00 | 100.00 | 0.03 |
| 4-13 | 27.44 | 26.63 | 0.00 | 0.00 | 0.00 | 0.00 | 0.00 | 0.00 | 100.00 | 0.03 |
| 4-14 | 27.64 | 26.86 | 0.00 | 0.00 | 0.00 | 0.00 | 0.00 | 0.00 | 100.00 | 0.03 |
| 4-15 | 30.55 | 22.70 | 0.00 | 0.00 | 0.00 | 0.00 | 0.00 | 0.00 | 100.00 | 0.03 |
| 4-16 | 30.80 | 22.89 | 0.00 | 0.00 | 0.00 | 0.00 | 0.00 | 0.00 | 100.00 | 0.03 |
| 4-17 | 28.09 | 22.85 | 0.00 | 0.00 | 0.00 | 0.00 | 0.00 | 0.00 | 100.00 | 0.03 |
| 4-18 | 28.18 | 22.92 | 0.00 | 0.00 | 0.00 | 0.00 | 0.00 | 0.00 | 100.00 | 0.03 |
| 4-19 | 28.51 | 23.20 | 0.00 | 0.00 | 0.00 | 0.00 | 0.00 | 0.00 | 100.00 | 0.03 |
| 4-20 | 28.12 | 22.88 | 0.00 | 0.00 | 0.00 | 0.00 | 0.00 | 0.00 | 100.00 | 0.03 |
| 4-21 | 28.37 | 23.07 | 0.00 | 0.00 | 0.00 | 0.00 | 0.00 | 0.00 | 100.00 | 0.03 |
| 4-22 | 31.31 | 18.75 | 0.00 | 0.00 | 0.00 | 0.00 | 0.00 | 0.00 | 100.00 | 0.03 |
| 4-23 | 28.48 | 23.17 | 0.00 | 0.00 | 0.00 | 0.00 | 0.00 | 0.00 | 100.00 | 0.03 |
| 4-24 | 31.13 | 18.65 | 0.00 | 0.00 | 0.00 | 0.00 | 0.00 | 0.00 | 100.00 | 0.03 |
| 4-25 | 34.64 | 14.50 | 0.00 | 0.00 | 0.00 | 0.00 | 0.00 | 0.00 | 100.00 | 0.03 |
| 4-26 | 29.87 | 26.50 | 0.00 | 0.00 | 0.00 | 0.00 | 0.00 | 0.00 | 100.00 | 0.03 |
| 4-27 | 29.44 | 26.12 | 0.00 | 0.00 | 0.00 | 0.00 | 0.00 | 0.00 | 100.00 | 0.03 |
| 4-28 | 29.06 | 25.78 | 0.00 | 0.00 | 0.00 | 0.00 | 0.00 | 0.00 | 100.00 | 0.03 |
| 4-29 | 27.84 | 27.03 | 0.00 | 0.00 | 0.00 | 0.00 | 0.00 | 0.00 | 100.00 | 0.03 |
| 4-30 | 29.22 | 25.92 | 0.00 | 0.00 | 0.00 | 0.00 | 0.00 | 0.00 | 100.00 | 0.03 |
| 4-31 | 30.13 | 26.71 | 0.00 | 0.00 | 0.00 | 0.00 | 0.00 | 0.00 | 100.00 | 0.03 |
| 4-32 | 30.07 | 26.68 | 0.00 | 0.00 | 0.00 | 0.00 | 0.00 | 0.00 | 100.00 | 0.03 |
| 4-33 | 27.03 | 26.26 | 0.00 | 0.00 | 0.00 | 0.00 | 0.00 | 0.00 | 100.00 | 0.03 |
| 4-34 | 26.82 | 26.05 | 0.00 | 0.00 | 0.00 | 0.00 | 0.00 | 0.00 | 100.00 | 0.03 |
| 4-35 | 26.96 | 26.17 | 1.97 | 0.00 | 0.00 | 0.00 | 0.00 | 0.00 | 100.00 | 0.03 |
| 4-36 | 24.41 | 30.44 | 0.00 | 0.00 | 0.00 | 0.00 | 0.00 | 0.00 | 100.00 | 0.03 |
| 4-37 | 26.90 | 26.13 | 0.00 | 0.00 | 0.00 | 0.00 | 0.00 | 0.00 | 100.00 | 0.03 |
| 4-38 | 26.69 | 25.91 | 0.00 | 0.00 | 0.00 | 0.00 | 0.00 | 0.00 | 100.00 | 0.03 |
| 4-39 | 26.48 | 25.70 | 0.00 | 0.00 | 0.00 | 0.00 | 0.00 | 0.00 | 100.00 | 0.03 |
| 4-40 | 26.26 | 25.49 | 0.00 | 0.00 | 0.00 | 0.00 | 0.00 | 0.00 | 100.00 | 0.03 |
| 4-41 | 27.13 | 26.35 | 0.00 | 0.00 | 0.00 | 0.00 | 0.00 | 0.00 | 100.00 | 0.03 |
| 4-42 | 27.36 | 26.57 | 0.00 | 0.00 | 0.00 | 0.00 | 0.00 | 0.00 | 100.00 | 0.03 |
| 4-43 | 27.25 | 26.45 | 0.00 | 0.00 | 0.00 | 0.00 | 0.00 | 0.00 | 100.00 | 0.03 |
| 4-44 | 27.25 | 26.48 | 0.00 | 0.00 | 0.00 | 0.00 | 0.00 | 0.00 | 100.00 | 0.03 |
| 4-45 | 26.92 | 26.15 | 0.00 | 0.00 | 0.00 | 0.00 | 0.00 | 0.00 | 100.00 | 0.03 |
| 4-46 | 26.24 | 25.49 | 0.00 | 0.00 | 0.00 | 0.00 | 0.00 | 0.00 | 100.00 | 0.03 |
| 4-47 | 25.70 | 24.95 | 0.00 | 0.00 | 0.00 | 0.00 | 0.00 | 0.00 | 100.00 | 0.03 |
| 4-48 | 26.22 | 26.09 | 0.00 | 0.00 | 0.00 | 0.00 | 0.00 | 0.00 | 100.00 | 0.03 |
| 4-49 | 26.97 | 25.13 | 0.00 | 0.00 | 0.00 | 0.00 | 0.00 | 0.00 | 100.00 | 0.03 |
| 4-50 | 26.95 | 26.16 | 0.00 | 0.00 | 0.00 | 0.00 | 0.00 | 0.00 | 100.00 | 0.03 |
| 4-51 | 26.69 | 25.91 | 0.00 | 0.00 | 0.00 | 0.00 | 0.00 | 0.00 | 100.00 | 0.03 |
| 4-52 | 26.76 | 25.98 | 0.00 | 0.00 | 0.00 | 0.00 | 0.00 | 0.00 | 100.00 | 0.03 |
| 4-53 | 26.84 | 26.05 | 0.00 | 0.00 | 0.00 | 0.00 | 0.00 | 0.00 | 100.00 | 0.03 |
| 4-54 | 28.80 | 20.56 | 1.58 | 0.00 | 0.00 | 0.00 | 0.00 | 0.00 | 100.00 | 0.03 |
| 4-55 | 26.35 | 26.21 | 1.97 | 0.00 | 0.00 | 0.00 | 0.00 | 0.00 | 100.00 | 0.03 |
| 4-56 | 27.11 | 25.26 | 1.98 | 0.00 | 0.00 | 0.00 | 0.00 | 0.00 | 100.00 | 0.03 |
| 4-57 | 26.82 | 26.05 | 0.00 | 0.00 | 0.00 | 0.00 | 0.00 | 0.00 | 100.00 | 0.03 |
| 4-58 | 26.68 | 25.91 | 0.00 | 0.00 | 0.00 | 0.00 | 0.00 | 0.00 | 100.00 | 0.03 |
| 4-59 | 26.71 | 25.94 | 0.00 | 0.00 | 0.00 | 0.00 | 0.00 | 0.00 | 100.00 | 0.03 |
| 4-60 | 26.93 | 26.15 | 0.00 | 0.00 | 0.00 | 0.00 | 0.00 | 0.00 | 100.00 | 0.03 |
| 4-61 | 26.91 | 26.13 | 0.00 | 0.00 | 0.00 | 0.00 | 0.00 | 0.00 | 100.00 | 0.03 |
| 4-62 | 26.73 | 25.96 | 0.00 | 0.00 | 0.00 | 0.00 | 0.00 | 0.00 | 100.00 | 0.03 |
| 4-63 | 26.18 | 25.42 | 0.00 | 0.00 | 0.00 | 0.00 | 0.00 | 0.00 | 100.00 | 0.03 |
| 4-64 | 27.50 | 25.03 | 0.00 | 0.00 | 0.00 | 0.00 | 0.00 | 0.00 | 100.00 | 0.03 |
| 4-65 | 28.46 | 21.52 | 1.65 | 0.00 | 0.00 | 0.00 | 0.00 | 0.00 | 100.00 | 0.03 |
| 4-66 | 28.03 | 21.19 | 1.62 | 0.00 | 0.00 | 0.00 | 0.00 | 0.00 | 100.00 | 0.03 |
| 4-67 | 29.93 | 22.63 | 1.73 | 0.00 | 0.00 | 0.00 | 0.00 | 0.00 | 100.00 | 0.03 |
| 4-68 | 31.84 | 20.98 | 1.61 | 0.00 | 0.00 | 0.00 | 0.00 | 0.00 | 100.00 | 0.03 |
| 4-69 | 33.01 | 21.75 | 1.67 | 0.00 | 0.00 | 0.00 | 0.00 | 0.00 | 100.00 | 0.03 |
| 4-70 | 28.77 | 28.82 | 1.67 | 0.00 | 0.00 | 0.00 | 0.00 | 0.00 | 100.00 | 0.03 |
| 4-71 | 32.30 | 21.28 | 0.00 | 0.00 | 0.00 | 0.00 | 0.00 | 0.00 | 100.00 | 0.03 |
| 4-72 | 31.72 | 20.90 | 0.00 | 0.00 | 0.00 | 0.00 | 0.00 | 0.00 | 100.00 | 0.03 |
| 4-73 | 27.46 | 24.99 | 0.00 | 0.00 | 0.00 | 0.00 | 2.59 | 0.00 | 100.00 | 0.03 |
| 4-74 | 26.14 | 25.38 | 0.00 | 0.00 | 0.00 | 0.00 | 2.53 | 0.00 | 100.00 | 0.03 |
| 4-75 | 26.10 | 25.35 | 0.00 | 0.00 | 0.00 | 0.00 | 5.05 | 0.00 | 100.00 | 0.03 |
| 4-76 | 25.82 | 23.04 | 0.00 | 0.00 | 3.39 | 0.00 | 0.00 | 0.00 | 100.00 | 0.03 |
| 4-77 | 26.05 | 24.86 | 1.95 | 0.00 | 0.00 | 0.00 | 0.00 | 0.00 | 100.00 | 0.03 |
| 4-78 | 27.55 | 22.95 | 1.97 | 0.00 | 0.00 | 0.00 | 0.00 | 0.00 | 100.00 | 0.03 |
| 4-79 | 24.77 | 25.25 | 1.90 | 0.00 | 0.00 | 0.00 | 0.00 | 0.00 | 100.00 | 0.03 |
| 4-80 | 26.22 | 23.39 | 1.92 | 0.00 | 0.00 | 0.00 | 0.00 | 0.00 | 100.00 | 0.03 |

TABLE 4-1(1)-continued

| | % by mass | | | | | | | | | |
|---|---|---|---|---|---|---|---|---|---|---|
| 4-81 | 27.38 | 24.92 | 0.00 | 0.00 | 0.00 | 2.88 | 0.00 | 0.00 | 100.00 | 0.03 |
| 4-82 | 27.68 | 25.19 | 0.00 | 0.00 | 0.00 | 0.00 | 0.00 | 1.81 | 100.00 | 0.03 |
| 4-83 | 26.06 | 25.31 | 0.00 | 0.00 | 0.00 | 2.80 | 0.00 | 0.00 | 100.00 | 0.03 |
| 4-84 | 26.34 | 25.58 | 0.00 | 0.00 | 0.00 | 0.00 | 0.00 | 1.77 | 100.00 | 0.03 |
| 4-85 | 26.08 | 25.32 | 0.00 | 0.00 | 0.00 | 0.00 | 0.00 | 0.00 | 100.00 | 0.03 |
| 4-86 | 26.28 | 25.52 | 0.00 | 0.00 | 0.00 | 0.00 | 0.00 | 0.00 | 100.00 | 0.03 |
| 4-87 | 26.38 | 25.62 | 0.00 | 0.00 | 0.00 | 0.00 | 0.00 | 0.00 | 100.00 | 0.03 |
| 4-88 | 26.11 | 25.60 | 0.00 | 0.00 | 0.00 | 0.00 | 0.00 | 1.77 | 100.00 | 0.03 |
| 4-89 | 26.40 | 25.22 | 0.00 | 0.00 | 0.00 | 0.00 | 0.00 | 1.77 | 100.00 | 0.03 |
| 4-90 | 26.00 | 25.61 | 0.00 | 0.00 | 0.00 | 0.00 | 0.00 | 1.77 | 100.00 | 0.03 |
| 4-91 | 26.44 | 25.05 | 0.00 | 0.00 | 0.00 | 0.00 | 0.00 | 1.77 | 100.00 | 0.03 |
| 4-92 | 26.55 | 25.29 | 0.00 | 0.00 | 0.00 | 0.00 | 1.02 | 0.00 | 100.00 | 0.03 |
| 4-93 | 26.18 | 24.94 | 0.00 | 0.00 | 0.00 | 0.00 | 1.01 | 0.00 | 100.00 | 0.03 |
| 4-94 | 26.42 | 25.17 | 0.00 | 0.00 | 0.00 | 0.00 | 1.01 | 0.00 | 100.00 | 0.03 |
| 4-95 | 26.80 | 25.52 | 0.00 | 0.00 | 0.00 | 0.00 | 1.03 | 0.00 | 100.00 | 0.03 |
| 4-96 | 26.31 | 25.11 | 0.00 | 0.00 | 0.00 | 0.00 | 0.00 | 0.00 | 100.00 | 0.03 |
| 4-97 | 27.83 | 23.18 | 0.00 | 0.00 | 0.00 | 0.00 | 0.00 | 0.00 | 100.00 | 0.03 |
| 4-98 | 27.37 | 24.9 | 0 | 0 | 0 | 0 | 0 | 0 | 100 | 0.03 |
| 4-99 | 27.22 | 24.78 | 0 | 0 | 0 | 0 | 0 | 0 | 100 | 0.03 |
| 4-100 | 27.21 | 24.78 | 0 | 0 | 0 | 0 | 0 | 0 | 100 | 0.03 |
| 4-101 | 27.12 | 24.68 | 0 | 0 | 0 | 0 | 0 | 0 | 100 | 0.03 |
| 4-102 | 29.01 | 23.11 | 0 | 0 | 0 | 0 | 0 | 0 | 100 | 0.03 |
| 4-103 | 28.83 | 22.95 | 0 | 0 | 0 | 0 | 0 | 0 | 100 | 0.03 |
| 4-104 | 27.3 | 24.84 | 0 | 0 | 0 | 0 | 0 | 0 | 100 | 0.03 |
| 4-105 | 28.04 | 23.36 | 0 | 0 | 0 | 0 | 0 | 0 | 100 | 0.03 |
| 4-106 | 26.52 | 25.31 | 0 | 0 | 0 | 0 | 0 | 0 | 100 | 0.03 |
| 4-107 | 27.57 | 25.1 | 0 | 0 | 0 | 0 | 0 | 0 | 100 | 0.03 |
| 4-108 | 27.43 | 24.97 | 0 | 0 | 0 | 0 | 0 | 0 | 100 | 0.03 |
| 4-109 | 27.35 | 24.9 | 0 | 0 | 0 | 0 | 0 | 0 | 100 | 0.03 |
| 4-110 | 28.84 | 22.97 | 0.99 | 0 | 0 | 0 | 0 | 0 | 100 | 0.03 |
| 4-111 | 28.85 | 22.98 | 0.99 | 0 | 0 | 0 | 0 | 0 | 100 | 0.03 |
| 4-112 | 28.86 | 22.98 | 0.99 | 0 | 0 | 0 | 0 | 0 | 100 | 0.03 |
| 4-113 | 28.86 | 22.98 | 0.99 | 0 | 0 | 0 | 0 | 0 | 100 | 0.03 |
| 4-114 | 27.93 | 25.43 | 0 | 0 | 0 | 0 | 0 | 0 | 100 | 0.03 |
| 4-115 | 29.12 | 25.33 | 0 | 0 | 0 | 0 | 0 | 0 | 100 | 0.03 |
| 4-116 | 28.35 | 26.29 | 0 | 0 | 0 | 0 | 0 | 0 | 100 | 0.03 |
| 4-117 | 27.6 | 27.24 | 0 | 0 | 0 | 0 | 0 | 0 | 100 | 0.03 |
| 4-118 | 28.7 | 24.45 | 0 | 0 | 0 | 0 | 0 | 0 | 100 | 0.03 |
| 4-119 | 28.92 | 25.14 | 0 | 0 | 0 | 0 | 0 | 0 | 100 | 0.03 |
| 4-120 | 28.92 | 25.15 | 0 | 0 | 0 | 0 | 0 | 0 | 100 | 0.03 |
| 4-121 | 29.22 | 24.77 | 0 | 0 | 0 | 0 | 0 | 0 | 100 | 0.03 |
| 4-122 | 26.96 | 24.54 | 0 | 0 | 0 | 0 | 0 | 0 | 100 | 0.03 |
| 4-123 | 26.44 | 24.07 | 0 | 0 | 0 | 0 | 0 | 0 | 100 | 0.03 |
| 4-124 | 27.53 | 25.06 | 0 | 0 | 0 | 0 | 0 | 0 | 100 | 0.03 |
| 4-125 | 27.65 | 25.16 | 0 | 0 | 0 | 0 | 0 | 0 | 100 | 0.03 |
| 4-126 | 27.78 | 25.29 | 0 | 0 | 0 | 0 | 0 | 0 | 100 | 0.03 |
| 4-127 | 27.51 | 25.03 | 0 | 0 | 0 | 0 | 0 | 0 | 100 | 0.03 |
| 4-128 | 27.4 | 24.94 | 0 | 0 | 0 | 0 | 0 | 0 | 100 | 0.03 |
| 4-129 | 26.99 | 25.76 | 0 | 0 | 0 | 0 | 0 | 0 | 100 | 0.03 |
| 4-130 | 28.55 | 23.78 | 0 | 0 | 0 | 0 | 0 | 0 | 100 | 0.03 |
| 4-131 | 27.56 | 25.07 | 0 | 0 | 0 | 0 | 0 | 0 | 100 | 0.03 |
| 4-132 | 27.84 | 25.34 | 0 | 0 | 0 | 0 | 0 | 0 | 100 | 0.03 |
| 4-133 | 27.94 | 23.27 | 0 | 0 | 0 | 0 | 0 | 1.83 | 100 | 0.03 |
| 4-134 | 27.99 | 23.31 | 2 | 0 | 0 | 0 | 0 | 0 | 100 | 0.03 |
| 4-135 | 28.02 | 25.5 | 0 | 0 | 0 | 0 | 0 | 0 | 100 | 0 |
| 4-136 | 26.51 | 25.93 | 0 | 0 | 0 | 0 | 0 | 0 | 100 | 0 |
| 4-137 | 27.28 | 24.94 | 0 | 0 | 0 | 0 | 0 | 0 | 100 | 0 |
| 4-138 | 28.08 | 23.94 | 0 | 0 | 0 | 0 | 0 | 0 | 100 | 0 |
| 4-139 | 28.86 | 22.94 | 0 | 0 | 0 | 0 | 0 | 0 | 100 | 0 |
| 4-140 | 27.88 | 25.36 | 0 | 0 | 0 | 0 | 0 | 0 | 100 | 0 |
| 4-141 | 27.8 | 25.3 | 0 | 0 | 0 | 0 | 0 | 0 | 100 | 0 |
| 4-142 | 27.72 | 25.23 | 0 | 0 | 0 | 0 | 0 | 0 | 100 | 0 |
| 4-143 | 27.67 | 25.2 | 0 | 0 | 0 | 0 | 0 | 0 | 100 | 0 |
| 4-144 | 26.02 | 26.93 | 0 | 0 | 0 | 0 | 0 | 0 | 100 | 0.03 |
| 4-145 | 24.54 | 28.79 | 0 | 0 | 0 | 0 | 0 | 0 | 100 | 0.03 |
| 4-146 | 27.32 | 24.87 | 0 | 0 | 0 | 0 | 0 | 0 | 100 | 0.03 |
| 4-147 | 27.12 | 24.68 | 0 | 0 | 0 | 0 | 0 | 0 | 100 | 0.03 |
| 4-148 | 27.21 | 24.77 | 0 | 1.28 | 0 | 0 | 0 | 0 | 100 | 0.03 |
| 4-149 | 27.03 | 24.61 | 1.93 | 0 | 0 | 0 | 0 | 0 | 100 | 0.03 |
| 4-150 | 27.53 | 25.05 | 0 | 0 | 0 | 0 | 0 | 0 | 100 | 0.03 |
| 4-151 | 27.3 | 24.86 | 0 | 0 | 0 | 0 | 0 | 0 | 100 | 0.03 |
| 4-152 | 27.41 | 24.95 | 0 | 0 | 0 | 0 | 0 | 0 | 100 | 0.03 |
| 4-153 | 27.2 | 24.76 | 0 | 0 | 0 | 0 | 0 | 0 | 100 | 0.03 |
| 4-154 | 27.56 | 25.08 | 0 | 0 | 0 | 0 | 0 | 0 | 100 | 0.03 |
| 4-155 | 27.68 | 24.97 | 0 | 0 | 0 | 0 | 0 | 0 | 100 | 0.03 |
| 4-156 | 27.63 | 25.02 | 0 | 0 | 0 | 0 | 0 | 0 | 100 | 0.03 |
| 4-157 | 27.64 | 24.99 | 0 | 0 | 0 | 0 | 0 | 0 | 100 | 0.03 |
| 4-158 | 27.45 | 24.98 | 0 | 0 | 0 | 0 | 0 | 0 | 100 | 0.03 |

TABLE 4-1(1)-continued

| % by mass | | | | | | | | | | | |
|---|---|---|---|---|---|---|---|---|---|---|---|
| 4-159 | 27.62 | 25.13 | 0 | 0 | 0 | 0 | 0 | 0 | 100 | 0.03 |
| 4-160 | 27.38 | 25.04 | 0 | 0 | 0 | 0 | 0 | 0 | 100 | 0.03 |
| 4-161 | 27.74 | 25.01 | 0 | 0 | 0 | 0 | 0 | 0 | 100 | 0.03 |
| 4-162 | 32.59 | 21.47 | 1.65 | 0 | 0 | 0 | 0 | 0 | 100 | 0.03 |
| 4-163 | 34.89 | 18.09 | 1.65 | 0 | 0 | 0 | 0 | 0 | 100 | 0.03 |
| 4-164 | 37.52 | 14.78 | 1.68 | 0 | 0 | 0 | 0 | 0 | 100 | 0.03 |
| 4-165 | 33.6 | 19.7 | 1.64 | 0 | 0 | 0 | 0 | 0 | 100 | 0.03 |
| 4-166 | 36.19 | 16.45 | 1.67 | 0 | 0 | 0 | 0 | 0 | 100 | 0.03 |
| 4-167 | 35.03 | 18.16 | 1.66 | 0 | 0 | 0 | 0 | 0 | 100 | 0.03 |
| 4-168 | 35.18 | 18.24 | 1.67 | 0 | 0 | 0 | 0 | 0 | 100 | 0.03 |
| 4-169 | 35.31 | 18.3 | 1.67 | 0 | 0 | 0 | 0 | 0 | 100 | 0.03 |
| 4-170 | 25.97 | 25.22 | 0 | 0 | 0 | 0 | 0 | 0 | 100 | 0.03 |
| 4-171 | 25.84 | 25.1 | 0 | 0 | 0 | 0 | 0 | 0 | 100 | 0.03 |
| 4-172 | 25.49 | 24.74 | 0 | 0 | 0 | 0 | 0 | 0 | 100 | 0.03 |
| 4-173 | 25.62 | 24.88 | 0 | 0 | 0 | 0 | 0 | 0 | 100 | 0.03 |
| 4-174 | 24.82 | 24.09 | 0 | 0 | 0 | 0 | 0 | 0 | 100 | 0.03 |
| 4-175 | 24.95 | 24.23 | 0 | 0 | 0 | 0 | 0 | 0 | 100 | 0.03 |
| 4-176 | 25.1 | 24.37 | 0 | 0 | 0 | 0 | 0 | 0 | 100 | 0.03 |

TABLE 4-2(1)

| No. | % by mass<br>$Li_2O$ + $Na_2O$ + $K_2O$ + $Cs_2O$ | $Na_2O$ + $K_2O$ + $Cs_2O$ | $Gd_2O_3$ + $La_2O_3$ + $Y_2O_3$ | $Li_2O$/{100 − ($SiO_2$ + $B_2O_3$ + $P_2O_5$ + $GeO_2$)} | $TiO_2$ + $Nb_2O_5$ | $TiO_2$/($TiO_2$ + $Nb_2O_5$) | $TiO_2$/($TiO_2$ + $Nb_2O_5$ + $WO_3$ + $ZrO_2$ + SrO + BaO + ZnO + $La_2O_3$ + $Gd_2O_3$ + $Y_2O_3$ + $Ta_2O_5$ + $Bi_2O_3$) | $Li_2O$/($Li_2O$ + $Na_2O$ + $K_2O$ + $Cs_2O$) |
|---|---|---|---|---|---|---|---|---|
| 4-1 | 5.58 | 2.49 | 0.00 | 0.04 | 49.93 | 0.53 | 0.42 | 0.55 |
| 4-2 | 6.44 | 4.23 | 0.00 | 0.03 | 49.47 | 0.53 | 0.42 | 0.34 |
| 4-3 | 4.65 | 2.45 | 0.00 | 0.03 | 49.22 | 0.53 | 0.42 | 0.47 |
| 4-4 | 4.61 | 2.43 | 0.00 | 0.03 | 48.78 | 0.53 | 0.42 | 0.47 |
| 4-5 | 7.22 | 2.79 | 0.00 | 0.06 | 51.66 | 0.57 | 0.53 | 0.61 |
| 4-6 | 7.75 | 2.81 | 0.00 | 0.07 | 51.99 | 0.57 | 0.53 | 0.64 |
| 4-7 | 7.36 | 2.75 | 0.00 | 0.06 | 55.19 | 0.53 | 0.51 | 0.63 |
| 4-8 | 7.59 | 3.24 | 0.00 | 0.06 | 55.04 | 0.53 | 0.51 | 0.57 |
| 4-9 | 7.09 | 2.74 | 0.00 | 0.06 | 54.95 | 0.53 | 0.51 | 0.61 |
| 4-10 | 7.07 | 2.73 | 0.00 | 0.06 | 54.81 | 0.53 | 0.51 | 0.61 |
| 4-11 | 7.72 | 2.80 | 0.00 | 0.07 | 56.30 | 0.53 | 0.53 | 0.64 |
| 4-12 | 8.15 | 3.47 | 0.00 | 0.06 | 56.04 | 0.53 | 0.53 | 0.57 |
| 4-13 | 7.77 | 2.82 | 0.00 | 0.07 | 54.07 | 0.51 | 0.51 | 0.64 |
| 4-14 | 7.84 | 2.85 | 0.00 | 0.07 | 54.50 | 0.51 | 0.51 | 0.64 |
| 4-15 | 7.91 | 2.87 | 0.00 | 0.07 | 53.25 | 0.57 | 0.57 | 0.64 |
| 4-16 | 7.98 | 2.90 | 0.00 | 0.07 | 53.69 | 0.57 | 0.57 | 0.64 |
| 4-17 | 7.96 | 2.89 | 0.00 | 0.07 | 50.94 | 0.55 | 0.55 | 0.64 |
| 4-18 | 7.98 | 2.90 | 0.00 | 0.07 | 51.10 | 0.55 | 0.55 | 0.64 |
| 4-19 | 8.59 | 2.94 | 0.00 | 0.08 | 51.71 | 0.55 | 0.55 | 0.66 |
| 4-20 | 7.98 | 2.90 | 0.00 | 0.07 | 51.00 | 0.55 | 0.55 | 0.64 |
| 4-21 | 9.08 | 3.96 | 0.00 | 0.07 | 51.44 | 0.55 | 0.55 | 0.56 |
| 4-22 | 8.10 | 2.94 | 0.00 | 0.07 | 50.06 | 0.63 | 0.63 | 0.64 |
| 4-23 | 8.57 | 2.93 | 0.00 | 0.08 | 51.65 | 0.55 | 0.55 | 0.66 |
| 4-24 | 8.60 | 3.97 | 0.00 | 0.07 | 49.78 | 0.63 | 0.63 | 0.54 |
| 4-25 | 8.26 | 3.00 | 0.00 | 0.08 | 49.14 | 0.70 | 0.70 | 0.64 |
| 4-26 | 7.73 | 2.81 | 0.00 | 0.06 | 56.37 | 0.53 | 0.53 | 0.64 |
| 4-27 | 7.15 | 2.77 | 0.00 | 0.06 | 55.56 | 0.53 | 0.53 | 0.61 |
| 4-28 | 6.58 | 2.73 | 0.00 | 0.05 | 54.84 | 0.53 | 0.53 | 0.59 |
| 4-29 | 8.38 | 2.86 | 0.00 | 0.07 | 54.87 | 0.51 | 0.51 | 0.66 |
| 4-30 | 9.61 | 5.74 | 0.00 | 0.05 | 55.14 | 0.53 | 0.53 | 0.40 |
| 4-31 | 8.80 | 3.84 | 0.00 | 0.06 | 56.84 | 0.53 | 0.53 | 0.56 |
| 4-32 | 8.80 | 3.84 | 0.00 | 0.07 | 56.75 | 0.53 | 0.53 | 0.56 |
| 4-33 | 7.42 | 2.78 | 0.00 | 0.06 | 53.29 | 0.51 | 0.49 | 0.63 |
| 4-34 | 7.36 | 2.76 | 0.00 | 0.06 | 52.87 | 0.51 | 0.48 | 0.63 |
| 4-35 | 7.39 | 2.77 | 0.00 | 0.06 | 53.13 | 0.51 | 0.49 | 0.63 |
| 4-36 | 7.63 | 2.77 | 0.00 | 0.07 | 54.85 | 0.45 | 0.45 | 0.64 |
| 4-37 | 9.52 | 5.65 | 0.00 | 0.05 | 53.03 | 0.51 | 0.51 | 0.41 |
| 4-38 | 10.27 | 7.20 | 0.00 | 0.04 | 52.60 | 0.51 | 0.51 | 0.30 |
| 4-39 | 10.99 | 8.71 | 0.00 | 0.03 | 52.18 | 0.51 | 0.51 | 0.21 |
| 4-40 | 11.72 | 10.21 | 0.00 | 0.02 | 51.75 | 0.51 | 0.51 | 0.13 |
| 4-41 | 8.76 | 4.08 | 0.00 | 0.06 | 53.48 | 0.51 | 0.51 | 0.53 |
| 4-42 | 7.99 | 2.48 | 0.00 | 0.08 | 53.93 | 0.51 | 0.51 | 0.69 |

TABLE 4-2(1)-continued

| No. | $Li_2O$ + $Na_2O$ + $K_2O$ + $Cs_2O$ (% by mass) | $Na_2O$ + $K_2O$ + $Cs_2O$ | $Gd_2O_3$ + $La_2O_3$ + $Y_2O_3$ | $Li_2O$/{100 − ($SiO_2$ + $B_2O_3$ + $P_2O_5$ + $GeO_2$)} | $TiO_2$ + $Nb_2O_5$ | $TiO_2$/($TiO_2$ + $Nb_2O_5$) | $TiO_2$/($TiO_2$ + $Nb_2O_5$ + $WO_3$ + $ZrO_2$ + SrO + BaO + ZnO + $La_2O_3$ + $Gd_2O_3$ + $Y_2O_3$ + $Ta_2O_5$ + $Bi_2O_3$) | $Li_2O$/($Li_2O$ + $Na_2O$ + $K_2O$ + $Cs_2O$) |
|---|---|---|---|---|---|---|---|---|
| 4-43 | 7.24 | 2.81 | 0.00 | 0.06 | 53.70 | 0.51 | 0.51 | 0.61 |
| 4-44 | 7.49 | 2.81 | 0.00 | 0.06 | 53.73 | 0.51 | 0.51 | 0.62 |
| 4-45 | 7.39 | 2.77 | 0.00 | 0.06 | 53.07 | 0.51 | 0.49 | 0.63 |
| 4-46 | 6.97 | 2.70 | 0.00 | 0.06 | 51.73 | 0.51 | 0.46 | 0.61 |
| 4-47 | 6.59 | 2.64 | 0.00 | 0.05 | 50.65 | 0.51 | 0.45 | 0.60 |
| 4-48 | 7.38 | 2.77 | 0.00 | 0.06 | 52.31 | 0.50 | 0.48 | 0.62 |
| 4-49 | 7.41 | 2.78 | 0.00 | 0.06 | 52.10 | 0.52 | 0.49 | 0.62 |
| 4-50 | 7.44 | 2.77 | 0.00 | 0.06 | 53.11 | 0.51 | 0.49 | 0.63 |
| 4-51 | 7.84 | 3.50 | 0.00 | 0.06 | 52.60 | 0.51 | 0.49 | 0.55 |
| 4-52 | 7.60 | 3.01 | 0.00 | 0.06 | 52.74 | 0.51 | 0.49 | 0.60 |
| 4-53 | 7.36 | 2.76 | 0.00 | 0.06 | 52.89 | 0.51 | 0.49 | 0.63 |
| 4-54 | 1.62 | 0.00 | 0.00 | 0.02 | 49.36 | 0.58 | 0.41 | 1.00 |
| 4-55 | 7.41 | 2.78 | 0.00 | 0.06 | 52.57 | 0.50 | 0.48 | 0.63 |
| 4-56 | 7.44 | 2.79 | 0.00 | 0.06 | 52.37 | 0.52 | 0.50 | 0.63 |
| 4-57 | 7.36 | 2.52 | 0.00 | 0.07 | 52.87 | 0.51 | 0.48 | 0.66 |
| 4-58 | 7.84 | 3.26 | 0.00 | 0.06 | 52.60 | 0.51 | 0.48 | 0.58 |
| 4-59 | 7.33 | 2.75 | 0.00 | 0.06 | 52.66 | 0.51 | 0.48 | 0.63 |
| 4-60 | 7.39 | 2.77 | 0.00 | 0.06 | 53.08 | 0.51 | 0.48 | 0.63 |
| 4-61 | 7.62 | 2.77 | 0.00 | 0.07 | 53.04 | 0.51 | 0.48 | 0.64 |
| 4-62 | 7.34 | 2.75 | 0.00 | 0.06 | 52.69 | 0.51 | 0.48 | 0.63 |
| 4-63 | 7.20 | 2.94 | 0.00 | 0.06 | 51.60 | 0.51 | 0.46 | 0.59 |
| 4-64 | 7.63 | 3.02 | 0.00 | 0.06 | 52.53 | 0.52 | 0.50 | 0.60 |
| 4-65 | 4.33 | 2.28 | 0.00 | 0.02 | 49.98 | 0.57 | 0.41 | 0.47 |
| 4-66 | 2.66 | 0.64 | 0.00 | 0.03 | 49.22 | 0.57 | 0.41 | 0.76 |
| 4-67 | 4.55 | 2.40 | 0.00 | 0.03 | 52.55 | 0.57 | 0.46 | 0.47 |
| 4-68 | 2.63 | 0.63 | 0.00 | 0.02 | 52.82 | 0.60 | 0.44 | 0.76 |
| 4-69 | 3.13 | 0.66 | 0.00 | 0.03 | 54.76 | 0.60 | 0.47 | 0.79 |
| 4-70 | 4.38 | 2.31 | 0.00 | 0.03 | 57.59 | 0.50 | 0.42 | 0.47 |
| 4-71 | 2.87 | 0.64 | 0.00 | 0.03 | 53.58 | 0.60 | 0.45 | 0.78 |
| 4-72 | 2.62 | 0.63 | 0.00 | 0.02 | 52.61 | 0.60 | 0.44 | 0.76 |
| 4-73 | 7.62 | 3.02 | 2.59 | 0.06 | 52.45 | 0.52 | 0.50 | 0.60 |
| 4-74 | 7.19 | 2.94 | 2.53 | 0.06 | 51.52 | 0.51 | 0.46 | 0.59 |
| 4-75 | 7.18 | 2.94 | 5.05 | 0.06 | 51.45 | 0.51 | 0.46 | 0.59 |
| 4-76 | 7.11 | 2.90 | 0.00 | 0.06 | 48.87 | 0.53 | 0.45 | 0.59 |
| 4-77 | 7.58 | 3.00 | 0.00 | 0.06 | 50.91 | 0.51 | 0.47 | 0.60 |
| 4-78 | 7.64 | 3.03 | 0.00 | 0.06 | 50.49 | 0.55 | 0.50 | 0.60 |
| 4-79 | 7.16 | 2.92 | 0.00 | 0.06 | 50.02 | 0.50 | 0.44 | 0.59 |
| 4-80 | 7.21 | 2.95 | 0.00 | 0.06 | 49.61 | 0.53 | 0.47 | 0.59 |
| 4-81 | 7.60 | 3.01 | 2.88 | 0.06 | 52.30 | 0.52 | 0.50 | 0.60 |
| 4-82 | 7.68 | 3.04 | 1.81 | 0.06 | 52.87 | 0.52 | 0.51 | 0.60 |
| 4-83 | 7.17 | 2.93 | 2.80 | 0.06 | 51.38 | 0.51 | 0.46 | 0.59 |
| 4-84 | 7.25 | 2.96 | 1.77 | 0.06 | 51.93 | 0.51 | 0.47 | 0.59 |
| 4-85 | 7.18 | 2.93 | 0.00 | 0.06 | 51.40 | 0.51 | 0.46 | 0.59 |
| 4-86 | 7.23 | 2.96 | 0.00 | 0.06 | 51.80 | 0.51 | 0.46 | 0.59 |
| 4-87 | 7.26 | 2.97 | 0.00 | 0.06 | 52.01 | 0.51 | 0.46 | 0.59 |
| 4-88 | 7.25 | 2.97 | 1.77 | 0.06 | 51.71 | 0.50 | 0.47 | 0.59 |
| 4-89 | 7.27 | 2.97 | 1.77 | 0.06 | 51.63 | 0.51 | 0.47 | 0.59 |
| 4-90 | 7.26 | 2.97 | 1.77 | 0.06 | 51.61 | 0.50 | 0.47 | 0.59 |
| 4-91 | 7.28 | 2.97 | 1.77 | 0.06 | 51.49 | 0.51 | 0.47 | 0.59 |
| 4-92 | 7.33 | 2.97 | 1.02 | 0.06 | 51.84 | 0.51 | 0.47 | 0.60 |
| 4-93 | 6.76 | 2.92 | 1.01 | 0.05 | 51.12 | 0.51 | 0.47 | 0.57 |
| 4-94 | 7.79 | 3.92 | 1.01 | 0.05 | 51.58 | 0.51 | 0.47 | 0.50 |
| 4-95 | 8.37 | 3.97 | 1.03 | 0.06 | 52.32 | 0.51 | 0.47 | 0.53 |
| 4-96 | 7.66 | 3.03 | 0.00 | 0.06 | 51.42 | 0.51 | 0.49 | 0.60 |
| 4-97 | 7.72 | 3.06 | 0.00 | 0.06 | 51.01 | 0.55 | 0.52 | 0.60 |
| 4-98 | 8.1 | 3.99 | 0 | 0.056139872 | 52.27 | 0.52362732 | 0.500365631 | 0.507407407 |
| 4-99 | 8.56 | 4.94 | 0 | 0.049359149 | 52 | 0.523461538 | 0.500183756 | 0.422897196 |
| 4-100 | 8.57 | 4.48 | 0 | 0.055767657 | 51.99 | 0.523369879 | 0.500091895 | 0.477246208 |
| 4-101 | 7.05 | 2.98 | 0 | 0.056867403 | 51.8 | 0.523552124 | 0.500276702 | 0.577304965 |
| 4-102 | 7.7 | 3.05 | 0 | 0.06383855 | 52.12 | 0.556600153 | 0.53141601 | 0.603896104 |
| 4-103 | 7.41 | 3.03 | 0 | 0.059983566 | 51.78 | 0.556778679 | 0.531624562 | 0.591093117 |
| 4-104 | 9.1 | 5.23 | 0 | 0.052811135 | 52.14 | 0.523590334 | 0.511715089 | 0.425274725 |
| 4-105 | 7.79 | 3.09 | 0 | 0.065669973 | 51.4 | 0.545525292 | 0.532573599 | 0.603337612 |
| 4-106 | 7.72 | 3.06 | 0 | 0.064884433 | 51.83 | 0.511672776 | 0.499717354 | 0.603626943 |
| 4-107 | 8.17 | 3.55 | 0 | 0.063279003 | 52.67 | 0.523447883 | 0.511502783 | 0.565483476 |
| 4-108 | 8.64 | 4.04 | 0 | 0.062893082 | 52.4 | 0.523473282 | 0.51156285 | 0.532407407 |
| 4-109 | 7.12 | 3.01 | 0 | 0.056132204 | 52.25 | 0.523444976 | 0.511501777 | 0.577247191 |
| 4-110 | 7.35 | 3.03 | 0 | 0.059365123 | 51.81 | 0.556649296 | 0.533777531 | 0.587755102 |

TABLE 4-2(1)-continued

| No. | $Li_2O$ + $Na_2O$ + $K_2O$ + $Cs_2O$ (% by mass) | $Na_2O$ + $K_2O$ + $Cs_2O$ | $Gd_2O_3$ + $La_2O_3$ + $Y_2O_3$ | $Li_2O$/{100 − ($SiO_2$ + $B_2O_3$ + $P_2O_5$ + $GeO_2$)} | $TiO_2$ + $Nb_2O_5$ | $TiO_2$/($TiO_2$ + $Nb_2O_5$) | $TiO_2$/($TiO_2$ + $Nb_2O_5$ + $WO_3$ + $ZrO_2$ + SrO + BaO + ZnO + $La_2O_3$ + $Gd_2O_3$ + $Y_2O_3$ + $Ta_2O_5$ + $Bi_2O_3$) | $Li_2O$/($Li_2O$ + $Na_2O$ + $K_2O$ + $Cs_2O$) |
|---|---|---|---|---|---|---|---|---|
| 4-111 | 7.55 | 3.28 | 0 | 0.058501165 | 51.83 | 0.556627436 | 0.533765032 | 0.565562914 |
| 4-112 | 7.54 | 3.22 | 0 | 0.05918619 | 51.84 | 0.556712963 | 0.533851276 | 0.572944297 |
| 4-113 | 7.54 | 3.16 | 0 | 0.06000822 | 51.84 | 0.556712963 | 0.533851276 | 0.580901857 |
| 4-114 | 7.75 | 3.07 | 0 | 0.064418445 | 53.36 | 0.523425787 | 0.523425787 | 0.603870968 |
| 4-115 | 7.72 | 3.06 | 0 | 0.064046179 | 54.45 | 0.534802571 | 0.534802571 | 0.603626943 |
| 4-116 | 7.69 | 3.05 | 0 | 0.063675038 | 54.64 | 0.518850659 | 0.518850659 | 0.603381014 |
| 4-117 | 7.65 | 3.03 | 0 | 0.063296342 | 54.84 | 0.503282276 | 0.503282276 | 0.603921569 |
| 4-118 | 7.79 | 3.09 | 0 | 0.064800772 | 53.15 | 0.539981185 | 0.539981185 | 0.603337612 |
| 4-119 | 7.42 | 3.03 | 0 | 0.060980692 | 54.06 | 0.534961154 | 0.534961154 | 0.591644205 |
| 4-120 | 6.92 | 2.29 | 0 | 0.064755245 | 54.07 | 0.534862216 | 0.534862216 | 0.669075145 |
| 4-121 | 7.75 | 3.07 | 0 | 0.064676617 | 53.99 | 0.541211335 | 0.541211335 | 0.603870968 |
| 4-122 | 7.49 | 2.97 | 0 | 0.063084438 | 51.5 | 0.523495146 | 0.500185529 | 0.603471295 |
| 4-123 | 7.33 | 2.9 | 0 | 0.063060498 | 50.51 | 0.523460701 | 0.500189179 | 0.604365621 |
| 4-124 | 7.16 | 3.02 | 0 | 0.058211474 | 52.59 | 0.523483552 | 0.523483552 | 0.578212291 |
| 4-125 | 8.7 | 4.55 | 0 | 0.05690388 | 52.81 | 0.52357508 | 0.52357508 | 0.477011494 |
| 4-126 | 8.24 | 3.58 | 0 | 0.064019783 | 53.07 | 0.523459582 | 0.523459582 | 0.565533981 |
| 4-127 | 9.17 | 5.04 | 0 | 0.056521144 | 52.54 | 0.523601066 | 0.523601066 | 0.450381679 |
| 4-128 | 7.6 | 3.01 | 0 | 0.064412012 | 52.34 | 0.523500191 | 0.523500191 | 0.603947368 |
| 4-129 | 7.85 | 3.11 | 0 | 0.065569235 | 52.75 | 0.511658768 | 0.511658768 | 0.603821656 |
| 4-130 | 7.93 | 3.14 | 0 | 0.06648161 | 52.33 | 0.545576151 | 0.545576151 | 0.604035309 |
| 4-131 | 7.16 | 3.02 | 0 | 0.057452123 | 52.63 | 0.52365571 | 0.52365571 | 0.578212291 |
| 4-132 | 7.49 | 3.06 | 0 | 0.061382846 | 53.18 | 0.523505077 | 0.523505077 | 0.591455274 |
| 4-133 | 7.51 | 3.07 | 1.83 | 0.06158968 | 51.21 | 0.545596563 | 0.526772247 | 0.591211718 |
| 4-134 | 7.76 | 3.07 | 0 | 0.064591654 | 51.3 | 0.545614035 | 0.525140713 | 0.604381443 |
| 4-135 | 7.78 | 3.08 | 0 | 0.064908162 | 53.52 | 0.523542601 | 0.523542601 | 0.604113111 |
| 4-136 | 7.91 | 3.13 | 0 | 0.066287616 | 52.44 | 0.50553013 | 0.50553013 | 0.604298357 |
| 4-137 | 7.94 | 3.14 | 0 | 0.06668519 | 52.22 | 0.522405209 | 0.522405209 | 0.604534005 |
| 4-138 | 7.97 | 3.15 | 0 | 0.067074868 | 52.02 | 0.539792388 | 0.539792388 | 0.60476788 |
| 4-139 | 8.01 | 3.17 | 0 | 0.067475254 | 51.8 | 0.557142857 | 0.557142857 | 0.604244694 |
| 4-140 | 7.97 | 3.06 | 0 | 0.067519252 | 53.24 | 0.523666416 | 0.523666416 | 0.616060226 |
| 4-141 | 8.21 | 3.55 | 0 | 0.064019783 | 53.1 | 0.52354049 | 0.52354049 | 0.567600487 |
| 4-142 | 8.45 | 3.8 | 0 | 0.063829787 | 52.95 | 0.523512748 | 0.523512748 | 0.550295858 |
| 4-143 | 7.69 | 3.05 | 0 | 0.063657566 | 52.87 | 0.523359183 | 0.523359183 | 0.603381014 |
| 4-144 | 7.56 | 2.99 | 0 | 0.062346521 | 52.95 | 0.491406988 | 0.469929565 | 0.604497354 |
| 4-145 | 7.5 | 2.97 | 0 | 0.061615887 | 53.33 | 0.46015376 | 0.440337341 | 0.604 |
| 4-146 | 7.35 | 3.01 | 0 | 0.059249147 | 52.19 | 0.523471929 | 0.500183083 | 0.59047619 |
| 4-147 | 7.29 | 2.98 | 0 | 0.058679374 | 51.8 | 0.523552124 | 0.485673352 | 0.59122085 |
| 4-148 | 7.32 | 2.99 | 0 | 0.059032038 | 51.98 | 0.523470566 | 0.488685345 | 0.591530055 |
| 4-149 | 7.27 | 2.97 | 0 | 0.058479532 | 51.64 | 0.523431448 | 0.482937288 | 0.591471802 |
| 4-150 | 7.63 | 3.02 | 0 | 0.062280465 | 52.58 | 0.523583111 | 0.500272579 | 0.604193971 |
| 4-151 | 7.59 | 3.01 | 0 | 0.06171675 | 52.16 | 0.523389571 | 0.485505958 | 0.60342556 |
| 4-152 | 7.6 | 3.01 | 0 | 0.062262615 | 52.36 | 0.523491215 | 0.500182482 | 0.603947368 |
| 4-153 | 7.55 | 2.99 | 0 | 0.061696658 | 51.96 | 0.5234796 | 0.485627567 | 0.60397351 |
| 4-154 | 7.65 | 3.03 | 0 | 0.063097514 | 52.64 | 0.523556231 | 0.500272282 | 0.603921569 |
| 4-155 | 7.62 | 3.02 | 0 | 0.062884484 | 52.65 | 0.525735992 | 0.502450535 | 0.603674541 |
| 4-156 | 7.63 | 3.02 | 0 | 0.062995354 | 52.65 | 0.524786325 | 0.50154293 | 0.604193971 |
| 4-157 | 7.59 | 3.02 | 0 | 0.062508549 | 52.63 | 0.525175755 | 0.501906664 | 0.602108037 |
| 4-158 | 7.62 | 3.02 | 0 | 0.063074181 | 52.43 | 0.523555216 | 0.500273373 | 0.603674541 |
| 4-159 | 7.66 | 3.03 | 0 | 0.063113413 | 52.75 | 0.523601896 | 0.500362319 | 0.604438642 |
| 4-160 | 7.63 | 3.02 | 0 | 0.063176648 | 52.42 | 0.522319725 | 0.498997631 | 0.604193971 |
| 4-161 | 7.63 | 3.02 | 0 | 0.062909389 | 52.75 | 0.525876777 | 0.502627288 | 0.604193971 |
| 4-162 | 3.48 | 0.65 | 0 | 0.033014466 | 54.06 | 0.602848687 | 0.442618498 | 0.813218391 |
| 4-163 | 4.35 | 2.29 | 0 | 0.024051372 | 52.98 | 0.658550396 | 0.480313877 | 0.473563218 |
| 4-164 | 4.41 | 2.32 | 0 | 0.02446161 | 52.3 | 0.717399618 | 0.519307958 | 0.473922902 |
| 4-165 | 4.31 | 2.27 | 0 | 0.023792862 | 53.3 | 0.630393996 | 0.461348345 | 0.473317865 |
| 4-166 | 4.37 | 2.3 | 0 | 0.024199205 | 52.64 | 0.6875 | 0.499516908 | 0.473684211 |
| 4-167 | 3.94 | 1.48 | 0 | 0.028745034 | 53.19 | 0.65858244 | 0.480257746 | 0.624365482 |
| 4-168 | 3.53 | 0.66 | 0 | 0.033559401 | 53.42 | 0.658554848 | 0.48020748 | 0.813031161 |
| 4-169 | 3.2 | 0 | 0 | 0.037440037 | 53.61 | 0.658645775 | 0.480342811 | 1 |
| 4-170 | 6.7 | 2.93 | 0 | 0.050966608 | 51.19 | 0.50732565 | 0.464413448 | 0.562686567 |
| 4-171 | 6.65 | 2.9 | 0 | 0.050614118 | 50.94 | 0.507263447 | 0.464330638 | 0.563909774 |
| 4-172 | 6.55 | 2.86 | 0 | 0.049550154 | 50.23 | 0.507465658 | 0.439482759 | 0.563358779 |
| 4-173 | 6.83 | 2.89 | 0 | 0.053021128 | 50.5 | 0.507326733 | 0.445565217 | 0.576866764 |
| 4-174 | 5.95 | 2.79 | 0 | 0.042054831 | 48.91 | 0.507462687 | 0.416932639 | 0.531092437 |
| 4-175 | 6.21 | 2.81 | 0 | 0.045339379 | 49.18 | 0.507320049 | 0.422451744 | 0.547504026 |
| 4-176 | 6.46 | 2.82 | 0 | 0.048637092 | 49.47 | 0.507378209 | 0.428254564 | 0.563467492 |

TABLE 4-3(1)

| No. | Glass properties: Refractive index nd | Abbe's number νd | Specific weight | nd − (0.2 × Specific weigh + 1.18) | nd/ Specific weight | Glass transition temperature Tg (° C.) | λ80 (nm) | λ70 (nm) | λ5 (nm) |
|---|---|---|---|---|---|---|---|---|---|
| 4-1 | 1.92564 | 23.09 | 3.639 | 0.018 | 0.529 | 605 | 556 | 460 | 376 |
| 4-2 | 1.91696 | 23.17 | 3.631 | 0.011 | 0.528 | 607 | 541 | 454 | 374 |
| 4-3 | 1.92371 | 23.31 | 3.656 | 0.013 | 0.526 | 615 | 572 | 467 | 377 |
| 4-4 | 1.92372 | 23.50 | 3.659 | 0.012 | 0.526 | 623 | 552 | 453 | 374 |
| 4-5 | 1.91048 | | 3.410 | 0.048 | 0.560 | 580 | 554 | 458 | 375 |
| 4-6 | 1.91272 | 23.06 | 3.418 | 0.049 | 0.560 | 583 | 548 | 456 | 374 |
| 4-7 | 1.92316 | 22.52 | 3.441 | 0.055 | 0.559 | 583 | 556 | 461 | 377 |
| 4-8 | 1.92110 | | 3.441 | 0.053 | 0.558 | | 555 | 459 | 376 |
| 4-9 | 1.92309 | | 3.448 | 0.053 | 0.558 | | N/A | 497 | 378 |
| 4-10 | 1.92293 | 22.63 | 3.449 | 0.053 | 0.558 | | 541 | 455 | 376 |
| 4-11 | 1.92337 | | 3.400 | 0.063 | 0.566 | 580 | N/A | 484 | 378 |
| 4-12 | 1.91933 | | 3.394 | 0.061 | 0.566 | 577 | 549 | 459 | 376 |
| 4-13 | 1.90059 | 23.31 | 3.364 | 0.048 | 0.565 | 582 | 666 | 459 | 374 |
| 4-14 | 1.90590 | 22.97 | 3.372 | 0.051 | 0.565 | 571 | N/A | 478 | 374 |
| 4-15 | 1.90099 | 23.01 | 3.333 | 0.054 | 0.570 | | 693 | 460 | 374 |
| 4-16 | 1.90643 | 22.88 | 3.341 | 0.058 | 0.571 | | N/A | 500 | 375 |
| 4-17 | 1.87843 | 23.92 | 3.298 | 0.039 | 0.570 | 581 | 544 | 443 | 372 |
| 4-18 | 1.87702 | 23.79 | 3.295 | 0.038 | 0.570 | 575 | N/A | 461 | 373 |
| 4-19 | 1.88584 | 23.83 | 3.313 | 0.043 | 0.569 | 573 | 514 | 438 | 371 |
| 4-20 | 1.88581 | 24.02 | 3.329 | 0.040 | 0.566 | 582 | 528 | 439 | 371 |
| 4-21 | 1.88185 | 23.84 | 3.311 | 0.040 | 0.568 | | 508 | 437 | 370 |
| 4-22 | 1.87894 | 23.70 | 3.266 | 0.046 | 0.575 | 582 | 526 | 443 | 372 |
| 4-23 | 1.87815 | 23.64 | 3.281 | 0.042 | 0.572 | | 514 | 442 | 372 |
| 4-24 | 1.87486 | 23.77 | 3.262 | 0.042 | 0.575 | | 505 | 437 | 372 |
| 4-25 | 1.87931 | 23.56 | 3.232 | 0.053 | 0.581 | | 650 | 452 | 374 |
| 4-26 | 1.93027 | 22.53 | 3.429 | 0.064 | 0.563 | 580 | 562 | 473 | 379 |
| 4-27 | 1.92297 | 21.40 | 3.415 | 0.060 | 0.563 | 587 | 573 | 475 | 380 |
| 4-28 | 1.92238 | 22.77 | 3.429 | 0.057 | 0.561 | 594 | 564 | 471 | 379 |
| 4-29 | 1.90832 | 23.09 | 3.381 | 0.052 | 0.564 | 572 | 555 | 465 | 376 |
| 4-30 | 1.90598 | 22.63 | 3.372 | 0.052 | 0.565 | 578 | 563 | 471 | 378 |
| 4-31 | 1.92643 | 22.32 | 3.413 | 0.064 | 0.564 | 572 | 590 | 480 | 380 |
| 4-32 | 1.91948 | | 3.382 | 0.063 | 0.568 | | 666 | 487 | 381 |
| 4-33 | 1.90072 | 23.33 | 3.393 | 0.042 | 0.560 | 580 | 560 | 469 | 377 |
| 4-34 | 1.90098 | 23.35 | 3.413 | 0.038 | 0.557 | 585 | 569 | 468 | 376 |
| 4-35 | 1.90423 | 23.18 | 3.392 | 0.046 | 0.561 | 585 | 570 | 470 | 377 |
| 4-36 | 1.90037 | 23.40 | 3.397 | 0.041 | 0.559 | 580 | 568 | 466 | 375 |
| 4-37 | 1.88576 | 23.40 | 3.343 | 0.037 | 0.564 | 578 | 553 | 465 | 375 |
| 4-38 | 1.87933 | 23.47 | 3.341 | 0.031 | 0.563 | | 548 | 463 | 375 |
| 4-39 | 1.87258 | 23.57 | 3.336 | 0.025 | 0.561 | | 549 | 461 | 374 |
| 4-40 | 1.86530 | | 3.331 | 0.019 | 0.560 | | 602 | 464 | 373 |
| 4-41 | 1.89182 | 22.03 | 3.345 | 0.043 | 0.566 | | 556 | 466 | 377 |
| 4-42 | 1.89719 | 23.33 | 3.345 | 0.048 | 0.567 | | 564 | 469 | 377 |
| 4-43 | 1.89548 | 23.20 | 3.352 | 0.045 | 0.565 | | 569 | 468 | 377 |
| 4-44 | 1.89641 | 23.24 | 3.356 | 0.045 | 0.565 | | 549 | 464 | 377 |
| 4-45 | 1.90091 | 23.33 | 3.404 | 0.040 | 0.558 | 584 | 545 | 462 | 376 |
| 4-46 | 1.90124 | 23.49 | 3.457 | 0.030 | 0.550 | 586 | 565 | 469 | 377 |
| 4-47 | 1.90126 | 23.64 | 3.504 | 0.020 | 0.543 | 590 | 562 | 466 | 376 |
| 4-48 | 1.89547 | 23.57 | 3.406 | 0.034 | 0.557 | 586 | 561 | 464 | 375 |
| 4-49 | 1.89561 | 23.51 | 3.398 | 0.036 | 0.558 | 582 | 551 | 461 | 375 |
| 4-50 | 1.90107 | 23.33 | 3.402 | 0.041 | 0.559 | 581 | 551 | 465 | 376 |
| 4-51 | 1.89703 | 23.4 | 3.405 | 0.036 | 0.557 | 580 | 565 | 469 | 377 |
| 4-52 | 1.89909 | 23.4 | 3.406 | 0.038 | 0.558 | 581 | 566 | 468 | 376 |
| 4-53 | 1.89968 | 23.36 | 3.408 | 0.038 | 0.557 | 582 | 569 | 466 | 376 |
| 4-54 | 1.96914 | 22.11 | 3.89 | 0.011 | 0.506 | 657 | 639 | 500 | 388 |
| 4-55 | 1.8991 | 23.43 | 3.380 | 0.043 | 0.562 | 584 | 626 | 474 | 376 |
| 4-56 | 1.89915 | 23.42 | 3.375 | 0.044 | 0.563 | 586 | 579 | 468 | 376 |
| 4-57 | 1.90093 | 23.39 | 3.407 | 0.040 | 0.558 | 583 | 570 | 470 | 376 |
| 4-58 | 1.89667 | 23.45 | 3.400 | 0.037 | 0.558 | 582 | 557 | 465 | 376 |
| 4-59 | 1.89848 | 23.46 | 3.404 | 0.038 | 0.558 | 586 | 553 | 466 | 377 |
| 4-60 | 1.90705 | 23.43 | 3.417 | 0.044 | 0.558 | 578 | 561 | 472 | 378 |
| 4-61 | 1.90226 | 23.30 | 3.418 | 0.039 | 0.557 | 586 | 556 | 466 | 377 |
| 4-62 | 1.90216 | 23.37 | 3.425 | 0.037 | 0.555 | 589 | 551 | 464 | 376 |
| 4-63 | 1.89924 | 23.48 | 3.452 | 0.029 | 0.550 | 587 | 566 | 470 | 377 |
| 4-64 | 1.89899 | 23.53 | 3.399 | 0.039 | 0.559 | 583 | 565 | 469 | 377 |
| 4-65 | 1.9636 | 23.38 | 3.858 | 0.012 | 0.509 | 621 | 648 | 499 | 387 |
| 4-66 | 1.95856 | 22.26 | 3.830 | 0.013 | 0.511 | 639 | 656 | 499 | 387 |
| 4-67 | 1.95316 | 22.30 | 3.668 | 0.040 | 0.532 | 621 | 668 | 500 | 387 |
| 4-68 | 1.99951 | 21.92 | 3.890 | 0.042 | 0.514 | 636 | N/A | 518 | 394 |
| 4-69 | 2.00242 | 21.02 | 3.817 | 0.059 | 0.525 | 628 | N/A | 526 | 395 |
| 4-70 | 1.99474 | 20.78 | 3.787 | 0.057 | 0.527 | 616 | N/A | 520 | 393 |
| 4-71 | 1.99624 | 21.02 | 3.865 | 0.043 | 0.516 | 629 | N/A | 517 | 396 |
| 4-72 | 1.99462 | 21.17 | 3.907 | 0.033 | 0.511 | 637 | N/A | 516 | 395 |
| 4-73 | 1.90223 | 23.36 | 3.405 | 0.041 | 0.559 | 585 | 566 | 472 | 378 |
| 4-74 | 1.9023 | 23.44 | 3.459 | 0.031 | 0.550 | 589 | 564 | 469 | 377 |

TABLE 4-3(1)-continued

| | | | | | | | | | |
|---|---|---|---|---|---|---|---|---|---|
| 4-75 | 1.90575 | 23.55 | 3.467 | 0.032 | 0.550 | 590 | 560 | 468 | 377 |
| 4-76 | 1.89824 | 23.79 | 3.498 | 0.019 | 0.543 | 589 | 549 | 462 | 376 |
| 4-77 | 1.89573 | 23.72 | 3.414 | 0.033 | 0.555 | 584 | 559 | 468 | 376 |
| 4-78 | 1.8959 | 23.61 | 3.399 | 0.036 | 0.558 | 586 | 569 | 472 | 377 |
| 4-79 | 1.89591 | 23.90 | 3.468 | 0.022 | 0.547 | 590 | 561 | 466 | 376 |
| 4-80 | 1.89598 | 23.79 | 3.452 | 0.026 | 0.549 | 588 | 555 | 465 | 376 |
| 4-81 | 1.90158 | 23.38 | 3.419 | 0.038 | 0.556 | 586 | 561 | 470 | 377 |
| 4-82 | 1.90054 | 23.36 | 3.382 | 0.044 | 0.562 | 586 | 561 | 468 | 377 |
| 4-83 | 1.90183 | 23.54 | 3.473 | 0.027 | 0.548 | 588 | 553 | 465 | 377 |
| 4-84 | 1.90052 | 23.54 | 3.436 | 0.033 | 0.553 | 587 | 551 | 464 | 376 |
| 4-85 | 1.89651 | 23.73 | 3.446 | 1.869 | 0.550 | 591 | 559 | 467 | 376 |
| 4-86 | 1.90232 | 23.46 | 3.456 | 1.871 | 0.550 | 581 | 564 | 471 | 377 |
| 4-87 | 1.90443 | 23.38 | 3.460 | 1.872 | 0.550 | 579 | 564 | 470 | 377 |
| 4-88 | 1.89848 | 23.60 | 3.433 | 1.867 | 0.553 | 586 | 554 | 468 | 377 |
| 4-89 | 1.89833 | 23.60 | 3.430 | 1.866 | 0.553 | 590 | 559 | 469 | 377 |
| 4-90 | 1.89847 | 23.69 | 3.437 | 1.867 | 0.552 | 590 | 548 | 466 | 376 |
| 4-91 | 1.89856 | 23.63 | 3.432 | 1.866 | 0.553 | 582 | 552 | 464 | 376 |
| 4-92 | 1.90048 | 23.64 | 3.438 | 1.868 | 0.553 | | 571 | 475 | 377 |
| 4-93 | 1.89251 | 23.60 | 3.420 | 1.864 | 0.553 | | 565 | 469 | 377 |
| 4-94 | 1.89666 | 23.51 | 3.438 | 1.868 | 0.552 | | 558 | 467 | 377 |
| 4-95 | 1.90344 | 23.43 | 3.452 | 1.870 | 0.551 | | 563 | 467 | 376 |
| 4-96 | 1.88811 | 23.77 | 3.379 | 1.856 | 0.559 | | 575 | 466 | 375 |
| 4-97 | 1.88831 | 23.71 | 3.365 | 1.853 | 0.561 | | 569 | 464 | 375 |

| No. | nd | νd | Specific weight | Tg (° C.) | λ80 (nm) | λ70 (nm) | λ5 (nm) |
|---|---|---|---|---|---|---|---|
| 4-98 | 1.89542 | 23.34 | 3.396 | 580 | 557 | 467 | 377 |
| 4-99 | 1.8914 | 23.41 | 3.395 | 584 | 566 | 468 | 376 |
| 4-100 | 1.89093 | 23.44 | 3.384 | 581 | 566 | 468 | 376 |
| 4-101 | 1.89112 | 23.14 | 3.38 | 590 | 556 | 465 | 377 |
| 4-102 | 1.89951 | 23.23 | 3.38 | 583 | 551 | 468 | 378 |
| 4-103 | 1.89942 | 23.36 | 3.388 | 588 | 553 | 467 | 377 |
| 4-104 | 1.8865 | 23.56 | 3.356 | 582 | 549 | 465 | 376 |
| 4-105 | 1.88826 | 23.64 | 3.345 | 582 | 545 | 463 | 376 |
| 4-106 | 1.88811 | 23.75 | 3.361 | | 546 | 464 | 376 |
| 4-107 | 1.89457 | 23.41 | 3.365 | | 552 | 466 | 377 |
| 4-108 | 1.88953 | 23.5 | 3.351 | | 544 | 465 | 377 |
| 4-109 | 1.89895 | 23.5 | 3.393 | | 543 | 465 | 377 |
| 4-110 | 1.90024 | 23.75 | 3.376 | 588 | 558 | 469 | 378 |
| 4-111 | 1.90025 | 23.29 | 3.378 | 590 | 558 | 469 | 378 |
| 4-112 | 1.90023 | 23.29 | 3.379 | | 553 | 467 | 378 |
| 4-113 | 1.89992 | 23.3 | 3.377 | | 552 | 465 | 377 |
| 4-114 | 1.89897 | 23.3 | 3.359 | 583 | 561 | 472 | 378 |
| 4-115 | 1.90618 | 22.84 | 3.361 | 583 | 566 | 475 | 379 |
| 4-116 | 1.90622 | 22.85 | 3.369 | 583 | 570 | 474 | 379 |
| 4-117 | 1.90606 | 22.92 | 3.376 | 582 | 609 | 475 | 378 |
| 4-118 | 1.89901 | 23.27 | 3.351 | 584 | 566 | 472 | 377 |
| 4-119 | 1.90185 | 22.87 | 3.351 | 586 | 595 | 479 | 379 |
| 4-120 | 1.90097 | 22.89 | 3.347 | 587 | 670 | 486 | 380 |
| 4-121 | 1.90296 | 22.92 | 3.35 | 583 | 560 | 469 | 378 |
| 4-122 | 1.88883 | 23.63 | 3.372 | 585 | 556 | 466 | 377 |
| 4-123 | 1.8786 | 23.91 | 3.349 | 589 | 548 | 461 | 375 |
| 4-124 | 1.8907 | 23.4 | 3.342 | 590 | 598 | 475 | 377 |
| 4-125 | 1.89048 | 23.4 | 3.345 | 583 | 561 | 471 | 377 |
| 4-126 | 1.89424 | 23.38 | 3.346 | 582 | 564 | 471 | 377 |
| 4-127 | 1.88593 | 23.54 | 3.332 | 584 | 552 | 466 | 377 |
| 4-128 | 1.88866 | 23.57 | 3.337 | 585 | 557 | 464 | 376 |
| 4-129 | 1.89279 | 23.57 | 3.353 | 581 | 559 | 468 | 377 |
| 4-130 | 1.89292 | 23.51 | 3.337 | 580 | 552 | 464 | 376 |
| 4-131 | 1.89479 | 23.47 | 3.356 | 590 | 556 | 469 | 377 |
| 4-132 | 1.89777 | 23.26 | 3.354 | 582 | 578 | 474 | 378 |
| 4-133 | 1.8924 | 23.68 | 3.361 | 585 | 550 | 466 | 377 |
| 4-134 | 1.89572 | 23.57 | 3.36 | 587 | 551 | 466 | 377 |
| 4-135 | 1.89843 | 23.24 | 3.354 | 581 | 546 | 454 | 372 |
| 4-136 | 1.88954 | 23.77 | 3.348 | 580 | N/A | N/A | 377 |
| 4-137 | 1.88958 | 23.73 | 3.343 | 582 | N/A | 668 | 376 |
| 4-138 | 1.88967 | 23.64 | 3.335 | 581 | N/A | 580 | 375 |
| 4-139 | 1.8876 | 23.54 | 3.326 | 582 | N/A | 546 | 374 |
| 4-140 | 1.89782 | 23.38 | 3.353 | 580 | 665 | 533 | 377 |
| 4-141 | 1.8959 | 23.39 | 3.353 | 583 | N/A | 556 | 377 |
| 4-142 | 1.89363 | 23.44 | 3.349 | 583 | N/A | 599 | 379 |
| 4-143 | 1.89767 | 23.49 | 3.364 | 584 | N/A | 628 | 379 |
| 4-144 | 1.89935 | 23.42 | 3.411 | 581 | 583 | 500 | 381 |
| 4-145 | 1.89904 | 23.53 | 3.43 | 584 | 578 | 490 | 378 |
| 4-146 | 1.89932 | 23.41 | 3.406 | 588 | 593 | 497 | 380 |
| 4-147 | 1.89937 | 23.62 | 3.426 | 587 | 580 | 500 | 381 |
| 4-148 | 1.90099 | 23.35 | 3.423 | 578 | 565 | 489 | 379 |
| 4-149 | 1.90325 | 23.32 | 3.426 | 588 | 591 | 500 | 381 |
| 4-150 | 1.90299 | 23.41 | 3.412 | 582 | 576 | 488 | 378 |

TABLE 4-3(1)-continued

| | | | | | | | |
|---|---|---|---|---|---|---|---|
| 4-151 | 1.90284 | 23.41 | 3.437 | 583 | 570 | 490 | 379 |
| 4-152 | 1.90019 | 23.49 | 3.413 | 588 | 576 | 496 | 380 |
| 4-153 | 1.9003 | 23.51 | 3.433 | 586 | | | |
| 4-154 | 1.90041 | 23.31 | 3.4 | 582 | 592 | 484 | 378 |
| 4-155 | 1.90055 | 23.31 | 3.4 | | 591 | 483 | 378 |
| 4-156 | 1.9005 | 23.29 | 3.401 | 583 | 576 | 474 | 377 |
| 4-157 | 1.90049 | 23.29 | 3.4 | | 572 | 473 | 377 |
| 4-158 | 1.89837 | 23.37 | 3.389 | 573 | 567 | 479 | 379 |
| 4-159 | 1.90132 | 23.29 | 3.4 | 582 | 569 | 483 | 379 |
| 4-160 | 1.89832 | 23.38 | 3.397 | 583 | 567 | 477 | 378 |
| 4-161 | 1.90151 | 23.25 | 3.402 | 583 | 558 | 473 | 378 |
| 4-162 | 2.01328 | 20.96 | 3.919 | 604 | N/A | 522 | 398 |
| 4-163 | 2.00332 | 20.96 | 3.88 | 612 | N/A | 525 | 397 |
| 4-164 | 2.00373 | 20.82 | 3.854 | 618 | N/A | 522 | 400 |
| 4-165 | 2.00319 | 21.01 | 3.89 | 619 | N/A | 517 | 396 |
| 4-166 | 2.00338 | 20.89 | 3.871 | 619 | 681 | 511 | 396 |
| 4-167 | 2.00866 | 20.89 | 3.888 | 605 | N/A | 527 | 399 |
| 4-168 | 2.01517 | 20.82 | 3.894 | 609 | N/A | 527 | 400 |
| 4-169 | 2.01957 | 20.77 | 3.903 | 621 | N/A | 529 | 400 |
| 4-170 | 1.89886 | 23.64 | 3.456 | 584 | 609 | 502 | 380 |
| 4-171 | 1.89904 | 23.74 | 3.464 | 594 | 587 | 488 | 378 |
| 4-172 | 1.89897 | 23.78 | 3.505 | 593 | 573 | 484 | 378 |
| 4-173 | 1.89946 | 23.69 | 3.496 | 590 | 562 | 478 | 378 |
| 4-174 | 1.89862 | 24.01 | 3.542 | 598 | 564 | 481 | 378 |
| 4-175 | 1.89917 | 23.93 | 3.534 | 589 | 567 | 482 | 379 |
| 4-176 | 1.89987 | 23.81 | 3.529 | 589 | 559 | 479 | 378 |

Example 4-2

The optical glasses (Nos. 4-1 to 4-97) prepared in Example 4-1 were compared with the optical glasses disclosed in Examples of Patent Documents 1 to 4. First, in a graph in which a mass ratio [$Li_2O$/{100−($SiO_2$+$B_2O_3$+$P_2O_5$+$GeO_2$)}] is a vertical axis, and a mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] is a horizontal axis, the optical glasses of Example 4-1 and the optical glasses disclosed in Examples of Patent Documents 1 to 4 were plotted. Results are illustrated in FIG. 4.

Next, in a graph in which a ratio [Refractive Index nd/Specific Weight] of the refractive index nd to the specific weight is a vertical axis, and a mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] is a horizontal axis, the optical glasses (Nos. 4-1 to 4-97) of Example 4-1 and the optical glasses disclosed in Examples of Patent Documents 1 to 4 were plotted. Note that, it is indicated that as the value of the ratio [Refractive Index nd/Specific Weight] that is the vertical axis increases, the refractive index increases, and the specific weight is further reduced. Results are illustrated in FIG. 5.

As illustrated in FIG. 4, the optical glasses of Example 4-1 and the optical glasses disclosed in Examples of Patent Documents 1 to 4 are distinguished by a line on which the mass ratio [$TiO_2$/($TiO_2$+$Nb_2O_5$+$WO_3$+$ZrO_2$+SrO+BaO+ZnO+$La_2O_3$+$Gd_2O_3$+$Y_2O_3$+$Ta_2O_5$+$Bi_2O_3$)] that is the horizontal axis is 0.40, and a line on which the mass ratio [$Li_2O$/{100-($SiO_2$+$B_2O_3$+$P_2O_5$+$GeO_2$)}] that is the vertical axis is 0.02.

In addition, as illustrated in FIG. 5, it is found that in the ratio [Refractive Index nd/Specific Weight] that is the vertical axis, the optical glasses of Example 4-1 have a value higher than that of the optical glasses disclosed in Examples of Patent Documents 1 to 4.

That is, it was found that the optical glasses of Example 4-1 were distinctively distinguished from the optical glasses disclosed in Examples of Patent Documents 1 to 4 on the basis of the composition, and had a remarkable effect that the ratio [Refractive Index nd/Specific Weight] was high.

Example 4-3

A lens blank was prepared by using each of the optical glasses prepared in Example 4-1 in accordance with a known method, and various lenses were prepared by processing the lens blank in accordance with a known method such as polishing.

The prepared optical lens was various lenses such as a planar lens, a biconvex lens, a biconcave lens, a plano-convex lens, a plano-concave lens, a concave meniscus lens, and a convex meniscus lens.

A secondary chromatic aberration was capable of being excellently corrected by combining various lenses with a lens including another type of optical glass.

In addition, the glass had a low specific weight, and thus, each of the lenses had a small weight compared to a lens having the same optical properties and size, and was suitable for goggle type or spectacle type AR display device or MR display device. Similarly, a prism was prepared by using various optical glasses prepared in Example 1-1.

Example 4-4

Each of the optical glasses prepared in Example 4-1 was processed into the shape of a rectangular thin plate having Length of 50 mm×Width of 20 mm×Thickness of 1.0 mm to obtain a light guide plate. The light guide plate was built in the head mounted display 1 illustrated in FIG. 2.

In the head mounted display obtained as described above, an image was evaluated in an eye-point position, and a high-brightness and high-contrast image was capable of being observed at a wide viewing angle.

COMPARATIVE EXAMPLES

Glass samples having glass compositions shown in Table 5(1) were prepared by the following procedure, and various evaluations were performed. Note that, Comparative Examples 1 to 7 have the same compositions as those of the glasses disclosed in the following documents, respectively.

Comparative Example 1: Physics and Chemistry of Glasses, vol. 12, p. 93, 1971

Comparative Example 2: J. Non-Crystalline Solids, vol. 107, p. 244, 1989

Comparative Example 3: J. American Ceramic Soc., vol. 73, p. 2743, 1990

Comparative Example 4: Applied Optics, vol. 29, p. 3126, 1990

Comparative Example 5: Applied Optics, vol. 29, p. 3126, 1990

Comparative Example 6: JP Patent Application Laid Open 2003-252646

Comparative Example 7: J. American Ceramic Soc., vol. 94, p. 2086, 2011

[Manufacturing of Optical Glass]

First, an oxide, a hydroxide, a carbonate, and a nitrate corresponding to structural components of the glass were prepared as a raw material, the raw materials were weighed and blended such that a glass composition of optical glass to be obtained was each of the compositions shown in Table 5(1), and the raw materials were sufficiently mixed. A blended raw material (a batch raw material) obtained as described above was put in a platinum crucible, and was heated at 1350° C. to 1400° C. for 2 hours to be molten glass, and the molten glass was stirred, homogenized, and clarified, and then, was cast into a mold that was preheated to a suitable temperature. The cast glass was subjected to a heat treatment at approximately a glass transition temperature Tg for 30 minutes, and was allowed to cool in a furnace to a room temperature, and thus, a glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Table 5(1).

[Measurement of Optical Properties]

The obtained glass sample was further subjected to an annealing treatment at approximately the glass transition temperature Tg for approximately 30 minutes to 2 hours, and then, was cooled in the furnace to the room temperature at a temperature decrease rate of −30° C./hour, and thus, an annealed sample was obtained. In the obtained annealed sample, a refractive index nd and a specific weight were measured. Results are shown in Table 5(2).

(i) Refractive Index nd

In the annealed sample, the refractive index nd was measured by a refractive index measurement method of JIS standard JIS B 7071-1.

(ii) Specific Weight

The specific weight was measured by an Archimedes method.

[Observation of Glass]

The obtained glass sample was observed. In all of Comparative Examples 1 to 7, a part of the glass sample or the entire glass sample was devitrified, and thus, glass applicable to the optical glass was not capable of being obtained. Pictures of the glass samples obtained in Comparative Examples 1, 2, and 4 to 7 are illustrated in FIGS. 6 to 11, respectively.

TABLE 5(1)

| % by mass | | | | | | | | |
|---|---|---|---|---|---|---|---|---|
| No. | $SiO_2$ | $Nb_2O_5$ | $B_2O_3$ | $Al_2O_3$ | $Li_2O$ | $Na_2O$ | $K_2O$ | ZnO |
| Comparative Example 1 | 18.80 | 65.80 | 0 | 0 | 0 | 15.40 | 0 | 0 |
| Comparative Example 2 | 13.62 | 45.19 | 0 | 0 | 0 | 14.04 | 0 | 0 |
| Comparative Example 3 | 14.10 | 69.70 | 0 | 0 | 0 | 16.20 | 0 | 0 |
| Comparative Example 4 | 11.18 | 49.46 | 12.95 | 0 | 0 | 11.53 | 0 | 0 |
| Comparative Example 5 | 10.55 | 46.67 | 12.22 | 0 | 0 | 0 | 16.54 | 0 |
| Comparative Example 6 | 19.20 | 23.40 | 2.70 | 0 | 3.10 | 17.9 | 0 | 3.00 |
| Comparative Example 7 | 23.81 | 65.83 | 0 | 0 | 10.36 | 0 | 0 | 0 |

| No. | $TiO_2$ | $WO_3$ | Total | $Li_2O + Na_2O + K_2O + Cs_2O$ | $Gd_2O_3 + La_2O_3 + Y_2O_3$ | $TiO_2 + Nb_2O_5$ | $TiO_2/(TiO_2 + Nb_2O_5)$ |
|---|---|---|---|---|---|---|---|
| Comparative Example 1 | 0 | 0 | 100 | 15.40 | 0 | 65.80 | 0 |
| Comparative Example 2 | 27.15 | 0 | 100 | 14.04 | 0 | 72.34 | 0.375 |
| Comparative Example 3 | 0 | 0 | 100 | 16.20 | 0 | 69.70 | 0 |
| Comparative Example 4 | 14.86 | 0 | 99.98 | 11.53 | 0 | 64.32 | 0.231 |
| Comparative Example 5 | 14.02 | 0 | 100 | 16.54 | 0 | 60.69 | 0.231 |
| Comparative Example 6 | 30.30 | 0.40 | 100 | 21.00 | 0 | 53.70 | 0.564 |
| Comparative Example 7 | 0 | 0 | 100 | 10.36 | 0 | 65.83 | 0 |

TABLE 5(2)

| No. | % by mass: $Li_2O/(Li_2O + Na_2O + K_2O + Cs_2O)$ | $Na_2O + K_2O + Cs_2O$ | $Li_2O/\{100 - (SiO_2 + B_2O_3 + P_2O_5 + GeO_2)\}$ | $TiO_2/(TiO_2 + Nb_2O_5 + WO_3 + ZrO_2 + SrO + BaO + ZnO + La_2O_3 + Gd_2O_3 + Y_2O_3 + Ta_2O_5 + Bi_2O_3)$ | Glass properties Refractive index |
|---|---|---|---|---|---|
| Comparative Example 1 | 0 | 15.40 | 0 | 0 | 1.93 |
| Comparative Example 2 | 0 | 14.04 | 0 | 0.375311031 | 1.95 |
| Comparative Example 3 | 0 | 16.20 | 0 | 0 | 2.10 |
| Comparative Example 4 | 0 | 11.53 | 0 | 0.231032338 | 1.93 |
| Comparative Example 5 | 0 | 16.54 | 0 | 0.231010051 | 1.88 |
| Comparative Example 6 | 0.1476190 | 17.90 | 0 | 0.530647986 | 1.85 |
| Comparative Example 7 | 1 | 0 | 0 | 0 | 1.99 |

| No. | Glass properties: Specific weight | nd/Specific weight | 0.2 × Specific weight + 1.18 | nd − [0.2 × Specific weight + 1.18] |
|---|---|---|---|---|
| Comparative Example 1 | 3.7 | 0.521622 | 1.920 | 0.010 |
| Comparative Example 2 | 3.6 | 0.541667 | 1.900 | 0.050 |
| Comparative Example 3 | 3.994 | 0.525789 | 1.9788 | 0.1212 |
| Comparative Example 4 | 3.49 | 0.553009 | 1.878 | 0.052 |
| Comparative Example 5 | 3.23 | 0.582043 | 1.826 | 0.054 |
| Comparative Example 6 | 3.27 | 0.565749 | 1.834 | 0.016 |
| Comparative Example 7 | 3.57 | 0.557423 | 1.894 | 0.096 |

It should be considered that the embodiments disclosed here are exemplary in all respects and not restrictive. The scope of the present invention is shown by the claims but not the above description, and is intended to include all modifications within the meaning and the scope equivalent to the claims.

For example, the optical glass according to one aspect of the present invention can be prepared by performing an adjustment of the composition described herein with respect to the glass composition exemplified above.

In addition, it is obvious that two or more respects described herein as an example or a preferable range can be arbitrarily combined.

The invention claimed is:

1. Optical glass that is $SiO_2$—$TiO_2$—$Nb_2O_5$-based glass, wherein a content of $SiO_2$ is 10% by mass or more, a content of $TiO_2$ is 10% by mass or more, a total content [$Na_2O$+$K_2O$+$Cs_2O$] of $Na_2O$, $K_2O$, and $Cs_2O$ is 11.0% by mass or less, and a specific gravity and a refractive index nd satisfy Expression (1) described below:

$$nd \geq 0.2 \times \text{Specific Gravity} + 1.18 \quad (1).$$

2. An optical element, comprising:

the optical glass according to claim 1.

3. A light guide plate, comprising:

the optical glass according to claim 1.

4. The light guide plate according to claim 3, wherein a diffraction grating is provided on a surface.

5. An image display device, comprising:

an image display element; and a light guide plate guiding light exiting from the image display element, wherein the light guide plate comprises the optical glass according to claim 1.

* * * * *